(12) United States Patent
Zuckerman et al.

(10) Patent No.: US 9,632,936 B1
(45) Date of Patent: Apr. 25, 2017

(54) TWO-TIER DISTRIBUTED MEMORY

(71) Applicant: Parallel Machines Ltd., Tel Aviv (IL)

(72) Inventors: Gal Zuckerman, Holon (IL); Avner Braverman, Tel-Aviv (IL); Lior Khermosh, Givataim (IL)

(73) Assignee: Parallel Machines Ltd., Tel Aviv (IL)

( * ) Notice: Subject to any disclaimer, the term of this patent is extended or adjusted under 35 U.S.C. 154(b) by 92 days.

(21) Appl. No.: 14/868,788

(22) Filed: Sep. 29, 2015

Related U.S. Application Data

(60) Provisional application No. 62/089,453, filed on Dec. 9, 2014, provisional application No. 62/109,663, filed
(Continued)

(51) Int. Cl.
   *G06F 3/06* (2006.01)
   *G06F 12/0855* (2016.01)
   (Continued)

(52) U.S. Cl.
   CPC .......... *G06F 12/0855* (2013.01); *G06F 3/067* (2013.01); *G06F 3/0613* (2013.01);
   (Continued)

(58) Field of Classification Search
   CPC .......... G06F 11/1469; G06F 17/30091; G06F 11/1076; G06F 11/1461; G06F 3/061;
   (Continued)

(56) References Cited

U.S. PATENT DOCUMENTS

| 5,185,871 A | 2/1993 | Frey et al. |
| 5,251,308 A | 10/1993 | Steven et al. |

(Continued)

FOREIGN PATENT DOCUMENTS

| EP | 0154551 | 12/1987 |
| EP | 0557736 | 11/2005 |
| WO | 2013/177313 | 11/2013 |

OTHER PUBLICATIONS

Lim, Kevin, et al. "Thin servers with smart pipes: designing SoC accelerators for memcached." ACM SICIARCH Computer Architecture News 41.3 (2013): 36-47.
(Continued)

*Primary Examiner* — Mark Giardino, Jr.
*Assistant Examiner* — Edward Waddy, Jr.
(74) *Attorney, Agent, or Firm* — Active Knowledge Ltd.

(57) ABSTRACT

Described herein are systems and methods to redirect data read requests from the first tier to the second tier of a two-tier distributed memory. The first tier includes memory modules with data sets. Data interfaces associated with the first tier memory modules, receive from a second tier including compute elements and associated cache memories, requests to fetch data from the first tier. If a data set has not recently been fetched by the second tier, then the data interface will send the data set from the first tier to the cache memory associated with the requesting compute element. If a data set has recently been fetched by the second tier, the data interface will redirect the requesting compute element to fetch the data set from the cache memory in which the data set is currently located.

25 Claims, 74 Drawing Sheets

Related U.S. Application Data on Jan. 30, 2015, provisional application No. 62/121,523, filed on Feb. 27, 2015, provisional application No. 62/129,876, filed on Mar. 8, 2015, provisional application No. 62/141,904, filed on Apr. 2, 2015, provisional application No. 62/149,606, filed on Apr. 19, 2015, provisional application No. 62/180,269, filed on Jun. 16, 2015, provisional application No. 62/195,824, filed on Jul. 23, 2015.

(51) Int. Cl.
  *G06F 12/0815* (2016.01)
  *G06F 12/0842* (2016.01)
  *G06F 13/16* (2006.01)
  G06F 12/02 (2006.01)
  G06F 12/08 (2016.01)
  G06F 13/00 (2006.01)

(52) U.S. Cl.
  CPC .......... *G06F 3/0658* (2013.01); *G06F 3/0659* (2013.01); *G06F 12/0815* (2013.01); *G06F 12/0842* (2013.01); *G06F 13/1673* (2013.01); G06F 2212/1024 (2013.01); G06F 2212/154 (2013.01); G06F 2212/621 (2013.01)

(58) Field of Classification Search
  CPC ...... G06F 11/2094; G06F 3/067; G06F 21/10; G06F 21/60; G06F 11/1464; G06F 3/0656; G06F 11/1096; G06F 17/30082; G06F 2211/102; G06F 11/0727; G06F 11/1456; G06F 12/0897; G06F 2212/60; G06F 3/0683; G06F 3/0647; G06F 11/1435; G06F 17/30067; G06F 12/0638; G06F 12/0871; G06F 2212/222; G06F 3/0604; G06F 3/0643
  USPC ......... 711/162, 112, 154, E12.001, E12.017, 711/100, 118, 161, 165, 202, E12.083, 711/170, 206, 221, E12.066; 709/201
  See application file for complete search history.

(56) References Cited

U.S. PATENT DOCUMENTS

| | | |
|---|---|---|
| 5,423,019 A | 6/1995 | Lin et al. |
| 5,544,345 A | 8/1996 | Carpenter et al. |
| 5,586,264 A | 12/1996 | Belknap et al. |
| 5,655,100 A | 8/1997 | Ebrahim et al. |
| 5,664,148 A | 9/1997 | Mulla et al. |
| 5,704,053 A | 12/1997 | Santhanam |
| 5,765,036 A | 6/1998 | Lim |
| 6,243,709 B1 | 6/2001 | Tung |
| 6,289,506 B1 | 9/2001 | Kwong et al. |
| 6,507,834 B1 | 1/2003 | Kabra et al. |
| 6,880,049 B2 | 4/2005 | Gruner et al. |
| 6,889,288 B2 | 5/2005 | Bono et al. |
| 6,931,630 B1 | 8/2005 | Cotner et al. |
| 6,978,261 B2 | 12/2005 | Cotner et al. |
| 6,988,139 B1 | 1/2006 | Jervis et al. |
| 6,988,180 B2 | 1/2006 | Kadatch |
| 7,111,125 B2 | 9/2006 | Hooker |
| 7,266,716 B2 | 9/2007 | Frolund et al. |
| 7,318,215 B1 | 1/2008 | Krishnan et al. |
| 7,536,693 B1 | 5/2009 | Manczak et al. |
| 7,571,275 B2 | 8/2009 | Nelson |
| 7,587,545 B2 | 9/2009 | Kashiwaya et al. |
| 7,596,576 B2 | 9/2009 | Venkatesh et al. |
| 7,685,367 B2 | 3/2010 | Ruia et al. |
| 7,725,655 B2* | 5/2010 | Frolund .............. G06F 11/1064 707/674 |
| 7,739,287 B1 | 6/2010 | Chapman et al. |
| 7,818,541 B2 | 10/2010 | Rhoades et al. |
| 7,912,835 B2 | 3/2011 | Rajamani et al. |
| 7,934,020 B1 | 4/2011 | Xu et al. |
| 8,041,940 B1 | 10/2011 | Natanzon et al. |
| 8,051,362 B2 | 11/2011 | Li et al. |
| 8,181,065 B2 | 5/2012 | Fachan et al. |
| 8,209,664 B2 | 6/2012 | Yu et al. |
| 8,219,758 B2 | 7/2012 | Wang et al. |
| 8,224,931 B1 | 7/2012 | Brandwine et al. |
| 8,239,847 B2 | 8/2012 | Yu et al. |
| 8,296,743 B2 | 10/2012 | Linderman et al. |
| 8,327,071 B1 | 12/2012 | Danskin et al. |
| 8,386,840 B2 | 2/2013 | Stougie et al. |
| 8,392,880 B2 | 3/2013 | Ahadian et al. |
| 8,396,946 B1 | 3/2013 | Brandwine et al. |
| 8,402,061 B1 | 3/2013 | Briggs et al. |
| 8,433,849 B2 | 4/2013 | De Schrijver et al. |
| 8,473,778 B2 | 6/2013 | Simitci et al. |
| 8,527,719 B2 | 9/2013 | Klapman et al. |
| 8,589,666 B2 | 11/2013 | Hammes |
| 8,626,725 B2 | 1/2014 | Netz et al. |
| 8,700,683 B2 | 4/2014 | Cooney et al. |
| 8,707,098 B2 | 4/2014 | Anderson et al. |
| 8,713,074 B2 | 4/2014 | Adler |
| 8,726,129 B1 | 5/2014 | Aguilera et al. |
| 8,738,855 B2 | 5/2014 | De Spiegeleer et al. |
| 8,793,674 B2 | 7/2014 | Ravi et al. |
| 8,825,959 B1 | 9/2014 | Switakowski et al. |
| 8,874,535 B2 | 10/2014 | McKenney |
| 8,914,333 B2 | 12/2014 | Bird et al. |
| 8,977,818 B2 | 3/2015 | Wang et al. |
| 9,003,082 B2 | 4/2015 | Okada et al. |
| 9,052,948 B2 | 6/2015 | Munshi et al. |
| 9,135,351 B2 | 9/2015 | Mizobuchi et al. |
| 2002/0188594 A1 | 12/2002 | Kulp et al. |
| 2003/0126233 A1* | 7/2003 | Bryers ................ H04L 29/06 709/219 |
| 2004/0015878 A1 | 1/2004 | Saito |
| 2004/0073752 A1 | 4/2004 | Musumeci |
| 2005/0114827 A1 | 5/2005 | Lane et al. |
| 2006/0053424 A1 | 3/2006 | Koistinen et al. |
| 2007/0124415 A1 | 5/2007 | Lev-Ran et al. |
| 2008/0133844 A1 | 6/2008 | Ramani et al. |
| 2008/0250046 A1 | 10/2008 | Nelson |
| 2009/0119460 A1 | 5/2009 | Lin et al. |
| 2010/0010962 A1 | 1/2010 | Sarapuk |
| 2010/0023524 A1 | 1/2010 | Gladwin et al. |
| 2010/0174968 A1 | 7/2010 | Charles et al. |
| 2010/0180006 A1 | 7/2010 | Nourbakhsh et al. |
| 2011/0029840 A1 | 2/2011 | Ozzie et al. |
| 2011/0145511 A1 | 6/2011 | Woffinden |
| 2011/0320558 A1 | 12/2011 | Gross et al. |
| 2012/0059934 A1 | 3/2012 | Rafiq et al. |
| 2012/0317365 A1 | 12/2012 | Elhamias |
| 2013/0081066 A1 | 3/2013 | Munshi et al. |
| 2014/0129881 A1 | 5/2014 | De Schrijver et al. |
| 2014/0143465 A1 | 5/2014 | Mealey et al. |
| 2014/0351547 A1 | 11/2014 | Dietterich et al. |
| 2014/0359044 A1 | 12/2014 | Davis et al. |
| 2015/0019829 A1 | 1/2015 | Sivasubramanian et al. |
| 2015/0149732 A1 | 5/2015 | Kiperberg et al. |
| 2016/0110284 A1* | 4/2016 | Athalye ................ G06F 12/084 711/120 |
| 2016/0275014 A1* | 9/2016 | Lim ...................... G06F 13/385 |

OTHER PUBLICATIONS

Blott, M., and K. Vissers. "Dataflow Architectures for 10Gbps Line-Rate Key-Value Stores." HotChips 2013 (2013).

Matthew Huxtable "A high-performance key-value store Computer Science Tripos, Part II" St John's College, May 15, 2014.

Rixner, Scott. Stream processor architecture. Springer Science & Business Media, 2001.

Collins, Jamison, et al. "Pointer cache assisted prefctching." Proceedings of the 35th annual ACM/IEEE international symposium on Microarchitecture. IEEE Computer Society Press, 2002.

Offloading Computation to your GPU http://www.centerspace.net/blog/offloading-computation-to-your-gpu/.

(56) References Cited

OTHER PUBLICATIONS

Topham, Nigel, et al. "Compiling and optimizing for decoupled architectures. 2.1 The target architecture" Supercomputing, 1995. Proceedings of the IEEE/ACM SC95 Conference. IEEE, 1995.

* cited by examiner

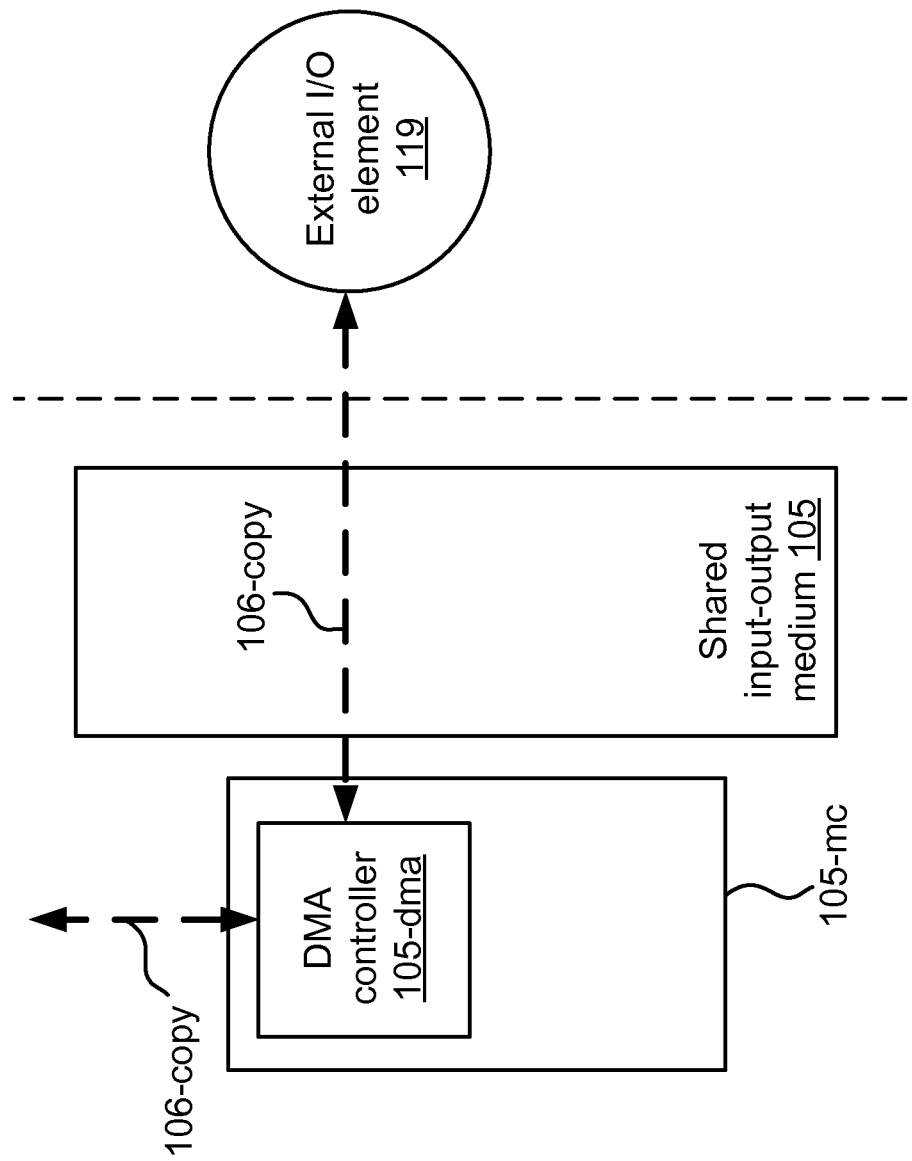

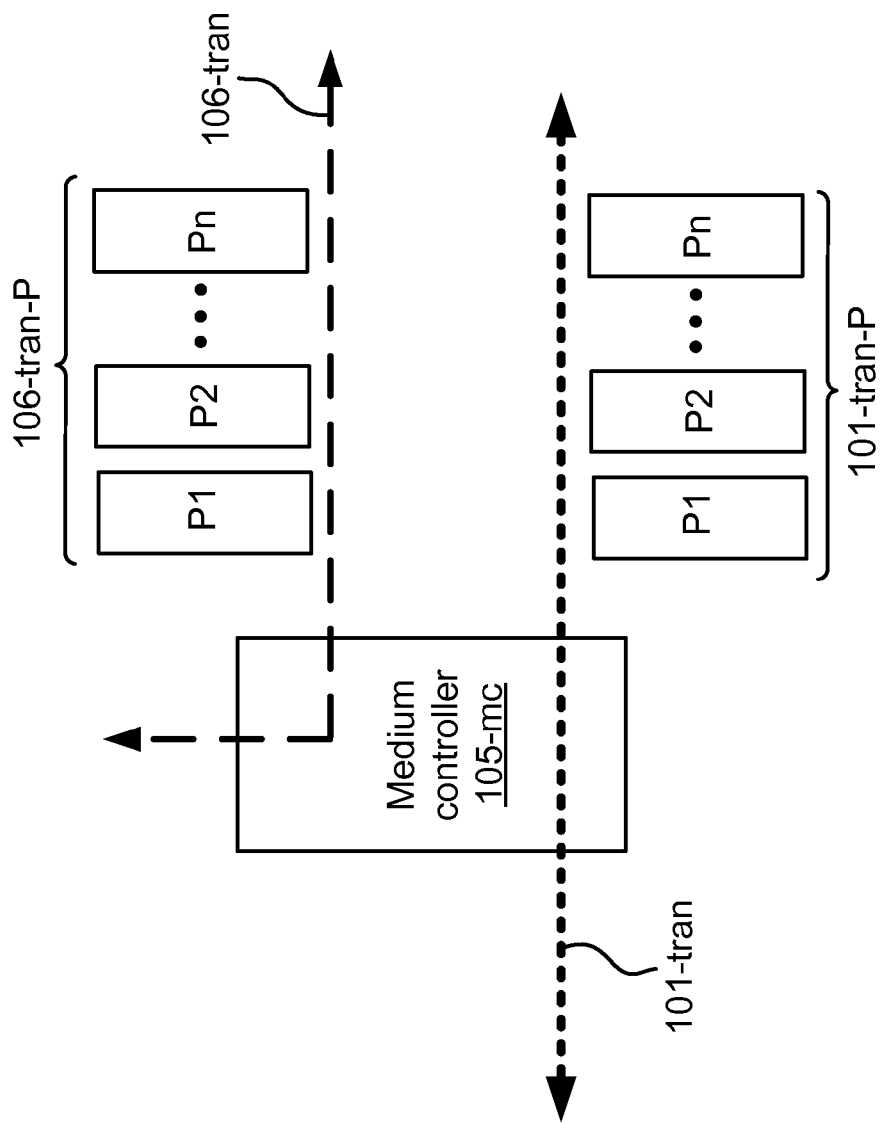

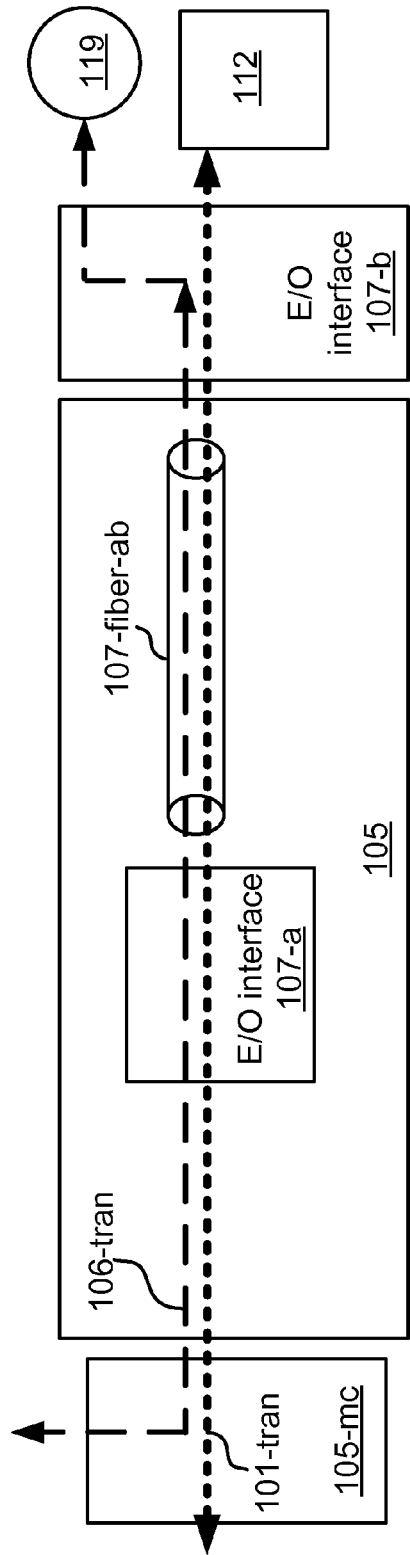
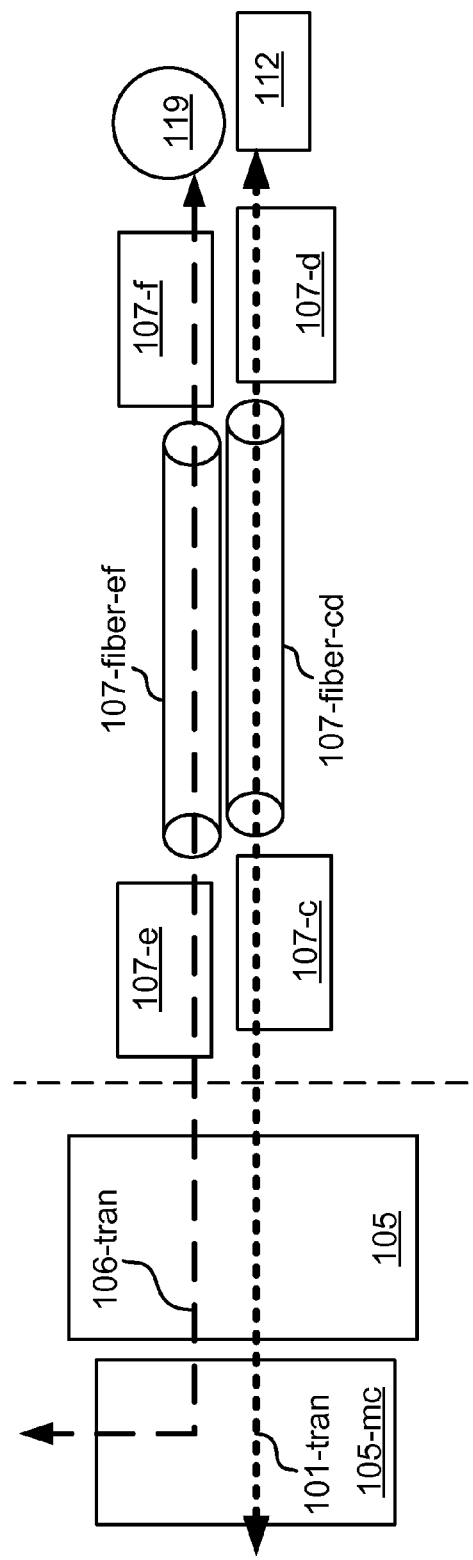
FIG. 5A
FIG. 5B

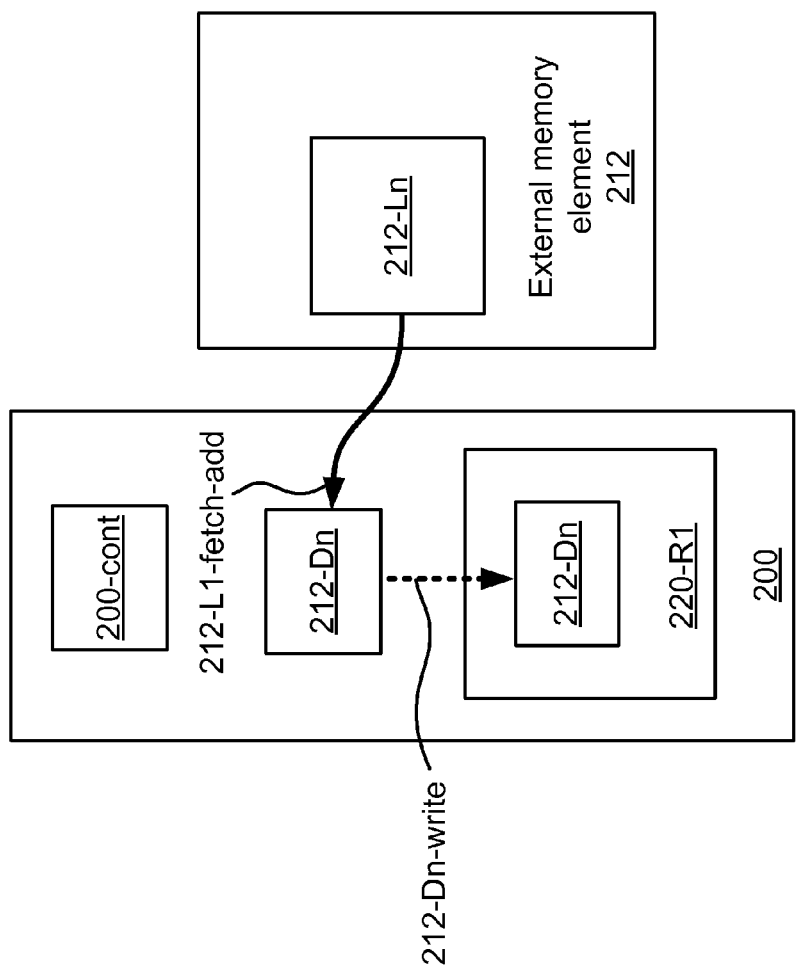
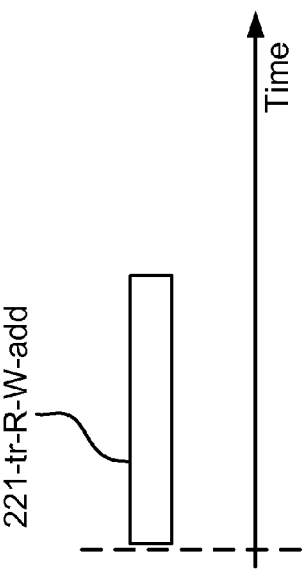
FIG. 7E
FIG. 7F

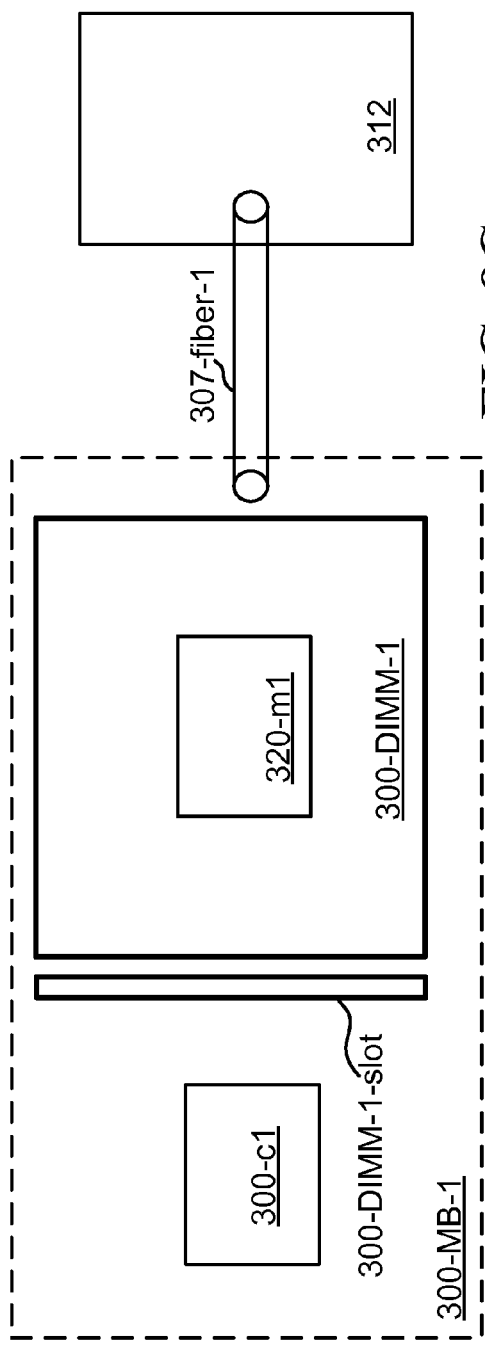
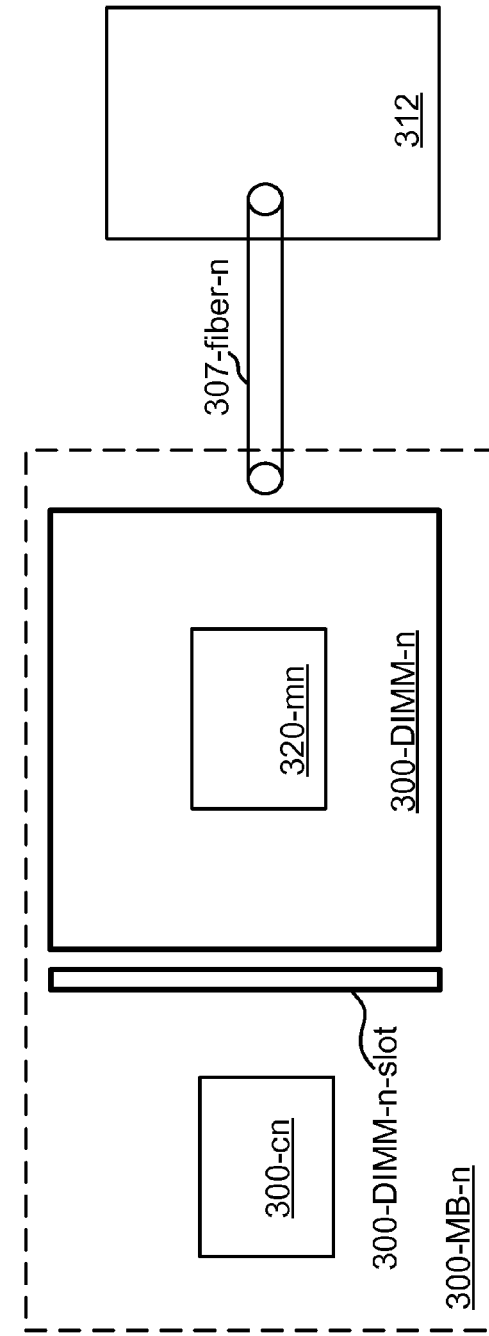

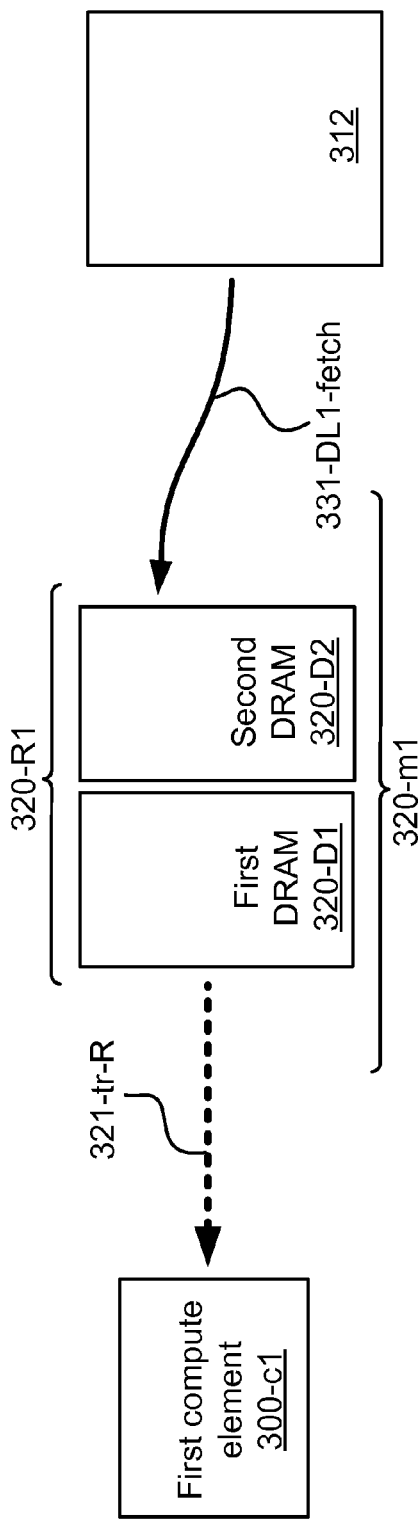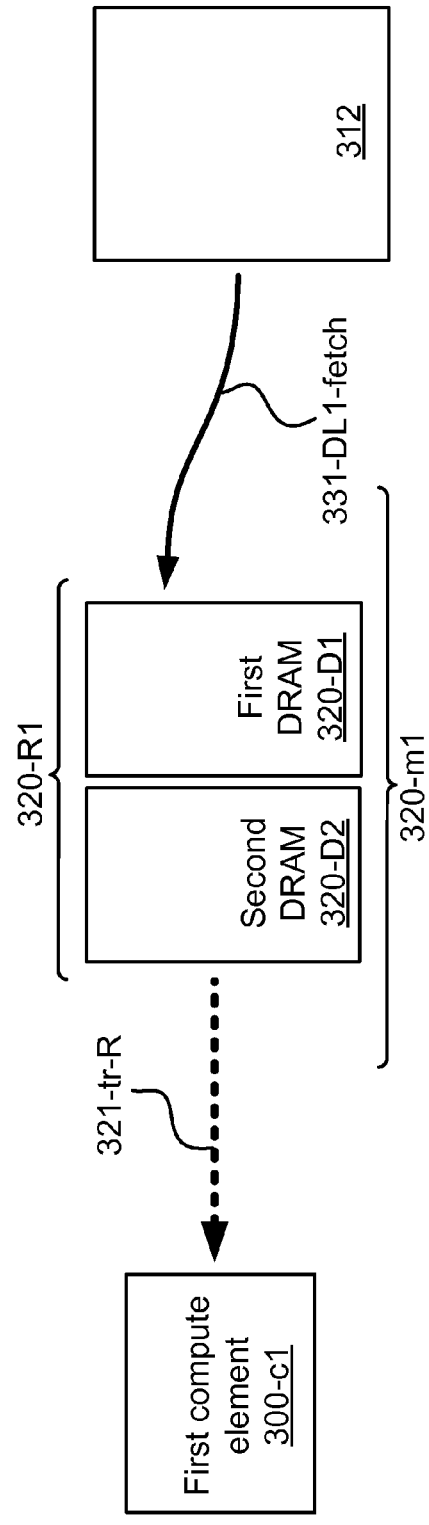

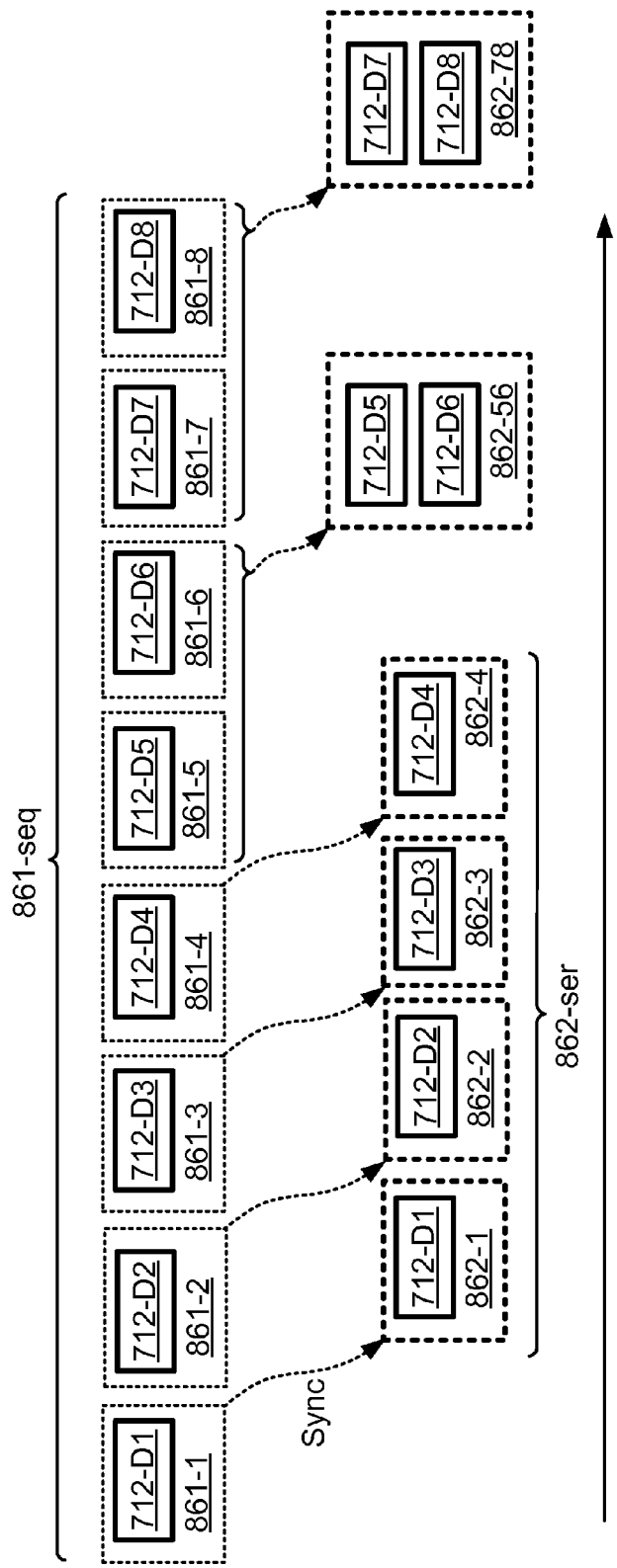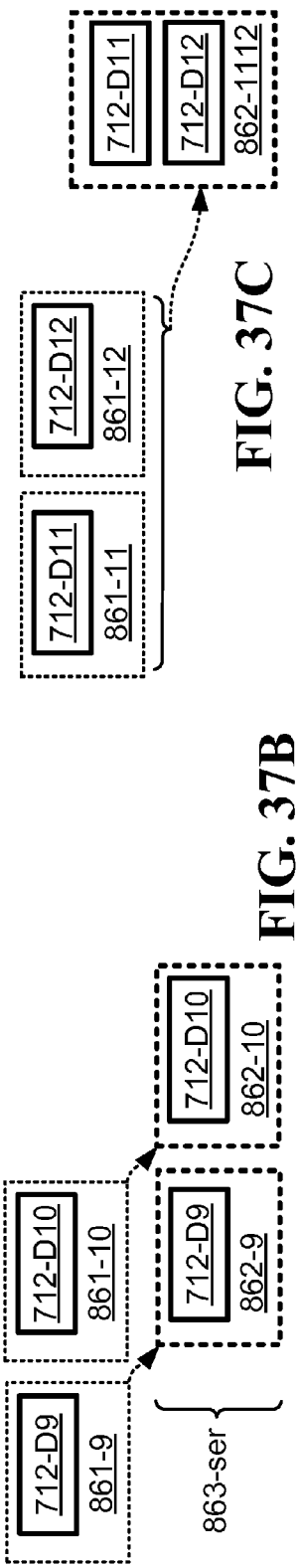
FIG. 37A
FIG. 37B
FIG. 37C

TWO-TIER DISTRIBUTED MEMORY

CROSS REFERENCE TO RELATED APPLICATIONS

The present application is related to and claims priority under 35 USC §120 to U.S. Provisional Application No. 62/089,453, filed on Dec. 9, 2014, which is hereby incorporated by reference.

The present application is also related to and claims priority under 35 USC §120 to U.S. Provisional Application No. 62/109,663, filed on Jan. 30, 2015, which is hereby incorporated by reference.

The present application is also related to and claims priority under 35 USC §120 to U.S. Provisional Application No. 62/121,523, filed on Feb. 27, 2015, which is hereby incorporated by reference.

The present application is also related to and claims priority under 35 USC §120 to U.S. Provisional Application No. 62/129,876, filed on Mar. 8, 2015, which is hereby incorporated by reference.

The present application is also related to and claims priority under 35 USC §120 to U.S. Provisional Application No. 62/141,904, filed on Apr. 2, 2015, which is hereby incorporated by reference.

The present application is also related to and claims priority under 35 USC §120 to U.S. Provisional Application No. 62/149,606, filed on Apr. 19, 2015, which is hereby incorporated by reference.

The present application is also related to and claims priority under 35 USC §120 to U.S. Provisional Application No. 62/180,269, filed on Jun. 16, 2015, which is hereby incorporated by reference.

The present application is also related to and claims priority under 35 USC §120 to U.S. Provisional Application No. 62/195,824, filed on Jul. 23, 2015, which is hereby incorporated by reference.

BACKGROUND

In data processing systems, the efficiency of the system is impacted directly by the number of data read requests, and by the manner in which requested data sets is provided. In typical systems, each compute element has its own associated cache memory. In alternative systems, two or some other limited number of compute elements may share a cache memory. However, in both types of systems, a system may have tens, hundreds, or thousands of compute elements, with corresponding numbers of cache memories. These cache memories in such a system are not coordinated, in the sense that one cache memory and the compute elements associated with that cache memory, do not know what is held in the other cache memories. As a result, when a compute element needs a data set, it must request and receive the data set from main memory, even if the data set was previously requested by another compute element and stored in local cache.

SUMMARY

Described herein are systems and methods that can enable a first compute element to receive a requested data set from the cache memory associated with a second compute element, rather than receiving the data set from main memory.

One embodiment is a system (FIG. 42) operative to produce a two-tier distributed memory. In one particular form of such embodiment, the system includes a plurality of compute elements, a plurality of data interfaces associated respectively with a plurality of memory modules storing distributively a plurality of data sets, and a switching network configured to communicatively interconnect the plurality of compute elements with the plurality of data interfaces. Each of the compute elements is configured to request and receive from any of the data interfaces, via the switching network, at least one of the data sets stored in the associated memory module, thereby creating, in conjunction with the plurality of cache memories, a distributed copy of at least some of the data sets. Further, each of the data interfaces includes a data registry which is configured to record, in conjunction the requests for the data sets, an identity of the compute element which made the request. Based on this record, the data interface redirects any current request for one of the data sets to one of the compute elements whose identity has been recorded in the data registry. The result is a two-tier distributed memory, in which one tier is associated with the plurality of memory modules, and a second tier is associated with the plurality of cache memories.

One embodiment is a system (FIG. 42) operative to decide on redirecting data read requests in conjunction with memory disaggregation. In one particular form of such embodiment, the system includes a plurality of compute elements, a first data interface associated with a first memory module storing a plurality of data sets, in which the first memory module belongs to a shared memory pool operative to achieve (in conjunction with the plurality of compute elements) memory disaggregation in the system, and a data registry associated with the first data interface. The first data interface is configured to record, in the data registry, information associated with prior distribution of any of the data sets to any of the compute elements in conjunction with operation of the memory disaggregation. The first data interface is further configured to receive, from one of the compute elements, a current request for one of the data sets. The first data interface is further configured to decide, based at least in part on the information recorded, whether to (i) respond to the current request by transporting, in conjunction with the memory disaggregation, the data set from the first memory module to the compute element making the current request, or to (ii) respond to the current request by causing the compute element making the current request to receive the data set from one of the compute elements to which the data set was previously distributed, thereby boosting performance of the memory disaggregation.

One embodiment is a method (FIG. 43) for redirecting data read requests, comprising: recording, by a data registry in a first data interface associated with storage of a first data set in a memory module, an identity associated with a first compute element that has requested, and that has received, the first data set from the first data interface, such that an association is made between the first compute element and the first data set; receiving from a second compute element, in the first data interface, a current request to obtain the first data set; detecting, by the first data interface, in conjunction with the current request, and based on the association made, that the second compute element is currently requesting the first data set that was previously requested by the first compute element; and, based on this detection, causing the second compute element, by the first data interface, in conjunction with the current request, to receive the first data set from the first compute element or a cache thereof instead of receiving the first data set from the first data interface or associated storage in a memory module, thereby effectively redirecting the current request.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 1D illustrates one embodiment of a system configured to implement a general communication transaction over a shared input-output medium;

FIG. 2A illustrates one embodiment of a system configured to transmit data packets associated with both either a cache related memory transaction or a general communication transactions;

FIG. 5A illustrates one embodiment of a system configured to mix cache related memory transactions together with general communication transactions over a shared input-output medium, in which there is a conflict between a cache related memory I/O data packet and a general communication I/O data packet, and in which there is a fiber optic line and electrical/optical interfaces;

FIG. 5B illustrates one embodiment of a system configured to mix cache related memory transactions together with general communication transactions over a shared input-output medium, in which there is a conflict between a cache related memory I/O data packet and a general communication I/O data packet, and in which there are two or more fiber optic lines, and in which each fiber optic line has two or more electrical/optical interfaces;

FIG. 7E illustrates one embodiment of a system controller configured to fetch additional data elements from additional memory locations of an external memory, and write such data elements to RAM memory;

FIG. 7F illustrates one embodiment of a process by which a system the writing of additional data elements to RAM memory occurs essentially concurrently with additional synchronous random-access write cycles;

FIG. 8C illustrates one embodiment of a system configured to cache a shared memory pool using at least two memory modules, in which a first compute element is placed on a first motherboard, a first DIMM module is connected to the first motherboard via a first DIMM slot, and first data link is comprised of a first optical fiber;

FIG. 8D illustrates one embodiment of a system configured to cache a shared memory pool using at least two memory modules, in which a second compute element is placed on a second motherboard, a second DIMM module is connected to the second motherboard via a second DIMM slot, and a second data link is comprised of a second optical fiber;

FIG. 8H illustrates one embodiment of a system configured to cache a shared memory pool using at least two memory modules, wherein a memory module includes a first RAM comprising a first bank of RAM and a second bank of RAM;

FIG. 8I illustrates one embodiment of a system configured to cache a shared memory pool using at least two memory modules, wherein a memory module includes a first RAM comprising a first bank of RAM and a second bank of RAM;

FIG. 37A illustrates one embodiment of a sequence of store commands, in which each store command includes a single data set to be stored, and in which the system generates a series of data write requests in which initially each data write request includes a single data set, and a later data write request includes multiple data sets;

FIG. 37B illustrates one embodiment of multiple store commands which result in a series of resynchronized data write requests, in which each data write request includes a single data set;

FIG. 37C illustrates one embodiment of multiple store commands each holding a single data set, in which at least two data sets have been aggregated in a single data write request;

FIG. 40A illustrates one embodiment of a process in which a first action is taken prior to use of a particular data set, the data set is requested and received, and a second action is then taken using the data set;

FIG. 40B illustrates one embodiment of a process in which a first action is taken prior to use of a particular data set, the data set is requested and received, and a second action is then taken using the data set. The process illustrated in FIG. 40B is different from the process illustrated in FIG. 40A, in that the two processes use the same data set for different actions;

FIG. 40C illustrates one embodiment of the two processes, in which the processes share a common first action, and the processes both use the data set after being fetched once, but the processes use the data set in different actions;

DETAILED DESCRIPTION

Figure 1A:
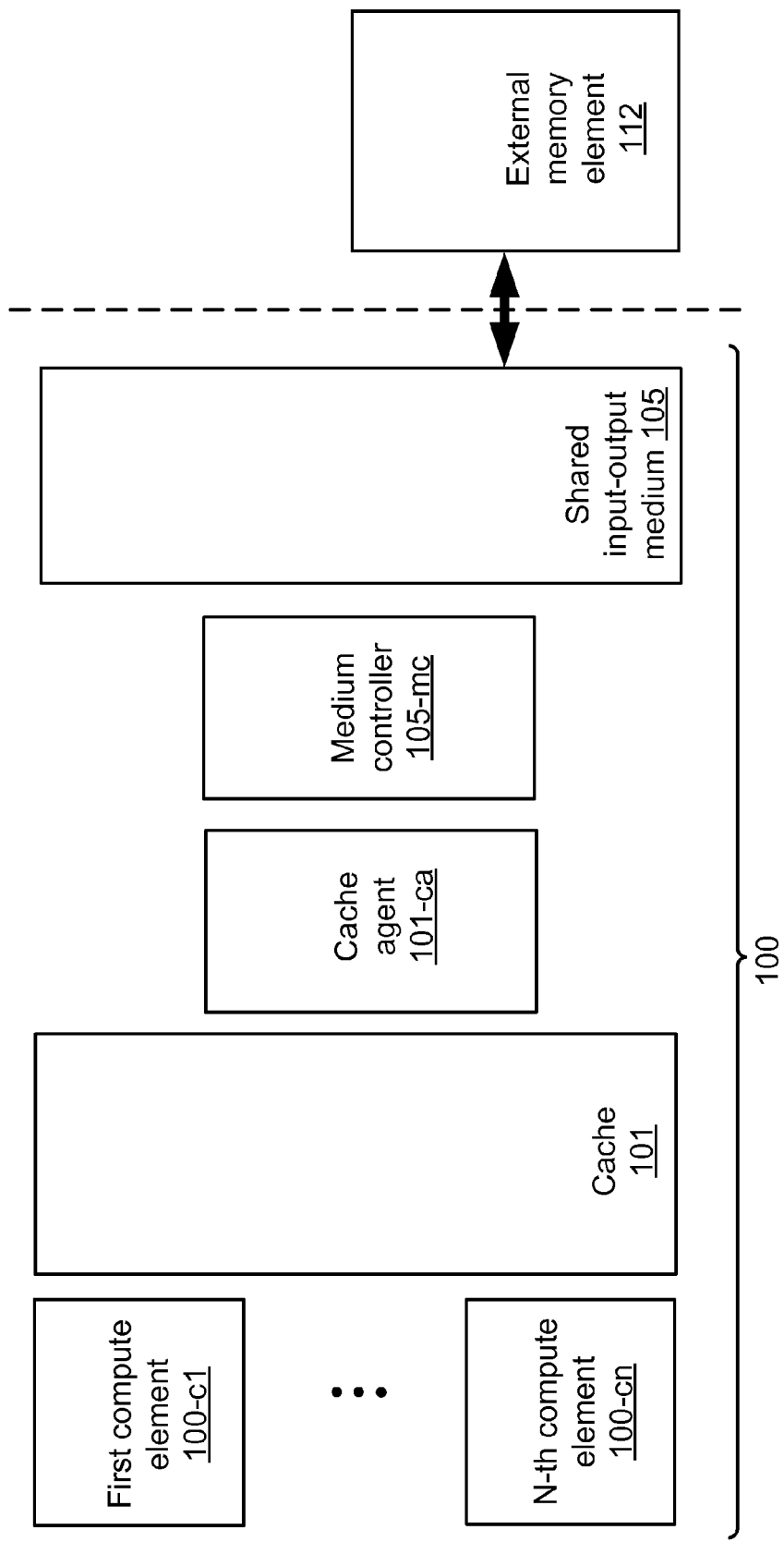
FIG. 1A illustrates one embodiment of a system configured to mix cache related memory transactions together with general communication transactions over a shared input-output medium.

In this description, "cache related memory transaction" or a "direct cache related memory transaction" is a transfer of one or more data packets to or from a cache memory. A "latency-critical cache transaction" is a cache transaction in which delay of a data packet to or from the cache memory is likely to delay execution of the task being implemented by the system.

In this description, "general communication transaction" is a transfer of one or more data packets from one part of a communication system to another part, where neither part is a cache memory.

In this description, a "communication transaction" is a transfer of one or more data packets from one part of a communication system to another part. This term includes both "cache related memory transaction" and "general communication transaction".

In this description, a "shared input-output medium" is part of a system that receives or sends both a data packet in a cache related memory transaction and a data packet in a general communication transaction. Non-limiting examples of "shared input-output medium" include a PCIE computer extension bus, an Ethernet connection, and an InfiniBand interconnect.

In this description, an "external I/O element" is a structural element outside of the system. Non-limiting examples include a hard disc, a graphic card, and a network adapter.

In this description, an "external memory element" is a structure outside the system that holds data which may be accessed by the system in order to complete a cache related memory transaction or other memory transactions.

In this description, "cache-coherency" is the outcome of a process by which consistency is achieved between a cache memory and one or more additional cache memory locations inside or external to the system. Generally, data will be copied from one source to the other, such that coherency is achieved and maintained. There may be a separate protocol, called a "cache-coherency protocol", in order to implement cache-coherency.

In this description, an "electro-optical interface" is a structure that allows conversion of an electrical signal into an optical signal, or vice versa.

In this description, a "prolonged synchronous random-access read cycle" is a synchronous RAM read cycle that has been lengthened in time to permit access from an external memory element.

In this description, "shared memory pool" is a plurality of memory modules that are accessible to at least two separate data consumers in order to facilitate memory disaggregation in a system.

In this description, "simultaneously" means "essentially simultaneously". In other words, two or more operations occur within a single time period. This does not mean necessarily that each operation consumes the same amount of time—that is one possibility, but in other embodiments simultaneously occurring operations consume different amounts of time. This also does not mean necessarily that the two operations are occurring continuously—that is one possibility, but in other embodiments an operation may occur in discrete steps within the single time period. In this description, "simultaneity" is the action of two or more operations occurring "simultaneously".

In this description, "efficiently" is a characterization of an operation whose intention and/or effect is to increase the utilization rate of one or more structural elements of a system. Hence, "to efficiently use a compute element" is an operation that is structured and timed such that the utilization rate of the compute element is increased. Hence, "efficiently mixing and timing at least two key-value transactions" is an operation by which two or more needed data values are identified, requested, received, and processed, in such a manner that the utilization rate of the compute element in increased.

In this description, "utilization rate" is the percentage of time that a structural element of a system is engaged in useful activity. The opposite of "utilization rate" is "idle rate".

In this description, a "needed data value" is a data element that is held by a server and needed by a compute element to complete a compute operation being conducted by the compute element. The phrase "data value" and the word "value" are the same as "needed data value", since it is understand that in all cases a "value" is a "data value" and in all cases a "data value" is needed by a compute element for the purpose just described.

In this description, "derive" is the operation by which a compute element determines that a needed data value is held by one or more specific servers. The phrase "derive" sometimes appears as "identify", since the objective and end of this operation is to identify the specific server or servers holding the needed data value. If a needed data value is held in two or more servers, in some embodiments the compute element will identify the specific server that will be asked to send the needed data value.

In this description, "request" is the operation by which a compute element asks to receive a needed set of data or data value from a server holding that set of data or data value. The request may be sent from the compute element to either a NIC and then to a switched network or directly to the switched network. The request is then sent from the switched network to the server holding the needed data value. The request may be sent over a data bus.

In this description, "propagation of a request" for a needed data value is the period of time that passes from the moment a compute element first sends a request to the moment that that the request is received by a server holding the needed data value.

In this description, "get" is the operation by which a compute element receives a needed data value from a server. The needed data value is sent from the server to a switching network, optionally to a NIC and then optionally to a DMA controller or directly to the DMA controller, and from the DMA controller or the NIC or the switching network either directly to the compute element or to a cache memory from which the compute element will receive the needed data value.

In this description, "process" is the operation by which a compute element performs computations on a needed data value that it has received. In other words, the compute element fulfills the need by performing computations on the needed data element. If, for example, the social security number of a person is required, the "needed data value" may be the person's name and number, and the "process" may by the operation by which the compute element strips off the number and then applies it in another computation or operation.

In this description, "compute element" is that part of the system which performs traditional computational operations. In this description, it may be the part of the system that performs the derive, request, and process operations. In some embodiments, the compute element also receives the needed data value from a server, via a switching network, a DMA, and optionally a NIC. In other embodiments, the requested data value is not received directly by the compute element, but is received rather by the cache memory, in which case the compute element obtains the needed value from the cache memory. A compute element may or may not be part of a CPU that includes multiple compute elements.

In this description, "executing the request" is the operation during which a server that has received a request for a needed data value identifies the location of the needed data value and prepares to send the needed data value to a switching network.

In this description, "key-value transaction" is the set of all the operations in which a location of a needed data value is "derived" from a key, the data value is "requested" optionally with the key sent by a compute element through a communication network to a server holding the data value, the request received by the server, "executed" by the server, the data value sent by the server through the communication network, "gotten" by the compute element, and "processed" by the compute element.

In this description, "latency-critical" means that a delay of processing a certain request for a value may cause a delay in system operation, thereby introducing an inefficiency into the system and degrading system performance. In some embodiments, the period of time for a "latency-critical" operation is predefined, which means that exceeding that predefined time will or at least may degrade system performance, whereas completing the operation within that period of time will not degrade system performance. In other embodiments, the time period that is "latency-critical" is predefined, but is also flexible depending on circumstances at the particular moment of performing the latency-critical operation.

In this description, "determining" whether a compute element is authorized to access a particular data set in a shared memory pool is the process that determines whether a particular compute element in a system has been authorized by some reliable source to access a particular data set that is stored in a shared memory pool.

In this description, "accessing" a data set encompasses any or all of entering an original value in a data set, requesting to receive an existing data set, receiving an existing data set, and modifying one or more values in an existing data set.

In this description, "preventing" delivery of a data set to a compute element is the process by which an access controller or other part of a system prevents such data set from being delivered to the compute element, even though specifically requested by the compute element. In some cases, denial of access is total, such that the compute element may not access any part of the data set. In some cases, denial access is partial, such that the compute element may access part but not all of a data set. In some cases, denial is conditional, such that the compute element may not access the data set in its current form, but the system may modify the data set such that the compute element may access the modified data set. The prevention of delivery may be achieved using various techniques, such as blocking of communication, interfering with electronic processes, interfering with software processes, altering addresses, altering data, or any other way resulting in such prevention.

In this description, "data set" is a data structure that a compute element might access in order for the compute element to process a certain function. A data set may be a single data item, or may be multiple data items of any number or length.

In this description, a "server" may be a computer of any kind, a motherboard (MB), or any other holder of structures for either or both of data memory and data processing.

In this description, "random access memory" may include RAM, DRAM, flash memory, or any other type of memory element that allows random access to the memory element, or at least a random access read cycle in conjunction with the memory element. The term does not include any type of storage element that must be accessed sequentially, such as a sequentially-accessed hard disk drive (HDD) or a sequentially accessed optical disc.

In this description, "data interface" is a unit or sub-system that controls the flow of data between two or more parts of a system. A data interface may alter the data flowing through it. A data interface may handle communication aspects related to the flow of data, such as networking. A data interface may access memory modules storing the data. A data interface may handle messages in conjunction with the two or more parts of the system. A data interface may handle signaling aspects related to controlling any of the parts of the system. Some possible non-limiting examples of a "data interface" include an ASIC, an FPGA, a CPU, a microcontroller, a communication controller, a memory buffer, glue logic, and combinations thereof.

In this description, "data corpus" is the entire amount of data included in related data sets, which together make up a complete file or other complete unit of information that may be accessed and processed by multiple compute elements. As one example, the data corpus may be a copy of all the pages in the Internet, and each data set would be a single page.

In this description, a "memory module" is a physical entity in a system that stores data and that may be accessed independently of any other memory module in the system and in parallel to any other memory module in the system. Possible examples include a DIMM card or other physical entity that may be attached or removed from the system, or a memory chip that is part of the system but that is not necessarily removed or re-attached at will.

In this description, "data resiliency" means the ability of a system to reconstruct a data set, even if the system does not have all of the data that makes up that data set. Any number of problems may arise in that require "data resiliency", including, without limitation, (i) the destruction of data, (ii) the corruption of data, (iii) the destruction of any part of the operating, application, or other software in the system, (iv) the corruption of any part of operating, application, or other software in the system, (v) the destruction of a compute element, erasure-coding interface, data interface, memory module, server, or other physical element of the system, and (vi) the malfunction, whether temporary or permanent, of a compute element, erasure-coding interface, data interface, memory module, server, or other physical element of the system. In all such cases, the system is designed and functions to provide "data resiliency" to overcome the problem, and thus provide correct and whole data sets.

In this description, an "external destination" is a destination that is outside a system, wherein such system may include a switching network, compute elements, and memory modules storing data sets. An external destination may be a data center, a computer, a server, or any other component or group of components that are capable of receiving an electronic communication message.

In this description, a "respective block" means the specific memory block within a flash memory that is associated with a particular linked list, such that aggregation of all the changes indicated in the linked list will result in execution of all such changes when the memory block is rewritten.

In this description, a "portion of a row" means several elements of a row from a matrix, but not all of the elements of the row, that are received and processed by one of the compute elements in the system. Also in this description, a "portion of a column" means several elements of a column from a matrix, but not all of the elements of the column, that are received and processed by one of the compute elements in the system.

FIG. 1A illustrates one embodiment of a system 100 configured to mix cache related memory transactions together with general communication transactions over a shared input-output medium 105. The system 100 includes a number of computing elements, including a first compute element 100-c1 through N-th compute element 100-cn. The compute elements are in communicative contact with a cache memory 101, which is in communicative contact with a cache agent 101-ca that controls communication between the cache memory 101 and a medium controller 105-mc. The medium controller 105-mc controls communication between the cache agent 101-ca and a shared input-output medium 105, which is communicative contact with an external memory elements 112 that is outside the system 100.

Figure 1B:
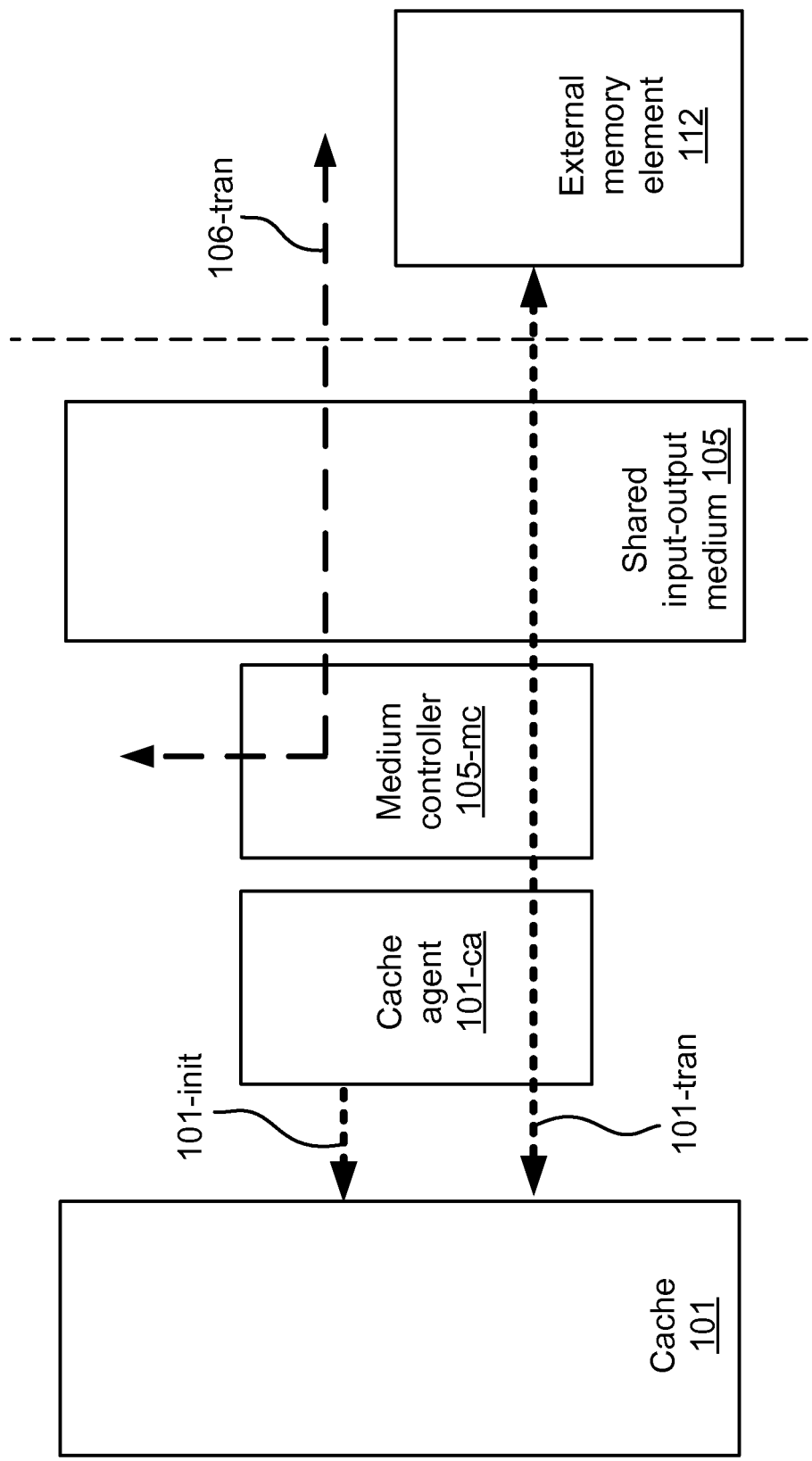
FIG. 1B illustrates one embodiment of a system configured to mix cache related memory transactions together with general communication transactions over a shared input-output medium, in which there is a conflict between a cache related memory I/O data packet and a general communication I/O data packet.

FIG. 1B illustrates one embodiment of a system 100 configured to mix cache related memory transactions together with general communication transactions over a shared input-output medium 105, in which there is a conflict between a cache related memory I/O data packet and a general communication I/O data packet. Here two transactions are illustrated. One transaction 101-tran is a cache related memory transaction between the cache memory 101 and the external memory element 112, via the cache agent 101-ca, the medium controller 105-mc, and the shared input-output medium 105. Transaction 101-tran can go to the cache memory 101, or to the external memory element 112, or in both directions, and may include a cache-coherency transaction. In some embodiments, there is an additional path 101-init between the cache agent 101-ca and the cache memory 101, in which the cache agent initiates transaction 101-tran. The second transaction 106-tran, is a general communication transaction between a part of the system other than the cache memory 101, and some external element other than the external memory element 112, such as an external I/O elements 119 in FIG. 1D. This transaction 106-tran also goes through the shared input-output medium 105 and the medium controller 105-mc, but then continues to another part of the system rather than to the cache agent 101-ca.

Figure 1C:
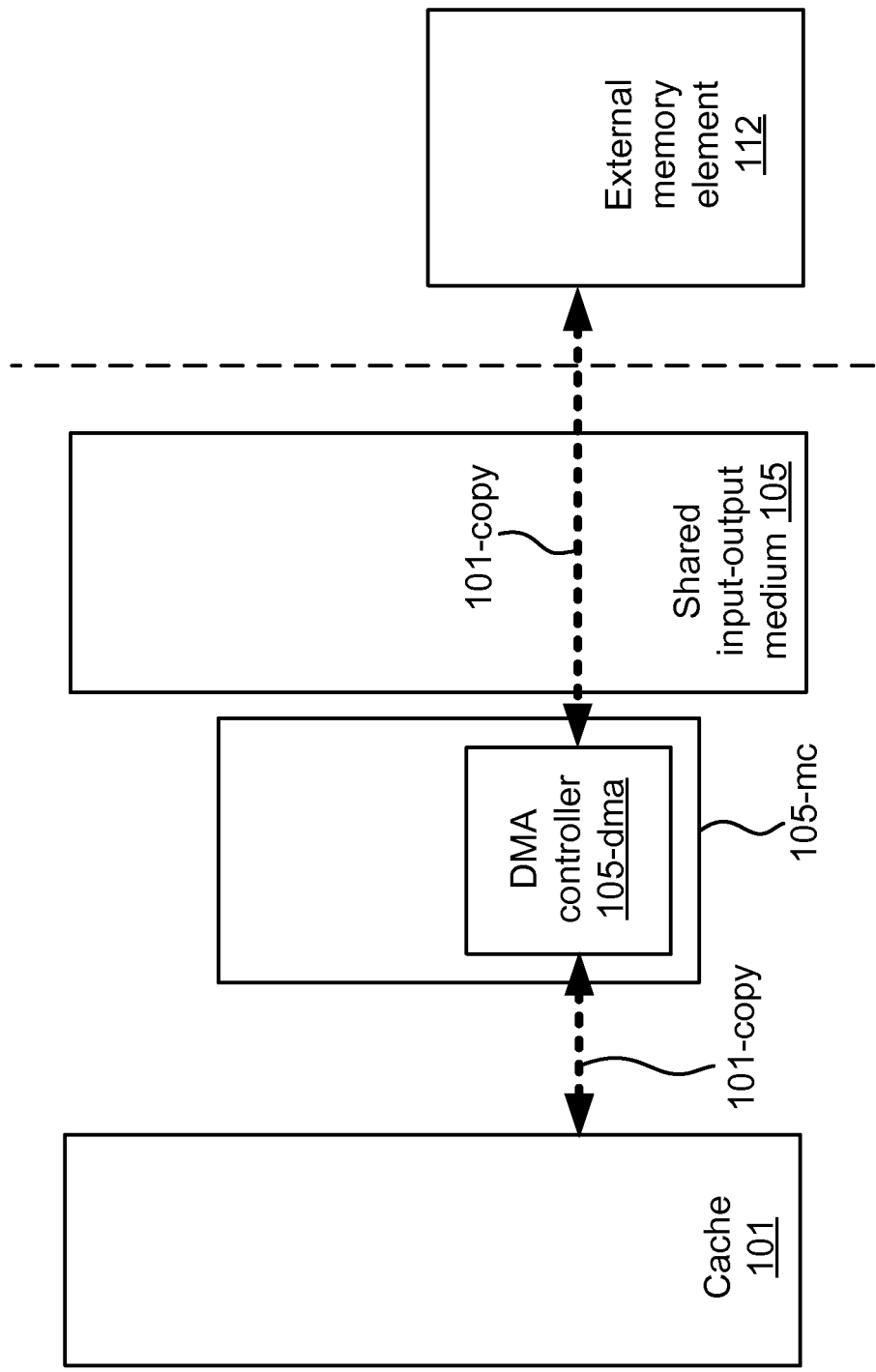
FIG. 1C illustrates one embodiment of a system configured to implement a cache related memory transaction over a shared input-output medium.

FIG. 1C illustrates one embodiment of a system configured to implement a cache related memory transaction over a shared input-output medium 105. The DMA controller 105-dma performs copy operations 101-copy from the cache memory 101 into the media controller 105-mc, and from the media controller to the external memory element 112, or vice-versa.

FIG. 1D illustrates one embodiment of a system configured to implement a general communication transaction over a shared input-output medium 105. The DMA controller 105-dma performs copy operations 106-copy from a non-cache related source (not shown) into the media controller 105-mc, and from the media controller to the external I/O element 119, or vice-versa.

FIG. 2A illustrates one embodiment of a system configured to transmit data packets associated with both either a cache related memory transaction or a general communication transactions. It illustrates that transactions occur in the form of data packets. The cache related memory transaction 101-tran includes a number of data packets, P1, P2, through Pn, that will pass through the medium controller 105-mc. Again, the data packets may flow in either or both ways, since data packets may transmit to or from the cache memory. The cache related memory transaction 101-tran is a packetized transaction 101-tran-P. In the same, or at least an overlapping time period, there is a general communication transaction 106-tran which includes a number of data packets P1, P2, through Pn, which are all part of the general communication transaction 106-tran that is a packetized transaction 106-tran-P. This packetized transaction 106-tran-P also passes through the medium controller 105-mc, and may pass in both directions.

Figure 2B:
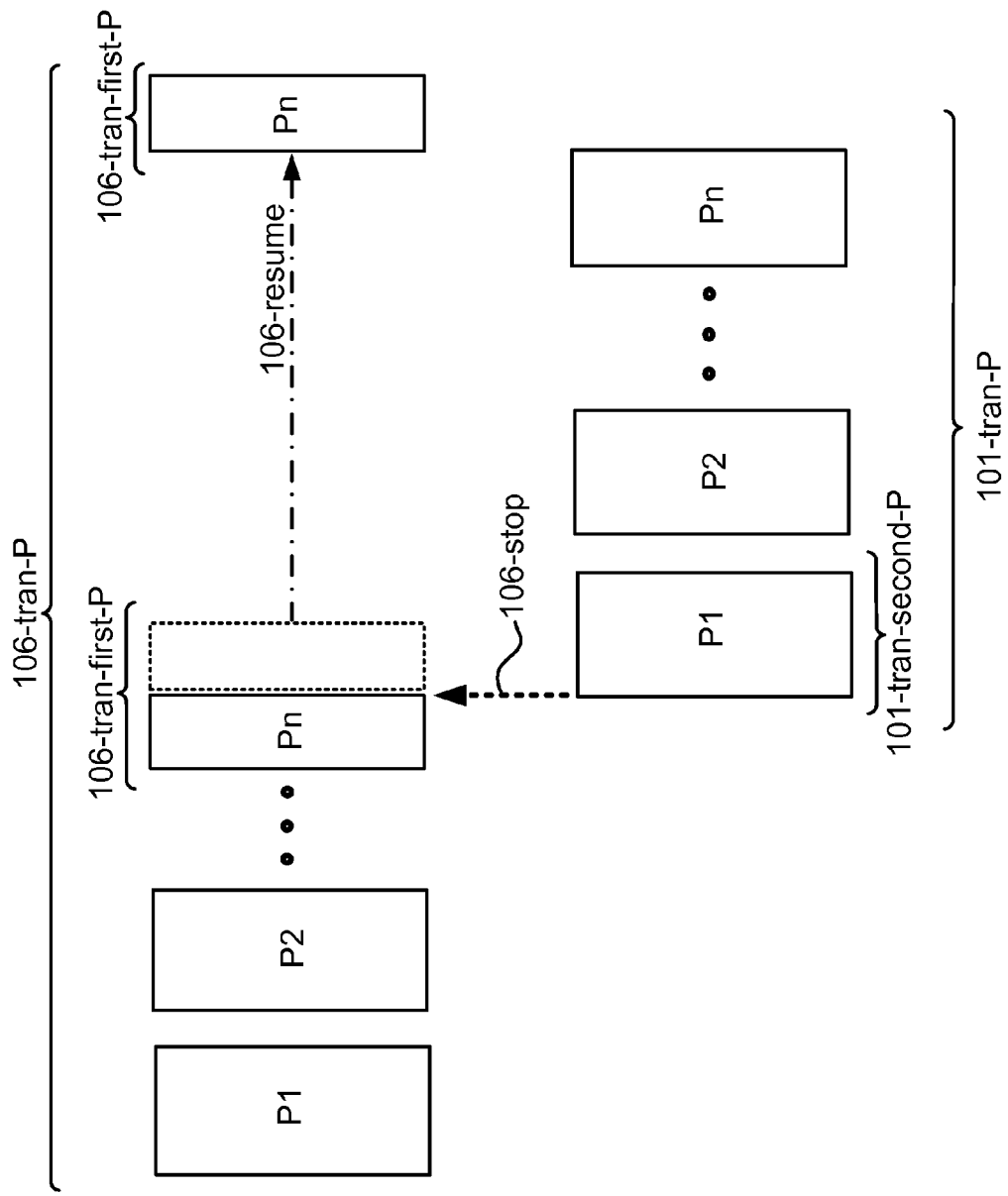
FIG. 2B illustrates one embodiment of a system designed to temporarily stop and then resume the communication of data packets for general communication transactions.

FIG. 2B illustrates one embodiment of a system designed to temporarily stop and then resume the communication of data packets for general communication transactions. Here, a general packetized communication transaction 106-tran-P includes a first packet 106-tran-first-P. After transaction 106-tran-P has begun, but while first packet 106-tran-first-P is still in process, a packetized cache related memory transaction 101-tran-P begins with a second packet 101-trans-second-P. When the system understands that there are two transactions occurring at the same time, one of which is cache related memory 101-tran-P and the other 106-tran-P not, the system will cause the general communication transaction to stop 106-stop transmission of the particular data packet 106-tran-first-P. After all of the data packets of 101-tran-P have passed the system, the system will then allow the general communication transaction to resume 106-resume and complete the transmission of packet 106-tran-first-P. In some embodiments, the system will allow completion of a data packet from 106-tran-P when such packet is in mid-transmission, but in some embodiments the system will stop the data packet flow of 106-tran-P even in mid-packet, and will then repeat that packet when the transaction is resumed 106-resume. In some of the various embodiments, the particular element that understands there are two transactions at the same time, and that stops and then resumes 106-tran-P, is the medium controller element 105-mc or some other controller such as those illustrated and explained in FIGS. 3A, 3B, and 3C, below.

Figure 3C:
FIG. 3C illustrates one embodiment of a system configured to mix cache related memory transactions together with general communication transactions over a shared input-output medium, in which such shared input-output medium is an InfiniBand interconnect.
Figure 3B:
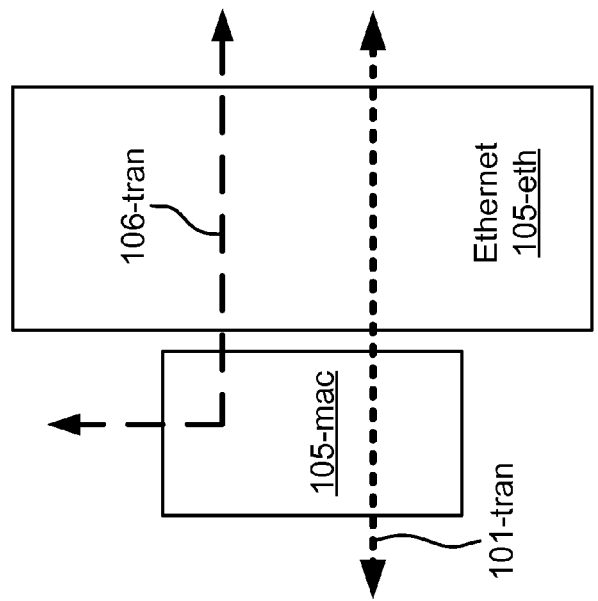
FIG. 3B illustrates one embodiment of a system configured to mix cache related memory transactions together with general communication transactions over a shared input-output medium, in which such shared input-output medium is an Ethernet connection, and the medium controller is a MAC layer.
Figure 3A:
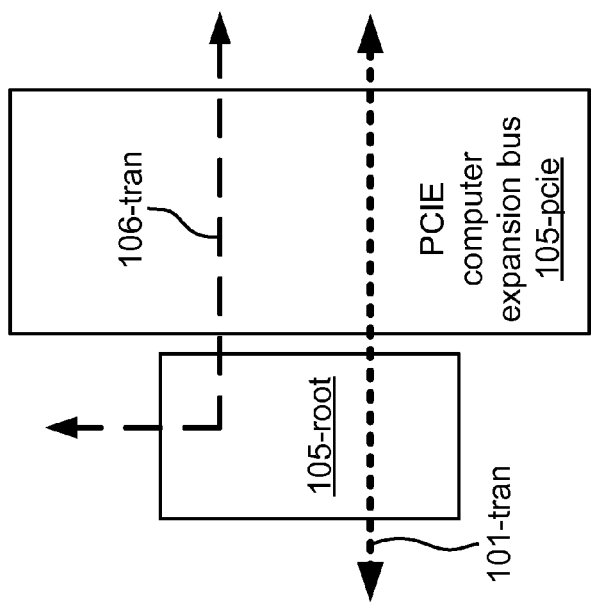
FIG. 3A illustrates one embodiment of a system configured to mix cache related memory transactions together with general communication transactions over a shared input-output medium, in which such shared input-output medium is a PCIE computer expansion bus, and the medium controller is a root complex.

FIG. 3A illustrates one embodiment of a system configured to mix cache related memory transactions together with general communication transactions over a shared input-output medium, in which such shared input-output medium is a PCIE computer expansion bus 105-pcie, and the medium controller is a root complex 105-root. In FIG. 3A, the specific shared input-output medium 105 is a PCIE computer expansion bus 105-pcie, and the specific medium controller 105-mc is a root complex 105-root. Both the cache related memory transaction 101-tran and the general communication transaction 106-tran pass through both 105-pcie and 105-root.

FIG. 3B illustrates one embodiment of a system configured to mix cache related memory transactions together with general communication transactions over a shared input-output medium, in which such shared input-output medium is an Ethernet connection 105-eth, and the medium controller is a MAC layer 105-mac. In FIG. 3B, the specific shared input-output medium 105 is an Ethernet connection 105-eth, and the specific medium controller 105-mc is a MAC layer 105-mac. Both the cache related memory transaction 101-tran and the general communication transaction 106-tran pass through both 105-eth and 105-mac.

FIG. 3C illustrates one embodiment of a system configured to mix cache related memory transactions together with general communication transactions over a shared input-output medium, in which such shared input-output medium is an InfiniBand interconnect 105-inf.

Figure 4:
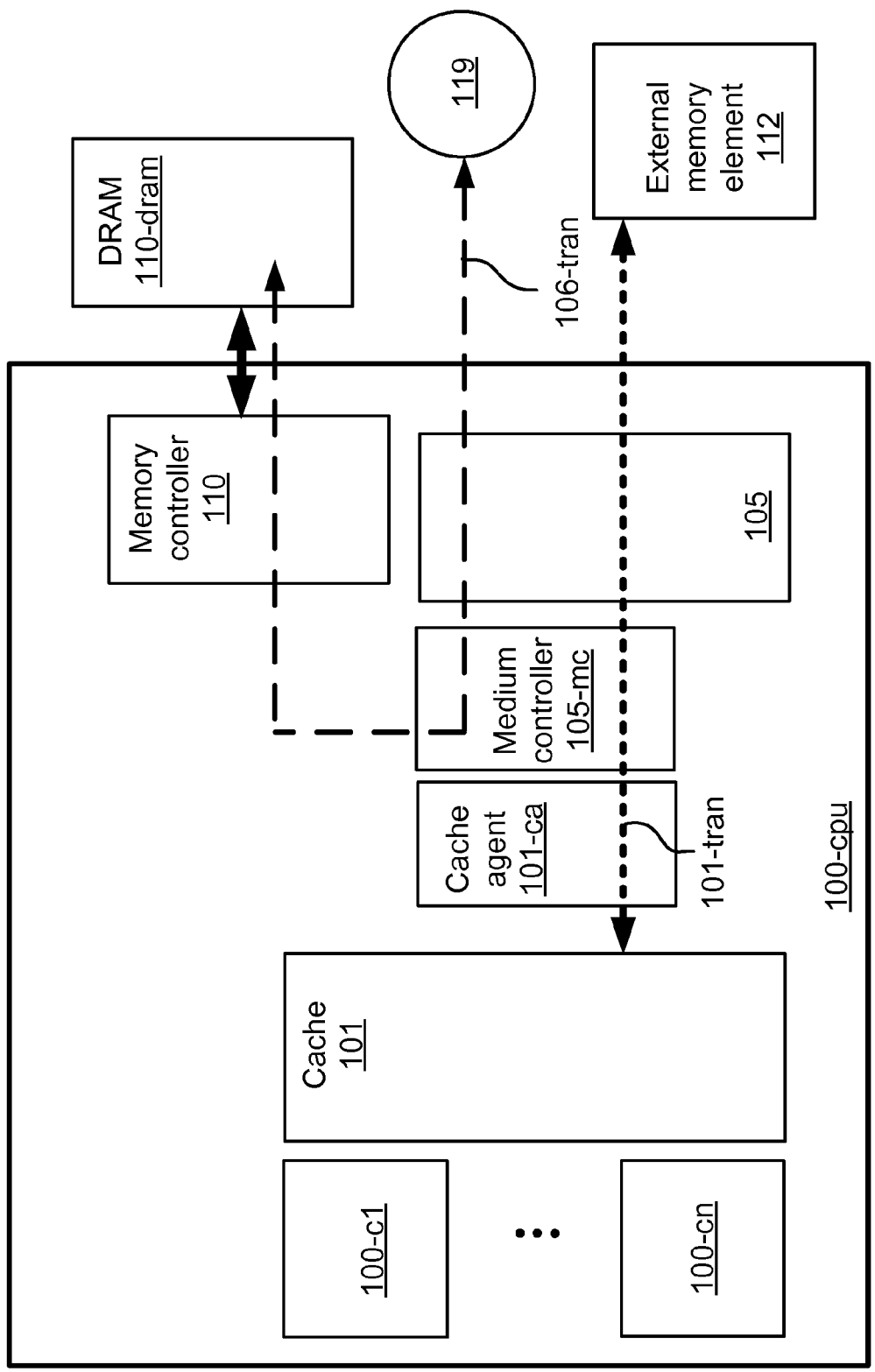
FIG. 4 illustrates one embodiment of a system configured to mix cache related memory transactions together with general communication transactions over a shared input-output medium, in which there is a conflict between a cache related memory I/O data packet and a general communication I/O data packet, and in which the system is implemented in a single microchip. In some embodiments, the various elements presented in FIG. 4 may be implemented in two or more microchips.

FIG. 4 illustrates one embodiment of a system configured to mix cache related memory transactions together with general communication transactions over a shared input-output medium 105, in which there is a conflict between a cache related memory I/O data packet and a general communication I/O data packet, and in which the system is implemented in a single microchip. In some embodiments, the various elements presented in FIG. 4 may be implemented in two or more microchips. In FIG. 4, various elements of the system previously described are implemented in a single microchip 100-cpu. Such elements include various processing elements, 100c-1 through 100-cn, a cache memory 101, a cache agent 101-ca, a medium controller 105-mc, and a shared input-output medium 105. In FIG. 4, there is a cache related memory transaction 101-tran between cache memory 101 and an external memory element 112. There is further a general communication transaction 106-tran between an external I/O element 119, such as a hard disc, a graphic card, or a network adapter, and a structure other than the cache memory 101. In the particular embodiment illustrated in FIG. 4, the non-cache structure is a DRAM 110-dram, and the communication path between 110-dram and 119 includes a memory controller 110 as shown. The DRAM 110-dram may be part of a computer, and the entire microchip 100-cpu may itself be part of that computer. In other embodiments, the structure other than cache memory 101 may also be on chip 100-cpu but not cache memory 101, or the structure may be another component external to the chip 100-cpu other than DRAM 100-dram.

FIG. 5A illustrates one embodiment of a system configured to mix cache related memory transactions together with general communication transactions over a shared input-output medium 105, in which there is a conflict between a cache related memory I/O data packet and a general communication I/O data packet, and in which there is a fiber optic line 107-fiber-ab and electrical/optical interfaces 107-*a* and 107-*b*. In FIG. 5A, there is a cache related memory transaction 101-tran between cache memory 101 (not shown in FIG. 5A) and external memory element 112, in which data packets may move in both directions to and from the external I/O memory element 112, and electrical-optical interface 107*b*, a shared input-output medium 105 which as illustrated here is a fiber optic line 107-fiber-ab and another electrical-optical interface 107-*a*, and a medium controller 105-mc. The connection from 112 to 107-*b* is electrical, the electrical signal is converted to optical signal at 107-*b*, and the signal is then reconverted back to an electrical signal at 107-*a*. FIG. 5A includes also a general communication transaction 106-tran between an external I/O element 119 and either a part of the system that is either not the cache memory 101 (not shown in FIG. 5A) or that is outside of the system, such as 110-dram (not shown in FIG. 5A). The signal conversions for 106-tran are the same as for 101-tran. In the event that 101-tran and 106-tran occur simultaneously or at least with an overlap in time, the medium control 101-mc will either stop and resume, or at least delay, the 106-tran data packets to give priority to the 101-tran data packets.

FIG. 5B illustrates one embodiment of a system configured to mix cache related memory transactions together with general communication transactions over a shared input-output medium 105, in which there is a conflict between a cache related memory I/O data packet and a general communication I/O data packet, and in which there are two or more fiber optic lines 107-fiber-cd and 107-fiber-ef, and in which each fiber optic line has two or more electrical/optical interfaces, 107-c and 107-d for 107-fiber-cd, and 107-e and 107-f for 107-fiber-ef. FIG. 5B presents one alternative structure to the structure shown in FIG. 5A. In FIG. 5B, the electrical-optical interfaces and the fiber optic line are not shared. Rather, cache related memory transaction 101-tran between external memory element 112 and cache memory 101 (not shown in FIG. 5B) occurs over do interface 107-d not shared with 106-tran, fiber optic line 107-fiber-cd not shared with 106-tran, do interface 107-c not shared with 106-tran, and medium controller 105-mc which is shared with 106-tran, and which senses multiple transactions and gives priority to 101-tran data packets. Also, general communication transaction 106-tran between external I/O element 119 and a non-cache element (not shown in FIG. 5B) occurs over do interface 107-f not shared with 101-tran, fiber optic line 107-fiber-ef not shared with 101-tran, do interface 107-e not shared with 101-tran, and medium controller 105-mc which is shared with 101-tran, senses multiple transactions, and give priority to 101-tran data packets.

One embodiment is a system 100 configured to mix cache related memory transactions together with general communication transactions over a shared input-output medium. Various embodiments include a shared input-output medium 105 associated with a medium controller 105-mc, a cache agent 101-ca, and a first cache memory 101 associated with said cache agent 101-ca. Further, in some embodiments, the cache agent 101-ca is configured to initiate 101-init direct cache related memory transactions 101-tran between the first cache memory 101 and an external memory element 112, via said shared input-output medium 105. Further, in some embodiments the medium controller 105-mc is configured to block general communication transactions 106-tran via said shared input-output medium 105 during the direct cache related memory transactions 101-tran, thereby achieving the mix of transactions without delaying the direct cache related memory transactions 101-tran.

In one alternative embodiment to the system just described, the medium controller 105-mc includes a direct-memory-access (DMA) controller 105-dma configured to perform the direct cache related memory transactions 101-tran by executing a direct copy operation 101-copy between the first cache memory 101 and the external memory element 112 via the shared input-output medium 105.

In one possible variation of the alternative embodiment just described, the direct-memory-access (DMA) controller 105-dma is further configured to perform the general communication transactions 106-tran by executing another direct copy operation 106-copy in conjunction with an external input-output element 119 via the shared input-output medium 105.

In a second alternative embodiment to the system of mixing cache related memory transactions together with general communication transactions, further the direct cache related memory transactions 101-tran are latency-critical cache transactions. Further, the medium controller 105-mc is configured to interrupt any of the general communication transactions 106-tran and immediately commence the direct cache related memory transactions 101-tran, thereby facilitating the latency criticality.

In one possible variation of the second alternative embodiment just described, further both said direct cache related memory transactions 101-tran and general communication transactions 106-tran are packet-based transactions 101-tran-P, and 106-tran-P is performed via the medium controller 105-mc in conjunction with the shared input-output medium 105. Further, the medium controller 105-mc is configured to stop 106-stop on-going communication of a first packet 106-tran-first-P belonging to the general communication transactions 106-tran via the shared input-output medium 105, and substantially immediately commence communication of a second packet 101-tran-second-P belonging to the direct cache related memory transactions 101-tran via the shared input-output medium 105 instead, thereby achieving the interruption at the packet level.

In one possible configuration of the possible variation just described, further the medium controller 105-mc is configured to resume 106-resume communication of the first packet 106-tran-first-P after the second packet 101-tran-second-P has finished communicating, thereby facilitating packet fragmentation.

In a third alternative embodiment to the system of mixing cache related memory transactions together with general communication transactions, the shared input-output medium 105 is based on an interconnect element selected from a group consisting of (i) peripheral-component-interconnect-express (PCIE) computer expansion bus 105-pcie, (ii) Ethernet 105-eth, and (iii) InfiniBand 105-inf.

In one embodiment associated with the PCIE computer expansion bus 105-pcie, the medium controller 105-mc may be implemented as part of a root-complex 105-root associated with said PCIE computer expansion bus 105-pcie.

In one embodiment associated with the Ethernet 105-eth, the medium controller 105-mc may be implemented as part of a media-access-controller (MAC) 105-mac associated with said Ethernet 105-eth.

In a fourth alternative embodiment to the system of mixing cache related memory transactions together with general communication transactions, further the direct cache related memory transactions 101-tran and general communication transactions 106-tran are packet-based transactions 101-tran-P, and 106-tran-P is performed via the medium controller 105-mc in conjunction with said the shared input-output medium 105. Further, the medium controller 105-mc is configured to deny access to the shared input-output medium 105 from a first packet 106-tran-first-P belonging to the general communication transactions 106-tran, and instead to grant access to the shared input-output medium 105 to a second packet 101-tran-second-P belonging to the direct cache related memory transactions 101-tran, thereby giving higher priority to the direct cache related memory transactions 101-tran over the general communication transactions 106-tran.

In a fifth alternative embodiment to the system of mixing cache related memory transactions together with general communication transactions, further there is at least a first compute element 100-c1 associated with the cache memory 101, and there is a memory controller 110 associated with an external dynamic-random-access-memory (DRAM) 110-dram. Further, the system 100 is integrated inside a central-processing-unit (CPU) integrated-circuit 100-cpu, and at least some of the general communication transactions 106-tran are associated with the memory controller 110 and DRAM 110-dram.

In a sixth alternative embodiment to the system of mixing cache related memory transactions together with general communication transactions, further the system achieves the mix without delaying the direct cache related memory transactions 101-tran, which allows the system 100 to execute cache-coherency protocols in conjunction with the cache memory 101 and the external memory element 112.

In a seventh alternative embodiment to the system of mixing cache related memory transactions together with general communication transactions, the shared input-output medium 105 includes an electro-optical interface 107-*a* and an optical fiber 107-fiber-ab operative to transport the direct cache related memory transactions 101-tran and the general communication transactions 106-tran.

In an eighth alternative embodiment to the system of mixing cache related memory transactions together with general communication transactions, further including a first 107-*c* and a second 107-*d* electro-optical interface, both of which are associated with a first optical fiber 107-fiber-cd, and are operative to transport the direct cache related memory transactions 101-tran in conjunction with the medium controller 105 and the external memory element 112.

In a possible variation of the eighth alternative embodiment just described, further including a third 107-*e* and a fourth 107-*f* electro-optical interface, both of which are associated with a second optical fiber 107-fiber-ef, and are operative to transport the general communication transactions 106-tran in conjunction with the medium controller 105 and an external input-output element 119.

Figure 6A:
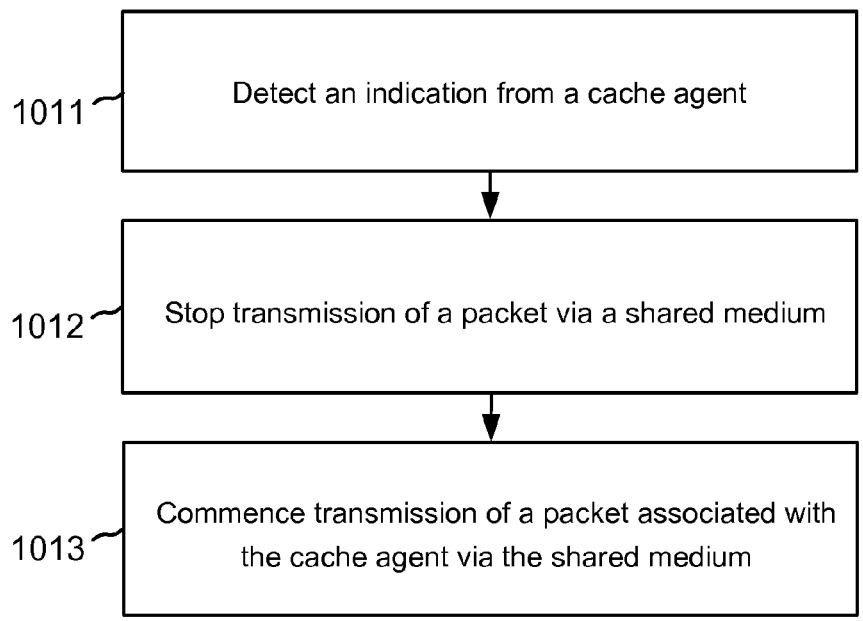
FIG. 6A illustrates one embodiment of a method for stopping transmission of a data packet associated with a general communication transaction, and starting transmission of a data packet associated with a cache agent.

FIG. 6A illustrates one embodiment of a method for mixing cache related memory transactions 101-tran together with general communication transactions 106-tran over a shared input-output medium 105 without adversely affecting cache performance. In step 1011, a medium controller 105-mc detects, in a medium controller 105-mc associated with a shared input-output medium 105, an indication from a cache agent 101-ca associated with a cache memory 101, that a second packet 101-tran-second-P associated with a cache related memory transactions 101-tran is pending. In step 1012, as a result of the indication, the medium controller 105-mc stops transmission of a first packet 106-tran-first-P associated with a general communication transactions 106-tran via the shared input-output medium 105. In step 1013, the medium controller 105-mc commences transmission of the second packet 101-tran-second-P via said the input-output medium 105, thereby preserving cache performance in conjunction with the cache related memory transactions 101-tran.

In a first alternative embodiment to the method just described, further the cache performance is associated with a performance parameter selected from a group consisting of: (i) latency, and (ii) bandwidth.

In a second alternative embodiment to the method just described for mixing cache related memory transactions together with general communication transactions over a shared input-output medium without adversely affecting cache performance, further the general communication transactions 106-tran are packet-based transactions 106-tran-P performed via the medium controller 105-mc in conjunction with the shared input-output medium 105. Also, the cache performance is associated with latency and this latency is lower than a time required to transmit a shortest packet belonging to said packet-based transaction 106-tran-P.

Figure 6B:
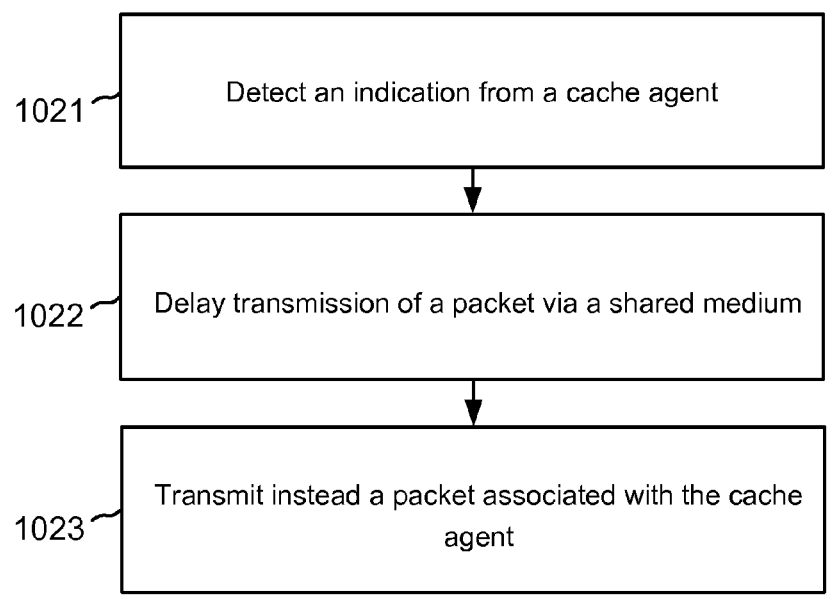
FIG. 6B illustrates one embodiment of a method for delaying transmission of a data packet associated with a general communication transaction, and transmitting instead a data packet associated with a cache agent.

FIG. 6B illustrates one embodiment of a method for mixing cache related memory transactions together with general communication transactions over a shared input-output medium without adversely affecting cache performance. In step 1021, a medium controller 105-mc associated with a shared input-output medium 105 detects an indication from a cache agent 101-ca associated with a cache memory 101, that a second packet 101-tran-second-P associated with a cache related memory transactions 101-tran is pending. In step 1022, as a result of the indication, the medium controller 105-mc delays transmission of a first packet 106-tran-first-P associated with a general communication transaction 106-tran via the shared input-output medium 105. In step 1023, the medium controller 105-mc transmits instead the second packet 101-tran-second-P via the shared input-output medium 105, thereby preserving cache performance in conjunction with the cache related memory transactions 101-tran.

In a first alternative embodiment to the method just described, the cache performance is associated with a performance parameter selected from a group consisting of: (i) latency, and (ii) bandwidth.

In a second alternative embodiment to the method just described for mixing cache related memory transactions together with general communication transactions over a shared input-output medium without adversely affecting cache performance, further the general communication transactions 106-tran are packet-based transactions 106-tran-P performed via the medium controller 105-mc in conjunction with the shared input-output medium 105. Also, the cache performance is associated with latency; and said latency is lower than a time required to transmit a shortest packet belonging to said packet-based transaction 106-tran-P.

Figure 7A:
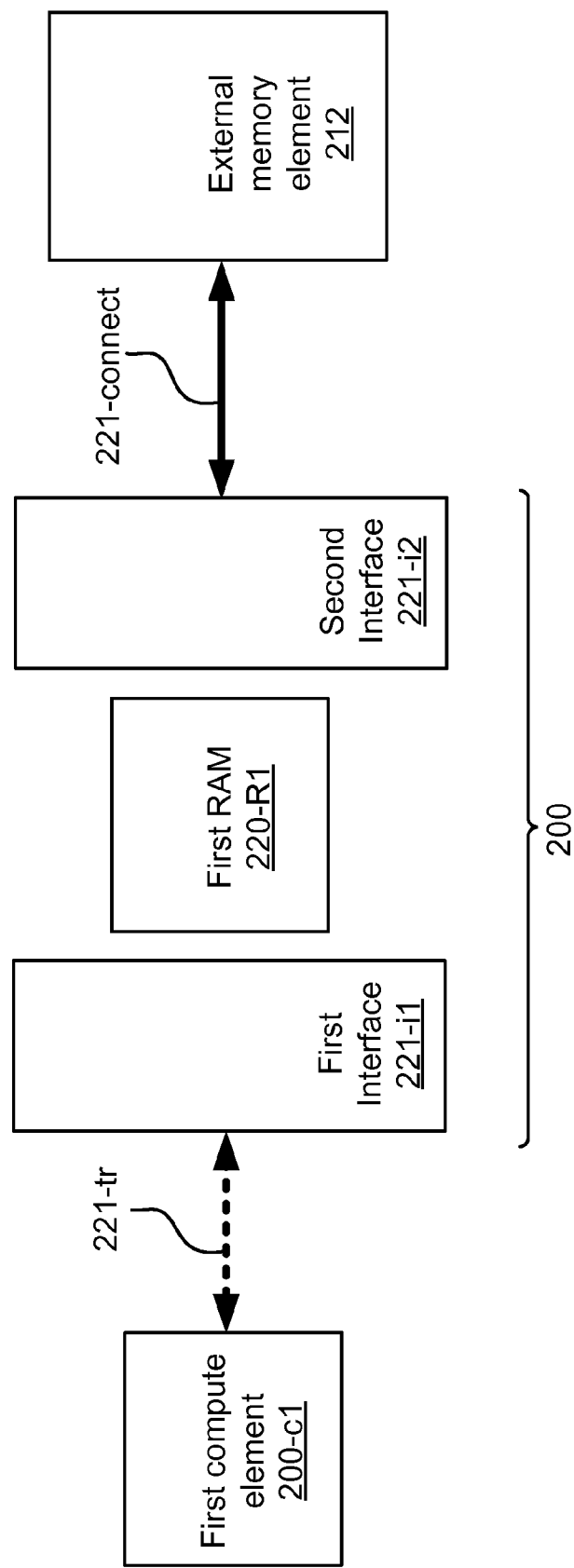
FIG. 7A illustrates one embodiment of a system configured to cache automatically an external memory element as a result of a random-access read cycle.

FIG. 7A illustrates one embodiment of a system configured to cache automatically an external memory element as a result of a random-access read cycle. A system 200 is configured to cache automatically an external memory element as a result of a random-access read cycle. In one particular embodiment, the system includes a first random-access memory (RAM) 220-R1, a first interface 221-*i*1 configured to connect the system 200 with a compute element 200-*c*1 using synchronous random access transactions 221-tr, and a second interface 221-*i*2 configured to connect 221-connect the system 200 with an external memory 212.

Figure 7C:
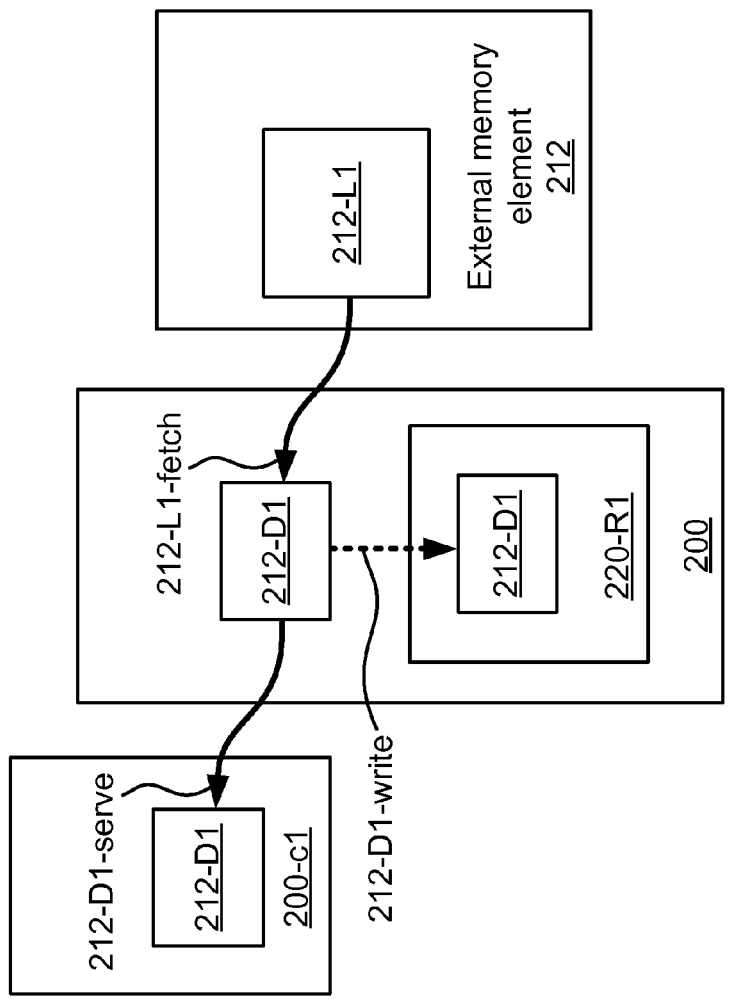
FIG. 7C illustrates one embodiment of a system with a random access memory that is fetching at least one data element from an external memory element, serving it to a compute element, and writing it to the random access memory.
Figure 7B:
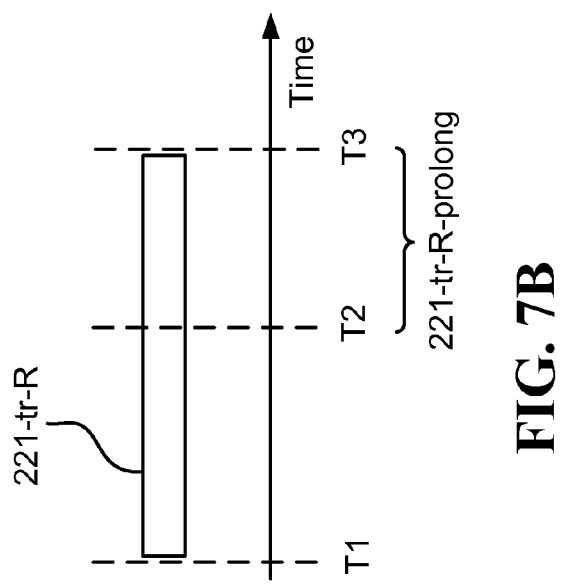
FIG. 7B illustrates one embodiment of prolonged synchronous random-access read cycle.

FIG. 7B illustrates one embodiment of prolonged synchronous random-access read cycle. The system 200 is configured to prolong 221-tr-R-prolong a synchronous random-access read cycle 221-tr-R from the time period between T1 and T2 to the time period between T1 to T3, the prolongation being the period between T2 and T3.

FIG. 7C illustrates one embodiment of a system with a random access memory that is fetching at least one data element from an external memory element, serving it to a compute element, and writing it to the random access memory. In one particular embodiment, the prolong 221-tr-R-prolong (FIG. 7B) is initiated by the first computer element 200-*c*1 when the synchronous random-access read cycle 221-tr-R (FIG. 7B) is detected to be addressed to a first memory location 212-L1 of the external memory element 212 currently not cached by the first random-access memory 220-R1 (FIG. 7A). The system 200 is further configured to fetch 212-L1-fetch, via the second interface 221-*i*2 (FIG. 7A), from the external memory element 212, at least one data element 212-D1 associated with the first memory location 212-L1. The system is further configured to serve 212-D1-serve to the first compute element 200-*c*1, as part of the synchronous random-access read cycle 221-tr-R (FIG. 7B) prolonged, via the first interface 221-*i*1 (FIG. 7A), the at least one data element 212-D1 that was previously fetched, thereby concluding successfully the synchronous random-access read cycle 221-tr-R (FIG. 7B). The system is further configured to write 212-D1-write the at least one data element 212-D1 to the first random-access memory 220-R1, thereby caching automatically the first memory location 212-L1 for faster future access by the first compute element 200-c1.

Figure 7D:
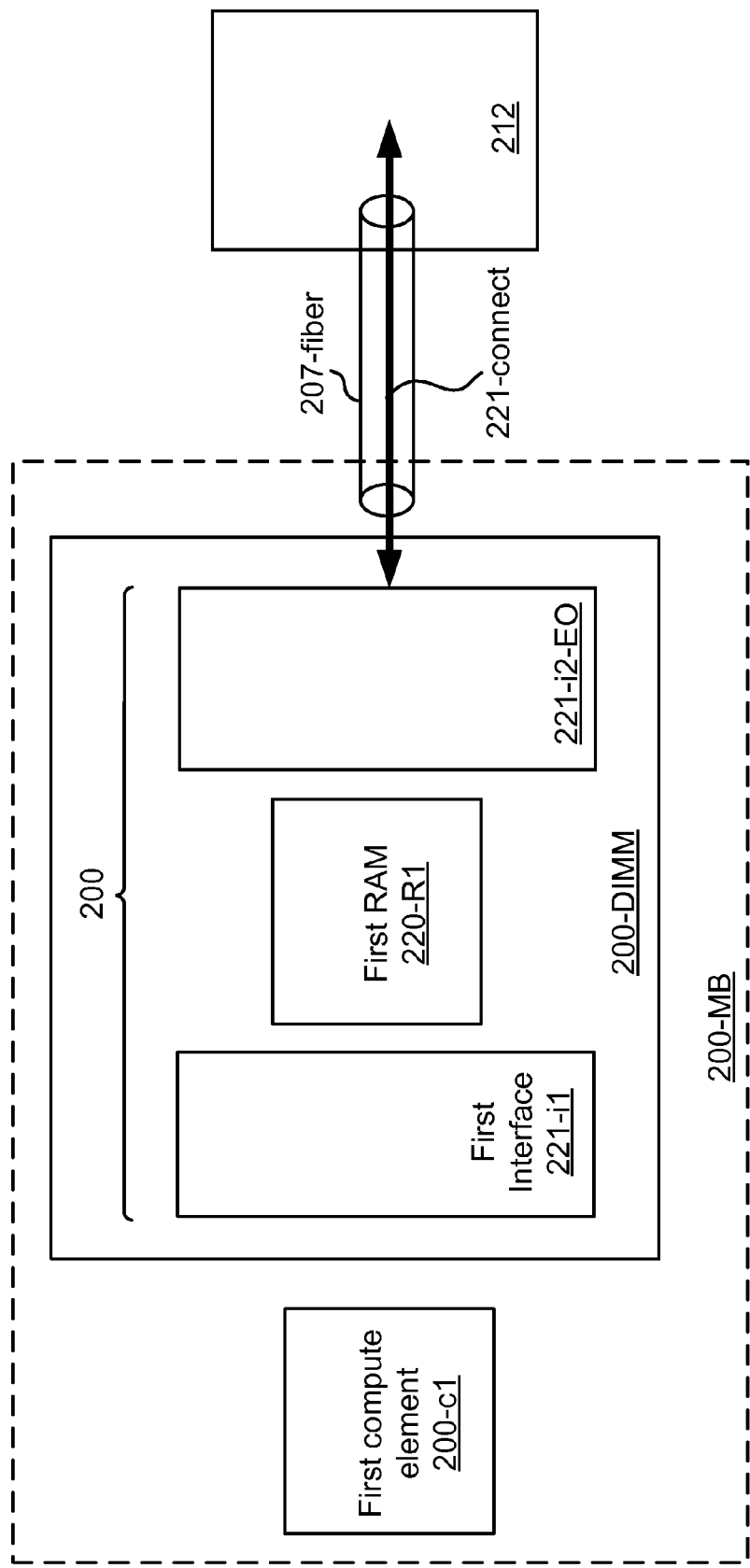
FIG. 7D illustrates one embodiment of a DIMM system configured to implement communication between an external memory element, a first RAM, and a first computer element.

FIG. 7D illustrates one embodiment of a DIMM system configured to implement communication between an external memory element, a first RAM, and a first computer element. In one particular embodiment, the first compute element 200-c1 is placed on a first motherboard 200-MB. Further, the system 200 is implemented on a first printed-circuit-board (PCB) having a form factor of a dual-in-line-memory-module (DIMM) 200-DIMM, such that the system 200 is connected to the first motherboard 200-MB like a dual-in-line-memory-module, and such that the first compute element 200-c1 perceives the system 200 as essentially a dual-in-line-memory-module. Further, the external memory element 212 is not placed on said first motherboard 200-MB. Further, the second interface 221-$i2$ (FIG. 7A) is an electrical-optical interface 221-$i2$-EO, connected to the external memory element 212 via an optical fiber 207-fiber, together operative to facilitate said connection 221-connect. In the embodiment shown in FIG. 7D, first RAM 220-R1 and first interface 221-$i1$ are structured and function as described in FIG. 7A.

FIG. 7E illustrates one embodiment of a system controller configured to fetch additional data elements from additional memory locations of an external memory, and write such data elements to RAM memory. The system 200 includes a system controller 200-cont that is configured to fetch 212-L1-fetch-add additional data elements 212-Dn respectively from additional memory locations 212-Ln of the external memory element 212, wherein the additional memory locations 212-Ln are estimated, based at least in part on the first memory location 212-L1 (FIG. 7C), to be accessed in the future by the compute element 200-c1 (FIG. 7A). The system controller 200-cont is further configured to write 212-Dn-write the additional data elements 212-Dn fetched to the first random-access memory 220-R1, thereby caching automatically the additional memory locations 212-Ln for faster future access by the first compute element 200-c1 (FIG. 7A).

FIG. 7F illustrates one embodiment of a process by which a system 200 (FIG. 7E) writing of additional data elements to RAM memory occurs concurrently with additional synchronous random-access write cycles. In FIG. 7E, the writing 212-Dn-write (FIG. 7E) of the additional data elements 212-Dn (FIG. 7E) is operated essentially concurrently with additional 221-tr-R-W-add synchronous random-access read cycles or synchronous random-access write cycles made by said first compute element 200-c1 (FIG. 7A) in conjunction with the first interface 221-$i1$ (FIG. 7A) and the first random-access memory 220-R1 (FIG. 7E).

Figure 8A:
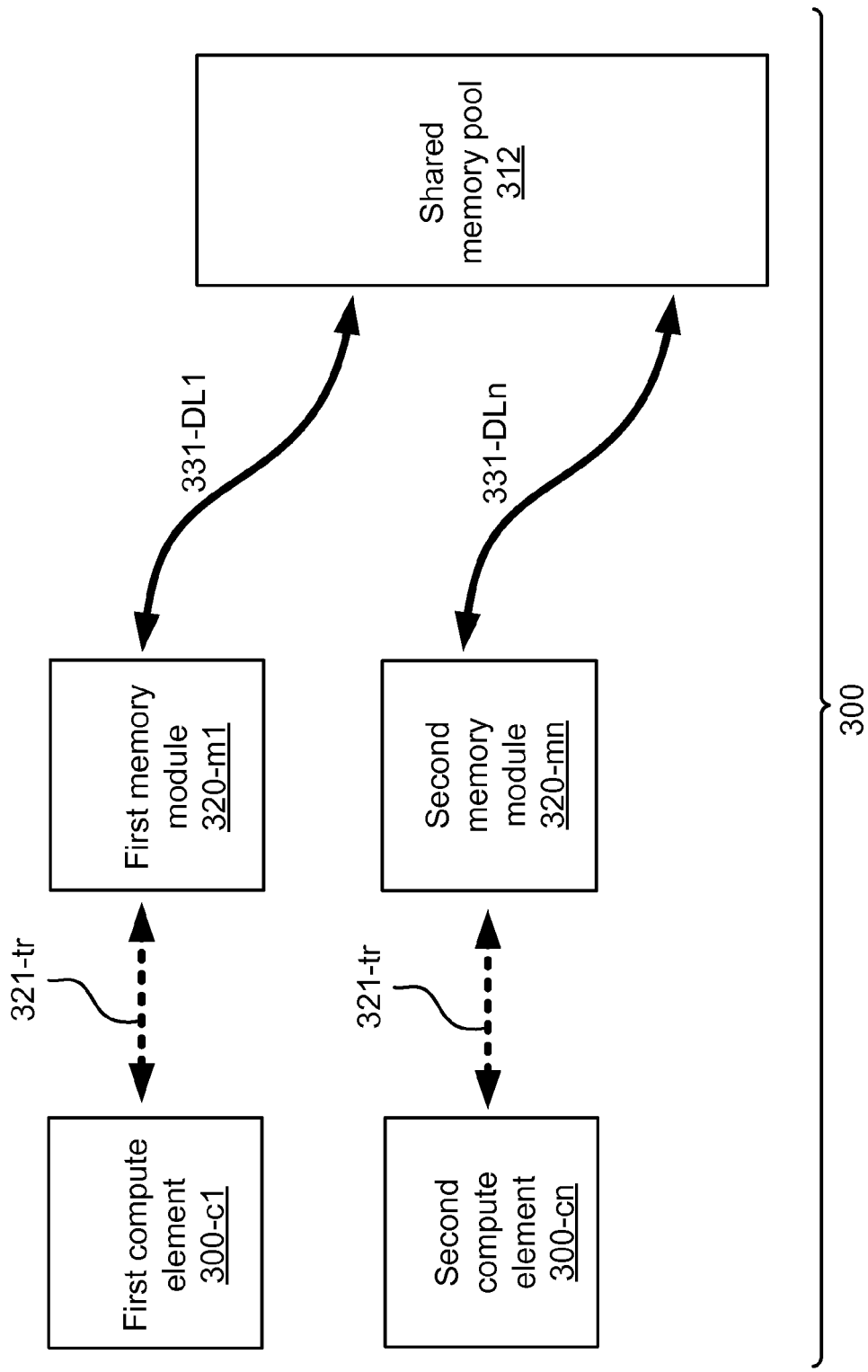
FIG. 8A illustrates one embodiment of a system configured to cache a shared memory pool using at least two memory modules.

FIG. 8A illustrates one embodiment of a system configured to cache a shared memory pool using at least two memory modules. In one particular embodiment, the system 300 includes first 300-c1 and second 300-cn compute elements associated respectively with first 320-$m1$ and second 320-$mn$ memory modules, each of said compute elements configured to communicate with its respective memory module using synchronous random access transactions 321-tr. The system includes further a shared memory pool 312 connected with the first and second memory modules via first 331-DL1 and second 331-DLn data links, respectively.

Figure 8B:
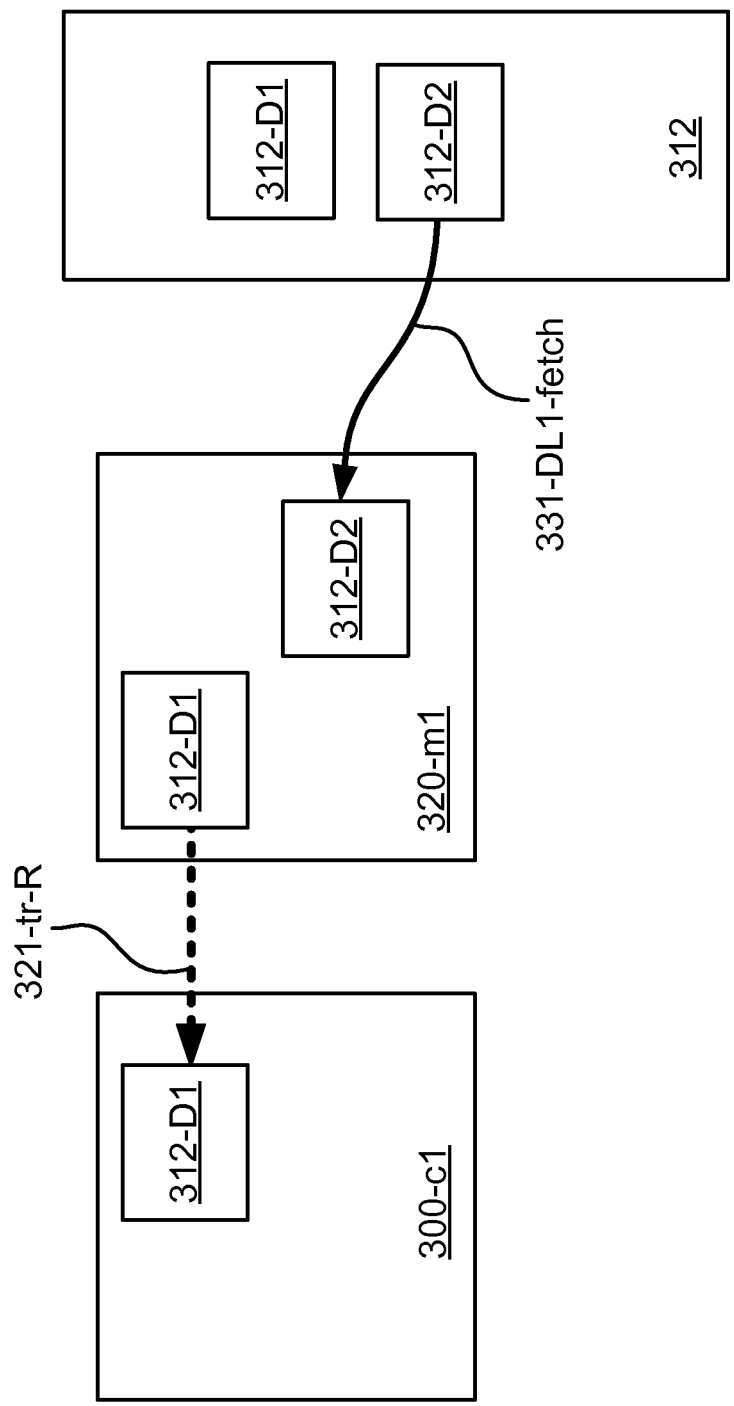
FIG. 8B illustrates one embodiment of system configured to fetch sets of data from a shared memory pool.

FIG. 8B illustrates one embodiment of system 300 (FIG. 8A) configured to fetch, by a first compute element, sets of data from a shared memory pool. FIG. 8B illustrates an additional embodiment of the system 300 (FIG. 8A) illustrated in FIG. 8A, wherein the system 300 is (FIG. 8A) configured to use the first 320-$m1$ and second 320-$mn$ (FIG. 8A) memory modules as a cache to the shared memory pool 312, such that sets of data 312-D1 cached on the first 320-$m1$ or second 320-$mn$ (FIG. 8A) memory modules are read 321-tr-R by the respective compute element 300-c1 or 300-cn (FIG. 8A) using the synchronous random access transactions 321-tr (FIG. 8A), and other sets of data 312-D2 that are not cached on said first or second memory module are fetched 331-DL1-fetch from the shared memory pool 312 into the first 320-$m1$ or second 320-$mn$ (FIG. 8A) memory modules upon demand from the respective compute elements 300-c1 and 300-cn (FIG. 8A).

FIG. 8C illustrates one embodiment of a system configured to cache a shared memory pool using at least two memory modules, in which a first compute element is placed on a first motherboard, a first DIMM module is connected to the first motherboard via a first DIMM slot, and first data link is comprised of a first optical fiber. In one particular embodiment of the system 300 (FIG. 8A), the first 320-$m1$ memory module is a first dual-in-line-memory-module (DIMM) 300-DIMM-1. Further, the first compute element 300-c1 is placed on a first motherboard 300-MB-1, the first dual-in-line-memory-module 300-DIMM-1 is connected to the first motherboard 300-MB-1 via a first dual-in-line-memory-module slot 300-DIMM-1-slot, and the first data link 331-DL1 (FIG. 8A) includes a first optical fiber 307-fiber-1 with a connection to a shared memory pool 312.

FIG. 8D illustrates one embodiment of a system configured to cache a shared memory pool using at least two memory modules, in which a second compute element is placed on a second motherboard, a second DIMM module is connected to the second motherboard via a second DIMM slot, and a second data link is comprised of a second optical fiber. FIG. 8D illustrates one particular embodiment of the system 300 (FIG. 8A) illustrated in FIG. 8C, in which further the second 320-$mn$ memory module is a second dual-in-line-memory-module 300-DIMM-n, the second compute element 300-cn is placed on a second motherboard 300-MB-n, the second dual-in-line-memory-module 300-DIMM-n is connected to the second motherboard 300-MB-n via a second dual-in-line-memory-module slot 300-DIMM-n-slot, and the second data link 331-DLn (FIG. 8A) includes a second optical fiber 307-fiber-n connected to a shared memory pool 312.

Figure 8E:
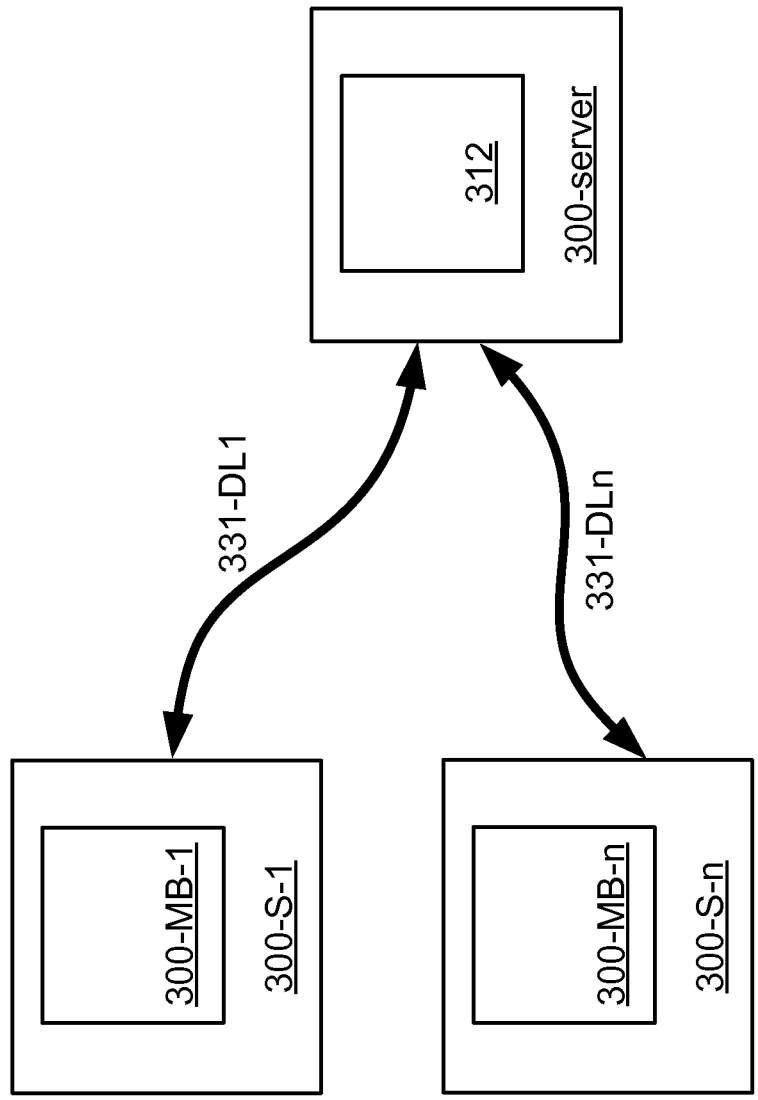
FIG. 8E illustrates one embodiment of a system configured to cache a shared memory pool using at least two memory modules, in which each of the memory modules and the shared memory pool resides in a different server.

FIG. 8E illustrates one embodiment of a system configured to cache a shared memory pool using at least two memory modules, in which each of the memory modules and the shared memory pool resides in a different server. FIG. 8E illustrates one particular embodiment of the system 300 (FIG. 8A) illustrated in FIG. 8D, in which further the first 300-MB-1 and second 300-MB-n motherboards are placed in a first 300-S-1 and a second 300-S-n server, respectively, and the shared memory pool 312 is placed in a third server 300-server, in which there is a first data link 331-DL1 between the first server 300-S1 and the third server 300-server and in which there is a second data link 331-DLn between the second server 300-S-n and the third server 300-server. The structure presented in FIG. 8E thereby facilitates distributed operation and memory disaggregation.

Figure 8F:
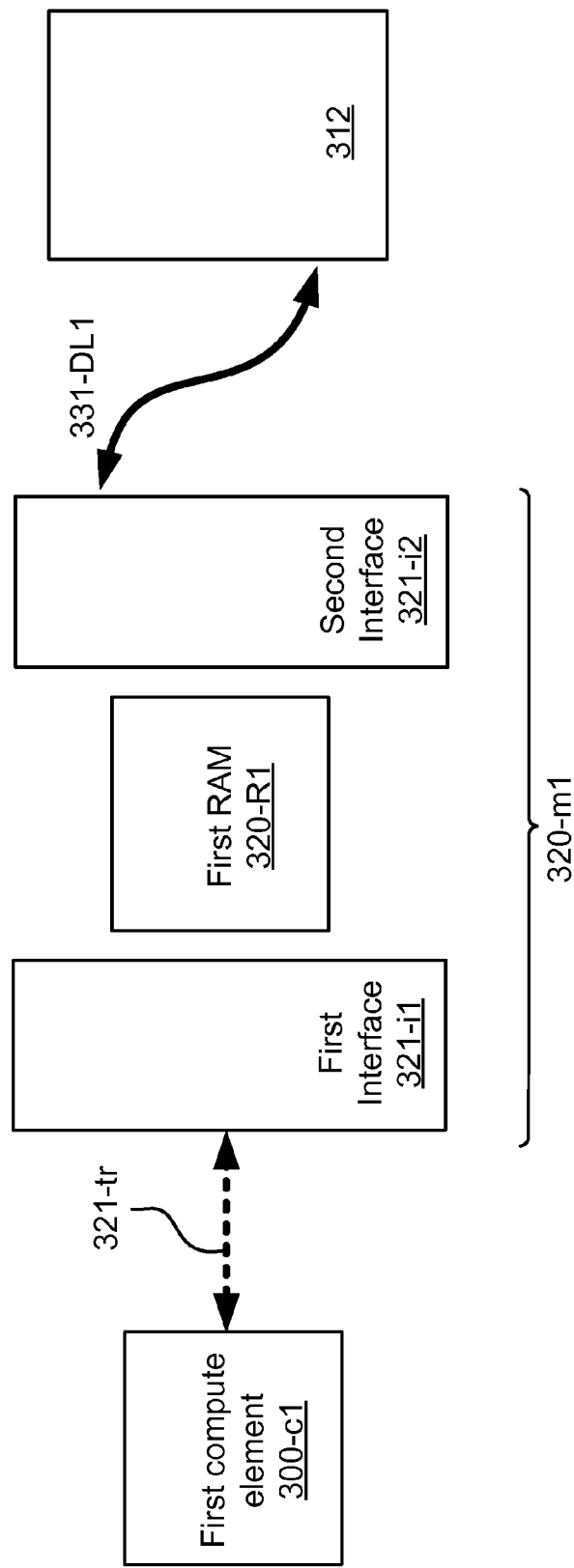
FIG. 8F illustrates one embodiment of a system configured to cache a shared memory pool using at least two memory modules, in which a first memory module includes a first RAM operative to cache sets of data, a first interface is configured to communicate with a first compute element, and a second interface is configured to transact with the shared memory pool.

FIG. 8F illustrates one embodiment of a system configured to cache a shared memory pool using at least two memory modules, in which a first memory module includes a first RAM operative to cache sets of data, a first interface is configured to communicate with a first compute element, and a second interface is configured to transact with the shared memory pool. In the system 300 (FIG. 8A) the first memory module 320-m1 includes a first random-access memory 320-R1 configured to cache the sets of data 312-D1 (FIG. 8B), a first interface 321-i1 configured to communicate with the first compute element 300-c1 using the synchronous random access transactions 321-tr, and a second interface 321-i2 configured to transact with the external shared memory pool 312 via the first data link 331-DL1.

Figure 8G:
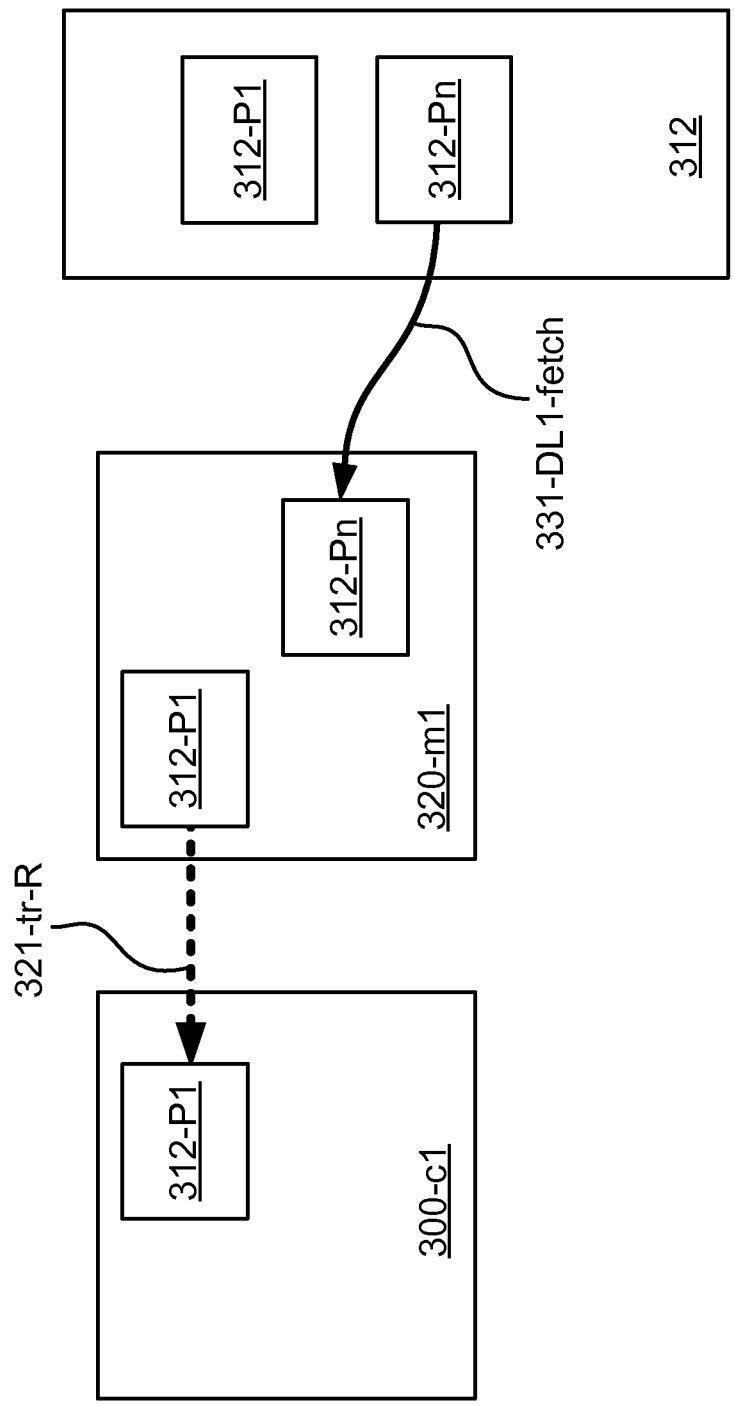
FIG. 8G illustrates one embodiment of a system configured to cache a shared memory pool using at least two memory modules, in which sets of data are arranged in a page format.

FIG. 8G illustrates one embodiment of a system configured to cache a shared memory pool using at least two memory modules, in which sets of data are arranged in a page format. In this system 300 (FIG. 8A), the sets of data 312-D1 (FIG. 8B) and other sets of data 312-D2 (FIG. 8B) are arranged in a page format 312-P1, 312-Pn respectively. Also, the system 300 (FIG. 8A) is further configured to conclude that at least some of said other sets of data 312-D2 (FIG. 8B) are currently not cached on the first memory module 320-m1, and consequently to issue, in said first compute element 300-c1, a page fault condition. The system 300 (FIG. 8A) consequently fetches 331-DL1-fetch at least one page 312-Pn from the shared memory pool 312, wherein the at least one page 312-Pn contains the at least some of the other sets of data 312-D2 (FIG. 8B). The system (FIG. 8A) further caches the at least one page 312-Pn in the first memory module 320-m1 for further use.

FIG. 8H illustrates one embodiment of a system configured to cache a shared memory pool using at least two memory modules, wherein a memory module includes a first RAM comprising a first bank of RAM and a second bank of RAM. FIG. 8H and FIG. 8I together illustrate one embodiment of a system 300 (FIG. 8A) that facilitates operation of the first random-access memory 320-R1 similar to a dual-ported random-access memory. In FIG. 8H, the first memory module 320-m1 includes a first random-access memory 320-R1 which itself includes first 320-D1 and second 320-D2 banks of dynamic-random-access-memory (DRAM). Concurrency is facilitated by the reading 321-tr-R (FIG. 8H) made from the first bank 320-D1 (FIG. 8H) by the first compute element while at the same time fetching 331-DL1-fetch (FIG. 8H) is done with the second bank 320-D2 (FIG. 8H).

FIG. 8I illustrates one embodiment of a system configured to cache a shared memory pool using at least two memory modules, wherein a memory module includes a first RAM comprising a first bank of RAM and a second bank of RAM. In FIG. 8I, the first memory module 320-m1 includes a first random-access memory 320-R1 which itself includes first 320-D1 and second 320-D2 banks of dynamic-random-access-memory (DRAM). Concurrency is facilitated by the reading 321-tr-R (FIG. 8I) made from the second bank 320-D2 (FIG. 8I) by the first compute element while at the same time fetching 331-DL1-fetch (FIG. 8I) is done with the first bank 320-D1 (FIG. 8I). The reading and fetching in FIG. 8I are implemented alternately with the reading and fetching in FIG. 8H, thereby facilitating operation of the first random-access memory 320-R1 as a dual-ported random-access memory.

Figure 9:
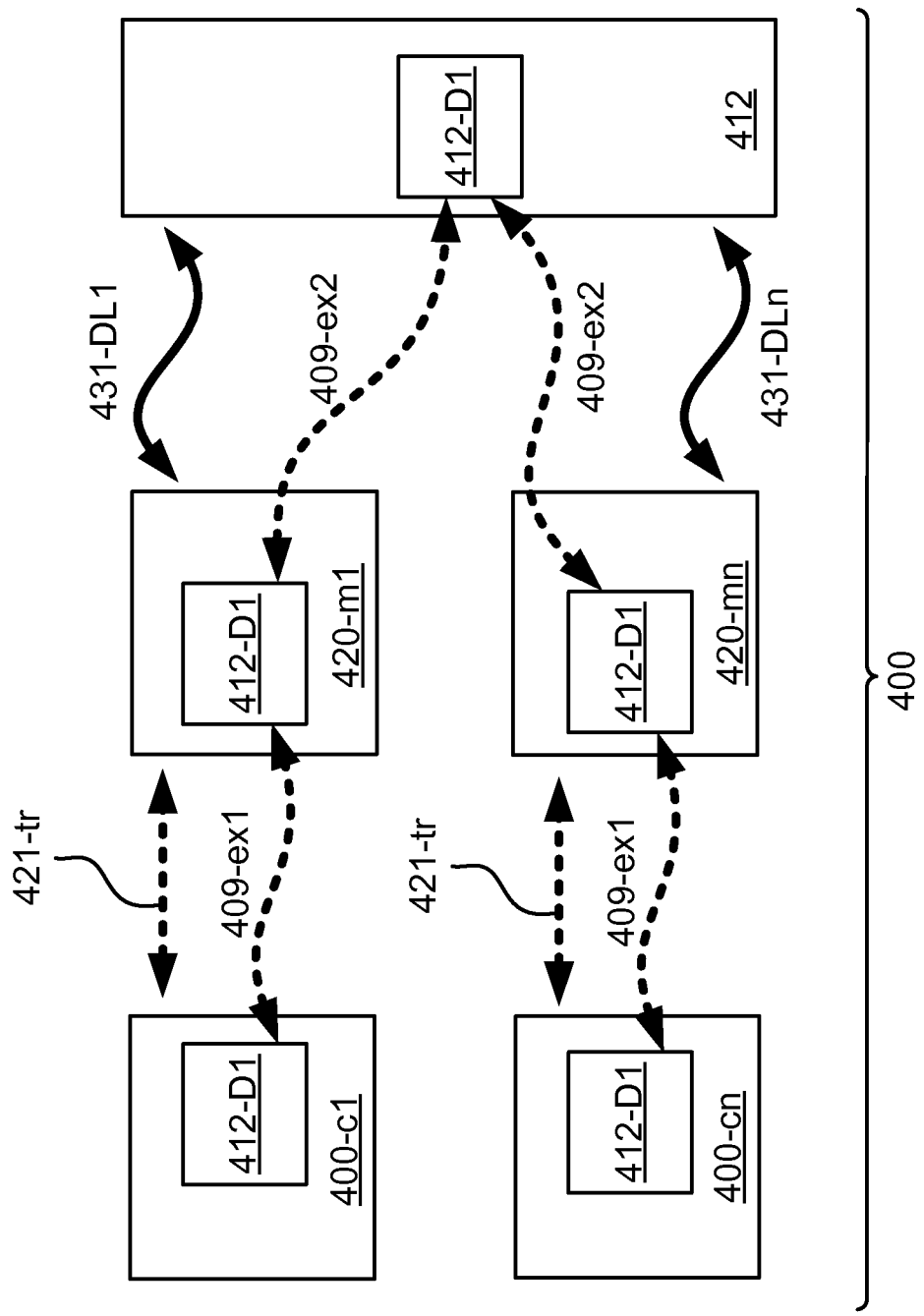
FIG. 9 illustrates one embodiment of a system configured to propagate data among a plurality of computer elements via a shared memory pool.

FIG. 9 illustrates one embodiment of a system 400 configured to propagate data among a plurality of computer elements via a shared memory pool. In one particular embodiment, the system 400 includes a plurality of compute elements 400-c1, 400-cn associated respectively with a plurality of memory modules 420-m1, 420-mn, each compute element configured to exchange 409-ex1 data 412-D1 with the respective memory module using synchronous random access memory transactions 421-tr. The system 400 includes further a shared memory pool 412 connected with the plurality of memory modules 420-m1, 420-mn via a plurality of data links 431-DL1, 431-DLn respectively. In some embodiments, the system 400 is configured to use the plurality of data links 431-DL1, 431-DLn to further exchange 409-ex2 the data 412-D1 between the plurality of memory modules 420-m1, 420-mn and the shared memory pool 412, such that at least some of the data 412-D1 propagates from one 400-c1 of the plurality of compute elements to the shared memory pool 412, and from the shared memory pool 412 to another one 400-cn of the plurality of compute elements.

Figure 10A:
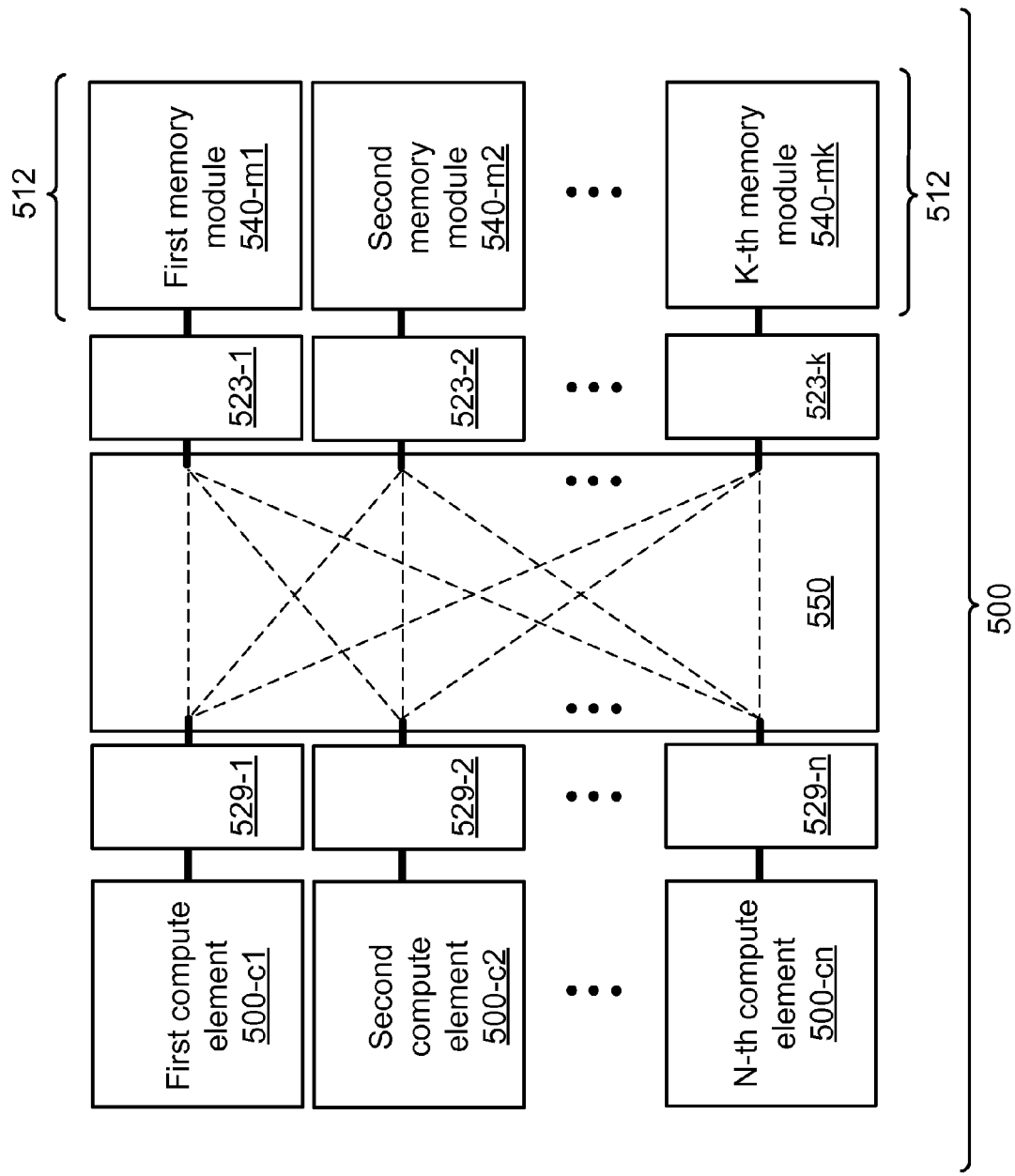
FIG. 10A illustrates one embodiment of a system configured to allow a plurality of compute elements concurrent access to a shared memory pool, including one configuration of a switching network.

FIG. 10A illustrates one embodiment of a system 500 configured to allow a plurality of compute elements concurrent access to a shared memory pool, including one configuration of a switching network 550. In one particular embodiment, the system 500 includes a first plurality of data interfaces 529-1, 529-2, 529-n configured to connect respectively to a plurality of compute elements 500-c1, 500-c2, 500-cn with the switching network 550. The system further includes a shared memory pool 512, which itself includes a plurality of memory modules 540-m1, 540-m2, 540-mn, connected to the switching network 550 via a second plurality of data interfaces 523-1, 523-2, 523-k, respectively.

Figure 10B:
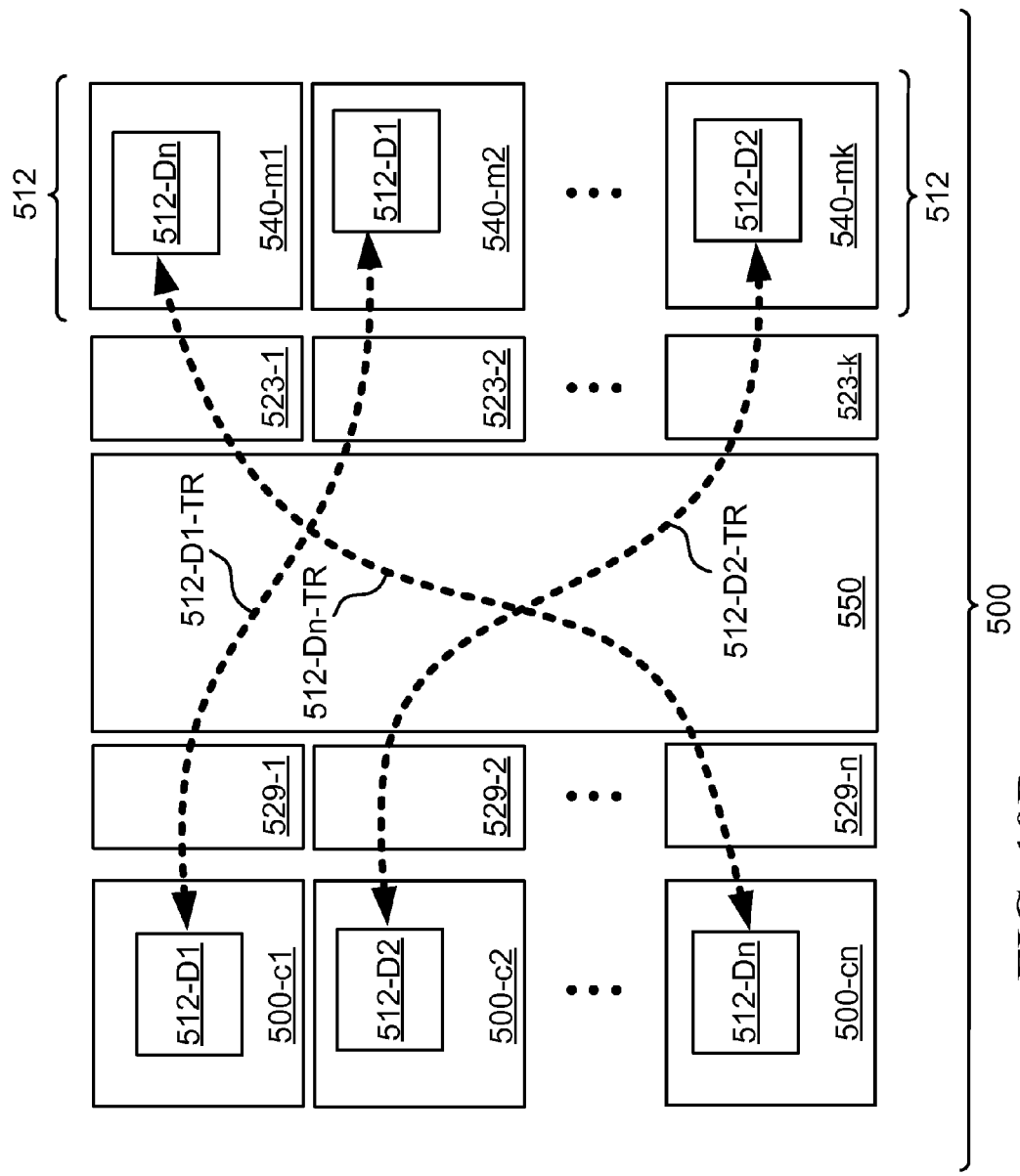
FIG. 10B illustrates one embodiment of a system configured to allow a plurality of compute elements concurrent access to a shared memory pool, including one configuration of a switching network.

FIG. 10B illustrates one embodiment of a system configured to allow a plurality of compute elements concurrent access to a shared memory pool, including one configuration of a switching network. In one particular embodiment, the system 500 includes a switching network 550 operative to transport concurrently sets of data 512-D1, 512-D2, 512-Dn associated with a plurality of memory transactions 512-D1-TR, 512-D2-TR, 512-Dn-TR. The system further includes a first plurality of data interfaces 529-1, 529-2, 529-n configured to connect respectively a plurality of compute elements 500-c1, 500-c2, 500-cn with the switching network 500. The system further includes a shared memory pool 512, which itself includes a plurality of memory modules 540-m1, 540-m2, 540-mk, connected to the switching network 550 via a second plurality of data interfaces 523-1, 523-2, 523-k respectively, where the shared memory pool 512 is configured to store or serve the sets of data 512-D1, 512-D2, 512-Dn concurrently by utilizing the plurality of memory modules concurrently, thereby facilitating a parallel memory access by the plurality of compute elements 500-c1, 500-c2, 500-cn in conjunction with the plurality of memory transactions 512-D1-TR, 512-D2-TR, 512-Dn-TR via the switching network 550.

Figure 10C:
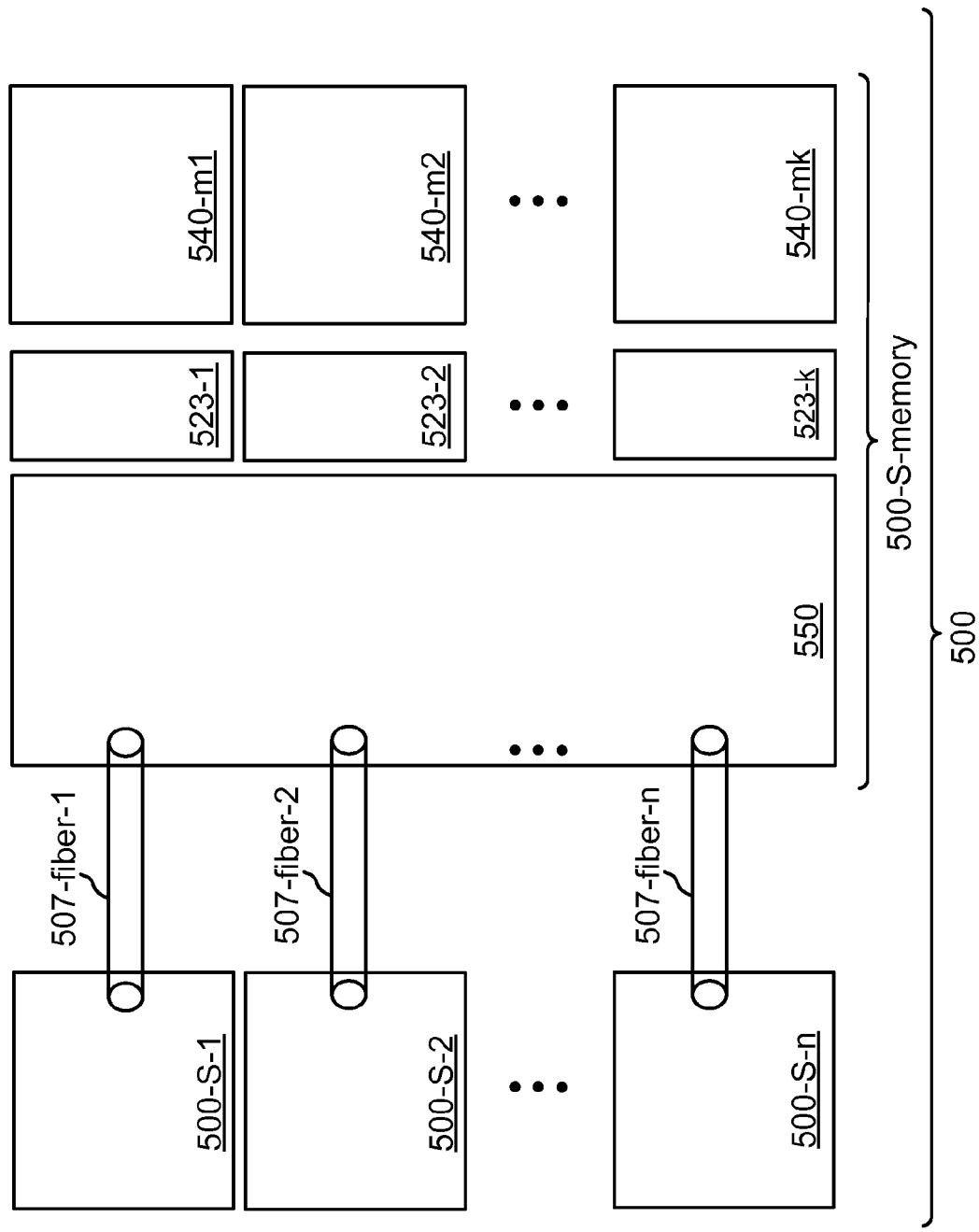
FIG. 10C illustrates one embodiment of a system configured to allow a plurality of compute elements concurrent access to a shared memory pool, including one configuration of a switching network and a plurality of optical fiber data interfaces.

FIG. 10C illustrates one embodiment of a system 500 configured to allow a plurality of compute elements concurrent access to a shared memory pool, including one configuration of a switching network and a plurality of optical fiber data interfaces. In one particular embodiment, the system 500 includes a plurality of servers 500-S-1, 500-S-2, 500-S-n housing respectively said plurality of compute elements 500-c1 (FIG. 10B), 500-c2 (FIG. 10B), 500-cn (FIG. 10B), and a memory-server 500-S-memory housing said switching network 550 and a second plurality of data interfaces 523-1, 523-2, 523-k, which are connected to, respectively, memory modules 540-m1, 540-m2, and 540-mk. The system 500 further includes a first plurality of data interfaces 529-1 (FIG. 10B), 529-2 (FIG. 10B), 529-n (FIG. 10B), which themselves include, respectively, a plurality of optical fibers 507-fiber-1, 507-fiber-2, 507-fiber-n configured to transport a plurality of memory transactions 512-D1-TR (FIG. 10B), 512-D2-TR (FIG. 10B), 512-Dn-TR (FIG. 10B) between the plurality of servers 500-S-1, 500-S-2, 500-S-n and the memory-server 500-S-memory.

Figure 10D:
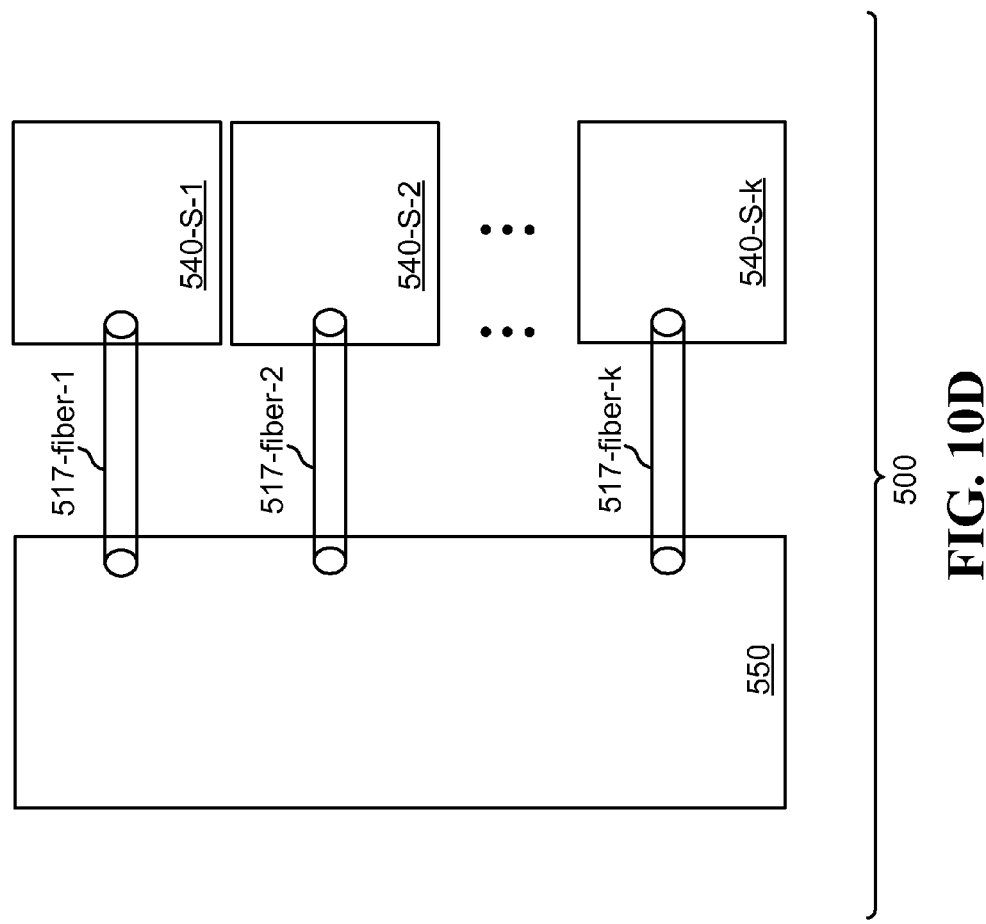
FIG. 10D illustrates one embodiment of a system configured to allow a plurality of compute elements concurrent access to a shared memory pool, including one configuration of a switching network, and a second plurality of servers housing a second plurality of memory modules.

FIG. 10D illustrates one embodiment of a system 500 configured to allow a plurality of compute elements concurrent access to a shared memory pool, including one configuration of a switching network 550, and a second plurality of servers housing a second plurality of memory modules. In one particular embodiment, the system 500 includes a second plurality of servers 540-S-1, 540-S-2, 540-S-k housing respectively a plurality of memory modules 540-m1 (FIG. 10C), 540-m2 (FIG. 10C), 540-mk (FIG. 10C). In some particular embodiments, a second plurality of data interfaces 523-1 (FIG. 10C), 523-2 (FIG. 10C), 523-k (FIG. 10C) comprises respectively a plurality of optical fibers 517-fiber-1, 517-fiber-2, 517-fiber-k configured to transport a plurality of memory transactions 512-D1-TR (FIG. 10B), 512-D2-TR (FIG. 10B), 512-Dn-TR (FIG. 10B) between the second plurality of servers 540-S-1, 540-S-2, 540-S-k and the switching network 550.

One embodiment is a system 200 configured to cache automatically an external memory element 212 as a result of a random-access read cycle 221-tr-R. In one embodiment, the system includes a first random-access memory (RAM) 220-R1, a first interface 221-i1 configured to connect the system 200 with a first compute element 200-c1 using synchronous random access transactions 221-tr, and a second interface 221-i2 configured to connect 221-connect the system 200 with an external memory element 212. In some embodiments the system is configured to prolong 221-tr-prolong a synchronous random-access read cycle 221-tr-R initiated by the first compute element 200-c1 in conjunction with the first interface 221-i1 when the synchronous random-access read cycle 221-tr-R is detected to be addressed to a first memory location 221-L1 of the external memory element 212 currently not cached by the first random-access memory 220-R-1, fetch 212-L1-fetch via the second interface 221-i2 from the external memory element 212 at least one data element 212-D1 associated with the first memory location 212-L1, serve 212-D1-serve to the first compute element 200-c1 as part of said synchronous random-access read cycle 221-tr-R prolonged via the first interface 221-i1 the at least one data element 212-D1 that was previously fetched thereby concluding successfully said synchronous random-access read cycle 221-tr-R, and optionally write 212-D1-write the at least one data element 212-D1 to the first random-access memory 220-R1 thereby caching automatically the first memory location 212-L1 for faster future access by the first compute element 200-c1.

In one alternative embodiment to the system 200 just described to cache automatically an external memory element 212, further the first compute element is placed on a first motherboard 200-MB, the system 200 is implemented on a first printed-circuit-board (PCB) having a form factor of a dual-in-line-memory-module (DIMM) 200-DIMM such that the system 200 is connected to the first motherboard 200-MB like a dual-in-line-memory-module and such that said first compute element 200-c1 perceives the system 200 as essentially a dual-in-line-memory-module, the external memory element 212 is not placed on the first motherboard 200-MB, and the second interface 221-i2 is an electrical-optical interface 221-i2-EO connected to said external memory element 212 via an optical fiber 207-fiber together operative to facilitate the connection 221-connect.

In a second alternative embodiment to the system 200 described above to cache automatically an external memory element 212, further the synchronous random-access read cycle 221-tr-R is performed using a signal configuration selected from a group consisting of: (i) single-data-rate (SDR), (ii) double-data-rate (DDR), and (iii) quad-data-rate (QDR).

In a third alternative embodiment to the system 200 described above to cache automatically an external memory element 212, further the prolonging 221-tr-R-prolong of the synchronous random-access read cycle 221-tr-R is done in order to allow enough time for the system 200 to perform the fetch 212-L1-fetch, and further the synchronous random-access read cycle 221-tr-R is allowed to conclude at such time that said serving 212-D1-serve is possible, thereby ending said prolonging 221-tr-R-prolong.

In one possible variation of the third alternative embodiment just described, further the synchronous random-access read cycle 221-tr-R is performed over a double-data-rate (DDR) bus configuration, and the prolonging 221-tr-R-prolong is done using a procedure selected from a group consisting of: (i) manipulating a data strobe signal belonging to said DDR bus configuration, (ii) manipulating an error signal belonging to said DDR bus configuration, (iii) reducing dynamically a clock frame of the DDR bus configuration, (iv) adjusting dynamically a latency configuration associated with said DDR bus configuration, and (v) any general procedure operative to affect timing of said synchronous random-access read cycle 221-tr-R.

In a fourth alternative embodiment to the system 200 described above to cache automatically an external memory element 212, further a system controller 200-cont is included and configured to fetch 212-Li-fetch-add additional data elements 212-Dn respectively from additional memory locations 212-Ln of the external memory element 212 where the additional memory locations are estimated based at least in part on the first memory location 212-L1 and the memory locations are to be accessed in the future by said compute element 200-c1, and write 212-Dn-write the additional data elements 212-Dn fetched to the first random-access memory 220-R1 thereby caching automatically the additional memory locations 212-Ln for faster future access by the first compute element.

In one possible variation of the fourth alternative embodiment just described, further the writing 212-Dn-write of the additional data elements 212-Dn is operated concurrently with additional 221-tr-R-W-add synchronous random-access read cycles or synchronous random-access write cycles made by the first compute element 200-c1 in conjunction with the first interface 221-i1 and the first random-access memory 220-R1.

In one possible configuration of the possible variation just described, further the concurrent operation is made possible at least in part by the first random-access memory 220-R1 being a dual-ported random-access memory.

One embodiment is a system 300 configured to cache a shared memory pool 312 using at least two memory modules, including a first compute element 300-c1 and a second computer element 300-cn which are associated with, respectively, a first memory module 320-m1 and a second memory module 320-mn memory module, where each of the compute elements is configured to communicate with its respective memory module using synchronous random access transactions 321-tr. Also, a shared memory pool 312 connected with the first 320-m1 and second 320-mn memory modules via a first data link 331-DL1 and a second data link 331-DLn, respectively. In some embodiments, the system 300 is configured to use the first 320-m1 and second 320-mn memory modules as a cache to the shared memory pool 312, such that sets of data 312-D1 cached on the first 320-m1 or second 320-mn memory modules are read 321-tr-R by the respective compute element using the synchronous random access transactions 321-tr, and other sets of data 312-D2 that are not cached on the first 320-m1 or second 320-mn memory modules are fetched 331-DL1-fetch from the shared memory pool 312 into the first 320-*m*1 or the second 320-*mn* memory module upon demand from the memory module's respective compute element.

In one alternative embodiment to the system 300 just described to cache a shared memory pool 312 using at least two memory modules, further the first 320-*m*1 memory module is a first dual-in-line-memory-module (DIMM) 300-DIMM-1.

In one possible variation of the alternative embodiment just described, further the first compute element 300-*c*1 is placed on a first motherboard 300-MB-1, the first dual-in-line-memory-module 300-DIMM-1 is connected to the first motherboard 300-MB-1 via a first dual-in-line-memory-module slot 300-DIMM-1-slot, and the first data link 331-DL1 includes a first optical fiber 307-fiber-1.

In one possible configuration of the possible variation just described, further, the second 320-*mn* memory module is a second dual-in-line-memory-module 300-DIMM-n, the second compute element 300-*cn* is placed on a second motherboard 300-MB-n, the second dual-in-line-memory-module 300-DIMM-n is connected to the second motherboard 300-MB-n via a second dual-in-line-memory-module slot 300-DIMM-n-slot, the second data link 331-DLn includes a second optical fiber 307-fiber-n, the first 300-MB-1 and second 300-MB-n motherboard are placed in a first 300-S-1 and a second 300-S-n server, respectively, and the shared memory pool is placed in a third server 300-server thereby facilitating distributed operation and memory disaggregation.

In a second alternative embodiment to the system 300 described above to cache a shared memory pool 312 using at least two memory modules, further the first memory module 320-*m*1 includes a first random-access memory 320-R1 operative to cache the sets of data 312-D1, a first interface 321-*i*1 configured to communicate with the first compute element 300-*c*1 using the synchronous random access transactions 321-tr, and a second interface 321-*i*2 configured to transact with the external shared memory pool 312 via the first data link 331-DL1.

In a third alternative embodiment to the system 300 described above to cache a shared memory pool 312 using at least two memory modules, further the sets of data 312-D1 and other sets of data 312-D2 are arranged in a page format 312-P1 and 312-Pn, respectively. In some embodiments, the system 300 is further configured to conclude that at least some of the other sets of data 312-D2 are currently not cached on said first memory module 320-*m*1, to issue in the first compute element 300-*c*1 a page fault condition, to fetch 331-DL1-fetch by the first compute element 300-*c*1 at least one page 312-Pn from said shared memory pool 312 where the at least one page 312-Pn contains at least some of the other sets of data 312-D2, and cache the at least one page 312-Pn in said first memory module 320-*m*1 for further use.

In a fourth alternative embodiment to the system 300 described above to cache a shared memory pool 312 using at least two memory modules, further the first memory module 320-*m*1 is configured to facilitate the reading 321-tr-R of the sets of data 312-D1 concurrently with the fetching 331-DL1-fetch of the other sets of data 312-D2, such that the fetching 331-DL1-fetch of the other sets of data 312-D2 does not reduce data throughput associated with the readings 321-tr-R.

In one possible variation of the fourth alternative embodiment just described, further, the first memory module 320-*m*1 comprises a first random-access memory 320-R1 including a first 320-D1 and a second 320-D2 bank of dynamic-random-access-memory (DRAM). In some embodiments, the concurrency is facilitated by the reading 321-tr-R in FIG. 8H made from the first bank 320-D1 in FIG. 8H when the fetching 331-DL1-fetch in FIG. 8H is done with the second bank 320-D2 in FIG. 8H, and by the reading 321-tr-R FIG. 8I made from the second bank 320-D2 in FIG. 8I when the fetching 331-DL1-fetch in FIG. 8I is done with the first bank 320-D1 in FIG. 8I, effectively facilitating operation of the first random-access memory 320-R1 as a dual-ported random-access memory.

One embodiment is a system 400 configured to propagate data among a plurality of compute elements via a shared memory pool 412, including a plurality of compute elements 400-*c*1, 400-*cn* associated with, respectively, a plurality of memory modules 420-*m*1, 420-*mn*, where each compute element is configured to exchange 409-ex1 data 412-D1 with its respective memory module using synchronous random access memory transactions 421-tr. In this embodiment, further a shared memory pool 412 is connected with the plurality of memory modules 420-*m*1, 420-*mn* via a plurality of data links 431-DL1, 431-DLn, respectively. In some embodiments, the system 400 is configured to use the plurality of data links 431-DL1, 431-DLn to further exchange 409-ex2 the data 412-D1 between the plurality of memory modules 420-*m*1, 420-*mn* and the shared memory pool 412, such that at least some of the data 412-D1 propagates from one 400-*c*1 of the plurality of compute elements to the shared memory pool 412 and from the shared memory pool 412 to another one 400-*cn* of the plurality of compute elements.

One embodiment is a system 500 configured to allow a plurality of compute elements concurrent access to a shared memory pool 512, including a switching network 550 operative to transport concurrently sets of data 512-D1, 512-D2, 512-Dn associated with a plurality of memory transactions 512-D1-TR, 512-D2-TR, 512-Dn-TR. In this embodiment, further a first plurality of data interfaces 529-1, 529-2, 529-*n* configured to connect, respectively, a plurality of compute elements 500-*c*1, 500-*c*2, 500-*cn* with the switching network 500. In this embodiment, further a shared memory pool 512 including a plurality of memory modules 540-*m*1, 540-*m*2, 540-*mk*, connected to the switching network 550 via a second plurality of data interfaces 523-1, 523-2, 523-*k* respectively, wherein the shared memory pool 512 is configured to store or serve the sets of data 512-D1, 512-D2, 512-Dn concurrently by utilizing the plurality of memory modules concurrently, thereby facilitating a parallel memory access by the plurality of compute elements 500-*c*1, 500-*c*2, 500-*cn* in conjunction with the plurality of memory transactions 512-D1-TR, 512-D2-TR, 512-Dn-TR via the switching network.

One alternative embodiment to the system just described 500 to allow a plurality of compute elements concurrent access to a shared memory pool 512, further including a plurality of servers 500-S-1, 500-S-2, 500-S-n housing respectively the plurality of compute elements 500-*c*1, 500-*c*2, 500-*cn*, and a memory-server 500-S-memory housing the switching network 550 and the second plurality of data interfaces 523-1, 523-2, 523-*k*. In some embodiments, the first plurality of data interfaces 529-1, 529-2, 529-*n* includes respectively a plurality of optical fibers 507-fiber-1, 507-fiber-2, 507-fiber-n configured to transport the plurality of memory transactions 512-D1-TR, 512-D2-TR, 512-Dn-TR between the plurality of servers 500-S-1, 500-S-2, 500-S-n and the memory-server 500-S-memory. In some embodiments, the at least one of the first plurality of data interfaces 529-1, 529-2, 529-*n* is a shared input-output medium. In some embodiments, at least one of the plurality of memory transactions 512-D1-TR, 512-D2-TR, 512-Dn-TR is done in conjunction with at least one of the plurality of compute elements 500-c1, 500-c2, 500-cn using synchronous random access transactions.

In a second alternative embodiment to the system 500 described above to allow a plurality of compute elements concurrent access to a shared memory pool 512, further the first plurality of data interfaces 529-1, 529-2, 529-n include at least 8 (eight) data interfaces, the plurality of memory modules 540-m1, 540-m2, 540-mk include at least 8 (eight) memory modules, and the plurality of memory transactions 512-D1-TR, 512-D2-TR, 512-Dn-TR has an aggregated bandwidth of at least 400 Giga-bits-per-second.

In a third alternative embodiment to the system 500 described above to allow a plurality of compute elements concurrent access to a shared memory pool 512, further each of the plurality of memory modules 540-m1, 540-m2, 540-mk is a dynamic-random-access-memory accessed by the respective one of the second plurality of data interfaces 523-1, 523-2, 523-k using synchronous random access memory transactions, and the latency achieved with each of the plurality of memory transactions 512-D1-TR, 512-D2-TR, 512-Dn-TR is lower than 2 (two) microseconds.

In a fourth alternative embodiment to the system 500 described above to allow a plurality of compute elements concurrent access to a shared memory pool 512, further the switching network 550 is a switching network selected from a group consisting of: (i) a non-blocking switching network, (ii) a fat tree packet switching network, (iii) a cross-bar switching network, and (iv) an integrated-circuit (IC) configured to multiplex said sets of data 512-D1, 512-D2, 512-Dn in conjunction with said plurality of memory modules 540-m1, 540-m2, 540-mk thereby facilitating said transporting concurrently of said sets of data 512-D1, 512-D2, 512-Dn.

In a fifth alternative embodiment to the system 500 described above to allow a plurality of compute elements concurrent access to a shared memory pool 512, further including a second plurality of serves 540-S-1, 540-S-2, 540-S-k housing respectively the plurality of memory modules 540-m1, 540-m2, 540-mk. In some embodiments, the second plurality of data interfaces 523-1, 523-2, 523-k includes respectively a plurality of optical fibers 517-fiber-1, 517-fiber-2, 517-fiber-k configured to transport the plurality of memory transactions 512-D1-TR, 512-D2-TR, 512-Dn-TR between the second plurality of servers 540-S-1, 540-S-2, 540-S-k and the switching network 550.

Figure 11A:
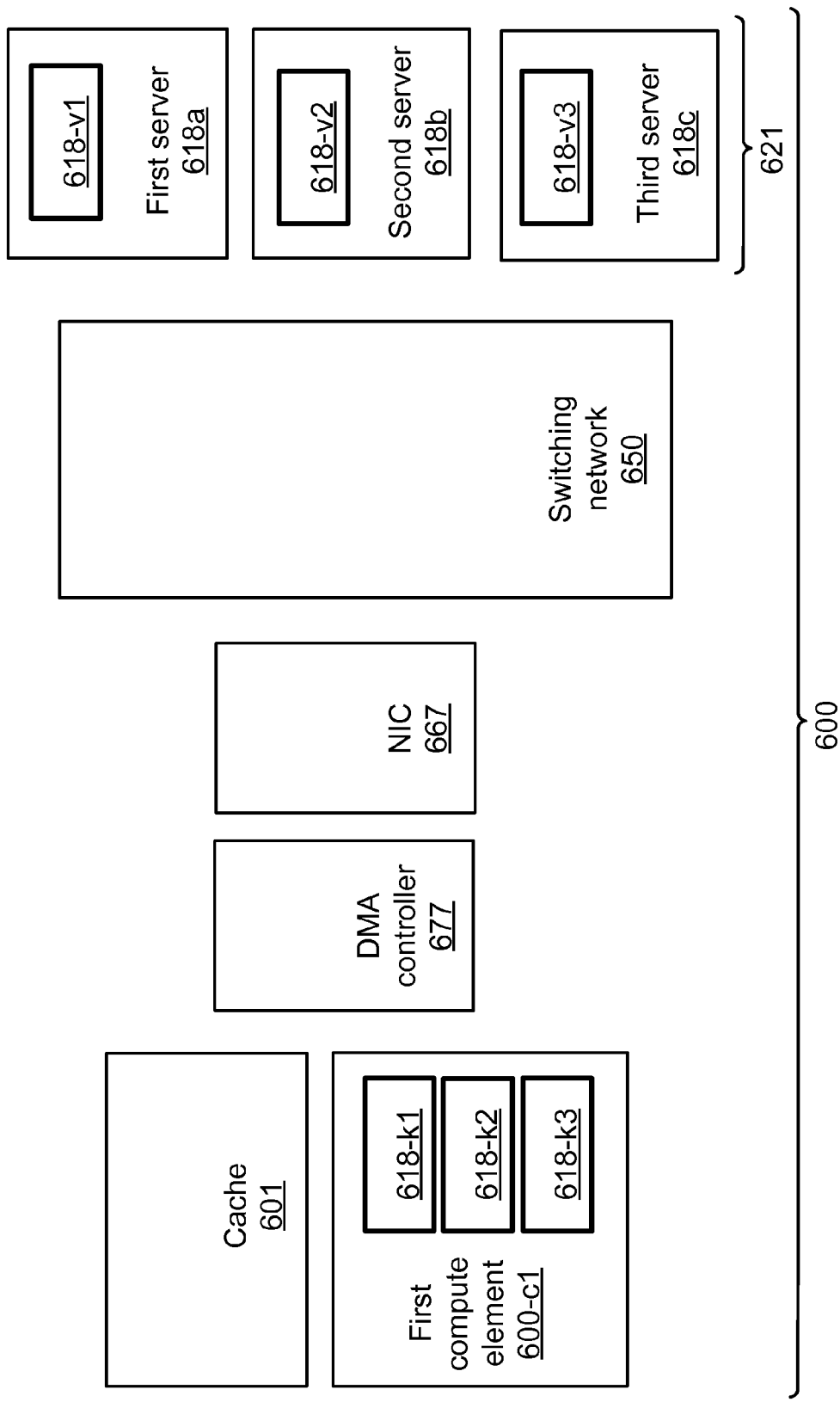
FIG. 11A illustrates one embodiment of a system configured to use a compute element to process a plurality of values distributed over a plurality of servers using a plurality of keys.

FIG. 11A illustrates one embodiment of a system 600 configured to use a compute element to process a plurality of values distributed over a plurality of servers using a plurality of keys. The system 600 includes a cache memory 601, and a first compute element 601-c1 associated with and in communicative contact with the cache memory 601. The first compute element 601-c1 includes two or more keys, 618-k1, 618-k 2, 618-k3, where each key is associated with a respective data value, 618-k1 with 618-v1, 618-k 2 with 618-v2, and 618-k3 with 618-v3. The data values are stored in multiple servers. In FIG. 11A, 618-v1 is stored in first server 618a, 618-v2 is stored in second server 618b, and 618-v3 is stored in third server 618c. It will be understood, however, that two or more specific data values may be served in a single server, although the entire system 600 includes two or more servers. The servers as a whole are a server stack that is referenced herein as a distributed key-value-store (KVS) 621. The first compute element 600-c1 and the distributed KVS 621 are in communicative contact through a switching network 650, which handles requests for data values from the first compute element 600-c1 to the KVS 621, and which handles also data values sent from the KVS 621 to either the first compute element 600-c1 or the cache memory 601. In some embodiments, the system 600 includes also a direct-memory-access (DMA) controller 677, which receives data values from the switching network 650, and which may pass such data values directly to the cache memory 601 rather than to the first compute element 600-c1, thereby temporarily freeing the first compute element 600-c1 to perform work other than receiving and processing a data value. The temporary freeing of the first compute element 600-c1 is one aspect of system 600 timing that facilitates a higher utilization rate for the first compute element 600-c1. In some embodiments, the system 600 includes also a network-interface-card (NIC) 667, which is configured to associate the first compute element 600-c1 and the cache memory 601 with the switching network 650. In some embodiments, the NIC 667 is further configured to block or delay any communication currently preventing the NIC 667 from immediately sending a request for data value from the first compute element 600-c1 to the KVS 621, thereby preventing a situation in which the first compute element 600-c1 must wait before sending such a request. This blocking or delaying by the NIC 667 facilitates efficient usage and a higher utilization rate of the first compute element 600-c1. In FIG. 11A, the order of structural elements between cache memory 601 and first compute element 600-c1 on the one hand and the KVS 621 on the other hand is DMA controller 677, then NIC 667, then switching network 650, but this is only one of many possible configurations, since any of the three elements 677, 667, or 650, may be either on the left, or in the middle, or on the right, and indeed in alternative embodiments, the DMA controller 677 and NIC 667 may be parallel, such that they are not in direct contact with one another but each one is in contact with the switching network 667 and with either the cache memory 601 or the first compute element 600-c1 or with both the cache memory 601 and the first compute element 600-c1.

In some embodiments of FIG. 11A, the KVS 621 is a shared memory pool 512 from FIG. 10B, which includes multiple memory modules 540-m1, 540-m2, 540-mk, where each memory module is associated with a particular server. In FIG. 11A as shown, memory module 540-m1 would be associated with first server 618a, memory module 540-m2 would be associated with second server 618b, and memory module 540-mk would be associated with third server 618c. However, many different configurations are possible, and a single server may include two or more memory modules, provided that the entire system includes a multiplicity of memory modules and a multiplicity of servers, and that all of the memory modules are included in at least two servers. In a configuration with memory modules, the data values are stored in the memory modules, for example data value 618-v1 in memory module 540-m1, data value 618-v2 in memory module 540-m2, and data value 618-v3 in memory module 540-mk, but this is only one of multiple possible configurations, provided that all of the data values are stored in two or more memory modules that are located in two or more servers. In some embodiments, one or more of the multiple memory modules 540-m1, 540-m2, 540-mk, are based on random-access-memory (RAM), which may be a dynamic RAM (DRAM) or a flash memory in two non limiting examples, and at least as far as read cycles are concerned, thereby facilitating the execution of data value requests from the first compute element 600-c1. In some embodiments, a memory module can execute a data value request in a period between 200 and 2,500 nanoseconds.

Figure 11B:
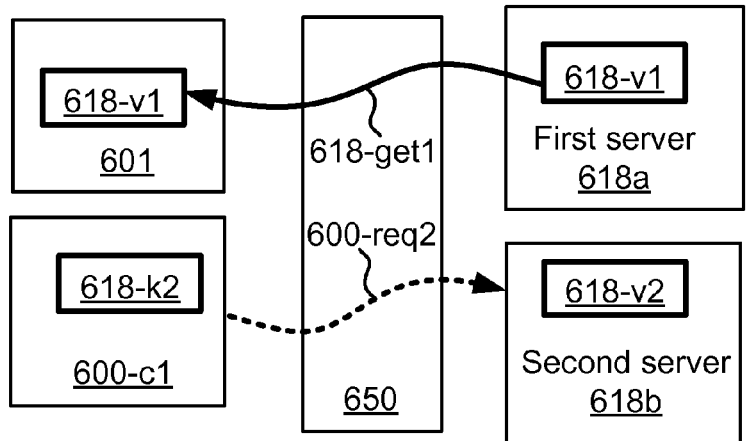
FIG. 11B illustrates one embodiment of a system configured to request and receive data values needed for data processing.

FIG. 11B illustrates one embodiment of a system configured to request and receive data values needed for data processing. FIG. 11B illustrates two transfers of information, one at the top and one at the bottom, although both transfers pass through the switching network 650. At the top, cache memory 601 receives 618-get1 a first data value 618-v1 which was sent by the first server 618a to the switching network 650. In some embodiments, the first data value 618-v1 is sent directly from the switching network to the cache memory 601, while in other embodiments the first data value 618-v1 is sent from the switching network to a DMA controller 677 (or rather pulled by the DMA controller) and then to the cache memory 601, while in other embodiments the first data value 618-v1 is sent from the switching network 650 directly to the first compute element 600-c1, and in other embodiments the first data value 618-v1 is sent from the switching network 650 to a DMA controller 677 and then to the first compute element 600-c1.

In FIG. 11B, in the bottom transfer of information, a first compute element 600-c1 uses a key, here 618-k 2 to identify the server location of a needed data value, here second data value 618-v2. The first compute element 600-c1 then sends a request 600-req2 to receive this data value 618-v2, where such request 600-req2 is sent to the switching network 650 and then to the server holding the data value 618-v2, here second server 618b.

Figure 11C:
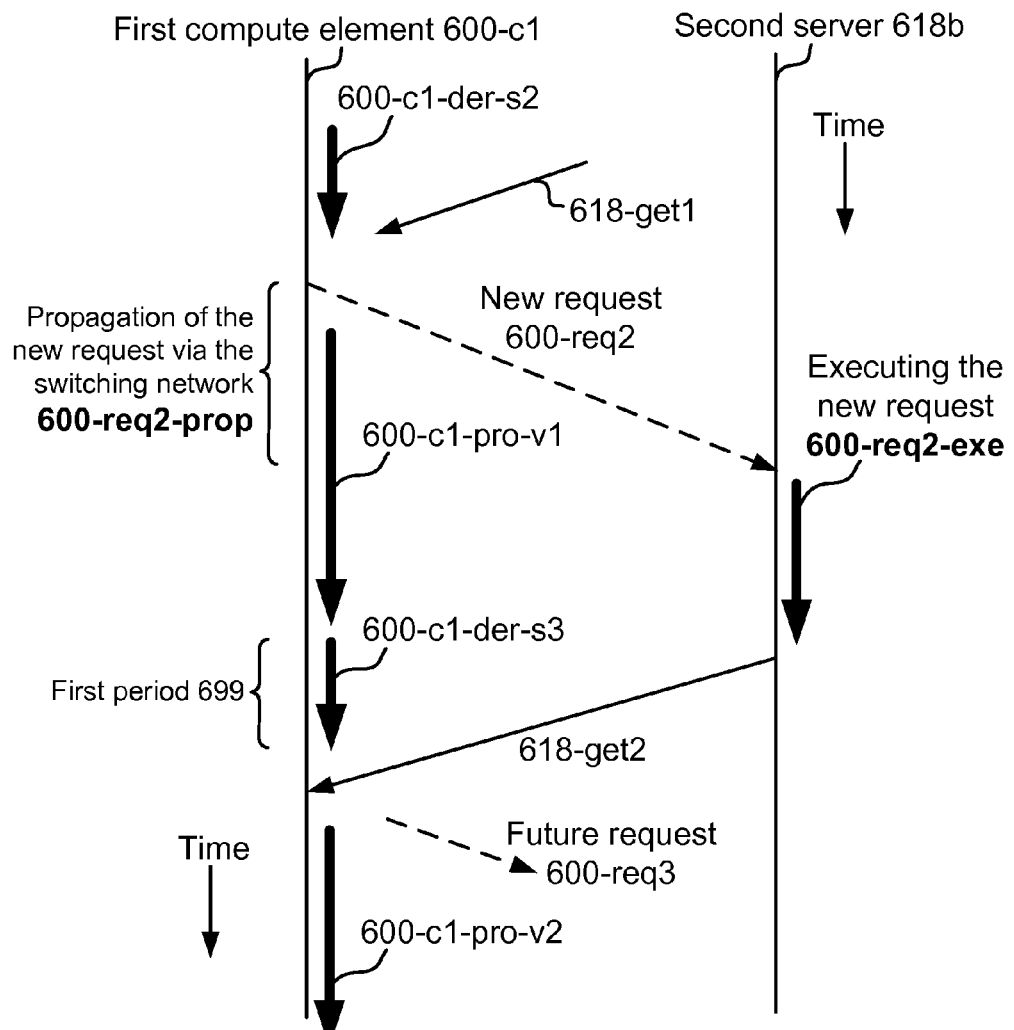
FIG. 11C illustrates one embodiment of a system configured to streamline a process of retrieving a plurality of values from a plurality of servers using a plurality of keys.

FIG. 11C illustrates one embodiment of a system configured to streamline a process of retrieving a plurality of values from a plurality of servers using a plurality of keys. In FIG. 11C, the system 600 is configured to perform four general tasks:

to use keys 618-k 2, 618-k3, to derive 600-c1-der-s2, 600-c1-der-s3 identities of servers holding needed data values, to send requests 600-req2, 600-req3 for needed data values to the specific servers in the KVS 621 holding the needed data values, to receive the needed data values 618-get1, 618-get2 from the servers via the switching network 650 or the DMA controller 677 or the cache memory 601, and to process 600-c1-pro-v1, 600-c1-pro-v2 the received data values as required.

In some embodiments, the first compute element 600-c1 is dedicated to the four general tasks described immediately above. Dedications to these tasks can enhance the utilization rate of the first compute element 600-c1, and thereby increase the relative efficiency of its usage.

In the specific embodiment shown in FIG. 11C, time flows from the top to the bottom, actions of the first compute element 600-c1 are illustrated on the left, actions of the second server 618b are illustrated on the right, and interactions between the first compute element 600-c1 and the second server 618b are illustrated by lines pointing between these two structures in which information transfers are via the switched network 650. The server location (e.g. the address of the server) associated with a second needed data value is derived 600-c1-der-s2 by the first compute element 600-c1, after which the first compute element 600-c1 receives 618-get1 a first needed data value that was previously requested, and the first compute element 600-c1 sends a new request for a second needed data value 600-req2 to the second server 618b, after which the first compute element 600-c1 processes the first data value 600-c1-pro-v1, and the first compute element derives the server location of a third needed data value 600-c1-der-s3, after which the first compute element 600-c1 receives 618-get2 the second needed data value, and the first compute element sends a future request 600-req3 for the third needed data value, after which the first compute element processes the second needed data value 60-c1-pro-v2.

After the second server 618b receives from the switching network 650 the new request for a second needed data value 600-req2, the second server 618b executes this request 600-req2-exe by locating, optionally using the second key which is included in the new request 600-req2, the needed data value within the server 618b and preparing to send it to the switching network 650. The period of time from which the first compute element 600-c1 sends a new request for a second needed data value 600-req2 until that request is received by the second server 618b is a request propagation time 600-req2-prop. During the propagation period 600-req2-prop, the period during which the second server 618b executes the data request 600-req2-exe, and the time period 618-get2 during which the second needed data value is transferred from the second server 618b to the first compute element 600-c1, the first compute element 600-c1 processes the first needed data value 600-c1-pro-v1 and, in a first period 699, derives the server location of the third needed data value 600-c1-der-s3. This interleaving of activity between the various structural elements of the system 600 increases the utilization rate of the first compute element 600-c1 and thereby enhances the efficient usage of the first compute element 600-c1.

In the embodiment illustrated in FIG. 11C, processing of the first needed data value 600-c1-pro-v1 occurs before the derivation of server location for the third needed data value 600-c1-der-s3. This is only one of multiple embodiments. In some alternative embodiments, the derivation of server location for the third needed data value 600-c1-der-s3 occurs before the processing of the first needed data value 600-c1-pro-v1. In other alternative embodiments, the processing of the first needed data value 600-c1-pro-v1 occurs in parallel with the derivation of the server location for the third needed data value 600-c1-der-s3. All of these embodiments are possible, because in all of them the first compute element 600-c1 continues to be utilized, which means that the first compute element's 600-c1 utilization rate is relatively high, and therefore its usage is relatively efficient.

Figure 11D:
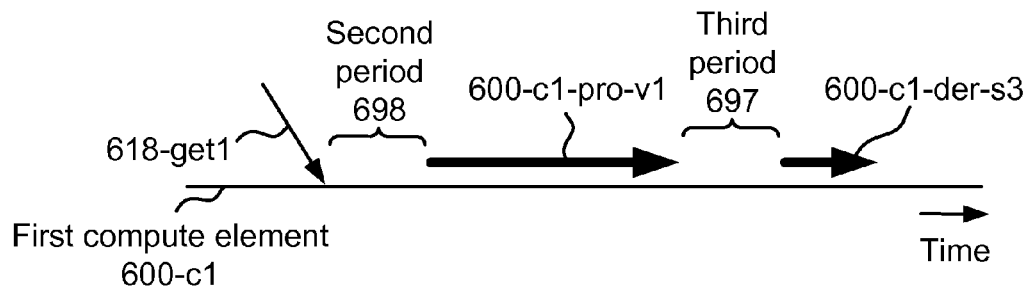
FIG. 11D illustrates one embodiment of a system configured to minimize or at least reduce the duration of time periods between general tasks executed by a first compute element.

FIG. 11D illustrates one embodiment of a system configured to minimize or at least reduce the duration of time periods between general tasks executed by a first compute element. In some embodiments, a first compute element 600-c1 is dedicated to the four general tasks described with respect to FIG. 11C above. In the specific embodiment illustrated in FIG. 11D, a first compute element 600-c1 is operating over time. The first compute element 600-c1 receives 618-get1 a first needed data value. There is a second period 698 after receipt 618-get1 of the first needed data value but before the first compute element 600-c1-prov-v1 processes that first needed data value. There is then a third period 697 after the first compute element 600-c1 has processed the first needed data value 600-c1-pro-v1 but before the first compute element 600-c1 derives the server location of a third needed data value 600-c1-der-s3. To increase system efficiency, it would be desirable to minimize, or at least to reduce the duration, of either or both of the second period 698 and the third period 697. The implementation of the four general tasks by the first compute element 600-c1, as presented and explained in reference to FIG. 11C, will minimize or at least reduce the duration of either or both of the second period 698 and the third period 697, and in this way increase the utilization rate of the first compute element 600-*c*1 and hence the relative efficiency in the usage of the first compute element 600-*c*1. In some alternative embodiments, the first compute element 600-*c*1 derives the server location of a third needed data value 600-*c*1-der-s3 before it processes the first needed data value 600-*c*1-pro-v1, in which case the second period 698 is between 618-get1 and 600-*c*1-der-s3 and the third period 697 is immediately after 600-*c*1-pro-v1.

Figure 11E:
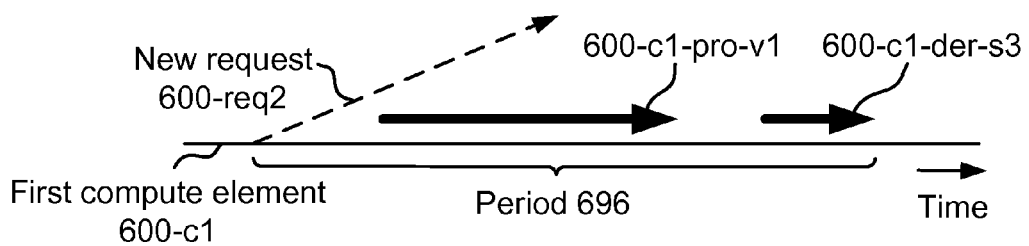
FIG. 11E illustrates one embodiment of a system configured to increase the utilization rate of a first compute element.

FIG. 11E illustrates one embodiment of a system configured to increase the utilization rate of a first compute element. In some embodiments, a first compute element 600-*c*1 is dedicated to the four general tasks described with respect to FIG. 11C above. In the specific embodiment illustrated in FIG. 11E, a first compute element 600-*c*1 is operating over time. After sending a new request for a second needed data value 600-req2, the first compute element 600-*c*1 processes the first needed data value 600-*c*1-pro-v1 and derives the server location of a third needed data value 600-*c*1-der-s3, either in the order shown in FIG. 11E, or by deriving the third needed data value 600-*c*1-der-s3 prior to processing the first needed data value 600-*c*1-pro-v1, or by performing both operations in a parallel manner. The duration of time during which the first compute element 600-*c*1 both processes the first needed data value 600-*c*1-pro-v1 and derives the server location of the third needed data value 600-*c*1-der-s3, in whatever chronological order, is period 696. In one embodiment, as a result of one or more of the dedication of the first compute element 600-*c*1 to the four general tasks, and/or the simultaneous operation of the first compute element 600-*c*1 and the second server 618*b* as illustrated and described in FIG. 11C, and/or of the operation of the cache memory in receiving some of the data values as illustrated and described in FIG. 11A, the first compute element 600-*c*1 consumes at least 50 (fifty) percent of the time during period 696 performing the two tasks 600-*c*1-pro-v1 and 600-*c*1-der-s3. This is a relatively high computational duty-cycle, and it allows the first compute element 600-*c*1 to process a plurality of keys, 618-*k*1, 618-*k* 2, 618-*k*3 from FIG. 11A, and a plurality of values, 618-*v*1, 618-*v*2, 618-*v*3, from FIG. 11A, at an increased and relatively high rate, thus enhancing the relative efficiency of the first compute element 600-*c*1.

Figure 11F:
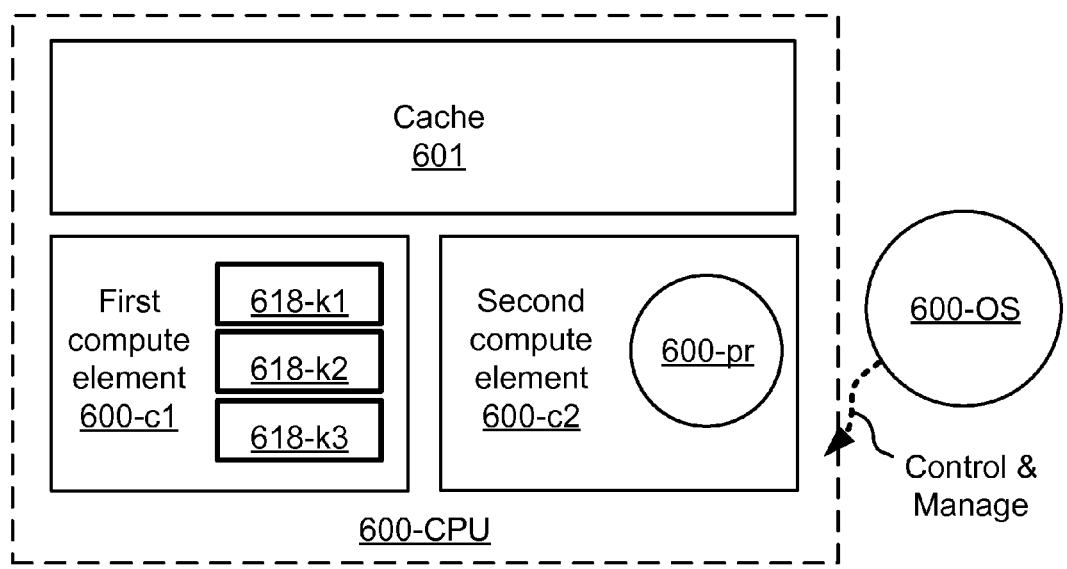
FIG. 11F illustrates one embodiment of a system configured to achieve a relatively high computational duty-cycle by at least temporarily blocking or redirecting the execution of certain processes.

FIG. 11F illustrates one embodiment of a system configured to achieve a relatively high computational duty-cycle by at least temporarily blocking or redirecting the execution of certain processes. In FIG. 11F, there is a central-processing-unit (CPU) 600-CPU that includes at least a cache memory 601, a first compute element 600-*c*1, and a second compute element 600-*c*2. The first compute element 600-*c*1 includes a plurality of keys, 618-*k*1, 618-*k* 2, 618-*k*3, each of which is associated with a corresponding data value stored in a server (such data values and servers not shown in FIG. 11F). The first compute element 600-*c*1 executes the general tasks illustrated and described in FIG. 11C. The second compute element 600-*c*2 executes certain processes that are unrelated 600-pr to the general tasks executed by the first compute element 600-*c*1. The system includes also an operating system 600-OS configured to control and manage the first 600-*c*1 and second 600-*c*2 compute elements. The operating system 600-OS is further configured to manage the general tasks executed by the first compute element 600-*c*1 and the unrelated processes 600-pr that are executed by the second compute element 600-*c*2. The operating system 600-OS is further configured to help achieve dedication of the first compute element 600-*c*1 to the general tasks by blocking the unrelated processes 600-pr from running on the first compute element 600-*c*1, or by causing the unrelated processes 600-pr to run on the second compute element 600-*c*2, or both blocking or directing to the second compute element 600-*c*2 depending on the specific process, or on the time constraints, or upon the system characteristics at a particular point in time.

In one embodiment, at least part of cache memory 601 is dedicated for usage by only the first compute element 600-*c*1 in conjunction with execution of the general tasks illustrated and described in FIG. 11C, thus ensuring performance and timing in accordance with some embodiments.

It will be understood that the particular embodiment illustrated in FIG. 11F is only one of multiple possible embodiments. In some alternative embodiments, there is only a single compute element, but some of its sub-structures are dedicated to the general tasks illustrated and described in FIG. 11C, whereas other of its sub-structures executed unrelated processes. In some alternative embodiments, there are two compute elements, in which some sub-structures of a first compute element 600-*c*1 are dedicated to general tasks while others execute unrelated tasks, and similarly some sub-structures of a second compute element 600-*c*2 are dedicated to general tasks while others execute unrelated tasks. In some alternative embodiments, different sub-structures within a compute element are either dedicated to general tasks or execute unrelated processes, but the status of a particular sub-structure will change over time depending on system characteristics, processing demands, and other factors, provided that every instant of time there are some sub-structures that perform only general tasks while other sub-structures execute only unrelated processes.

One embodiment is a system 600 operative to efficiently use a compute element to process a plurality of values distributed over a plurality of servers using a plurality of keys, including a first compute element 600-*c*1 associated with a first cache memory 601, and a distributed key-value-store (KVS) 621 including a plurality of servers 618*a*, 618*b*, 618*c* configured to store a plurality of values 618-*v*1, 618-*v*2, 618-*v*3 associated with a plurality of keys 618-*k*1, 618-*k* 2, 618-*k*3, in which the plurality of servers is communicatively connected with said first cache memory 601 via a switching network 650. Further, the system is configured to send, from the first compute element 600-*c*1, to a second 618*b* of the plurality of servers identified 600-*c*1-der-s2 using a second 618-*k* 2 plurality of keys, via said switching network 650, a new request 600-req2 to receive a second 618-*v*2 of the plurality of values associated with the second key 618-*k* 2. Further, the system is configured to receive 618-get1, via said switching network 650, from a first 618*a* of said plurality of servers, into said first cache memory 601, a first 618-*v*1 of said plurality of values previously requested. Further, after completion of the operations just described, the system is further configured to process 600-*c*1-pro-v1 in the first compute element 600-*c*1, in conjunction with the first cache memory 601, the first value 618-*v*1 received, simultaneously with the second server 618*b* and switching network 650 handling the new request 600-req2. The system is further configured to derive 600-*c*1-der-s3, in the first compute element 600-*c*1, from a third 618-*k*3 plurality of keys, during a first period 699 prior to receiving 618-get2 and processing 600-*c*1-pro-v2 the second value 618-*v*2, an identity of a third 618*c* of the plurality of servers into which to send a future request 600-req3 for a third 618-*v*3 of said plurality of values, thereby facilitating said efficient usage.

In one alternative embodiment to the system just described to efficiently use a compute element, the handling includes (i) propagation 600-req2-prop of the new request 600-req2 via the switching network 650, and (ii) executing 600-req2-exe the new request 600-req2 by the second server 618b.

In one possible configuration of the alternative embodiment just described, (i) the propagation 600-req2-prop takes between 150 to 2,000 nanoseconds, (ii) the executing 600-req2-exe of the new request 600-req2 takes between 200 and 2,500 nanoseconds, and (iii) the processing 600-c1-pro-v1 takes between 500 and 5,000 nanoseconds. In this way, the processing 600-c1-pro-v1 may extends over a period that is similar in magnitude to the handling, thereby making said simultaneity possibly more critical for achieving the efficient usage. In one possible embodiment of the possible configuration described herein, the distributed key-value-store 621 is a shared memory pool 512 that includes a plurality of memory modules 540-m1, 540-m2, 540-mk, wherein each of the plurality of servers 618a, 618b, 618c is associated with at least one of said plurality of memory modules 540-m1, 540-m2, 540-mk, and wherein the plurality of values 618-v1, 618-v2, 618-v3 are stored in the plurality of memory modules 540-m1, 540-m2, 540-mk.

In possible variation of the possible configuration described above, the plurality of memory modules 540-m1, 540-m2, 540-mk are based on random-access-memory, thereby facilitating the executing 600-req2-exe of the new request 600-req2 taking between 200 and 2,500 nanoseconds. This possible variation may be implemented whether or not the distributed key-value-store 621 is a shared memory pool 512.

In a second alternative embodiment to the system described above to efficiently use a compute element to process a plurality of values distributed over a plurality of servers using a plurality of keys, the system 600 is further configured to dedicate the first compute element 600-c1 for: (i) sending any one of the requests 600-req2, 600-req3 to receive respectively any one of the plurality of values 618-v2, 618-v3, (ii) processing 600-c1-pro-v1, 600-c1-pro-v2 any one of the plurality of values 618-v1, 618-v2, and (iii) deriving 600-c1-der-s2, 600-c1-der-s3 identities of any one of the plurality of servers 618b, 618c using respectively any one of the plurality of keys 618-k 2, 618-k3. In this way, there are minimized at least: (i) a second period 698 between the receiving 618-get1 and the processing 600-c1-pro-v1, and (ii) a third period 697 between the processing 600-c1-pro-v1 and the deriving 600-c1-der-s3. This minimization of (i) and (ii) facilitates the efficient usage of a compute element 600-c1.

In a first variation to the second alternative embodiment described above, The system further includes a second compute element 600-c2, together with the first compute element 600-c1 belonging to a first central-processing-unit (CPU) 600-CPU, and an operating-system (OS) 600-OS configured to control and manage the first 600-c1 and second 600-c2 compute element, wherein the operating-system 600-OS is further configured to manage a plurality of processes comprising: (i) said sending 600-req2, receiving 618-get1, processing 600-c1-pro-v1, and deriving 600-c1-der-s3, and (ii) other unrelated processes 600-pr. Also, the operating-system 600-OS is further configured to achieve the dedication by blocking the other unrelated processes 600-pr from running on said first compute element 600-c1, and by causing the other unrelated processes 600-pr to run on the second compute element 600-c2.

In a second variation to the second alternative embodiment described above, as a result of the dedication, the simultaneity, and the first cache memory 601, the derivation 600-c1-der-s3 and the processing 600-c1-pro-v1 together account for at least 50 (fifty) per-cent of time spent by the first compute element 600-c1 over a period 696 extending from a beginning of said sending 600-req2 to an end of said deriving 600-c1-der-s3. This utilization rate thereby achieves a high computational duty-cycle, which thereby allows the first compute element 600-c1 to process the plurality of keys 618-k1, 618-k 2, 618-k3 and values 618-v1, 618-v2, 618-v3 at an increased rate.

In a first configuration to the second variation to the second alternative embodiment, described above, further the period 696 extending from the beginning of the sending to the end of the deriving, is less than 10 (ten) microseconds.

In a second configuration to the second variation to the second alternative embodiment, described above, further the increased rate facilitates a sustained transaction rate of at least 100,000 (one hundred thousand) of the plurality of keys and values per second.

In a third alternative embodiment to the system described above to efficiently use a compute element to process a plurality of values distributed over a plurality of servers using a plurality of keys, further the derivation is done by applying on the third key 618-k3 a technique selected from a group consisting of: (i) hashing, (ii) table-based mapping, and (iii) any mapping technique either analytical or using look-up tables.

In a fourth alternative embodiment to the system described above to efficiently use a compute element to process a plurality of values distributed over a plurality of servers using a plurality of keys, further the first compute element 600-c1 and the first cache memory 601 belong to a first central-processing-unit (CPU) 600-CPU, such that the first compute element 600-c1 has a high bandwidth access to the first cache memory 601, thereby allowing the processing 600-c1-pro-v1 to conclude in less than 5 (five) microseconds.

In one possible configuration of the fourth alternative embodiment just described, the high bandwidth is more than 100 (one hundred) Giga-bits-per-second.

In a fifth alternative embodiment to the system described above to efficiently use a compute element to process a plurality of values distributed over a plurality of servers using a plurality of keys, the system further comprises a direct-memory-access (DMA) controller 677 configured to receive 618-get1 the first value 618-v1 via the switching network 650 directly into the first cache memory 601.

In one a variation of the fifth alternative embodiment just described, further the direct-memory-access controller 677 frees the first compute element 600-c1 to perform the identification 600-c1-der-s2 of the second server 618b simultaneously with the receiving 618-get1 of the first value 618-v1. In this way, the efficient usage is facilitated.

In a sixth alternative embodiment to the system described above to efficiently use a compute element to process a plurality of values distributed over a plurality of servers using a plurality of keys, the system 600 is further configured to send to the third 618c of the plurality of servers identified, via said switching network 650, the future request 600-req3 to receive the third value 618-v3, and to receive 618-get2, via the switching network 650, from the second server 618b, into the first cache memory 601, the second value 618-v2. The system is also configured, after completion of the send and receive operations just described, to process 600-c1-pro-v2 the second value 618-v2 received, simultaneously with the third server 618c and switching network 650 handling of the future request 600-req3.

In a seventh alternative embodiment to the system described above to efficiently use a compute element to process a plurality of values distributed over a plurality of servers using a plurality of keys, system 600 further comprises a network-interface-card (NIC) 667 configured to associate the first compute element 600-*c*1 and the first cache memory 601 to the said switching network 650. Also, the network-interface-card 667 is further configured to block or delay any communication currently preventing the network-interface-card 667 from immediately performing the sending 600-req2, thereby preventing the first compute element 600-*c*1 from waiting before performing said sending, thereby facilitating the efficient usage of the first compute element 600-*c*1.

In an eighth alternative embodiment to the system described above to efficiently use a compute element to process a plurality of values distributed over a plurality of servers using a plurality of keys, further the deriving 600-*c*1-der-s3 is done simultaneously with the second server 618*b* and the switching network 650 handling of the new request 600-req2.

In a ninth alternative embodiment to the system described above to efficiently use a compute element to process a plurality of values distributed over a plurality of servers using a plurality of keys, the system 600 further comprises a direct-memory-access (DMA) controller 677 configured to receive 618-get2 the second value 618-*v*2 via the switching network 650 directly into the first cache memory 601, wherein the direct-memory-access controller 677 frees the first compute element 600-*c*1 to perform the processing 600-*c*1-pro-v1 simultaneously with the receiving 618-get2 of the second value 618-*v*2. The operation described in this ninth alternative embodiment thereby facilitates efficient usage of the first compute element 600-*c*1.

In the various system embodiment described above, the processing 600-*c*1-pro-v1 is depicted as occurring before the deriving 600-*c*1-der-s3. However, this particular order of events is not required. In various alternative embodiments, the deriving 600-*c*1-der-s3 occurs before the processing 600-*c*1-pro-v1. Also, in different alternative embodiments, the deriving 600-*c*1-der-s3 occurs in parallel with the processing 600-*c*1-pro-v1.

Figure 12:
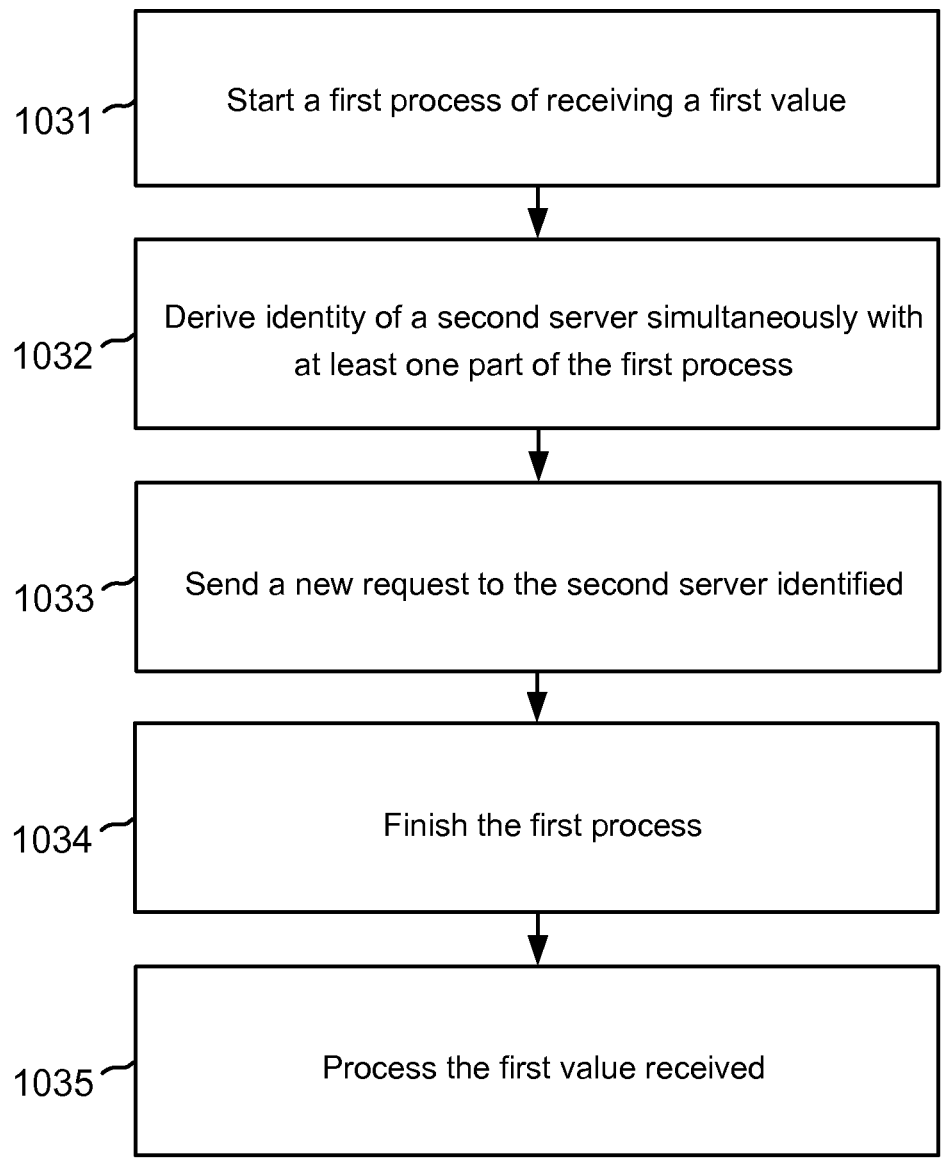
FIG. 12 illustrates one embodiment of a method for mixing and timing, relatively efficiently, at least two key-value transactions in conjunction with a distributed key-value-store (KVS)

FIG. 12 illustrates one embodiment of a method for mixing and timing, relatively efficiently, at least two key-value transactions in conjunction with a distributed key-value-store (KVS) 621. In step 1031: a direct-memory-access (DMA) controller 677, starts a first process of receiving 618-get1 via a switching network 650, from a first 618*a* of a plurality of servers 618*a*, 618*b*, 618*c* directly into a first cache memory 601 associated with a first compute element 600-*c*1, a first 618-*v*1 of a plurality of values 618-*v*1, 618-*v*2, 618-*v*3 previously requested and associated with a first 618-*k*1 of a plurality of keys 618-*k*1, 618-*k* 2, 618-*k*3. In step 1032: a first compute element 600-*c*1 derives 600-*c*1-der-s2 from a second 618-*k* 2 of the plurality of keys, simultaneously with at least one part of the first process, an identity of a second 618*b* of the plurality of servers into which to send a new request 600-req2 for a second 618-*v*2 of said plurality of values. In step 1033: the first compute element 600-*c*1 sends, via the switching network 650, to the second server 618*b* identified, the new request 600-req2. In step 1034: the direct-memory-access controller 677 finishes the first process of receiving 618-get1 the requested data element. In step 1035: the first compute element 600-*c*1 processes 600-*c*1-pro-v1 the first value 618-*v*1 received, simultaneously with the second server 618*b* and the switching network 650 handling the new request 600-req2.

In a first alternative embodiment to the method just described, further the first compute element 600-*c*1 derives 600-*c*1-der-s3 from a third of the plurality of keys 618-*k*3, during a first period 699 prior to receiving 618-get2 and processing 600-*c*1-pro-v2 the second value 618-*v*2, an identity of a third 618*c* of the plurality of servers into which to send a future request 600-req3 for a third 618-*v*3 of the plurality values.

Figure 13A:
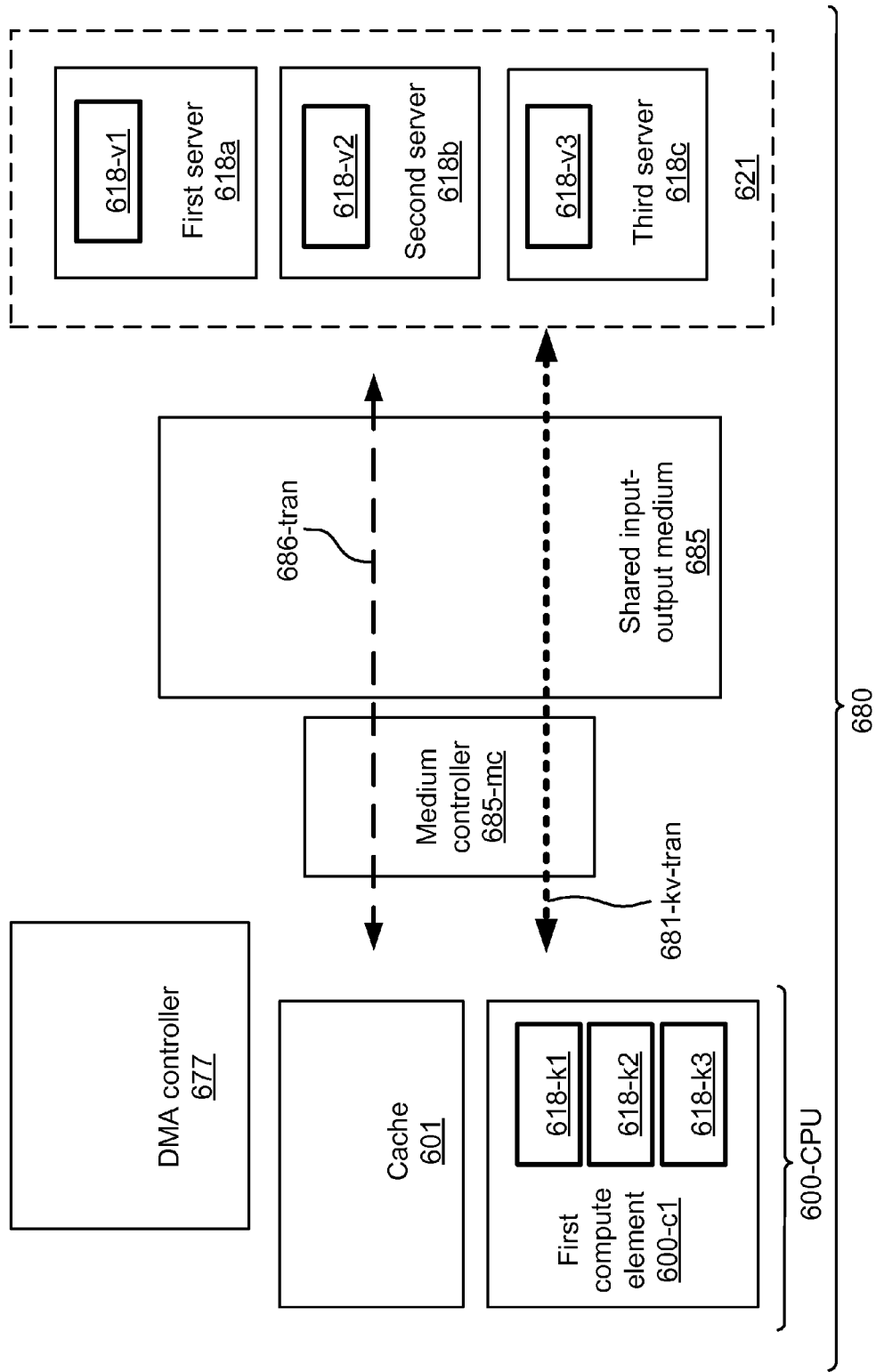
FIG. 13A illustrates one embodiment of a system configured to interleave high priority key-value transactions together with lower priority transactions over a shared input-output medium.

FIG. 13A illustrates one embodiment of a system 680 configured to interleave high priority key-value transactions 681-kv-tran together with lower priority transactions 686-tran over a shared input-output medium 685. The system 680 includes a plurality of values 618-*v*1, 618-*v*2, 618-*v*3, distributed over a plurality of servers 618*a*, 618*b*, 618*c*, using a plurality of keys 618-*k*1, 618-*k* 2, 618-*k*3. The system 680 includes a cache memory 601, and a first compute element 600-*c*1 associated with and in communicative contact with the cache memory 601. The first compute element 600-*c*1 includes two or more keys, 618-*k*1, 618-*k* 2, 618-*k*3, where each key is associated with a respective data value, 618-*k*1 with 618-*v*1, 618-*k* 2 with 618-*v*2, and 618-*k*3 with 618-*v*3. The data values are stored in multiple servers. In FIG. 13A, 618-*v*1 is stored in first server 618*a*, 618-*v*2 is stored in second server 618*b*, and 618-*v*3 is stored in third server 618*c*. It will be understood, however, that two or more specific data values may be served in a single server, although the entire system 680 includes two or more servers. The servers as a whole are a server stack that is referenced herein as a distributed key-value-store (KVS) 621.

The first compute element 600-*c*1 and the distributed KVS 621 are in communicative contact through a shared input-output medium 685 and a medium controller 685-mc, which together handle requests for data values from the first compute element 600-*c*1 to the KVS 621, and which handle also data values sent from the KVS 621 to either the first compute element 600-*c*1 or to the cache memory 601. In some embodiments, the system 680 includes also a direct-memory-access (DMA) controller 677, which receives data values from the shared input-output medium 685 and medium controller 685-mc, and which may pass such data values directly to the cache memory 601 rather than to the first compute element 600-*c*1, thereby at least temporarily freeing the first compute element 600-*c*1.

In some embodiments illustrated in FIG. 13A, the KVS 621 is a shared memory pool 512 from FIG. 10B, which includes multiple memory modules 540-*m*1, 540-*m*2, 540-*mk*, and wherein one of the memory modules is configured to store the first value 618-*v*1. In some embodiments, the multiple memory modules 540-*m*1, 540-*m*2, 540-*mk*, are based on random-access-memory, thereby facilitating fast extraction of at least the desired value 618-*v*1. In some embodiments, "fast extraction" can be executed in less than 3 (three) microseconds. In some embodiments, the blocking of lower priority transactions 686-tran enables sending of the new request 600-req2 from FIGS. 11B and 11C in less than 3 (three) microseconds, thereby matching timing of the extraction, and consequently thereby facilitating overall fast key-value transactions 618-kv-tran, each such fast transaction taking less than 10 (ten) microseconds.

Figures 13B, 13C:
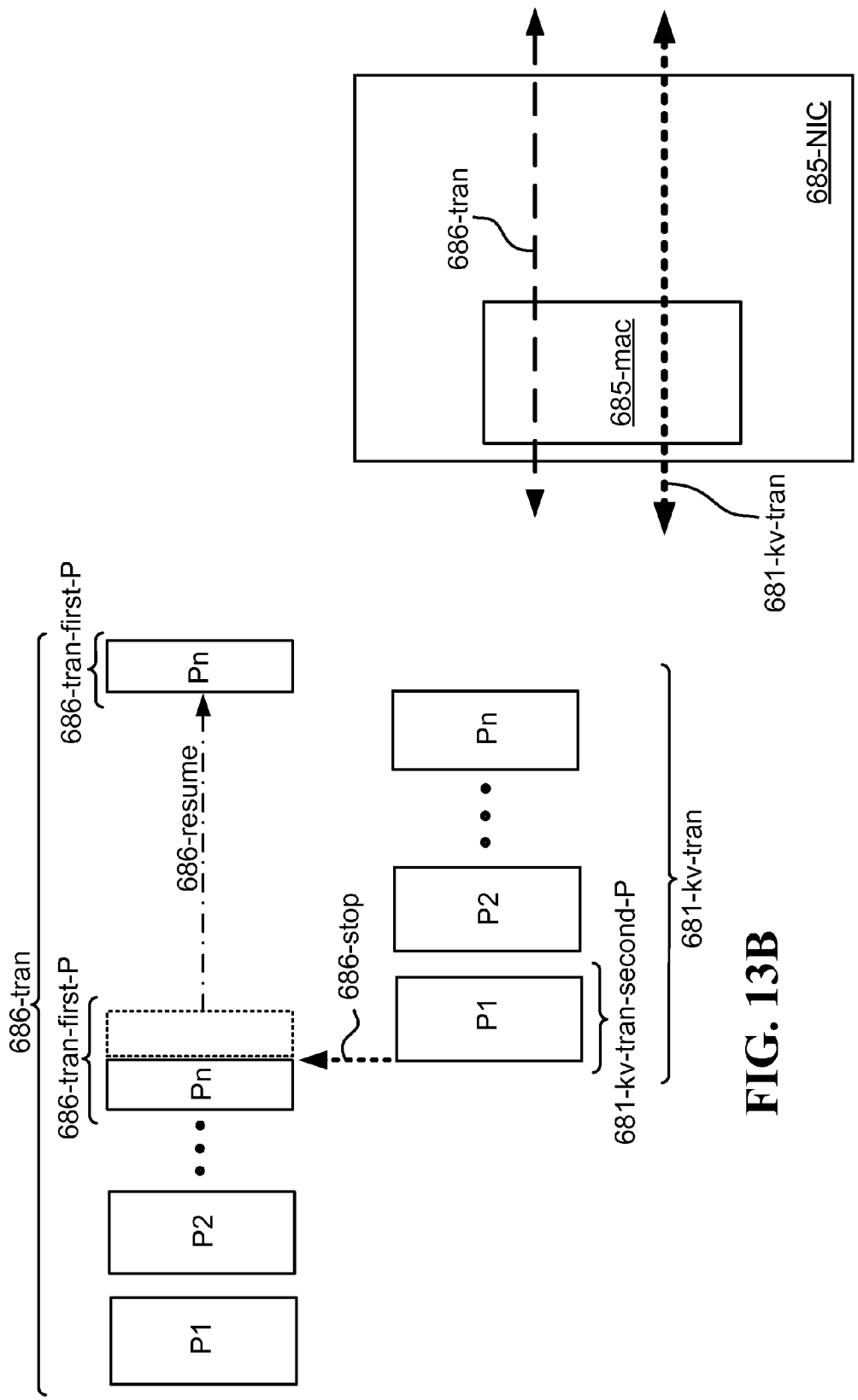
FIG. 13B illustrates one embodiment of a system configured to interleave high priority key-value transactions together with lower priority transactions over a shared input-output medium, in which both types of transactions are packet-based transactions.
FIG. 13C illustrates one embodiment of part of a system configured to interleave high priority key-value transactions together with lower priority transactions over a shared input-output medium, comprising a network-interface-card (NIC) including a medium-access-controller (MAC)

FIG. 13B illustrates one embodiment of a system configured to interleave high priority key-value transactions 681-kv-tran together with lower priority transactions 686-tran over a shared input-output medium, in which both types of transactions are packet-based transactions and the system is configured to stop packets of the lower priority transactions 686-tran in order to commence communication of packets of the high priority transactions 681-kv-tran. In FIG. 13B, the first transaction processed by the system is one of a plurality of low priority transactions 686-tran, including packets P1, P2, and Pn at the top of FIG. 13B, and the second transaction processed by the system is one of a plurality of high priority key-value transactions 681-kv-tran, including packets P1, P2, and Pn at the bottom of FIG. 13B. In the particular embodiment illustrated in FIG. 13B, all of the transactions are packet-based transactions, and they are performed via a medium controller in the system 685-mc from FIG. 13A in conjunction with a shared input-output medium 685 from FIG. 13A. The medium controller 685-mc is configured to stop 686-stop the on-going communication of a first packet 686-tran-first-P belonging to one of the lower priority transactions 686-tran, and immediately thereafter to commence communication of a second packet 681-kv-second-P belonging to one of the high priority key-value transactions 681-kv-tran. After the second packet 681-kv-tran-second-P has been communicated, the medium controller 685-mc is configured to resume 686-resume communication of the first packet 686-tran-first-P.

FIG. 13C illustrates one embodiment of part of a system configured to interleave high priority key-value transactions 681-kv-tran together with lower priority transactions 686-tran over a shared input-output medium, comprising a network-interface-card (NIC) 685-NIC including a medium-access-controller (MAC) 685-mac. In FIG. 13C, a shared input-output medium 685 from FIG. 13A is a network-interface-card 685-NIC together with a medium-access-controller (MAC) 685-mac that is located on the network-interface-card (NIC) 685-NIC. The elements shown help communicate both high priority key-value transactions 681-kv-tran and lower priority transactions 686-tran, either of which may be communicated either (i) from a KVS 621 to a cache 601 or first compute element 600-c1, or (ii) from a cache 601 or first compute element 600-c1 to a KVS 621. The lower priority transactions 686-tran are not necessarily related to KVS 621, and may be, as an example, a general network communication unrelated with keys or values.

One embodiment is a system 680 configured to interleave high priority key-value transactions 681-kv-tran together with lower priority transactions 686-tran over a shared input-output medium 685, including a shared input-output medium 685 associated with a medium controller 685-mc, a central-processing-unit (CPU) 600-CPU including a first compute element 600-c1 and a first cache memory 601, and a key-value-store (KVS) 621 communicatively connected with the central-processing-unit 600-CPU via the shared input-output medium 685. Further, the central-processing-unit 600-CPU is configured to initiate high priority key-value transactions 681-kv-tran in conjunction with the key-value-store (KVS) 621 said shared input-output medium 685, and the medium controller 685-mc is configured to block lower priority transactions 686-tran via the shared input-output medium 685 during at least parts of the high priority key-value transactions 681-kv-tran, thereby achieving the interleaving without delaying the high priority key-value transactions 681-kv-tran.

In one alternative to the system 680 to interleave transactions, further the key-value-store (KVS) 621 is configured to store a first value 618-v1 associated with a first key 618-k1. Further, the high priority key-value transactions 681-kv-tran include at least a new request 600-req2 from FIGS. 11B and 11C for the first value 618-v1, wherein the new request 600-req2 is sent from the first compute element 600-c1 to the key-value-store 621 via the shared input-output medium 685, and the new request 600-req2 conveys the first key 618-k1 to the key-value-store 621.

In some embodiments, the key-value-store (KVS) 621 is a distributed key-value-store, including a plurality of servers 618a, 618b, 618c. In some forms of these embodiments, the distributed key-value-store is a shared memory pool 512 including a plurality of memory modules 540-m1, 540-m2, 540-mk, wherein one of the plurality of memory modules is configured to store the first value 618-v1. In some forms of these embodiments, the plurality of memory modules 540-m1, 540-m2, 540-mk are based on random-access-memory, thereby facilitating fast extraction of at least the first value 618-v1. In some forms of these embodiments, "fast extraction" is done in less than 3 (three) microseconds. In some forms of these embodiments, the blocking of lower priority transactions 686-tran enables sending of the new request in less than 3 (three) microseconds, thereby matching timing of the extraction, thereby consequently facilitating overall fast key-value transactions, each transaction taking less than 10 (ten) microsecond.

In a second alternative to the system 680 to interleave transactions, further the high priority key-value transactions 681-kv-tran are latency-critical key-value transactions, and the medium controller 685-mc is configured to interrupt any of the lower priority transactions 686-tran and immediately commence at least one of the high priority key-value transactions 681-kv-tran, thereby facilitating said latency criticality.

In one possible configuration of the second alternative embodiment just described, further both the high priority key-value transaction 681-kv-tran and the lower priority transactions 686-tran are packet-based transactions performed via the medium controller 685-mc in conjunction with the shared input-output medium 685. Further, the medium controller 685-mc is configured to stop 686-stop on-going communication of a first packet 686-tran-first-P belonging to the lower priority transactions 686-tran via the shared input-output medium 685, and immediately to commence communication of a second packet 681-kv-tran-second-P belonging to the high priority key-value transaction 681-kv-tran via the shared input-output medium 685 instead, thereby achieving the communication interruption at the packet level.

In one possible variation of the configuration just described, the medium controller 685-mc is configured to resume 686-resume communication of the first packet 686-tran-first-P after the second packet 681-kv-tran-second-P has finished communicating, thereby facilitating packet fragmentation.

In a third alternative to the system 680 to interleave transactions, further the shared input-output medium is based on an interconnect element selected from a group consisting of: (i) peripheral-component-interconnect-express (PCIE) computer expansion bus 105-pcie from FIG. 3A, (ii) Ethernet 105-eth from FIG. 3B, and (iii) a network-interface-card (NIC) 685-NIC.

In some embodiments associated with the PCIE computer expansion bus 105-pcie from FIG. 3A, the medium controller 685-mc may be implemented as part of a root-complex 105-root from FIG. 3A associated with the PCIE computer expansion bus 105-pcie.

In some embodiments associated with the Ethernet 105-eth from FIG. 3B, the medium controller 685-mc may be implemented as part of a media-access-controller (MAC) 105-mac from FIG. 3B associated with the Ethernet 105-eth.

In some embodiments associated with the NIC 685-NIC, the medium controller 685-mc may be implemented as part of a media-access-controller (MAC) 685-mac associated with the NIC 685-NIC. In some forms of these embodiments, the NIC 685-NIC is in compliance with Ethernet.

In a fourth alternative to the system 680 to interleave transactions, further both the high priority key-value transactions 681-kv-tran and the lower priority transactions 686-tran are packet-based transactions performed via the medium controller 685-mc in conjunction with the shared input-output medium 685. Further, the medium controller 685-mc is configured to deny access to the shared input-output medium 685 from a first packet 686-tran-first-P belonging to the lower priority transactions 686-tran, and instead grant access to the shared input-output medium 685 to a second packet 681-kv-tran-second-P belonging to the high priority key-value transactions 681-kv-tran, thereby giving higher priority to the high priority key-value transactions 681-kv-tran over the lower priority transactions 686-tran.

In a fifth alternative to the system 680 to interleave transactions, further the key-value-store 621 is configured to store a first value 618-v1 associated with a first key 618-k1. Further, the high priority key-value transactions 681-kv-tran include at least sending of the first value 618-v1 from the key-value-store (KVS) 621 to the central-processing-unit 600-CPU via the shared input-output medium 685.

In one possible configuration of the fifth alternative just described, the system includes further a direct-memory-access (DMA) controller 677 configured to receive the first value 618-v1 via the shared input-output medium 685 directly into the first cache memory 601.

In a sixth alternative embodiment to the system 680 to interleave transactions, further the shared input-output medium 685 includes an electro-optical interface 107-a from FIG. 5A and an optical fiber 107-fiber-ab from FIG. 5A which are operative to transport the high priority key-value transactions 681-kv-tran and the lower priority transactions 686-tran.

Figure 14A:
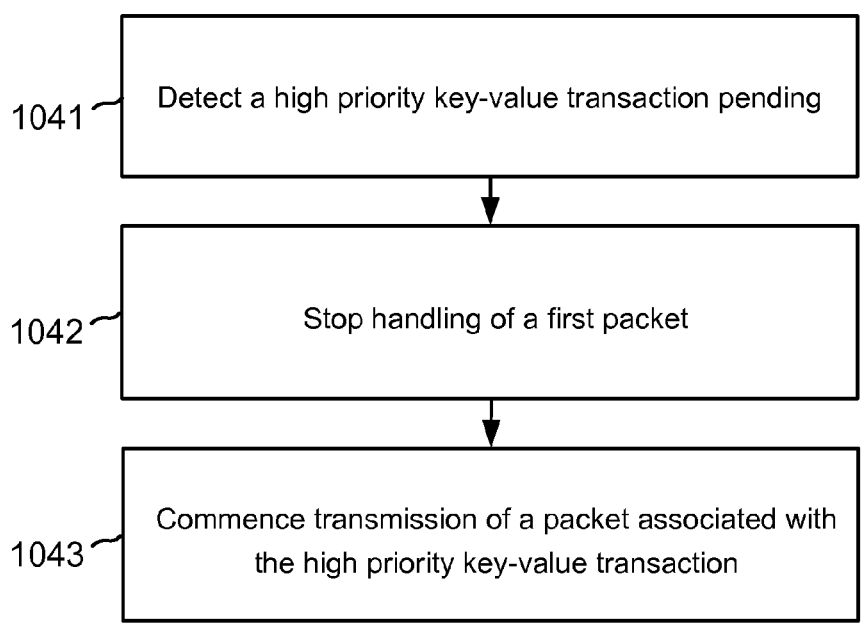
FIG. 14A illustrates one embodiment of a method for mixing high priority key-value transaction together with lower priority transactions over a shared input-output medium without adversely affecting performance.

FIG. 14A illustrates one embodiment of a method for mixing high priority key-value transactions 681-kv-tran over a shared input-output medium 685, together with lower priority transactions 686-tran over the same shared input-output medium 685, without adversely affecting system performance. In step 1041, a medium controller 685-mc associated with a shared input-output medium 685 detects that a second packet 681-kv-tran-second-P associated with high priority key-value transactions 681-kv-tran is pending; meaning, as an example, that the second packet 681-kv-tran-second-P has been recently placed in a transmission queue associated with the input-output medium 685.

In step 1042, as a result of the detection, the medium controller 685-mc stops handling of a first packet 686-tran-first-P associated with a lower priority transactions 686-tran via the shared input-output medium 685. In step 1043, the medium controller 685-mc commences transmission of the second packet 681-kv-tran-second-P via said shared input-output medium 685, thereby preventing the lower priority transactions 686-tran from delaying the high priority key-value transaction 681-kv-tran.

In a first alternative to the method just described for mixing high priority key-value transactions 681-kv-tran together with lower priority transactions 686-tran, further the prevention leads to a preservation of timing performance of the high priority key-value transactions 681-kv-tran, wherein such timing performance is selected from a group consisting of: (i) latency of the high priority key-value transactions 681-kv-tran, and (ii) bandwidth of the high priority key-value transactions 681-kv-tran.

In a second alternative to the method described for mixing high priority key-value transactions 681-kv-tran together with lower priority transactions 686-tran, further the prevention leads to a preservation of latency of the high priority key-value transactions 681-kv-tran, and as a result, such latency of the high priority key-value transactions 681-kv-tran is shorter than a time required to transmit a shortest packet belonging to said lower priority transactions 686-tran.

Figure 14B:
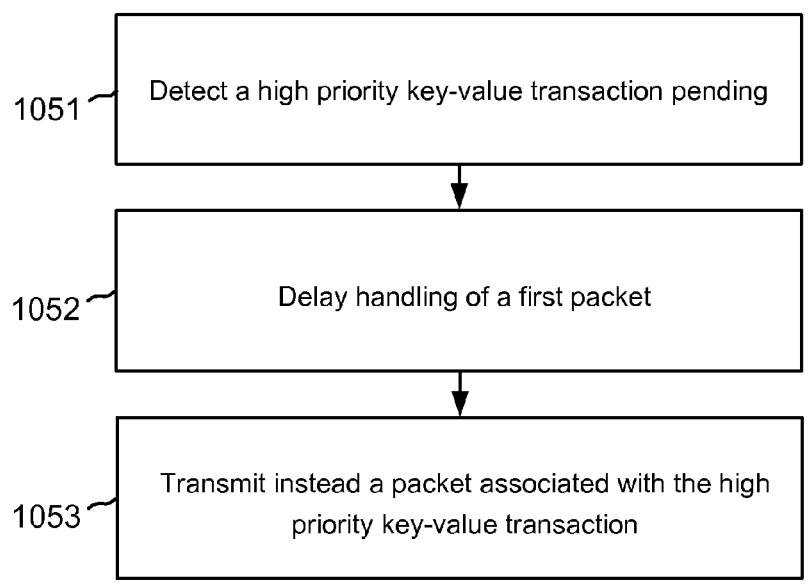
FIG. 14B illustrates one embodiment of a method for mixing high priority key-value transactions together with lower priority transactions over a shared input-output medium without adversely affecting performance.

FIG. 14B illustrates one embodiment of a method for mixing high priority key-value transactions 681-kv-tran over a shared input-output medium 685, together with lower priority transactions 686-tran over the same shared input-output medium 685, without adversely affecting system performance. In step 1051, a medium controller 685-mc associated with a shared input-output medium 685 detects that a second packet 681-kv-tran-second-P associated with high priority key-value transactions 681-kv-tran is pending. In step 1052, as a result of the detection, the medium controller 685-mc delays handling of a first packet 686-tran-first-P associated with a lower priority transactions 686-tran via the shared input-output medium 685. In step 1053, the medium controller 685-mc transmits the second packet 681-kv-tran-second-P via said shared input-output medium 685, thereby preventing the lower priority transactions 686-tran from delaying the high priority key-value transaction 681-kv-tran.

In a first alternative to the method just described for mixing high priority key-value transactions 681-kv-tran together with lower priority transactions 686-tran, further the prevention leads to a preservation of timing performance of the high priority key-value transactions 681-kv-tran, wherein such timing performance is selected from a group consisting of: (i) latency of the high priority key-value transactions 681-kv-tran, and (ii) bandwidth of the high priority key-value transactions 681-kv-tran.

In a second alternative to the method described for mixing high priority key-value transactions 681-kv-tran together with lower priority transactions 686-tran, further the prevention leads to a preservation of latency of the high priority key-value transactions 681-kv-tran, and as a result, such latency of the high priority key-value transactions 681-kv-tran is shorter than a time required to transmit a shortest packet belonging to lower priority transactions 686-tran.

Figure 14C:
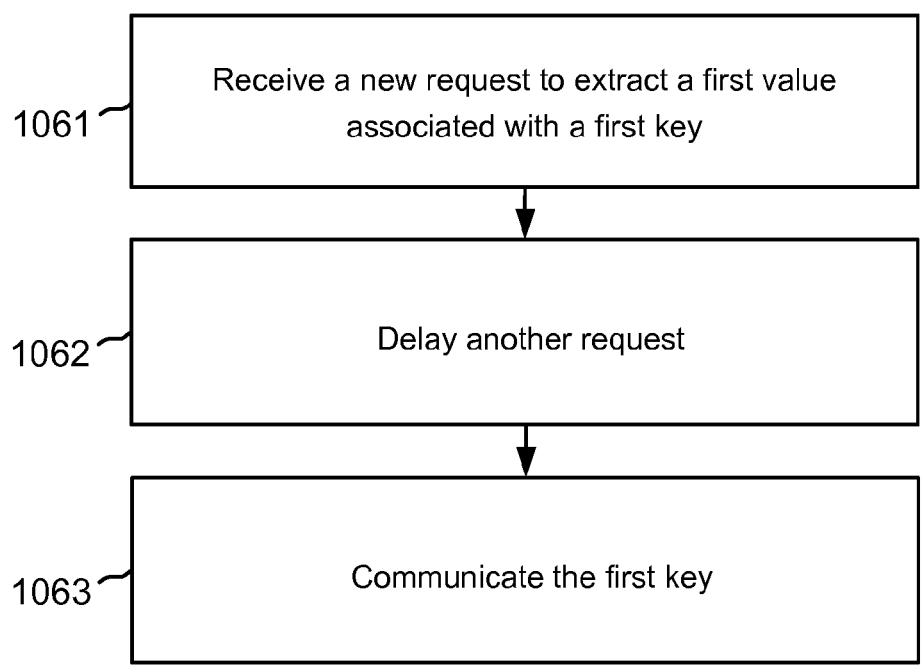
FIG. 14C illustrates one embodiment of a method for reducing latency associated with a key-value transaction involving a distributed data store interconnected by a network.

FIG. 14C illustrates one embodiment of a method for reducing latency associated with key-value transactions 686-dv-tran involving a distributed data store interconnected by a network. In step 1061, a first network-interface-card (NIC) 685-NIC receives, from a first compute element 600-c1, a new request 600-req2 from FIGS. 11B and 11C to extract with high priority a first value 618-v1 associated with a first key 618-k1. In step 1062, consequently the first network-interface-card 685-NIC delays a lower priority transaction 686-tran or other network-related activity that prevents or that might prevent, the first network-interface-card 685-NIC from immediately communicating the first key 618-k1 to a destination server 618a storing the first value 618-v1 and belonging to a key-value-store 621 comprising a plurality of servers 618a, 618b, 618c. In step 1063, as a result of such delaying, the first network-interface card 685-NIC communicates immediately the first key 618-k1 to the destination server 618a, thereby allowing the destination server 618a to start immediately processing of the first key 618-k1 as required for locating, within the destination server 618a, the first value 618-v1 in conjunction with said new request 600-req2. It is understood that the phrase "lower priority transaction 686-tran or other network-related activity" includes the start of any lower priority transaction 686-tran, a specific packet in the middle of a lower priority transaction 686-tran which is delayed to allow communication of a high priority transaction 681-kv-tran or of any packet associated with a high priority transaction 681-kv-tran, and any other network activity that is not associated with the high priority transaction 681-kv-tran and that could delay or otherwise impede the communication of a high priority transaction 681-kv-tran or any packet associated with a high priority transaction 681-kv-tran.

In one embodiment, said delaying comprises prioritizing the new request 600-req2 ahead of the lower priority transaction 686-tran or other network-related activity, such that lower priority transaction 686-tran or other network related activity starts only after the communicating of the first key 618-$k1$.

One embodiment is a system 680 (FIG. 13A) configured to facilitate low latency key-value transactions, including: a shared input-output medium 685 associated with a medium controller 685-mc; a central-processing-unit (CPU) 600-CPU; and a key-value-store 621 comprising a first data interface 523-1 (FIG. 10B) and a first memory module 540-$m1$ (FIG. 10B), said first data interface is configured to find a first value 618-$v1$ (FIG. 13A) in said first memory module and extract said first value from said first memory module using random access read cycles, and said key-value-store 621 is communicatively connected with said central-processing-unit 600-CPU via said shared input-output medium 685. In one embodiment, the central-processing-unit 600-CPU is configured to initiate a high priority key-value transaction 681-kv-tran (FIG. 13A) in conjunction with said key-value-store 621, by sending to said key-value-store, via said shared input-output medium 685, a new request 600-req2 (FIG. 11C) for said first value 618-$v1$, said new request comprising a first key 618-$k1$ associated with said first value and operative to facilitate said finding; and the medium controller 685-mc is configured to block lower priority transactions 686-tran via said shared input-output medium 685, thereby preventing said lower priority transactions from delaying said new request 600-req2, thereby allowing the system to minimize a time between said sending of the new request to said extraction of the first value 618-$v1$. In one embodiment, said prevention of delay and said random access read cycles together result in said minimization, such that said time between said sending of the new request 600-req2 to said extraction of the first value 618-$v1$ is kept below 5 (five) microseconds. In one embodiment, as a result from said minimization, said high priority key-value transaction 681-kv-tran results in the delivery of said first value 618-$v1$ to said central-processing-unit 600-CPU in less than 10 (ten) microseconds from said initiation.

Figure 15A:
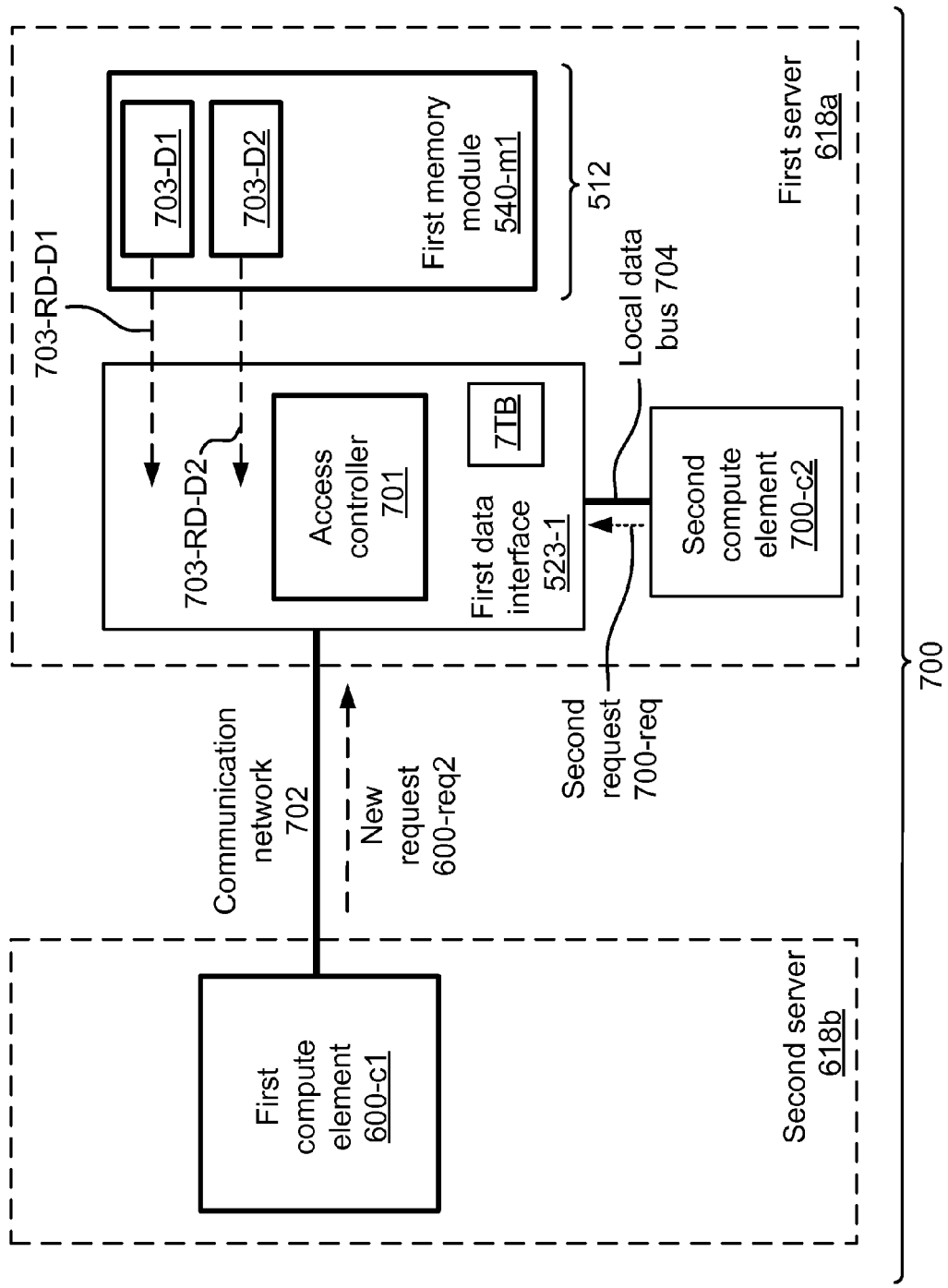
FIG. 15A illustrates one embodiment of a system operative to control random memory access in a shared memory pool.

FIG. 15A illustrates one embodiment of a system 700 configured to control random access memory in a shared memory pool 512. There is a first server 618$a$, which includes a first memory module 540-$m1$, a first data interface 523-1, and a second compute element 700-$c2$. The first memory module 540-$m1$ includes various data sets which may be requested by a first compute element 600-$c1$ located on a second server 618$b$. The first compute element 600-$c1$ may request access 600-req2 to a data set 703-D1 over a communication network 702 that is in communicative contact with the first server 618$a$, in which the request is sent to the first data interface 523-1. Simultaneously: (i) the first data interface 523-1 performs a first random access read cycle 703-RD-D1 in conjunction with the first memory module 540-$m1$ to retrieve the requested first data set 703-D1, and (ii) the access controller 701 determines if the first compute element 600-$c1$ is authorized to have access to the requested data set 703-D1, such that the determination does not delay the first random access read cycle 703-RD-D1. If the first compute element 600-$c1$ is authorized to access the first data set 703-D1, then the first server 618$b$ will provide the requested data set 703-D1 to the first compute element 600-$c1$. If the first compute element 600-$c1$ is not authorized to receive the first data set 703-D1, then the access controller 701 will prevent delivery of the first data set 703-D1.

In an alternative embodiment illustrated in FIG. 15A, a second compute element 700-$c2$ is co-located on the first server 618$a$ with the first data interface 523-1 and the first memory module 540-$m1$. The second compute element 700-$c2$ is in communicative contact with the first data interface 523-1 via a local data bus 704, which could be, for example, a PCIE bus or Infiniband. The second compute element 700-$c2$ requests 700-req a second data set 703-D2 from the first memory module 540-$m1$. The processing of the second request 700-req is similar to the processing of the request 600-req2 from the first compute element 600-$c1$. This second request 700-req is sent to the first data interface 523-1. Simultaneously: (i) the access controller 701 determines if the second compute element 700-$c2$ is authorized to access the second data set 703-D2, while (ii) the first data interface 523-1 in conjunction with the first memory module 540-$m1$ perform a second random access read cycle 703-RD-D2 resulting in the retrieval of the second data set 703-D2. If the access controller 701 determines that the second compute element 700-$c2$ is authorized to access the second data set 703-D2, then the second data set 703-D2 is sent to the second compute element 700-$c2$ over the local data bus 704. If the second compute element 700-$c2$ is not authorized to access the second data set 703-D2, then the access controller 701 prevents delivery of the second data set 703-D2 to the second compute element 700-$c2$.

In an alternative embodiment illustrated in FIG. 15A, a system is configured to allow or not allow a compute element to write a data set into the shared memory pool. In one embodiment, a first compute element 600-$c1$ requests to write a third data set into a third address located within the first memory module 540-$m1$. This third request is sent from the first compute element 600-$c1$ over the communication network 702 to the first data interface 523-1, and the third data set is then temporarily stored in buffer 7TB. After the first compute element 600-$c1$ sends this third request, the first compute element 600-$c1$ can continue doing other work without waiting for an immediate response to the third request. If the access controller 701 determines that the first compute element 600-$c1$ is authorized to write the third data set into the third address, then the first data interface 523-1 may copy the third data set into the third address within the first memory module 540-$m1$. If the first compute element is not authorized to write into the third address, then the access controller 701 will prevent the copying of the third data set into the third address within the first memory module 540-$m1$.

In an alternative to the alternative embodiment just described, the requesting compute element is not the first compute element 600-$c1$ but rather the second compute element 700-$c2$, in which case the third request is conveyed by the local data bus 704, and the rest of the process is essentially as described above, all with the second compute element 700-$c2$ rather than the first compute element 600-$c1$.

In the various embodiments illustrated in FIG. 15A, different permutations are possible. For example, if a particular compute element, be it the first 600-c1 or the second 700-c2 or another compute element, makes multiple requests, all of which are rejected by the access controller 701 due to lack of authorization, that compute element may be barred from accessing a particular memory module, or barred even from accessing any data set in the system.

Figure 15B:
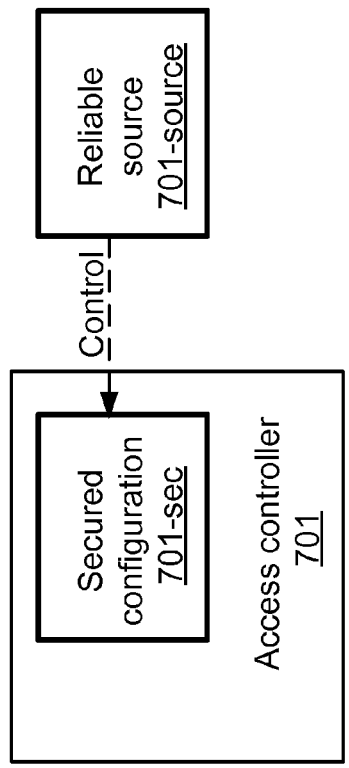
FIG. 15B illustrates one embodiment of a sub-system with an access controller that includes a secured configuration which may be updated by a reliable source.

FIG. 15B illustrates one embodiment of a sub-system with an access controller 701 that includes a secured configuration 701-sec which may be updated by a reliable source 701-source. This is a sub-system of the entire system 700. Access controller 701 is implemented as a hardware element having a secured configuration function 701-sec operative to set the access controller into a state in which a particular compute element (600-c1, or 700-c2, or another) is authorized to access some data set located in first memory module 540-m1, but a different compute element (600-c1, or 700-c2, or another) is not authorized to access the same data set. The rules of authorization are located within a secured configuration 701-sec which is part of the access controller 701. These rules are created and controlled by a reliable source 701-source that is not related to any of the particular compute elements. The lack of relationship to the compute elements means that the compute elements cannot create, delete, or alter any access rule or state of access, thereby assuring that no compute element can gain access to a data set to which it is not authorized. FIG. 15B shows a particular embodiment in which the reliable source 701-source is located apart from the access controller, and thereby controls the secured configuration 701-sec remotely. In alternative embodiments, the reliable source 701-source may be located within the access controller 701, but in all cases the reliable source 701-source lacks a relationship to the compute elements.

The communicative connection between the reliable source 701-source and the secured configuration 701-sec is any kind of communication link, while encryption and/or authentication techniques are employed in order to facilitate said secure configuration.

Figure 15C:
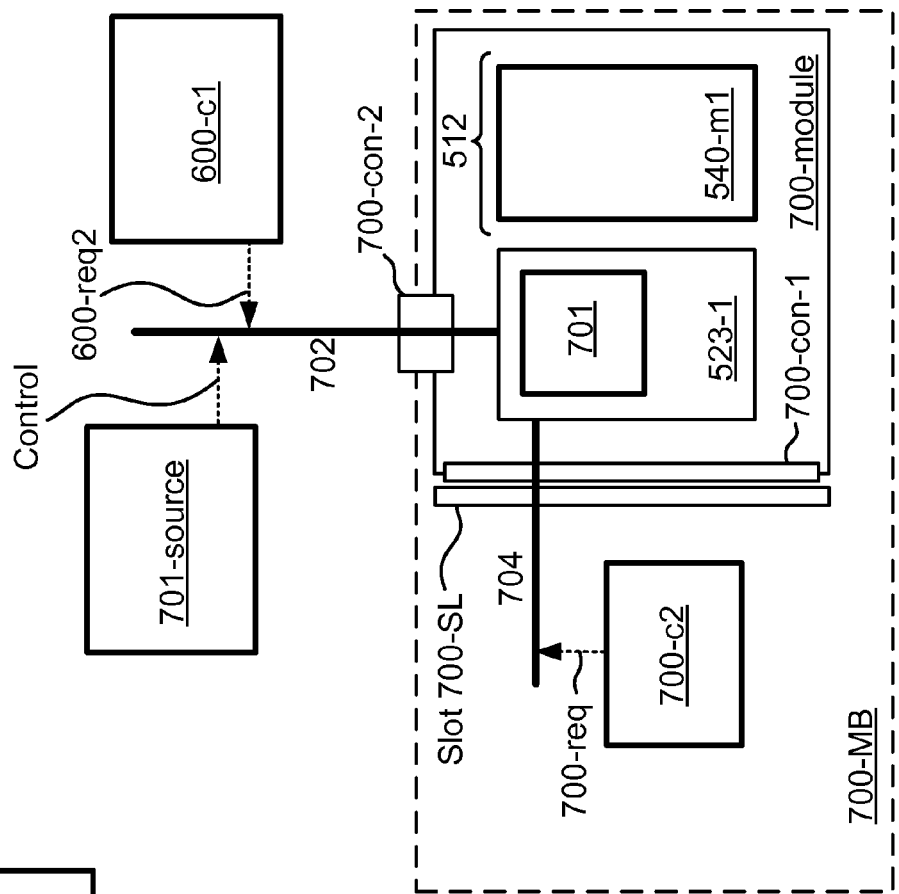
FIG. 15C illustrates one alternative embodiment of a system operative to control random memory access in a shared memory pool.

FIG. 15C illustrates one alternative embodiment of a system operative to control random memory access in a shared memory pool. Many of the elements described with respect to FIGS. 15A and 15B. appear here also, but in a slightly different configuration. There is a motherboard 700-MB which includes the second compute element 700-c2, the first data interface 523-1, and the shared memory pool 512, but these structural elements do not all reside on a single module within the motherboard 700-MB. The first memory module 540-m1, and the first data interface 523-1, including the access controller 701, are co-located on one module 700-module which is placed on the motherboard 700-MB. The second compute element 700-c2, which still makes requests 700-req over the local data bus 704, is not co-located on module 700-module, but rather is in contact with module 700-module through a first connection 700-con-1 which is connected to a first slot 700-SL in the motherboard. In FIG. 15C, the first compute element 600-c1 still makes requests 600-req2 over a communication network 702 that is connected to the motherboard 700-MB through a second connection 700-con-2, which might be, for example, and Ethernet connector. In the particular embodiment illustrated in FIG. 15C, there is a reliable source 701-source that controls authorizations of compute elements to access data sets, such reliable source 701-source is located outside the motherboard 700-MB, and the particular connection between the reliable source 701-source and the motherboard 700-MB is the communication network 702 which is shared with the first compute element 600-c1. This is only one possible embodiment, and in other embodiments, the reliable source 701-source does not share the communication network 702 with the first compute element 600-c1, but rather has its own communication connection with the motherboard 700-MB. In some embodiments, the length of the local data bus 704 is on the order of a few centimeters, whereas the length of the communication network 702 is on the order of a few meters to tens of meters.

One embodiment is a system 700 operative to control random memory access in a shared memory pool, including a first data interface 523-1 associated with a first memory module 540-m1 belonging to a shared memory pool 512, an access controller 701 associated with the first data interface 523-1 and with the first memory module 540-m1, and a first compute element 600-c1 connected with the first data interface 523-1 via a communication network 702, whereas the first memory module 540-m1 is an external memory element relative to the first compute element 600-c1. That is to say, there is not a direct connection between the first compute element 600-c1 and the first memory module 540-m1 (e.g. the two are placed on different servers). Further, the first data interface 523-1 is configured to receive, via the communication network 702, a new request 600-req2 from the first compute element 600-c1 to access a first set of data 703-D1 currently stored in the first memory module 540-m1. Further, the first data interface 523-1 is further configured to retrieve the first set of data 703-D1, as a response to the new request 600-req2, by performing at least a first random access read cycle 703-RD-D1 in conjunction with the first memory module 540-m1. Further, the access controller 701 is configured to prevent delivery of said first set of data 703-D1 to said first compute element 600-c1 when determining that said first compute element is not authorized to access the first set of data, but such that the retrieval is allowed to start anyway, thereby preventing the determination from delaying the retrieval when the first compute element is authorized to access the first set of data.

In one embodiment, said retrieval is relatively a low latency process due to the read cycle 703-RD-D1 being a random access read cycle that does not require sequential access. In one embodiment, the retrieval, which is a relatively low latency process, comprises the random access read cycle 703-RD-D1, and the retrieval is therefore executed entirely over a period of between 10 nanoseconds and 1000 nanoseconds, thereby making said retrieval highly sensitive to even relatively short delays of between 10 nanoseconds and 1000 nanoseconds associated with said determination, thereby requiring said retrieval to start regardless of said determination process.

In one alternative embodiment to the system 700 operative to control random memory access in a shared memory pool 512, the system includes further a second compute element 700-c2 associated with the first memory module 540-m1, whereas the first memory module is a local memory element relative to the second compute element. The system 700 includes further a local data bus 704 operative to communicatively connect the second compute element 700-c2 with the first data interface 523-1. Further, the first data interface 523-1 is configured to receive, via the local data bus 704, a second request 700-req from the second compute element 700-c2 to access a second set of data 703-D2 currently stored in the first memory module 540-m1. Further, the first data interface 523-1 is configured to retrieve the second set of data 703-D2, as a response to said second request 700-req, by performing at least a second random access read cycle 703-RD-D2 in conjunction with the first memory module 540-m1. Further, the access controller 701 is configured to prevent delivery of the second set of data 703-D2 to the second compute element 700-c2 after determining that the second compute element in not authorized to access the second set of data.

In one possible configuration of the alternative embodiment described above, further the access controller 701 is implemented as a hardware element having a secured configuration function 701-sec operative to set the access controller into a state in which the second compute element 700-c2 is not authorized to access the second data set 703-D2. Further, the secured configuration function 701-sec is controllable only by a reliable source 701-source that is not related to the second compute element 700-c2, thereby preventing the second compute element 700-c2 from altering the state, thereby assuring that the second compute element does not gain access to the second data set 703-D2.

In a second possible configuration of the alternative embodiment described above, further the second compute element 700-c2, the first data interface 523-1, the access controller 701, and the first memory module 540-m1 are placed inside a first server 618a. Further, the first compute element 600-c1 is placed inside a second server 618b, which is communicatively connected with the first server 618a via the communication network 702.

In one variation of the second possible configuration described above, further the first data interface 523-1, the access controller 701, and the first memory module 540-m1 are packed as a first module 700-module inside the first server 618a In one option of the variation described above, further the second compute element 700-c2 is placed on a first motherboard 700-MB. Further, the first module 700-module has a form factor of a card, and is connected to the first motherboard 700-MB via a first slot 700-SL in the first motherboard.

In a second alternative embodiment to the system 700 operative to control random memory access in a shared memory pool 512, further the retrieval is performed prior to the prevention, such that the retrieval is performed simultaneously with the determination, thereby avoiding delays in the retrieval. Further, the prevention is achieved by blocking the first set of data 703-D1 retrieved from reaching the first compute element 600-c1.

In a third alternative embodiment to the system 700 operative to control random memory access in a shared memory pool 512, further the prevention is achieved by interfering with the retrieval after the determination, thereby causing the retrieval to fail.

In a fourth alternative embodiment to the system 700 operative to control random memory access in a shared memory pool 512, further the shared memory pool is a key-value store, the first data set 703-D1 is a first value 618-v1 (FIG. 13A) associated with a first key 618-k1, the first key 618-k1 is conveyed by said new request 600-req2, and the retrieval comprises finding the first value 618-v1 in the first memory module 540-m1 using the first key 618-k1 conveyed, prior to the performing of the first random access read cycle 703-RD-D1.

In one possible configuration of the fourth alternative embodiment described above, further the authorization is managed by a reliable source 701-source at the key-value store level, such that the first compute element 600-c1 is authorized to access a first plurality of values associated respectively with a first plurality of keys, and such that the first compute element is not authorized to access a second plurality of values associated respectively with a second plurality of keys, wherein the first value 618-v1 belongs to said second plurality of values.

In a fifth alternative embodiment to the system 700 operative to control random memory access in a shared memory pool 512, further the first memory module 540-m1 is based on a random-access-memory (RAM), the first data set 703-D1 is located in a first address associated with the random-access-memory, and the first address is conveyed by the new request 600-req2.

In one possible configuration of the fifth alternative embodiment described above, further the authorization is managed by a reliable source 701-source at the random-access-memory address level, such that the first compute element 600-c1 is authorized to access a first range of addresses, and such that the first compute element is not authorized to access a second range of addresses, wherein the first data set 703-D1 has an address that is within the second range of addresses. In some embodiments, the random-access-memory (RAM) is DRAM. In some embodiments, random-access-memory (RAM), is Flash memory.

One embodiment is a system 700 operative to control random memory access in a shared memory pool 512, including a first data interface 523-1 associated with a first memory module 540-m1 belonging to a shared memory pool 512, an access controller 701 and a temporary write buffer 7TB associated with the first data interface 523-1 and the first memory module 540-m1, and a first compute element 600-c1 connected with the first data interface 523-1 via a communication network 702 whereas the first memory module 540-m1 is a memory element that is external relative to the first compute element. Further, the first data interface 523-1 is configured to receive, via the communication network 702, a third request from the first compute element 600-c1 to perform a random write cycle for a third set of data into a third address within the first memory module 540-m1. Further, the first data interface 523-1 is configured to temporarily store the third set of data and third address in the temporary write buffer 7TB, as a response to the third request, thereby allowing the first compute element 600-c1 to assume that the third set of data is now successfully stored in the first memory module 540-m1. Further, the first data interface 523-1 is configured to copy the third set of data from the temporary write buffer 7TB into the third address within the first memory module 540-m1, using at least one random access write cycle, but only after said access controller 701 determining that the first compute element 600-c1 is authorized to write into the third address.

One embodiment is a system 700-module operative to control data access in a shared memory pool 512, including a first memory module 540-m1 belonging to a shared memory pool 512, configured to store a first 703-D1 and a second 703-D2 set of data. The system includes also a first data interface 523-1 associated with the first memory module 540-m1, and having access to (i) a first connection 700-con-1 with a local data bus 704 of a second system 700-MB, and to (ii) a second connection 700-con-2 with a communication network 702. The system includes also an access controller 701 associated with the first data interface 523-1 and the first memory module 540-m1. Further, the first data interface 523-1 is configured to facilitate a first memory transaction associated with the first set of data 703-D1, via the communication network 702, between a first compute element 600-c1 and the first memory module 540-m1. Further, the first data interface 523-1 is configured to facilitate a second memory transaction associated with the second set of data 703-D2, via the local data bus 704, between a second compute element 700-c2 belonging to the second system 700-MB and the first memory module 540-m1. Further, the access controller 701 is configured to prevent the second compute element 700-c2 from performing a third memory transaction via the local data bus 704 in conjunction with the first set of data 703-D1, by causing the first data interface 523-1 to not facilitate the third memory transaction.

In an alternative embodiment to the system 700-module operative to control data access in a shared memory pool 512, further the second system 700-MB is a motherboard having a first slot 700-SL, and the first connection 700-con-1 is a connector operative to connect with said first slot.

In one possible configuration of the alternative embodiment just described, further the first local bus 704 is selected from a group of interconnects consisting of: (i) peripheral-component-interconnect-express (PCIE) computer expansion bus, (ii) Ethernet, and (iii) Infiniband.

In a second alternative embodiment to the system 700-module operative to control data access in a shared memory pool 512, further the communication network 702 is based on Ethernet, and the second connection 700-con-2 in an Ethernet connector. In one embodiment, system 700-module is a network interface card (NIC).

Figure 16A:
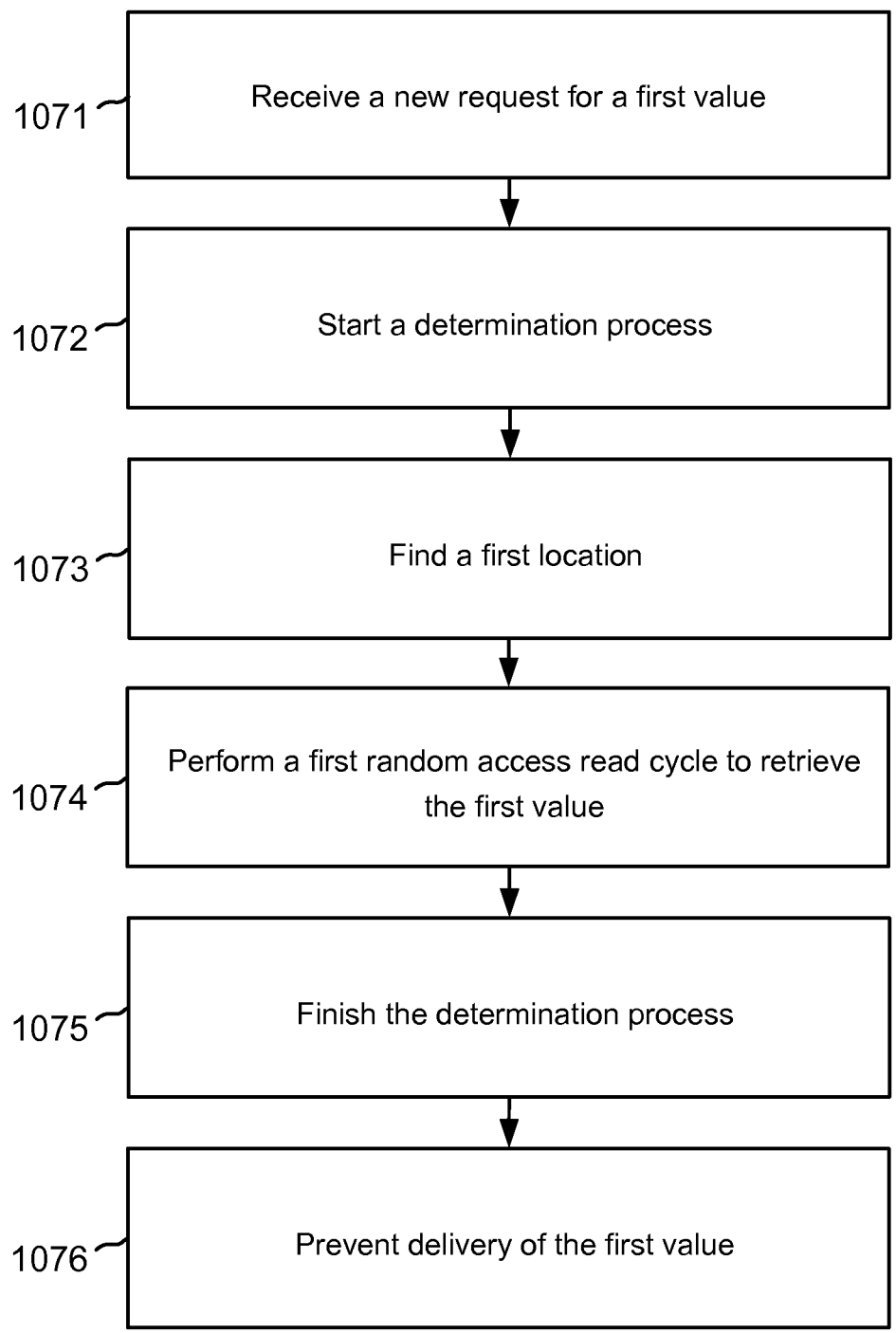
FIG. 16A illustrates one embodiment of a method for determining authorization to retrieve a value in a key-value store while preserving low latency associated with random-access retrieval.

FIG. 16A illustrates one embodiment of a method for determining authorization to retrieve a first value 681-v1 in a key-value store 621 while preserving low latency associated with random-access retrieval. In step 1071, a first data interface 523-1 receives a new request 600-req2 from a first compute element 600-c1 to access a first value 618-v1 (FIG. 13A) currently stored in a first memory module 540-m1 associated with the first data interface, wherein the first memory module belongs to a key-value store 621 (FIG. 13A), and the first value is associated with a first key 618-k1 that is conveyed by the new request 600-req2. In step 1072, a determination process is started in which an access controller 701 associated with the first data interface 523-1 determines whether or not the first compute element 600-c1 is authorized to access the first value. In step 1073, using the first key 618-k1, the first data interface 523-1 finds in the memory module 540-m1 a first location that stores the first value 618-v1, and this finding occurs simultaneously with the determination process described in step 1072. In step 1074, the first data interface 523-1 performs a first random access read cycle 703-RD-D1 in conjunction with the first memory module 540-m1, thereby retrieving the first value 618-v1, and this cycle is performed simultaneously with the determination process described in step 1072. In step 1075, the access controller 701 finishes the determination process. In step 1076, when the determination process results in a conclusion that the first compute element 600-c1 is not authorized to access the first value 618-v1, the access controller 701 prevents delivery of the first value 618-v1 retrieved for the first compute element 600-c1. In some embodiments, the finding in step 1073 and the performing in step 1074 are associated with random-access actions done in conjunction with the first memory module 540-m1, and the result is that the retrieval has a low latency, which means that the simultaneity of steps 1073 and 1074 with the determination process facilitates a preservation of such low latency.

In an alternative embodiment to the method just described for determining authorization to retrieve a first value 618-v1 in a key-value store 621 while preserving low latency associated with random-access retrieval, further when the determination process results in a conclusion that the first compute element 600-c1 is authorized to access said value 618-v1, the access controller 701 allows delivery of the retrieved value 618-v1 to the first compute element 600-c1.

Figure 16B:
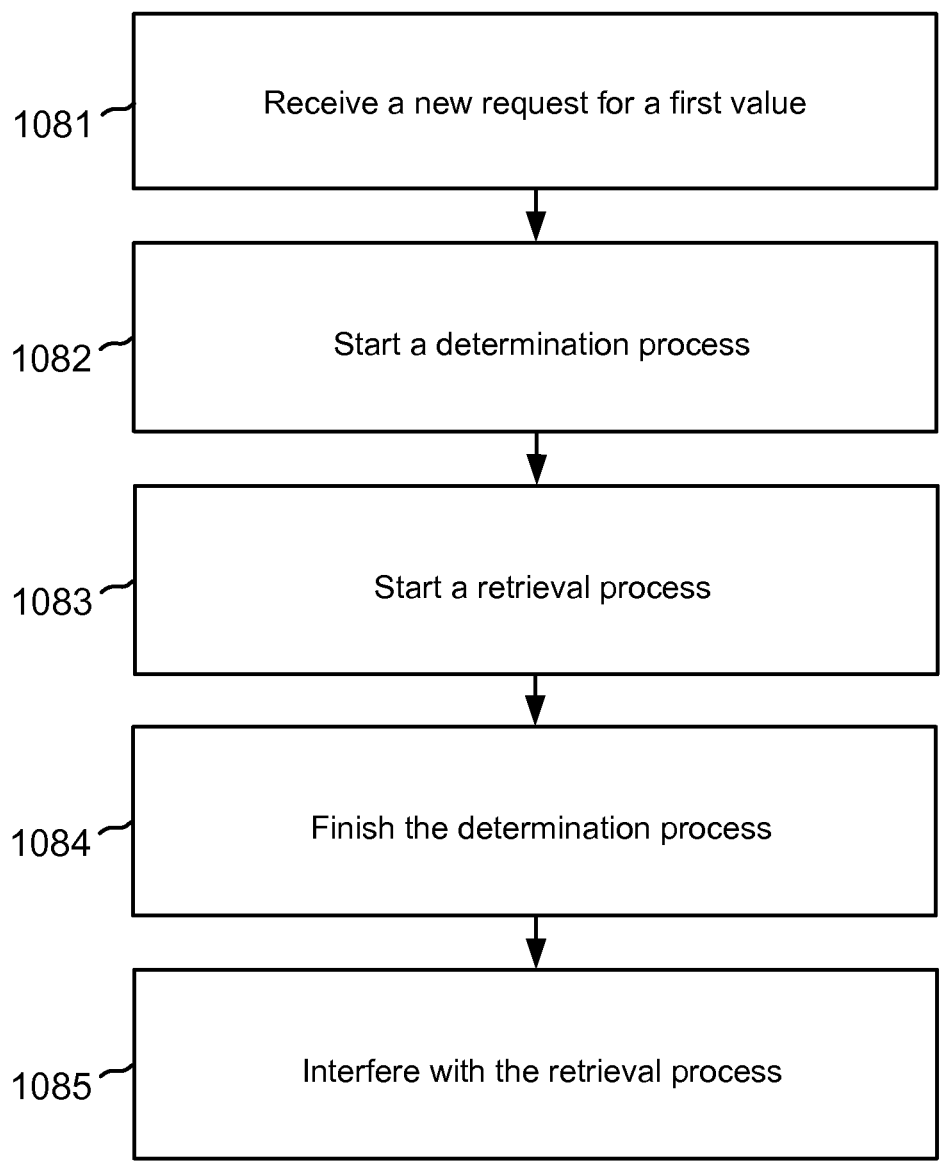
FIG. 16B illustrates one alternative embodiment of a method for determining authorization to retrieve a value in a key-value store while preserving low latency associated with random-access retrieval.

FIG. 16B illustrates one embodiment of a method for determining authorization to retrieve a first value 618-v1 in a key-value store 621 while preserving low latency associated with random-access retrieval. In step 1081, a first data interface 523-1 receives a new request 600-req2 from a first compute element 600-c1 to access a first value 618-v1 (FIG. 13A) currently stored in a first memory module 540-m1 associated with the first data interface, wherein the first memory module belongs to a key-value store 621 (FIG. 13A), and the first value is associated with a first key 618-k1 that is conveyed by the new request 600-req2. In step 1082, a determination process is started in which an access controller 701 associated with the first data interface 523-1 determines whether or not the first compute element 600-c1 is authorized to access the first value. In step 1083, using a the first key 618-k1, the first data interface 523-1 starts a retrieval process that includes (i) finding in the first memory module 540-m1 a first location that stores the first value 618-v1, and (ii) performing a first random access read cycle 703-RD-D1 at the first location to obtain the first value 618-v1, such that the retrieval process occur simultaneously with the determination process performed by the access controller 701. In step 1084, the access controller finishes the determination process. In step 1085, when the determination process results in a conclusion that the first compute element 600-c1 is not authorized to access the first value 618-v1, the access controller 701 interferes with the retrieval process, thereby causing the retrieval process to fail, thereby preventing delivery of the first value 618-v1 to the first compute element 600-c1.

Figure 17A:
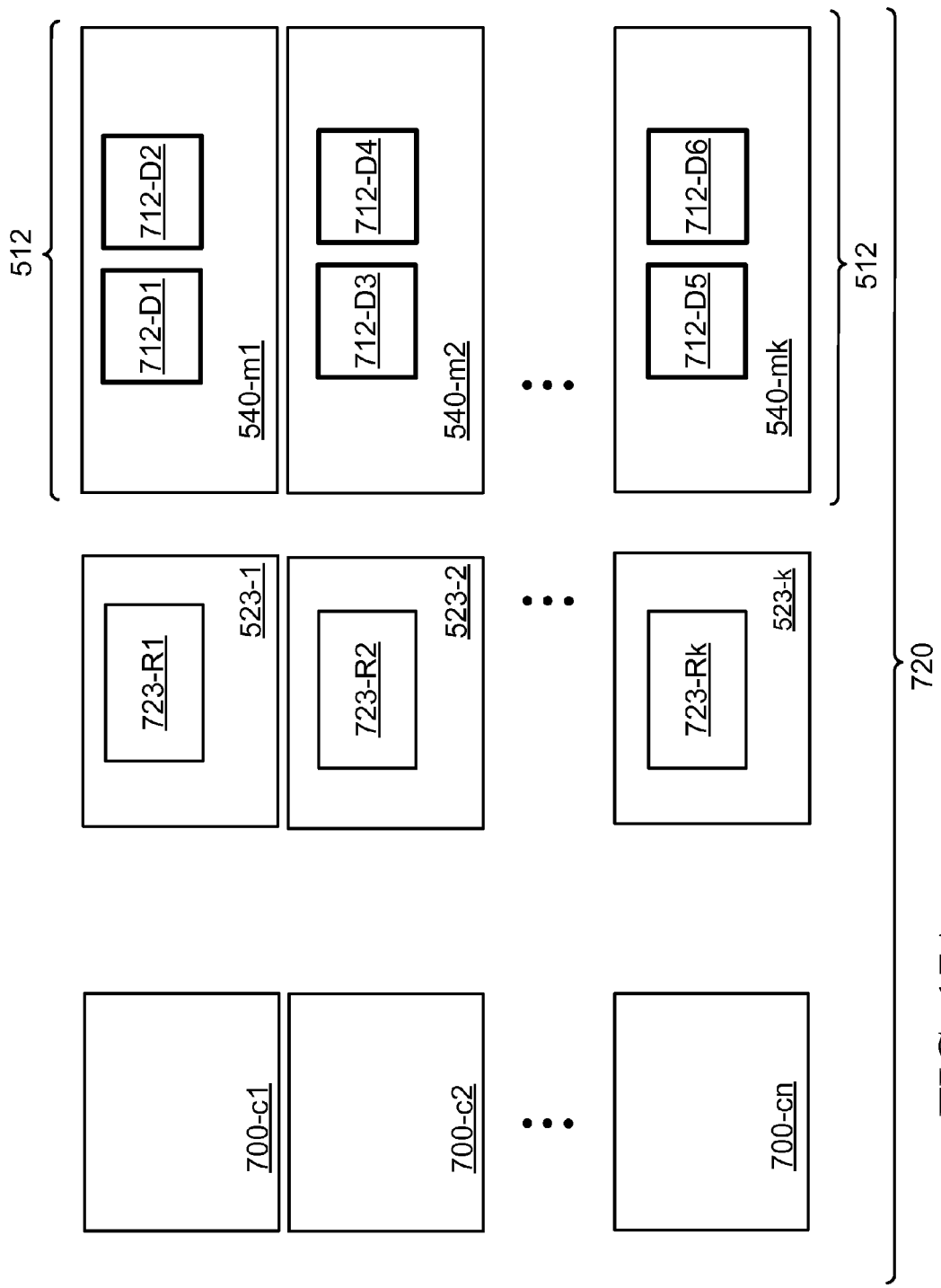
FIG. 17A illustrates one embodiment of a system operative to distributively process a plurality of data sets stored on a plurality of memory modules.

FIG. 17A illustrates one embodiment of a system 720 operative to distributively process a plurality of data sets 712-D1, 712-D2, 712-D3, 712-D4, 712-D5, 712-D6 stored on a plurality of memory modules 540-m1, 540-m2, 540-mk. In this system 720, a plurality of compute elements 700-c1, 700-c2, 700-cn send requests for data to one or more data interfaces 523-1, 523-2, 523-k. Data is held in data sets which are located in memory modules 540-m1, 540-m2, 540-mk, which together comprise a shared memory pool 512. Each data interface is associated with one or more memory modules 540-m1, 540-m2, 540-mk. As an example, data interface 523-1 is associated with memory module 540-m1. In the embodiment shown in FIG. 17A, each data registry 723-R1, 723-R2, 723-Rk is associated with one of the data interfaces. Each memory module includes one or more data sets. In the embodiment shown, memory module 540-m1 includes data sets 712-D1, 712-D2, memory module 540-m2 includes data sets 712-D3, 712-D4, and memory module 540-mk includes data sets 712-D5, 712-D6. It is understood that a memory module may include one, or two, or any other number of data sets. It is understood that the shared memory pool 512 may include two, three, or any other plurality number of memory modules. It is understood that the system may include one, two, or any other number of data interfaces, and one, two, or any other number of compute elements. Various functions of each data interface may be: to know the location of each data set included within an associated memory module, to receive requests for data from compute elements, to extract from the associated memory modules data sets, to send as responses to the compute elements the data sets, and to keep track of which data sets have already been served to the compute elements. Within each data registry is an internal registry which facilitates identification of which data sets have not yet been served, facilitates keeping track of data sets which have been served, and may facilitate the ordering by which data sets that have not yet been served to the compute elements will be served. In FIG. 17A, data interface 523-1 includes internal registry 723-R1, data interface 523-2 including internal registry 723-R2, and data interface 523-*k* includes internal registry 523-R*k*.

In an embodiment alternative to the embodiment shown in FIG. 17A, the internal registries 723-R1, 723-R2, and 723-R*k*, are not part of data interfaces. Rather, there is a separate module between the data interfaces 523-1, 523-2, 523-*k*, and the memory modules 540-*m*1, 540-*m*2, 540-*mk*. This separate module includes one or more internal registries, and the functions of the internal registries, as described above, are implemented in this separate module rather than in the data interfaces illustrated in FIG. 17A.

Figure 17B:
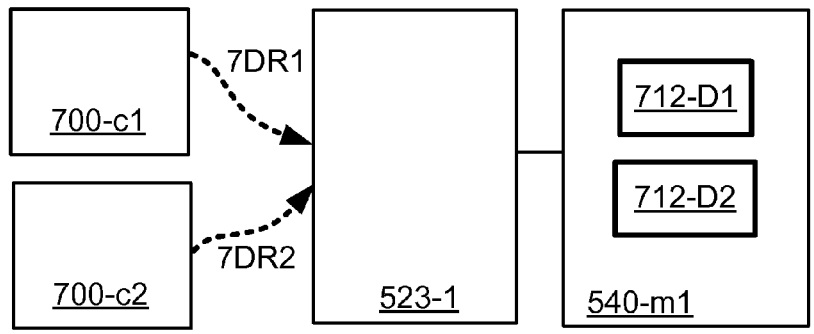
FIG. 17B illustrates one embodiment of a system in which a plurality of compute elements send data requests to a single data interface.

FIG. 17B illustrates one embodiment of a system in which a plurality of compute elements 700-*c*1, 700-*c*2 send data requests 7DR1, 7DR2 to a single data interface 523-1 which then accesses multiple data sets 712-D1, 712-D2 stored in a single memory module 540-*m*1. In various embodiments, any number of compute elements may send data requests to any number of data interfaces. In the particular embodiment illustrated in FIG. 17B, a plurality of compute elements 700-*c*1, 700-*c*2 send their requests to a single data interface 523-1. It is understood that three or any higher number of compute elements may send their requests to single data interface 523-1. FIG. 17B shows only one memory module 540-*m*1 associated with data interface 523-1, but two or any other number of memory modules may be associated with data interface 523-1. FIG. 17B shows two data sets 712-D1, 712-D2 included within memory module 540-*m*1, but there may be three or any other higher number of included data sets. FIG. 17B shows two data requests 7DR1, 7DR2, but there may be three or any other number of data requests send by the compute elements.

Figure 17C:
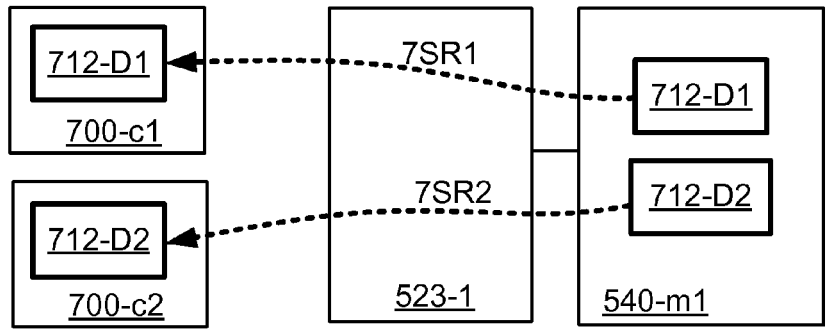
FIG. 17C illustrates one embodiment of a system in which the data interface then accesses multiple data sets stored in a single memory module, and then sends each such data set to the correct compute element.

FIG. 17C illustrates one embodiment of a system in which a single data interface 523-1 extracts from a single memory module 540-*m*1 some data sets and sends those data sets as multiple responses 7SR1, 7SR2 to the correct compute element. In this sense, a "correct" compute element means that the compute element which requested data set receives a data set selected for it by the data interface. FIG. 17C is correlative to FIG. 17B. After data interface 523-1 has received the data requests, the data interface 523-1 sends 7SR1 the first data set 712-D1, as a response to request 7DR1, to compute element 700-*c*1, and the data interface 523-1 sends 7SR2 the second data set 712-D2, as a response to request 7DR2, to compute element 700-*c*2. It is noted that data interface 523-1 sends data set 712-D2 as a response to request 7DR2 only after concluding, based on sending history as recorded in 723-R1, that data set 712-D2 was not served before.

Figure 17D:
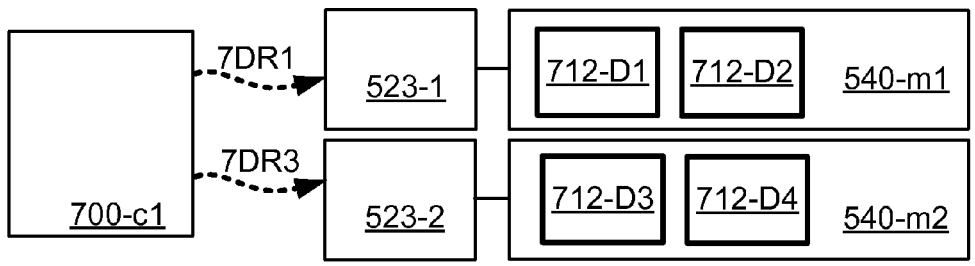
FIG. 17D illustrates one embodiment of a system in which a single compute element sends a plurality of data requests to a plurality of data interfaces.

FIG. 17D illustrates one embodiment of the system in which a single compute element 700-*c*1 sends a plurality of data requests 7DR1, 7DR3 to a plurality of data interfaces 523-1, 523-2 in which each data interface then accesses data sets stored in an associated memory module. Compute element 700-*c*1 sends data request 7DR1 to data interface 523-1, which then accesses associated memory module 540-*m*1 containing data sets 712-D1 and 712-D2. Compute element 700-*c*1 also sends data request 7DR3 to data interface 523-2, which then accesses associated memory module 540-*m*2 containing data sets 712-D3 and 712-D4. These two requests 7DR1 and 7DR3 may be sent essentially simultaneously, or with a time lag between the earlier and the later requests. It is understood that compute element 700-*c*1 may send data requests to three or even more data interfaces, although FIG. 17D shows only two data requests. It is understood that either or both of the data interfaces may have one, two, or more associated memory modules, although FIG. 17D shows only one memory module for each data interface. It is understood that any memory module may have more than two data sets, although FIG. 17D shows exactly two data sets per memory module.

Figure 17E:
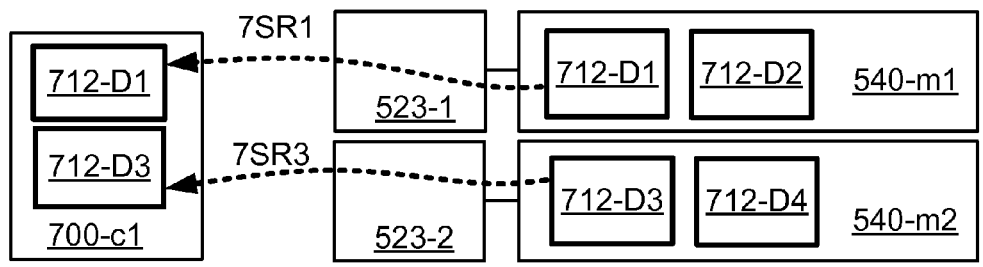
FIG. 17E illustrates one embodiment of a system in which a single compute element receives responses to data requests that the compute element sent to a plurality of data interfaces, in which each data interface fetches a response from an associated memory module and sends that response to the compute element.

FIG. 17E illustrates one embodiment of the system in which a single compute element 700-*c*1 receives responses to data requests that the compute element 700-*c*1 sent to a plurality of data interfaces 523-1, 523-2, in which each data interface accesses an associated memory module and sends the accessed data to the compute element 700-*c*1. FIG. 17E is correlative to FIG. 17D. Data interface 523-1, as a response to request 7DR1, selects data set 712-D1 since it was not served yet, extracts data set 712-D1 from memory module 540-*m*1, and serves 7SR1 data set 712-D1 to compute element 700-*c*1. Data interface 523-2, as a response to request 7DR3, selects data set 712-D3 since it was not served yet, extracts data set 712-D3 from memory module 540-*m*2, and serves 7SR3 data set 712-D3 to compute element 700-*c*1. The two responses 7DR1 and 7DR2 may be sent essentially simultaneously, or with a time lag between the earlier and the later. It is noted that data interface 523-2 sends data set 712-D3 as a response to request 7DR3 only after concluding, based on sending history as recorded in 723-R2, that data set 712-D3 was not served before. After serving data set 712-D3, data interface 523-2 may record that fact in 723-R2, and therefore may guarantee that data set 712-D3 is not served again as a result of future requests made by any of the compute elements.

One embodiment is a system 720 that is operative to distributively process a plurality of data sets stored on a plurality of memory modules. One particular form of such embodiment includes a plurality of compute elements 700-*c*1, 700-*c*2, 700-*cn*, a shared memory pool 512 with a plurality of memory modules 540-*m*1, 540-*m*2, 540-*mk* configured to distributively store a plurality of data sets 712-D1, 712-D2, 712-D3, 712-D4, 712-D5, 712-D6, and a plurality of data interfaces 523-1, 523-2, 523-*k* associated respectively with the plurality of memory modules 540-*m*1, 540-*m*2, 540-*mk*. Further, each of the data interfaces is configured to:

(i) receive data requests 7DR1, 7DR2 from any one of the plurality of compute elements, such as 7DR1 from 700-*c*1, or 7DR2 from 700-*c*2;

(ii) identify from the data sets 712-D1, 712-D2 of the memory module 540-*m*1 the data sets 712-D1, 712-D2 that were not served yet;

(iii) serve 7SR1, 7SR2, as replies to the data requests 7DR1, 7DR2, respectively, the data sets identified 712-D1, 712-D2, respectively; and (iv) keep track of the data sets already served, such that, as an example, after responding with 712-D1 to data request 7DR1, data interface 523-1 keeps a record of the fact that 712-D1 was just served, and therefore data interface 523-1 knows not to respond again with 712-D1 to another data request such as 7DR2, but rather to respond with 712-D2 to data request 7DR2, since 712-D2 has not yet been served. Further, each of the plurality of compute elements is configured to:

(i) send some of the data requests 7DR1, 7DR3 to at least some of the plurality of data interfaces 523-1, 523-2 respectively;

(ii) receive respectively some of the replies 7SR1, 7SR3 comprising some of the data sets 712-D1, 712-D3 respectively; and (iii) process the data sets received, Further, the compute elements continue to send data requests, receive replies, and process data, until a first condition is met. For example, one condition might be that all of the data sets that are part of the data corpus are served and processed.

In one alternative embodiment to the system just described, further the data requests 7DR1, 7DR2, 7DR3 do not specify certain which of the plurality of data sets 712-D1, 712-D2, 712-D3, 712-D4, 712-D5, 712-D6 should be served to the compute elements 700-c1, 700-c2. Rather, the identification and the keeping track constitute the only way by which the plurality of data interfaces 523-1, 523-2, 523-k know which one of the plurality of data sets is to be specifically served to the specific compute element making the data request, and thereby identification and keeping track constitute the only way by which the system 720 insures that none of the data sets is served more than once. As a non-limiting example, when sending data request 7DR1, compute element 700-c1 does not specify in the request that data set 712-D1 is to be served as a response. The decision to send data set 712-D1 as a response to data request 7DR1 is made independently by data interface 523-1 based on records kept indicating that data set 712-D1 was not yet served. The records may be kept within the internal register 723-R1 of data interface 523-1.

In one possible configuration of the alternative embodiment just descried, further the plurality of compute elements 700-c1, 700-c2, 700-cn comprises a first compute element 700-c1 and a second compute element 700-c2, the plurality of data interfaces 523-1, 523-2, 523-k comprises a first data interface 523-1 including a first internal registry 723-R1 that is configured to facilitate the identification and the keeping track, and the plurality of memory modules 540-m1, 540-m2, 540-mk comprises a first memory module 540-m1 associated with the first data interface 523-1 and configured to store a first data set 712-D1 and a second data set 712-D2. Further, the first compute element 700-c1 is configured to send a first data request 7DR1 to the first data interface 523-1, and the first data interface is configured to (i) conclude, according to the first internal registry 723-R1, that the first data set 712-D1 is next for processing from the ones of the data sets 712-D1, 712-D2 stored in the first memory module 540-m1, (ii) extract the first data set 712-D1 from the first memory module 540-m1, (iii) serve 7SR1 the first data set 712-D1 extracted to the first compute element 700-c1, and (iv) update the first internal registry 723-R1 to reflect said serving of the first data set. Further, the second compute element 700-c2 is configured to send a second data request 7DR2 to the first data interface 523-1, and the first data interface is configured to (i) conclude, according to the first internal registry 723-R1, that the second data set 712-D2 is next for processing from the ones of the data sets 712-D1, 712-D2 stored in the first memory module 540-m1, (ii) extract the second data set 712-D2 from the first memory module 540-m1, (iii) serve the second data set 712-D2 extracted to the second compute element 700-c2, and (iv) update the first internal registry 723-R1 to reflect said serving of the second data set.

In one possible variation of the configuration just described, further the plurality of data interfaces 523-1, 523-2, 523-k comprises a second data interface 523-2 including a second internal registry 723-R2 that is configured to facilitate the identification and the keeping track, and the plurality of memory modules 540-m1, 540-m2, 540-mk comprises a second memory module 540-m2 associated with said second data interface 523-2 and configured to store a third data set 712-D3 and a fourth data set 712-D4. Further, the first compute element 700-c1 is configured to send a third data request 7RD3 to the second data interface 523-2, and the second data interface is configured to (i) conclude, according to the second internal registry 723-R2, that the third data set 712-D3 is next for processing from the ones of the data sets 712-D3, 712-D4 stored in the second memory module 540-m2, (ii) extract the third data set 712-D3 from the second memory module 540-m2, (iii) serve the third data set 712-D3 extracted to the first compute element 700-c1, and (iv) update the second internal registry 723-R2 to reflect said serving of the third data set. Further, the second compute element 700-c2 is configured to send a fourth of said data requests to the second data interface 523-2, and the second data interface is configured to (i) conclude, according to the second internal registry 723-R2, that the fourth data set 712-D4 is next for processing from the ones of the data sets 712-D3, 712-D4 stored in the second memory module 540-m2, (iii) extract the fourth data set 712-D4 from the second memory module 540-m2, (iii) serve the fourth data set 712-D4 extracted to the second compute element 700-c2, and (iv) update the second internal registry 723-R2 to reflect said serving of the fourth data set.

In a second alternative embodiment to the system described to be operative to distributively process a plurality of data sets stored on a plurality of memory modules, further the plurality of compute elements 700-c1, 700-c2, 700-cn are configured to execute distributively a first task associated with the plurality of data sets 712-D1, 712-D2, 712-D3, 712-D4, 712-D5, 712-D6 by performing the processing of the data sets received.

In one possible configuration of the second alternative embodiment just described, further the execution of the first task can be done in any order of the processing of plurality of data sets, such that any one of the plurality of data sets can be processed before or after any other of the plurality of data sets. In other words, there is flexibility in the order in which data sets may be processed.

In one possible variation of the configuration just described, further the plurality of data sets 712-D1, 712-D2, 712-D3, 712-D4, 712-D5, 712-D6 constitute a first data corpus, and the first task is selected from a group consisting of: (i) counting number of occurrences of specific items in the first data corpus, (ii) determining size of the data corpus, (iii) calculating a mathematical property for each of the data sets, and (iv) running a mathematical filtering process on each of the data sets.

In a third alternative embodiment to the system described to be operative to distributively process a plurality of data sets stored on a plurality of memory modules, further each of the compute elements 700-c1, 700-c2, 700-cn is configured, per each of the sending of one of the data requests made by such compute element, to select one of the plurality of data interfaces as a target of receiving such data request, wherein the selection is done using a first technique. As a non-limiting example, compute element 700-c1 chooses to send data request 7DR1 to data interface 523-1, and then chooses to send data request 7DR3 to data interface 523-2, but compute element 700-c1 could have, instead, chosen to send data request 7DR3 to data interface 523-k, and in that event compute element 700-c1 would have received a different data set, such as data set 712-D5, as a response to data request 7DR3.

In one possible configuration of the third alternative embodiment just described, further the first technique is round robin selection.

In one possible configuration of the third alternative embodiment just described, further the first technique is pseudo-random selection.

In one possible configuration of the third alternative embodiment just described, further the selection is unrelated and independent of the identification and the keeping track.

In a fourth alternative embodiment to the system described to be operative to distributively process a plurality of data sets stored on a plurality of memory modules, further the keeping track of the data sets already served facilitates a result in which none of the data sets is served more than once.

In a fifth alternative embodiment to the system described to be operative to distributively process a plurality of data sets stored on a plurality of memory modules, further the first condition is a condition in which the plurality of data sets is served and processed in its entirety.

Figure 18:
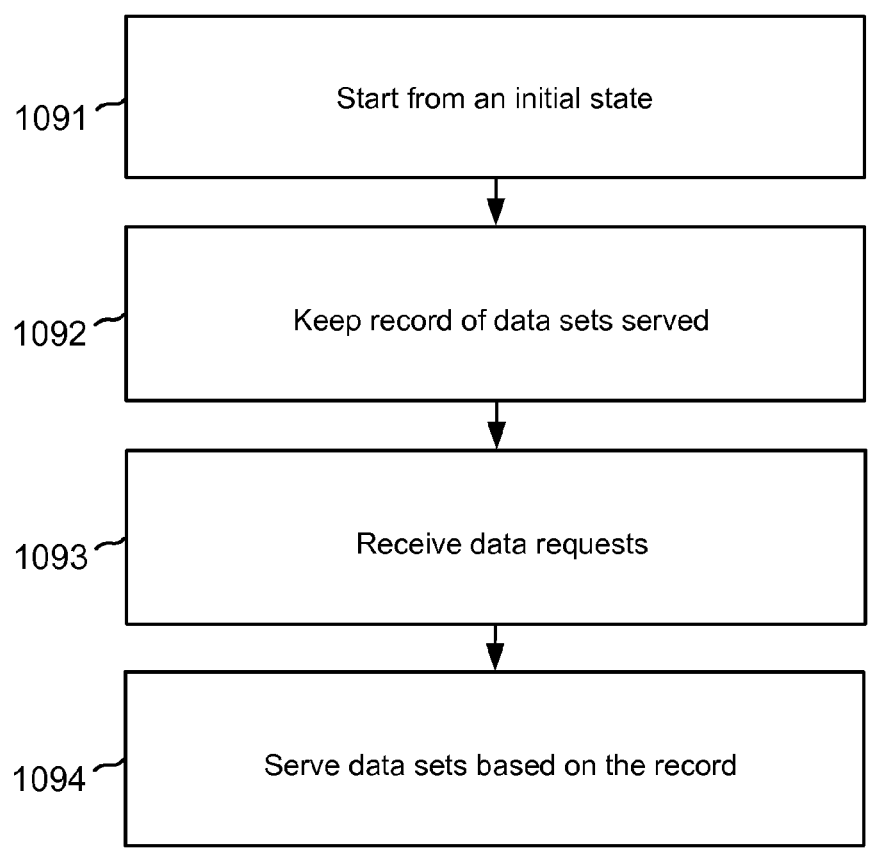
FIG. 18 illustrates one embodiment of a method for storing and sending data sets in conjunction with a plurality of memory modules.

FIG. 18 illustrates one embodiment of a method for storing and sending data sets in conjunction with a plurality of memory modules. In step 1091, a system is configured in an initial state in which a plurality of data sets 712-D1, 712-D2, 712-D3, 712-D4, 712-D5, 712-D6 belonging to a first data corpus are stored among a plurality of memory modules 540-$m1$, 540-$m2$, 540-$mk$, and such memory modules are associated, respectively, with a plurality of data interfaces 523-1, 523-2, 523-$k$, such that each of the plurality of data sets is stored only once in only one of the plurality of memory modules. In step 1092, each of the data interfaces 523-1, 523-2, 523-$k$, respectively, keeps a record 723-R1, 723-R2, 723-Rk about (i) which of the plurality of data sets are stored in the respective memory modules associated with the various data interfaces and (ii) which of the various data sets were served by the data interface to any one of the compute elements 700-$c1$, 700-$c2$, 700-$cn$. In step 1093, each of the data interfaces, 523-1, 523-2, 523-$k$, receives data request such as 7DR1, 7DR2, 7DR3, from any one of the plurality of compute elements 700-$c1$, 700-$c2$, 700-$cn$. In step 1094, each of the data interfaces selects and serves, as a response to each of the data requests received by that data interface, one of the data sets, wherein the data set selected is stored in a memory module associated with that data interface, and wherein the data interface knows and guarantees that the data set served as a response was not previously served by the data interface since the start of the initial state. For example, data interface 523-1 might serve, as a response to receiving data request 7DR1, one data set such as 712-D1, where that data set is stored in a memory module 540-$m1$ associated with data set 523-1, and the selection of that data set 712-D1 is based on the record 723-R1 kept by the data interface 523-1 which indicates that this data set 712-D1 has not been previously sent as a response since the start of the initial state. In some embodiments, eventually all of the data sets 712-D1, 712-D2, 712-D3, 712-D4, 712-D5, 712-D6, are served distributively to the plurality of compute elements 700-$c1$, 700-$c2$, 700-$cn$, thereby allowing the plurality of compute elements to distributively process the entire first data corpus.

In one alternative embodiment to the method just described, further the plurality of data sets is a plurality of values associated with a respective plurality of keys, and the data requests are requests for the values associated with the keys. For example, a plurality of values, 618-$v1$, 618-$v2$, 618-$v3$ (all from FIG. 13A), may be associated respectively with a plurality of keys, e.g. 618-$k1$, 618-$k2$, 618-$k3$ (all from FIG. 13A), and the data requests are requests for the values associated with the keys.

In one possible configuration of the alternative embodiment just described, the plurality of compute elements 700-$c1$, 700-$c2$, 700-$cn$, do not need to keep track of which values have already been served because a record of served values is already kept by each data interface. Therefore, the requests do not need to specify specific keys or values, because the data interfaces already know which keys and values can still be served to the plurality of compute elements.

Figure 19A:
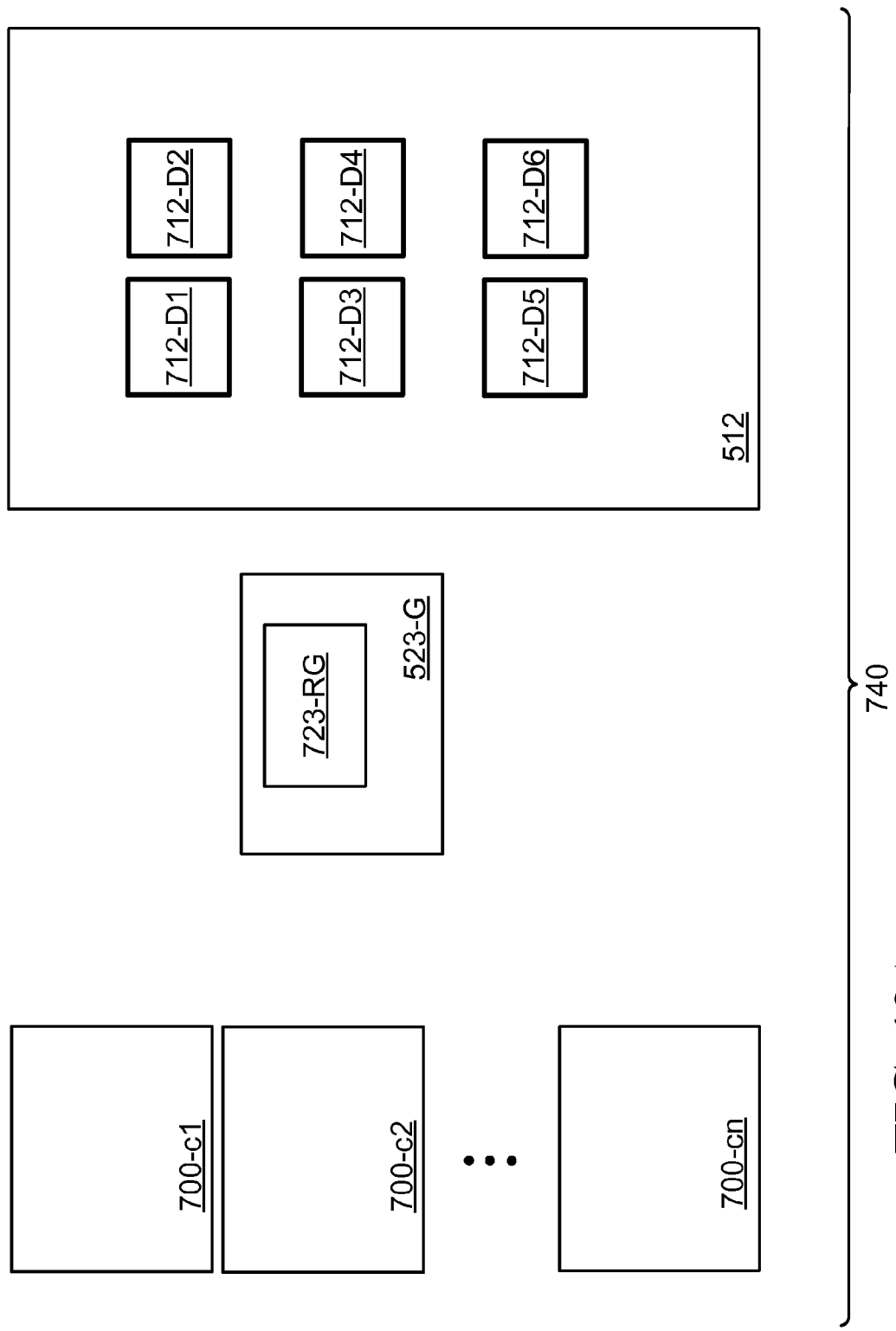
FIG. 19A illustrates one embodiment of a system operative to achieve load balancing among a plurality of compute elements accessing a shared memory pool.

FIG. 19A illustrates one embodiment of a system 740 operative to achieve load balancing among a plurality of compute elements 700-$c1$, 700-$c2$, 700-$cn$, accessing a shared memory pool 512. The system 740 includes a first data interface 523-G that is communicatively connected to both the compute elements 700-$c1$, 700-$c2$, 700-$cn$ and the shared memory pool 512. The shared memory pool 512 includes a plurality of data sets 712-D1, 712-D2, 712-D3, 712-D4, 712-D5, 712-D6 which comprise a data corpus related to a particular task to be processed by the compute elements 700-$c1$, 700-$c2$, 700-$cn$. The data sets 712-D1, 712-D2, 712-D3, 712-D4, 712-D5, 712-D6 may be stored in the shared memory pool 512 in any manner, including individually as shown in FIG. 19A, or within various memory modules not shown in FIG. 19A, or in a combination in which some of the various data sets are stored individually while others are stored in memory modules. Upon receiving requests from the compute elements 700-$c1$, 700-$c2$, 700-$cn$ for data sets related to a particular task being processed by the compute elements 700-$c1$, 700-$c2$, 700-$cn$, the first data interface 523-G extracts the data sets 712-D1, 712-D2, 712-D3, 712-D4, 712-D5, 712-D6 from the shared memory pool 512 and serves them to the compute elements 700-$c1$, 700-$c2$, 700-$cn$. The rate at which the first data interface 523-G extracts and serves data sets to a particular compute element is proportional to the rate at which that compute elements requests to receive data sets, and each compute element may request data sets as the compute element finishes processing of an earlier data set and becomes available to receive and process additional data sets. Thus, the first data interface 523-G, by extracting and serving data sets in response to specific data requests, helps achieve a load balancing of processing among the various compute elements 700-$c1$, 700-$c2$, 700-$cn$, such that there is a balance between available capacity for processing and the receipt of data sets to be processed, such that utilization of system capacity for processing is increased. The first data interface 523-G includes an internal registry 723-RG that is configured to keep track of which of the data sets 712-D1, 712-D2, 712-D3, 712-D4, 712-D5, 712-D6 have been extracted from the shared pool 512 and served to the compute elements 700-$c1$, 700-$c2$, 700-$cn$. The first data interface 523-G may extract and serve each of the data sets 712-D1, 712-D2, 712-D3, 712-D4, 712-D5, 712-D6 exactly once, thereby insuring that no data set is processed multiple times.

Figure 19B:
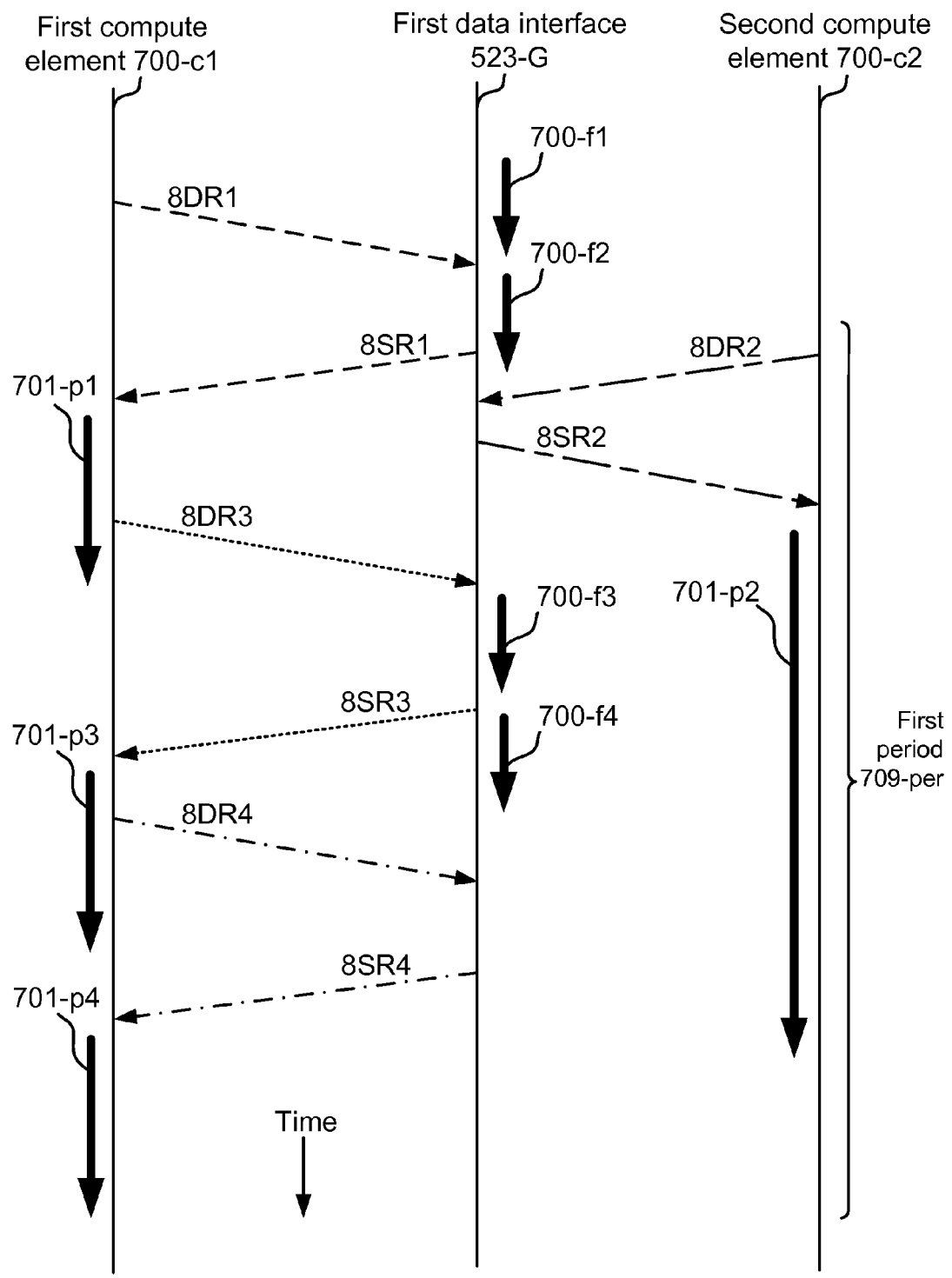
FIG. 19B illustrates one embodiment of a system including multiple compute elements and a first data interface, in which the system is operative achieve load balancing by serving data sets to the compute elements proportional to the rate at which the compute elements request data sets for processing.

FIG. 19B illustrates one embodiment of a system 740 including multiple compute elements 700-$c1$, 700-$c2$ and a first data interface 523-G, in which the system 740 is operative achieve load balancing by serving data sets to the compute elements 700-$c1$, 700-$c2$ proportional to the rate at which the compute elements 700-$c1$, 700-$c2$ request data sets for processing. As it becomes or is about to become available to process additional data sets, the first compute element 700-$c1$ sends a first data request 8DR1 to the first data interface 523-G. The first data interface 523-G concludes, based on information in the internal registry 723-RG, that a first data set 712-D1 is the next for processing, so the first data interface 523-G extracts 700-f1 the first data set 712-D1 from the shared memory 512, serves 8SR1 the first data set 712-D1 to the first compute element 700-c1, and updates the internal registry 723-RG to reflect the serving of the first data set. The first compute element 700-c1 continues to perform processing 701-p1 of data sets related to the task, here by processing the first data set received in response 8SR1. As it becomes available or is about to become available to process additional data sets, the second compute element 700-c2 sends a second data request 8DR2 to the first data interface 523-G. The first data interface 523-G concludes, based on information in the internal registry 723-RG, that the first data set has already been served to one of the compute elements but a second data set is the next for processing, so the first data interface 523-G extracts 700-f2 the second data set 712-D2 from the shared memory 512, serves 8SR2 the second data set to the second compute element 700-c2, and updates the internal registry 723-RG to reflect the serving of the second data set. The second compute element 700-c2 continues to perform processing 701-p2 of data sets related to the task, here by processing the second data set received in response 8SR2.

As it becomes available or is about to become available to process additional data sets, the first compute element 700-c1 sends a third data request 8DR3 to the first data interface 523-G. The first data interface 523-G concludes, based on information in the internal registry 723-RG, that the first and second data sets have already been served to the compute elements but a third data set is next for processing, so the first data interface 523-G extracts 700-f3 the third data set 712-D3 from the shared memory 512, serves 8SR3 the third data set to the first compute element 700-c1, and updates the internal registry 723-RG to reflect the serving of the third data set. The first compute element 700-c1 continues to perform processing 701-p3 of data sets related to the task, here by processing the third data set received in response 8SR3.

As it becomes available or is about to become available to process additional data sets, the first compute element 700-c1 sends a fourth data request 8DR4 to the first data interface 523-G. The first data interface 523-G concludes, based on information in the internal registry 723-RG, that the first, second, and third data sets have already been served to the compute elements but a fourth data set is next for processing, so the first data interface 523-G extracts 700-f4 the fourth data set 712-D4 from the shared memory 512, serves 8SR4 the fourth data set to the first compute element 700-c1, and updates the internal registry 723-RG to reflect the serving of the fourth data set. The first compute element 700-c1 continues to perform processing 701-p4 of data sets related to the task, here by processing the third data set received in response 8SR4.

It is understood that in all of the steps described above, the compute elements 700-c1, 700-c2 can process data sets only after they have received such data sets from the first data interface 523-G. The first data interface 523-G, however, has at least two alternative modes for fetching and sending data sets to the compute elements 700-c1, 700-c2. In one mode, the first data interface 523-G fetches a data set only after it has received a data request from one of the compute elements. This mode is reflected in element 700-f3, in which the first data interface 523-G first receives a data request 8DR3 from the first compute element 700-c1, the first data interface 523-G then fetches 700-f3 the third data set, and the first data interface 523-G then serves 8SR3 third data set to the first compute element 700-c1. In a second mode, the first data interface 523-G first fetches the next available data set before the first data interface 523-G has received any data request from any of the compute elements, so the first data interface 523-G is ready to serve the next data set immediately upon receiving the next data request from one of the compute elements 700-c1, 700-c2. This mode is illustrated in 700-f1, in which the first data interface 523-G fetches a first data set prior to receiving the first data request 8DR1 from the first compute element 700-c1, in 700-f2, in which the first data interface 523-G fetches a second data set prior to receiving the second data request 8DR2 from the second compute element 700-c2, and in 700-f4, in which the first data interface 523-G fetches a fourth data set prior to receiving the fourth data request 8DR4 from the first compute element 700-c1. By this second mode, there is no loss of time that might have resulted if the first data interface 523-G were fetching a data set while the requesting compute element was waiting for data.

FIG. 19B illustrates a time line, in which time begins at the top and continues towards the bottom. In one embodiment, over a first period 709-per, the first compute element 700-c1 issues exactly three data requests 8DR1, 8DR3, and 8DR4, receiving respectively responses 8SR1, 8SR3, and 8SR4 which include, respectively, a first data set 712-D1, a third data set 712-D3, and a fourth data set 712-D4, which the first compute element 700-c1 then processes, 701-p1, 701-p3, 701-p4, respectively. The first compute element 700-c1 does not issue additional data requests during the first period 709-per, because the first compute element 700-c1 will not be able to process received data within the time of 709-per. In one embodiment, 8DR3 is issued only after 701-p1 is done or about to be done, and 8DR4 is issued only after 701-p3 is done or about to be done, such that the first compute element 700-c1 issues data requests at a rate that is associated with the processing capabilities or availability of the first compute element 700-c1.

In one embodiment, over the same first period 709-per, the second compute element 700-c2 issues only one data request 8DR2, because the corresponding processing 701-p2 of the corresponding second data set 712-d2 requires long time, and further processing by the second compute element 700-c2 will not fit within the time period of 709-per. In this way, the second compute element 700-c2 issues data requests at a rate that is associated to the processing capabilities or availability of the second compute element 700-c2.

As explained above, each of the first compute element 700-c1 and the first compute element 700-c2 issues data requests in accordance with its processing capabilities or availability within a given time period. It is to be understood that data requests, receiving of data sets, and processing of data sets by the compute elements 700-c1 and 700-c2 are not synchronized, and therefore are unpredictably interleaved. Further, the compute elements 700-c1, 700-c2 are not aware of exactly which data set is received per each data request, but the compute elements 700-c1, 700-c2 do not request specific data sets, do not make the selection of which data sets they will receive, and do not know which data sets have been received from the first data interface 523-G. It is the first data interface 523-G that decides which data sets to serve based on the records kept in the internal registry 723-RG, the data sets selected have never yet been served to the compute element 700-c1, 700-c2, and the data sets are served by the first data interface 523-G in response to specific data requests from the compute elements 700-c1, 700-c2. The keeping of records in the internal registry 723-RG and the selection of data sets to be served based on those records, allows the achievement of load balancing among the various compute elements 700-c1, 700-c2, and this is true whether or not the various compute elements have the same processing capabilities or processing availabilities.

One embodiment is a system 740 operative to achieve load balancing among a plurality of compute elements 700-c1, 700-c2, 700-cn accessing a shared memory pool 512. One particular form of such embodiment includes a shared memory pool 512 configured to store and serve a plurality of data sets 712-D1, 712-D2, 712-D3, 712-D4, 712-D5, 712-D6 comprising at least a first data set 712-D1 and a second data set 712-D2; a first data interface 523-G configured to extract and serve any of the plurality of data sets 712-D1, 712-D2, 712-D3, 712-D4, 712-D5, 712-D6 from the shared memory pool 512, and comprising an internal registry 723-RG configured to keep track of the data sets extracted and served; and a plurality of compute elements 700-c1, 700-c2, 700-cn comprising at least a first compute element 700-c1 and a second compute element 700-c2, wherein the plurality of compute elements 700-c1, 700-c2 are communicatively connected with the first data interface 523-G, and the plurality of compute elements 700-c1, 700-c2 are configured to execute distributively a first task associated with the plurality of data sets 712-D1, 712-D2, 712-D3, 712-D4, 712-D5, 712-D6. Further, the first compute element 700-c1 is configured to send a first data request 8DR1 to the first data interface 523-G after deciding that the first compute element is currently available or will be soon available to start or continue contributing to execution of the task (i.e., processing one of the data sets), and the first data interface 523-G is configured to (i) conclude, according to the records kept in the internal registry 723-RG, that the first data set 712-D1 is next for processing, (ii) extract 700-f1 the first data set 712-D1 from the shared memory pool 512, (iii) serve 8SR1 the first data set extracted to the first compute element 700-c1 for performing said contribution 701-p1 (i.e., processing data set 712-D1), and (iv) update the internal registry 723-RG to reflect the serving of the first data set 712-D1 to the first compute element 700-c1. Further, the second compute element 700-c2 is configured to send a second data request 8DR2 to the first data interface 523-G after deciding that the second compute element 700-c2 is currently available or will be soon available to start or continue contributing to execution of the task, and the first data interface 523-G is configured to (i) conclude, according to the internal registry 723-RG reflecting that the first data set 712-D1 has already been served, that the second data set 712-D2 is next for processing, (ii) extract 700-f2 the second data set from the shared memory pool 512, (iii) serve 8SR2 the second data set extracted to the second compute element 700-c2 for performing the contribution 701-p2 (i.e., processing data set 712-D2), and (iv) update the internal registry 723-RG to reflect the serving of the second data set 712-D2 to the second server 700-c2. As herein described, the decisions regarding the availabilities facilitate the load balancing in conjunction with the executing distributively of the first task, all without the plurality of compute elements 700-c1, 700-c2, 700-cn being aware of the order in which the plurality of data sets are extracted and served by the first data interface 523-G.

In one alternative embodiment to the system just described, further the plurality of data sets further comprises at least a third data set 712-D3. Also, the first compute element 700-c1 is further configured to send a next data request 8DR3 to the first data interface 523-G after deciding that the first compute element 700-c1 is currently available or will be soon available to continue contributing to the execution of the task, and the first data interface 523-G is configured to (i) conclude, according to the internal registry 723-RG, that the third data set 712-D3 is next for processing, (ii) extract 700-f3 the third data set from the shared memory pool 512, (iii) serve 8SR3 the third data set extracted to the first compute element 700-c1 for performing the contribution 701-p3 (i.e., processing data set 712-D3), and (iv) update the internal registry 723-RG to reflect the serving of the third data set 712-D3.

In one possible configuration of the first alternative embodiment just described, further the next data request 8DR3 is sent only after the first compute element 700-c1 finishes the processing 701-p1 of the first data set 712-D1, thereby further facilitating said load balancing.

In a second possible configuration of the first alternative embodiment just described, further the first data request 8DR1 and next data request 8DR3 are sent by the first compute element 700-c1 at a rate that corresponds to a rate at which the first compute element 700-c1 is capable of processing 701-p1, 701-p3 the first data set 712-D1 and the third data set 712-D3, thereby further facilitating said load balancing.

In a second alternative embodiment to the above described system 740 operative to achieve load balancing among a plurality of compute elements 700-c1, 700-c2, 700-cn accessing a shared memory pool 512, further the concluding and the updating guarantee that no data set is served more than once in conjunction with the first task.

In a third alternative embodiment to the above described system 740 operative to achieve load balancing among a plurality of compute elements 700-c1, 700-c2, 700-cn accessing a shared memory pool 512, further the conclusion by said first data interface 523-G regarding the second data set 712-D2 is made after the second data request 8DR2 has been sent, and as a consequence of the second data request 8DR2 being sent.

In a fourth alternative embodiment to the above described system 740 operative to achieve load balancing among a plurality of compute elements 700-c1, 700-c2, 700-cn accessing a shared memory pool 512, further the conclusion by the first data interface 523-G regarding the second data set 712-D2 is made as a result of the first data set 712-D1 being served 8SR1, and before the second data request 8DR2 has been sent, such that by the time the second data request 8DR2 has been sent, the conclusion by the first data interface 523-G regarding the second data set 712-D2 has already been made.

In a fifth alternative embodiment to the above described system 740 operative to achieve load balancing among a plurality of compute elements 700-c1, 700-c2, 700-cn accessing a shared memory pool 512, further the extraction 700-f2 of the second data set 712-D2 from the shared memory pool 512 is done after the second data request 8DR2 has been sent, and as a consequence of the second data request 8DR2 being sent.

In a sixth alternative embodiment to the above described system 740 operative to achieve load balancing among a plurality of compute elements 700-c1, 700-c2, 700-cn accessing a shared memory pool 512, further the extraction 700-f2 of the second data set 712-D2 from the shared memory pool 512 is done as a result of the first data set 712-D1 being served 8SR1, and before the second data request 8DR2 has been sent, such that by the time the second data request 8DR2 has been sent, the second data set 712-D2 is already present in the first data interface 523-G and ready to be served by the first data interface 523-G to a compute element.

Figure 20:
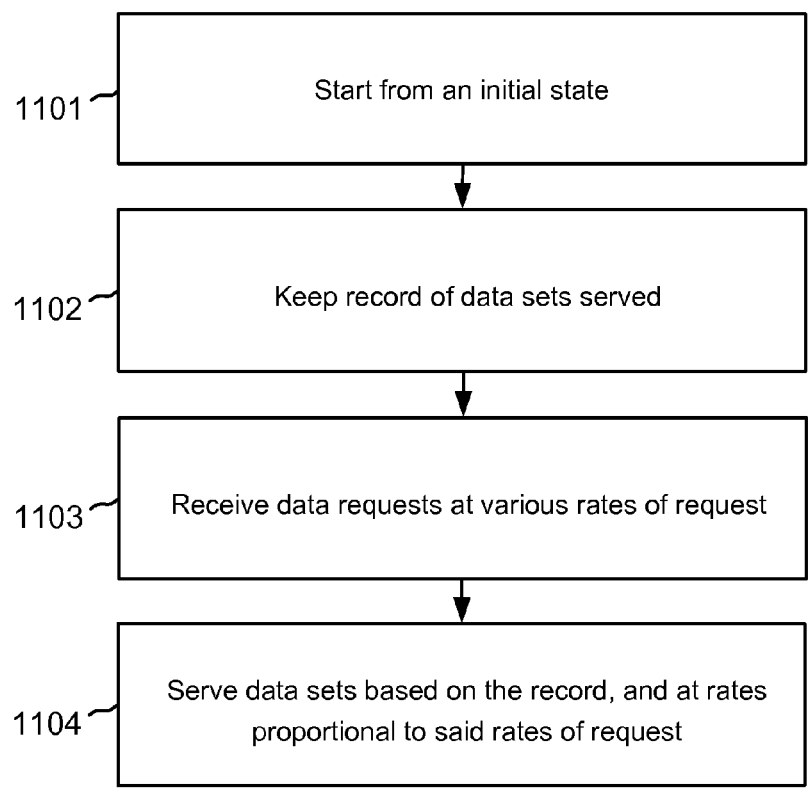
FIG. 20 illustrates one embodiment of a method for load balancing a plurality of compute elements accessing a shared memory pool.

FIG. 20 illustrates one embodiment of a method for load balancing a plurality of compute elements accessing a shared memory pool. In step 1101, a system is configured in an initial state in which a plurality of data sets 712-D1, 712-D2, 712-D3, 712-D4, 712-D5, 712-D6 belonging to a first data corpus are stored in a shared memory pool 512 associated with a first data interface 523-G, such that each of the plurality of data sets is stored only once. In step 1102, the internal registry 723-RG of a first data interface 523-G keeps a record about which of the plurality of data sets 712-D1, 712-D2, 712-D3, 712-D4, 712-D5, 712-D6 are stored in the shared memory pool 512 and which of the plurality of data sets 712-D1, 712-D2, 712-D3, 712-D4, 712-D5, 712-D6 were served by the first data interface 523-G to any one of the plurality of compute elements 700-c1, 700-c2, 700-cn. In step 1103, the first data interface 523-G receives data requests 8DR1, 8DR2, 8DR3, 8DR4 from any of plurality of compute elements 700-c1, 700-c2, 700-cn, in which the rates of request from the various compute elements 700-c1, 700-c2, 700-cn may vary based on factors such as the processing capabilities of the various compute elements 700-c1, 700-c2, 700-cn and the availability of processing time and resources given the various processing activities being executed by each of the compute elements 700-c1, 700-c2, 700-cn. In step 1104, in response to the each of the data requests sent by a compute element and received by the first data interface 523-G, the first data interface 523-G serves one of the data sets 712-D1, 712-D2, 712-D3, 712-D4, 712-D5, 712-D6 that is stored in the shared memory pool 512 and that is selected for sending to the compute element making the data request, where the data set is selected and served on the basis of the records kept in the internal registry 723-RG such that the data set served is guaranteed not to have been sent previously by the first data interface 523-G since the start from the initial state of the system 740. For example, the first data interface 523-G may select and serve, based on the records kept in the internal registry 723-RG, the second data set 712-D2 to be sent in response to a second data request 8DR2 from the second compute element 700-c2, wherein the records kept in internal registry 723-RG guarantee that this second data set 712-D2 has not yet been served to any of the compute elements 700-c1, 700-c2, 700-cn. The results are that (i) each data set is served by the first data interface 523-G and processed by one of the compute elements only once; and (ii) each of the plurality of compute elements 700-c1, 700-c2, 700-cn is served data at a rate that is proportional to the rate at which such compute element makes data requests. This proportionality, and the serving of data sets in direct relation to such proportionality, means that load balancing is achieved among the plurality of compute elements 700-c1, 700-c2, 700-cn.

In one alternative embodiment to the method just described, further the initial state is associated with a first task to be performed by the plurality of compute elements 700-c1, 700-c2, 700-cn in conjunction with the first data corpus, and the initial state is set among the first data interface 523-G and the plurality of compute elements 700-c1, 700-c2, 700-cn in conjunction with the first task, thereby allowing the keeping record, receiving, and serving to commence.

In one possible configuration of the alternative embodiment just described, said record keeping, receiving, and serving allow the plurality of compute elements 700-c1, 700-c2, 700-cn to distributively perform the first task, such that each of the plurality of compute elements 700-c1, 700-c2, 700-cn performs a portion of the first task that is determined by the compute element itself according to the rate at which that compete element is making data requests to the first data interface 523-G.

In one possible variation of the configuration just described, the rate at which each compute element makes data requests is determined by the compute element itself according to the present load on the compute element or the availability of computational capability of the compute element.

In one option of the variation just described, the data requests 8DR1, 8DR2, 8DR3, 8DR4 do not specify specific identities of the data sets 712-D1, 712-D2, 712-D3, 712-D4, 712-D5, 712-D6 to be served, such that the specific identities of the data sets served are determined solely by the first data interface 523-G according to the records kept by the internal registry 723-RG, thereby allowing the plurality of compute elements 700-c1, 700-c2, 700-cn to perform the first task asynchronously, thereby allowing the plurality of compute elements 700-c1, 700-c2, 700-cn to achieve load balancing efficiently.

In a second possible configuration of the alternative embodiment described above, the receiving of data requests and the serving of data sets in response to the data requests, end when the entire first data corpus has been served to the plurality of compute element 700-c1, 700-c2, 700-cn.

In a possible variation of the second configuration just described, the execution of the first task is achieved after the entire data corpus has been served to the plurality of compute elements 700-c1, 700-c2, 700-cn, and after each of the compute elements has processed all of the data sets that were served to that compute element by the first data interface 523-G.

In a third possible configuration of the alternative embodiment described above, further the first data interface 523-G performs on the plurality of data sets 712-D1, 712-D2, 712-D3, 712-D4, 712-D5, 712-D6 a pre-processing activity associated with the first task, after the extracting 700-f1, 700-f2, 700-f3, 700-f4 of the data sets and prior to the serving 8SR1, 8SR2, 8SR3, 8SR4 of the data sets.

Figure 21A:
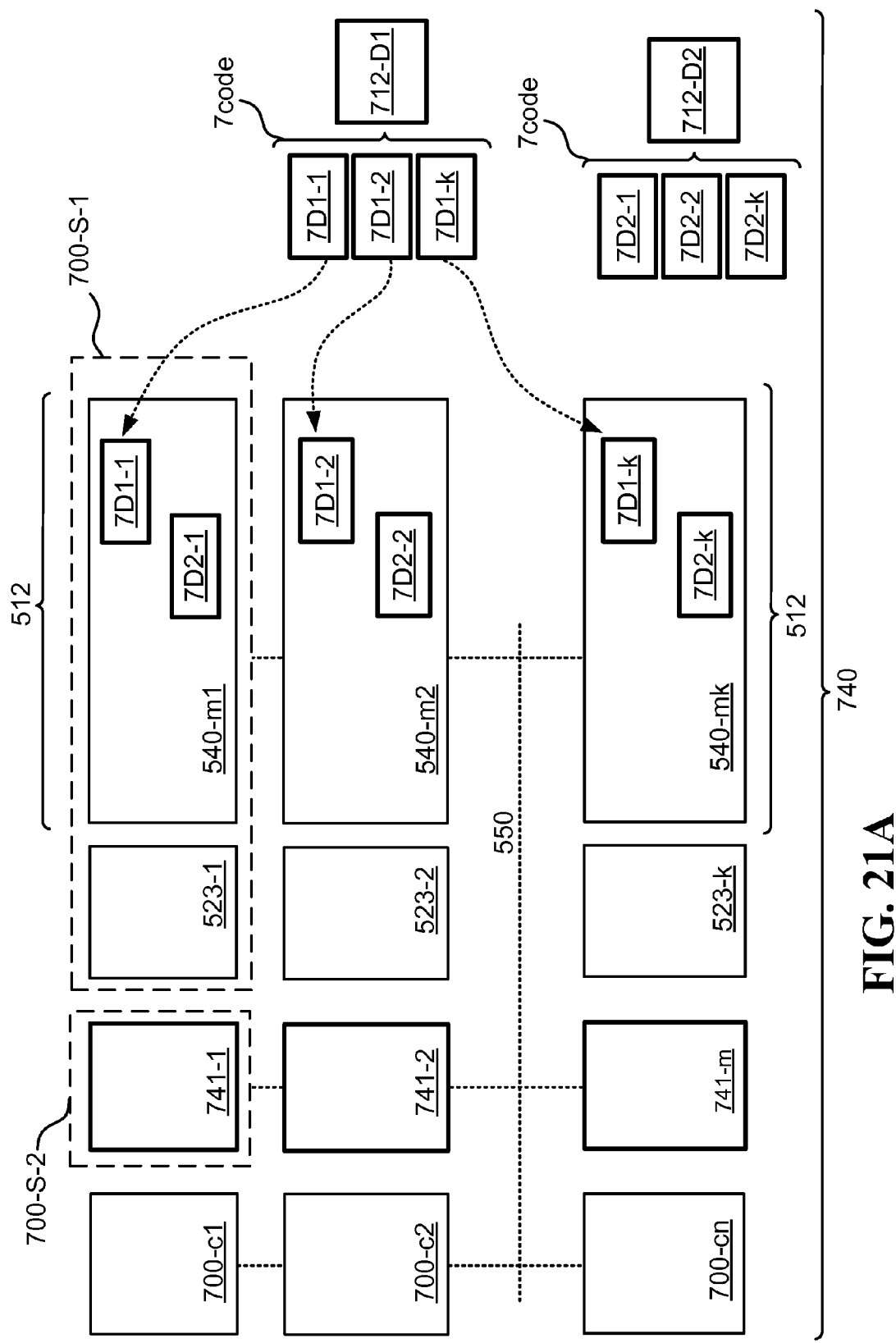
FIG. 21A illustrates one embodiment of a system operative to achieve data resiliency in a shared memory pool.

FIG. 21A illustrates one embodiment of a system 740 operative to achieve data resiliency in a shared memory pool 512. The system 740 includes multiple compute elements 700-c1, 700-c2, 700-cn, that execute various functions such as requesting data, receiving data, streaming request to write to memory, and processing data. The system 740 includes also multiple erasure-encoding interfaces 741-1, 741-2, 741-m, that execute various functions such as receiving data requests from compute elements, sending secondary data requests to data interfaces, receiving data fragments from data interfaces, reconstructing data sets, sending reconstructed data sets to compute elements as responses to requests for data, receiving streamed requests to write to memory, erasure-coding data sets into data fragments, creating multiple sub-streams of data fragments, and sending the sub-streams to memory modules to be added to memory. The system 740 includes also a shared memory pool 512 with multiple memory modules 540-m1, 540-m2, 540-mk, that execute various functions includes storing data sets in the form of data fragments. For example, as shown in FIG. 21A, a first data set 712-D1 has been coded 7code at the top into multiple data fragments 7D1-1, 7D1-2, 7D1-k, in which the various fragments are stored in different memory modules, first data fragment 7D1-1 in first memory module 540-m1, second data fragment 7D1-2 in second memory module 540-m2, and third data fragment 7D1-k in third memory module 540-mk. Similarly, FIG. 21A shows a second data set 712-D2 that has been coded 7code at the bottom into multiple data fragments 7D2-1, 7D2-2, 7D2-$k$, in which the various fragments are stored in different memory modules, first data fragment 7D2-1 in first memory module 540-$m$1, second data fragment 7D2-2 in second memory module 540-$m$2, and third data fragment 7D2-$k$ in third memory module 540-$mk$. Although only two data sets are shown in FIG. 21A, it is understood that there may be many more data sets in a system. Although each data set is shown in FIG. 21 to be coded into three data fragments, it is understood that any data set may be coded into two, four, or any higher number of data fragments. In the particular embodiment shown in FIG. 21A, there are at least two separate severs, a first server 700-S-1 that includes a first memory module 540-$m$1 and a first data interface 523-1, and a second server 700-S-2 that includes a first erasure-coding interface 741-1.

It should be understood that there may be any number of servers or other pieces of physical hardware in the system 740, and such servers or hardware may include any combination of the physical elements in the system, provided that the entire system 740 includes all of the compute elements 700-$c$1, 700-$c$2, 700-$ck$, all of the erasure-coding interfaces 741-1, 741-2, 741-$k$, all of the data interfaces 523-1, 523-2, 523-$k$, and all of the memory modules 540-$m$1, 540-$m$2, 540-$mk$, plus whatever other hardware elements have been added to the system 740. For example, one system might have a server including all of the memory modules and all of the data interfaces, a separate server including all of the erasure-coding interfaces, and a separate server including all of the compute elements. Or alternatively, there may be two more servers for the compute elements, and/or two or more servers for the erasure-coding interfaces, and/or two or more servers for the data interfaces and memory modules. In alternative embodiments, one or more compute elements may be co-located on a server with one or more erasure-coding interfaces and/or one or more data interfaces and memory modules, provided that all of the compute elements, erasure-coding interfaces, data interfaces, and memory modules are located on some server or other physical hardware.

Figure 21B:
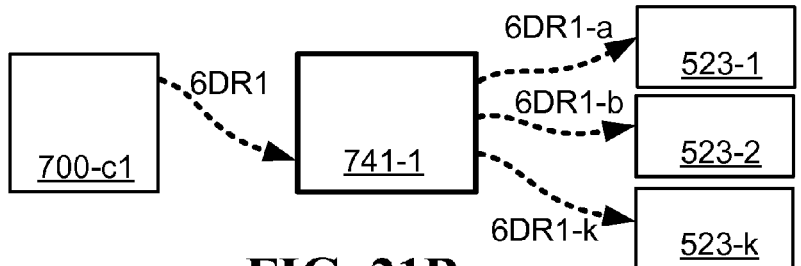
FIG. 21B illustrates one embodiment of a sub-system with a compute element making a data request to an erasure-encoding interface which converts the request to a plurality of secondary data requests and sends such secondary data requests to a plurality of data interfaces.

FIG. 21B illustrates one embodiment of a sub-system with a compute element 700-$c$1 making a data request 6DR1 to an erasure-encoding interface 741-1 which converts the request to a plurality of secondary data requests 6DR1-$a$, 6DR1-$b$, 6DR1-$k$, and sends such secondary data requests to a plurality of data interfaces 523-1, 523-2, 523-$k$. As shown, each secondary data request is sent to a separate data interface.

Figure 21C:
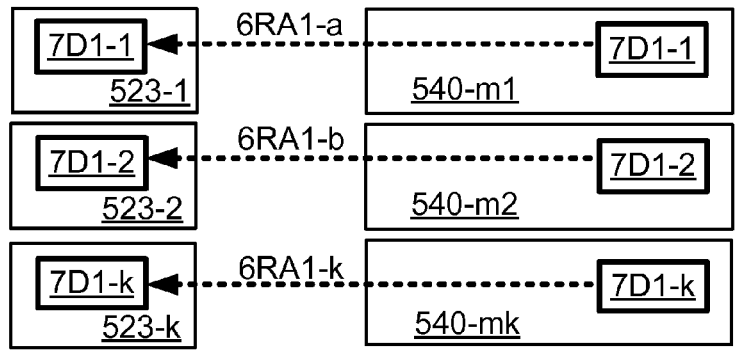
FIG. 21C illustrates one embodiment of a sub-system with the plurality of data interfaces using random-access read cycles to extract data fragments stored in associated memory modules.

FIG. 21C illustrates one embodiment of a sub-system with the plurality of data interfaces 523-1, 523-2, 523-$k$ using random-access read cycles 6RA1-$a$, 6RA1-$b$, 6RA-k, to extract multiple data fragments 7D1-1, 7D1-2, 7D1-$k$ stored in associated memory modules 540-$m$1, 540-$m$2, 540-$mk$. In the embodiment illustrated in FIG. 21C, the data fragments are part of a data set 712-D1 not shown in FIG. 21C. In the embodiment illustrated in FIG. 21C, the data fragments are stored in random access memory (RAM), which means that the data interfaces extract and fetch the data fragments very quickly using a random access read cycle or several random access read cycles. In the embodiment shown in FIG. 21C, exactly one data interface is associated with exactly one memory module in order to support simultaneity in accessing the various data fragments 7D1-1, 7D1-2, 7D1-$k$, but in alternative embodiments the various data interfaces and memory modules may be associated otherwise, provided however that the multiple data fragments 7D1-1, 7D1-2, 7D1-$k$ may be extracted in parallel by a plurality of data interfaces, such that the multiple data fragments 7D1-1, 7D1-2, 7D1-$k$ may be fetched quickly by the various data interface, and possibly during several clock cycles in which the various data interfaces access the various memory modules in parallel using simultaneous random access read cycles. Such simultaneity in random access is critical for achieving low latency that is comparable to latencies associated with randomly accessing uncoded data stored in RAM.

Figure 21D:
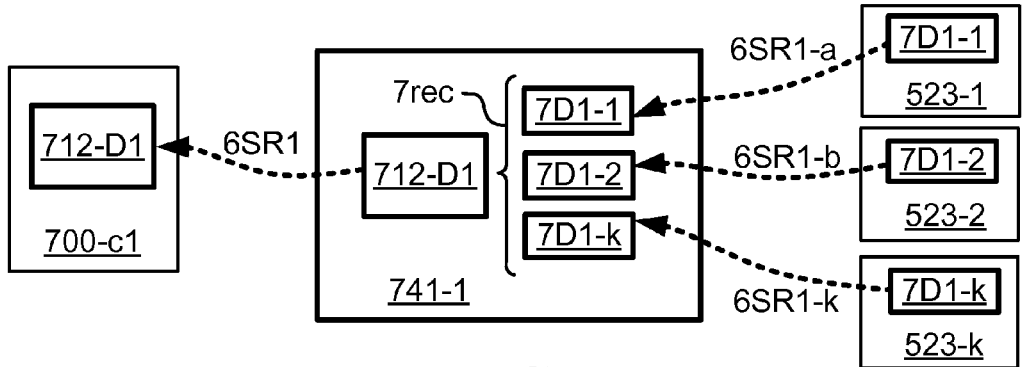
FIG. 21D illustrates one embodiment of a sub-system with the plurality of data interfaces sending, as responses to the secondary data requests, data fragments to the erasure-coding interface which reconstructs the original data set from the data fragments and sends such reconstructed data set to the compute element as a response to that compute element's request for data.

FIG. 21D illustrates one embodiment of a sub-system with the plurality of data interfaces 523-1, 523-2, 523-$k$, sending, as responses 6SR1-$a$, 6SR1-$b$, 6SR1-$k$ to a secondary data requests 6DR1-$a$, 6DR1-$b$, 6DR1-$k$ (shown in FIG. 21B), data fragments 7D1-1, 7D1-2, 7D1-$k$ to an erasure-coding interface 741-1 which reconstructs 7rec the original data set 712-D1 from the data fragments and sends such reconstructed data set 712-D1 to a compute element 700-$c$1 as a response 6SR-1 to that compute element's request for data 6DR-1 (shown in FIG. 21B). The data fragments may be sent serially to the erasure-coding interface 741-1, which might be, for example, 7D1-1, then 7D1-2, then 7D1-$k$, then 7D2-1 (part of second data set 712-D2 shown in FIG. 21A), then 7D1-2 (part of data set 712-D2 shown in FIG. 21A), then 7D1-$k$ (part of data set 712-D2 shown in FIG. 21A). The data fragments 7D1-1, 7D1-2, 7D1-$k$ may be sent simultaneously to the erasure-coding interface 741-1 using a switching network such as switching network 550 (FIG. 21A), which may be selected from a group consisting of: (i) a non-blocking switching network, (ii) a fat tree packet switching network, and (iii) a cross-bar switching network, in order to achieve a low latency that is comparable to latencies associated with randomly accessing uncoded data stored in RAM. The erasure-coding interface 741-1 may reconstruct 7rec the data set 712-D1 even if one of the data fragments 7D1-1, 7D1-2, 7D1-$k$ is either missing or corrupted, and this is one aspect of data resiliency of the overall system 740. In the embodiment shown in FIG. 21D, all of the data interfaces are communicatively connected with a single erasure-coding interface 741-1 which is communicatively connected with exactly one compute element 700-$c$1, but in alternative embodiments the various data interfaces may be communicatively connected with various erasure-coding interfaces, and the various erasure-coding interfaces may be communicatively connected with various compute elements, through the switching network 550 discussed previously.

Figure 21E:
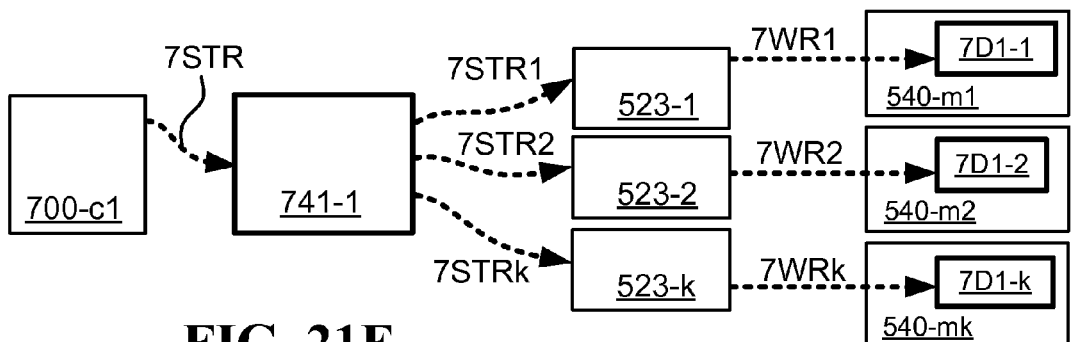
FIG. 21E illustrates one embodiment of a sub-system with a compute element streaming a data set to an erasure-coding interface which converts the data set into data fragments and streams such data fragments to multiple data interfaces, which then write each data fragment in real-time in the memory modules associated with the data interfaces.

FIG. 21E illustrates one embodiment of a sub-system with a compute element 700-$c$1 streaming 7STR a data set 712-D1 (shown in FIG. 21D) to an erasure-coding interface 741-1 which converts the data set into data fragments 7D1-1, 7D1-2, 7D1-$k$ and streams 7STR1, 7STR2, 7STRk such data fragments to multiple data interfaces 523-1, 523-2, 523-$k$, which then write 7WR1, 7WR2, 7WRk each data fragment in real-time in the memory modules 540-$m$1, 540-$m$2, 540-$mk$ associated with the data interfaces. The physical connection between the compute element 700-$c$1 and the erasure-coding interface, here in FIG. 21E or in any of the FIG. 21A, 21B, or 21D, may be a peripheral-component-interconnect-express (PCIE) computer expansion bus, an Ethernet connection, an Infiniband connection, or any other physical connection permitting high-speed transfer of data between the two physical elements, such as switching network 550. The coding of the data fragment streams 7STR1, STR2, STRk by the erasure-coding interface 741-1 may be done very quickly, in "real-time". The data interfaces 523-1, 523-2, 523-$k$ write 7WR1, 7WR2, 7WRk the data fragments 7D1-1, 7D1-2, 7D1-$k$ to the memory modules 540-$m$1, 540-$m$2, 540-$mk$ in RAM using fast random access cycles, which means that the writing process is very fast, possibly as fast as a single random access write cycle into a RAM.

One embodiment is a system 740 operative to achieve data resiliency in a shared memory pool 512. One particular form of such embodiment includes a plurality of memory modules 540-*m*1, 540-*m*2, 540-*mk* belonging to a shared memory pool 512 and associated respectively with a plurality of data interfaces 523-1, 523-2, 523-*k*; a first erasure-coding interface 741-1 communicatively connected with the plurality of data interfaces 523-1, 523-2, 523-*k*; and a first compute element 700-*c*1 communicatively connected with the first erasure-coding interface 741-1. Further, the plurality of memory modules 540-*m*1, 540-*m*2, 540-*mk* are configured to distributively store a plurality of data sets 712-D1, 712-D2, such that each data set is distributively stored among at least two of the memory modules in a form of a plurality of data fragments coded using a first erasure-coding scheme, and each data fragment is stored on a different one of the at least two memory modules. As an example, a first data set 712-D1 may include first data fragment 7D1-1 stored in first memory module 540-*m*1, second data fragment 7D1-2 stored in second memory module 540-*m*2, and third data segment 7D1-*k* stored in third memory module 540-*mk*. As another example, as either a substitute for the first data set 712-D1, or in addition to the first data set 712-D1, there may be a second data set 712-D2, including a first data fragment 7D2-1 stored in first memory module 540-*m*1, a second data fragment 7D2-2 stored in second memory module 540-*m*2, and a third data segment 7D2-*k* stored in third memory module 540-*mk*. Further, the first compute element 700-*c*1 is configured to send to the first erasure-coding interface 741-1 a request 6DR1 for one of the data sets. For example, the first erasure-encoding interface may request a first data set 712-D1. Further, the first erasure-coding interface 741-1 is configured to (i) convert the request into a first plurality of secondary data requests 6DR1-*a*, 6DR1-*b*, 6DR1-*k*; (ii) send the first plurality of secondary data requests, respectively, into at least a first sub-set of the plurality of data interfaces 523-1, 523-2, 523-*k*; (iii) receive as responses 6SR1-*a*, 6SR1-*b*, 6SR1-*k* at least a sub-set of the plurality of data fragments 7D1-1, 7D1-2, 7D1-*k* associated with the one of the data sets 712-D1; (iv) reconstruct 7rec the one of the data sets 712-D1, using the first erasure-coding scheme, from the data fragments received 7D1-1, 7D1-2, 7D1-*k*; and (v) send the reconstruction to the first compute element 700-*c*1 as a response 6SR1 to the request 6DR1 made. Further, each of the plurality of data interfaces, that is, each of 523-1, 523-2, 523-*k*, is configured to (i) receive, from the first erasure-coding interface 741-1, one of the plurality of secondary data requests (such as, for example secondary data request 6DR1-*a* received at first date interface 523-1); (ii) extract, from the respective memory module (such as, for example, from first memory module 540-*m*1 associated with first data interface 523-1), using a random-access read cycle 6RA1-*a*, one of the data fragments 7D1-1 associated with the one secondary data request; and (iii) send 6SR1-*a* the data fragment 7D1-1 extracted to the first erasure-coding interface 741-1 as part of the responses received by the first erasure-coding interface 741-1.

In a first alternative embodiment to the system just described, further one of the plurality of memory modules 540-*m*1 and its associated data interface 523-1 are located in a first server 700-S-1. Further, the first erasure-coding interface 741, the first compute element 700-*c*1, others of the plurality of memory modules 540-*m*2, 540-*mk*, and others of the associated data interfaces 523-2, 523-*k*, are all located outside the first server 700-S-1. The ultimate result is that, due to the uses of the first erasure-coding interface 741-1 and the first erasure-coding scheme, the system 740 is a distributed system that is configured to endure any failure in the first server 700-S-1, and further that the reconstruction 7rec is unaffected by the possible failure in the first server 700-S-1.

In one possible configuration of the first alternative embodiment just described, the system 740 includes also additional erasure-coding interfaces 741-2, 741-*m*, each configured to perform all tasks associated with the first erasure-coding interface 741-1, such that any failure of the first erasure-coding interface 741-1 still allows the system 740 to perform the reconstruction 7rec using at least one of the additional erasure-coding interfaces (such as the second erasure-coding interface 741-2) instead of the failed first erasure-coding interface 741-1.

In one possible variation of the configuration just described, further the first erasure-coding interface 741-1 is located in a second server 700-S-2, while the additional erasure-coding interfaces 714-2, 741-*m*, the first compute element 700-*c*1, the others of the plurality of memory modules 540-*m*2, 540-*mk*, and the associated data interfaces 523-2, 523-*k*, are all located outside said second server 700-S-2. The result is that the system 740 is further distributed, and is configured to endure any failure in the second server 700-S-2, such that the reconstruction 7rec would still be possible even after a failure in the second server 700-S-2.

In a second alternative embodiment to the above-described system 740 operative to achieve data resiliency in a shared memory pool, the system 740 further includes additional erasure-coding interfaces 741-2, 741-*m*, each of which is configured to perform all tasks associated with the first erasure-coding interface 741-1. Further, the system 740 also includes additional compute elements 700-*c*2, 700-*cn*, each of which is configured to associate with at least one of the erasure-coding interfaces (for example, compute element 700-*c*2 with erasure-coding interface 741-2, and compute element 700-*cn* with erasure-coding interface 741-*m*) in conjunction with erasure-coding transactions such as 7rec and alike, associated with the plurality of memory modules 540-*m*1, 540-*m*2, 540-*mk* and the plurality of data fragments 7D1-1, 7D1-2, 7D1-*k*, 7D2-1, 7D2-2, 7D2-*k*. As a result of the additions set forth in this second possible alternative, each of the plurality of compute elements, including the first compute element, is configured to receive one of the data sets 712-D1 reconstructed 7rec using at least one of the additional erasure-coding interfaces 741-2, and also the shared memory pool 512 is configured to serve the plurality of data sets 712-D1, 712-D2 to the plurality of compute elements regardless of any failure in one of the memory modules 540-*m*1, 540-*m*2, 540-*mk*.

In one possible option for the second alternative embodiment just described, each erasure-coding interface 741-2, 741-2, 741-*m* is associated with one of the compute elements 700-*c*1, 700-*c*2, 700-*cn*.

In another possible option for the second alternative embodiment just described, each of the compute elements 700-*c*1, 700-*c*2, 700-*cn* can use any one or any combination of the erasure-encoding interfaces 741-2, 741-2, 741-*m*, thereby creating a resilient matrix of both data and erasure-coding resources, capable of enduring any single failure scenario in the system. In one possible option of this embodiment, the different elements in the resilient matrix are interconnected using a switching network or an interconnect fabric 550.

In one possible configuration of the second alternative embodiment, further the plurality of memory modules 540-m1, 540-m2, 540-mk are based on dynamic-random-access-memory (DRAM), at least 64 (sixty four) memory modules are included in the plurality of memory modules, and the use first erasure-coding interface 741-1 together with the additional erasure-coding interfaces 741-2, 741-m are communicatively connected with the plurality of data interfaces 523-1, 523-2, 523-k using a switching network 550 selected from a group consisting of: (i) a non-blocking switching network, (ii) a fat tree packet switching network, and (iii) a cross-bar switching network. One result of this possible configuration is that a rate at which the data sets 712-D1, 712-D2 are being reconstructed 7rec is at least 400 Giga-bits-per second.

In a third alternative embodiment to the above-described system 740 operative to achieve data resiliency in a shared memory pool, further the plurality of memory modules 540-m1, 540-m2, 540-mk are based on random-access-memory (RAM), and therefore the random-access read cycles 6RA1-a, 6RA1-b, 6RA1-k allow the extraction to proceed at data rates that support the first compute element 700-c1 in receiving said data sets 712-D1, 712-D2, after said reconstruction 7rec, at data rates that are limited only by the ability of the first compute element 700-c1 to communicate.

In one possible configuration of the third alternative embodiment, further the random-access-memory in memory modules 540-m1, 540-m2, 540-mk is a dynamic-random-access-memory (DRAM), and the first erasure-coding interface 741-1 is communicatively connected with the plurality of data interfaces 523-1, 523-2, 523-k using a switching network 550 selected from a group consisting of: (i) a non-blocking switching network, (ii) a fat tree packet switching network, and (iii) a cross-bar switching network. One result of this possible configuration is that a first period beginning in the sending of the request 6DR1 and ending in the receiving of the response 6SR1 to the request is bounded by 5 (five) microseconds. In one embodiment, said random-access read cycles 6RA1-a, 6RA1-b, 6RA-k are done simultaneously, as facilitated by the plurality of data interfaces 523-1, 523-2, 523-k acting together, thereby facilitating said bound of 5 (five) microseconds.

In a second possible configuration of the third alternative embodiment, further the random-access-memory in memory modules 540-m1, 540-m2, 540-mk is a dynamic-random-access-memory (DRAM), and the first erasure-coding interface 741-1 is communicatively connected with the plurality of data interfaces 523-1, 523-2, 523-k using a switching network 550 selected from a group consisting of: (i) a non-blocking switching network, (ii) a fat tree packet switching network, and (iii) a cross-bar switching network. One result of this possible configuration is that a rate at which the data sets 712-D2, 712-D2 are being reconstructed is at least 100 Giga-bits-per second.

In a fourth alternative embodiment to the above-described system 740 operative to achieve data resiliency in a shared memory pool, further the one of the data sets 712-D1 is a first value 618-v1 (illustrated in FIGS. 11A and 13A) associated with a first key 618-k1 (illustrated in FIGS. 11A and. 13A), and the first value 618-v1 is stored as one of the pluralities of data fragments 7D1-1, 7D1-2, 7D1-k in the plurality of memory modules 540-m1, 540-m2, 540-mk. Further, the request 6DR1 for one of the data sets 712-D1 is a request for the first value 618-v1, in which the request 6DR1 conveys the first key 618-k1. Further, the first plurality of secondary data requests 6DR1-a, 6DR1-b, 6DR1-k are requests for the one of the pluralities of data fragments 7D1-1, 7D1-2, 7D1-k, in which each of the requests for the one of the pluralities of data fragments conveys the first key 618-k1 or a derivative of the first key 618-k1 to the respective data interface 523-1, 523-2, 523-k. Further, the respective data interface 523-1, 523-2, 523-k is configured to use the first key 618-k1 or a derivative of the first key to determine an address from which to perform said random access read cycles 6RA1-a, 6RA1-b, 6RA1-k.

One embodiment is a system 740 operative to stream data resiliently into a shared memory pool 512. One particular form of such embodiment includes a plurality of memory modules 540-m1, 540-m2, 540-mk belonging to a shared memory pool 512 and associated respectively with a plurality of data interfaces 523-1, 523-2, 523-k, a first erasure-coding interface 741-1 communicatively connected with the plurality of data interfaces 523-1, 523-2, 523-k, and a first compute element 700-c1 communicatively connected with the first erasure-coding interface 741-1. Further, the first compute element 700-c1 is configured to stream 7STR a plurality of data sets 712-D1, 712-D2 into the first erasure-coding interface 741-1. Further, the first erasure-coding interface 741-1 is configured to (i) receive the stream; (ii) convert in real-time each of the plurality of data sets 712-D1, 712-D2 in the stream into a plurality of data fragments (for example, first plurality 7D1-1, 7D1-2, 7D1-k, and second plurality 7D2-1, 7D2-2, 7D2-k) using a first erasure-coding scheme; and stream each of the pluralities of data fragments respectively into the plurality of data interfaces (for example, 7D1-1, 7D1-2, and 7D1-k into 523-1, 523-2, and 523-k, respectively), such that a plurality of sub-streams 7STR1, 7STR2, 7STRk of data fragments are created in conjunction with the plurality of data interfaces. Further, each of the data interfaces 523-1, 523-2, 523-k is configured to (i) receive one of said sub-streams of data fragments (for example, 523-1 receiving sub-stream 7STR1 containing fragments 7D1-1 and 7D2-1), and (ii) write in real-time each of the data fragments in the sub-stream into the respective memory module (for example, into memory module 540-m1 associated with data interface 523-1) using a random-access write cycle 7WR1. One result of this embodiment is a real-time erasure-coding of the stream 7STR of data sets into the shared memory pool 512 as facilitated by the first erasure-coding interface 741-1 and multiple random-access write cycles 7WR1, 7WR2, 7WRk, each of which is associated with a data interface 523-1, 523-2, 523-k.

In an alternative embodiment to the system 740 just described to stream data resiliently into a shared memory pool 512, further the plurality of memory modules 540-m1, 540-m2, 540-mk are based on random-access-memory (RAM), and therefore the random-access write cycles 7WR1, 7WR2, 7WRk allow the writing to proceed at data rates that support the first compute element 700-c1 in writing the data sets 712-D1, 712-D2, after said conversion, at data rates that are limited only by the ability of the first compute element 700-c1 to communicate.

In one possible configuration of the alternative embodiment just described, further the random-access-memory 540-m1, 540-m2, 540-mk is a dynamic-random-access-memory (DRAM), and the first erasure-coding interface 741-1 is communicatively connected with the plurality of data interfaces 523-1, 523-2, 523-k using a switching network selected 550 from a group consisting of: (i) a non-blocking switching network, (ii) a fat tree packet switching network, and (iii) a cross-bar switching network. One result of this possible configuration is that any one of the data sets 712-D1, 712-D2 is written in the plurality of memory modules 540-m1, 540-m2, 540-mk no later than 5 (five)

microseconds from being put in said stream 7STR. In one embodiment, said random-access write cycles 7WR1, 7WR2, 7WRk are done simultaneously, as facilitated by the plurality of data interfaces 523-1, 523-2, 523-$k$ acting together, thereby facilitating said bound of 5 (five) microseconds.

In a second possible configuration of the alternative embodiment described above to the system 740 operative to stream data resiliently into a shared memory pool 512, further the random-access-memory 540-$m1$, 540-$m2$, 540-$mk$ is a dynamic-random-access-memory (DRAM), and the first erasure-coding interface 741-1 is communicatively connected with the plurality of data interfaces 523-1, 523-2, 523-$k$ using a switching network 550 selected from a group consisting of: (i) a non-blocking switching network, (ii) a fat tree packet switching network, and (iii) a cross-bar switching network. One result of this possible configuration is that a rate at which the data sets 712-D1, 712-D2 are being written is at least 100 Giga-bits-per second.

Figure 22A:
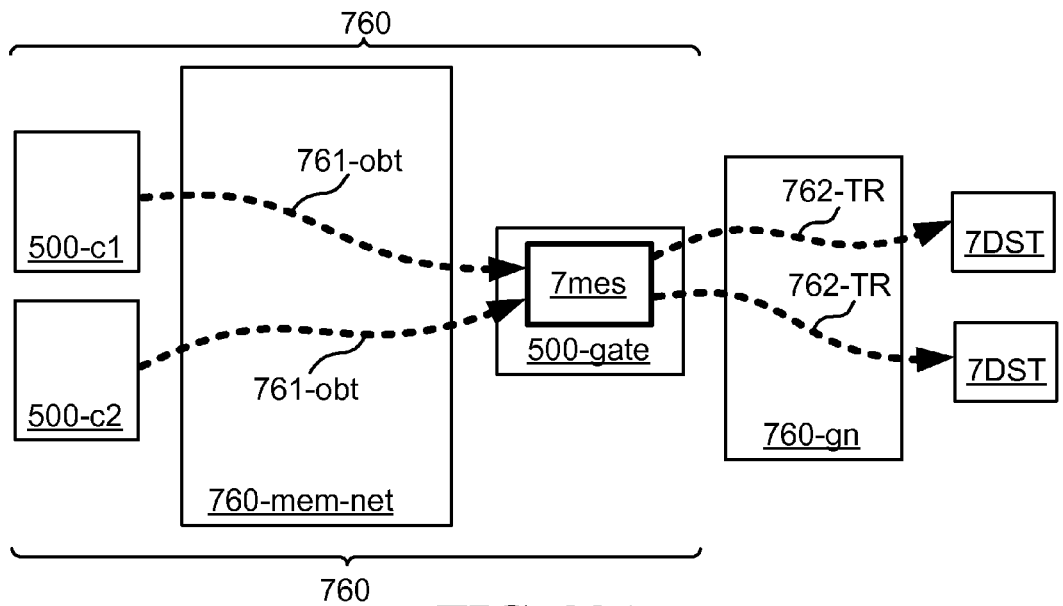
FIG. 22A illustrates one embodiment of a system operative to communicate, via a memory network, between compute elements and external destinations.

FIG. 22A illustrates one embodiment of a system 760 operative to communicate, via a memory network 760-mem-net, between compute elements 500-$c1$, 500-$c2$ and external destinations 7DST. The system includes a plurality of compute elements 500-$c1$, 500-$c2$, a memory network 760-mem-net, and a gateway compute node 500-gate. The gateway compute node 500-gate is configured to obtain 761-obt, from the plurality of compute nodes 500-$c1$, 500-$c2$, via the memory network 760-mem-net, using a first communication protocol adapted for low latency transmissions, a plurality of general communication messages 7mes intended for a plurality of destinations 7DST external to the system 760. The first communication protocol may be the same communication protocol used in a switching network 550 (FIG. 22B), or be another communication protocol adapted for low latency transmissions. The gateway compute node 500-gate is also configured to transmit 762-TR the plurality of general communication messages 7mes to said plurality of destinations 7DST external to the system, via a general communication network 760-gn, using a second communication protocol adapted for the general communication network 760-gn.

Figure 22B:
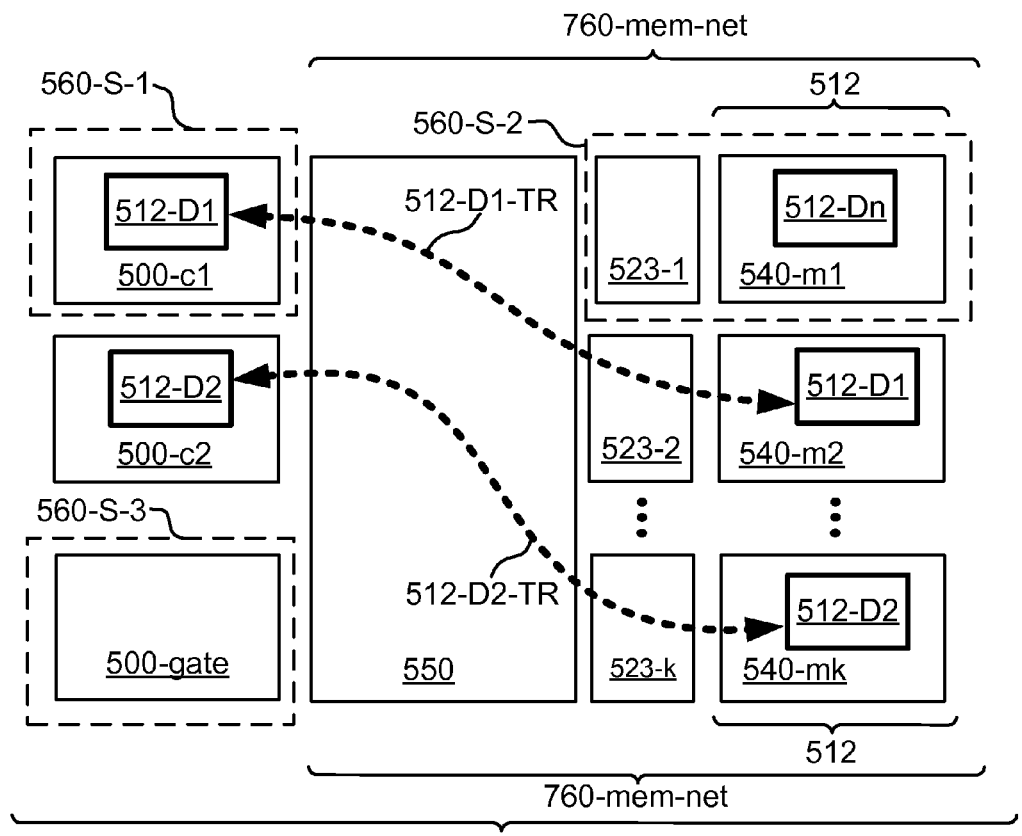
FIG. 22B illustrates one embodiment of a system operative to communicate, via a switching network, between compute elements and memory modules storing data sets.

FIG. 22B illustrates one embodiment of a system 760 operative to communicate, via a switching network 550, between compute elements 500-$c1$, 500-$c2$ and memory modules 540-$m1$, 540-$m2$, 540-$mk$ storing data sets 512-Dn, 512-D1, 512-D2, respectively. The system 760 includes a plurality of compute elements 500-$c1$, 500-$c2$, which may be in a separate server 560-S-1. FIG. 22B shows a first compute element 500-$c1$ in a separate server 560-S-1, and a second compute element 500-$c2$ which is not part of a separate server, but it is understood that multiple compute elements may be contained with a single separate server, or each compute element may be part of its own separate server, or none of the compute elements may be part of any separate server. The plurality of compute elements 500-$c1$, 500-$c2$ are configured to access 512-D1-TR, 512-D2-TR the plurality of data sets 512-D1, 512-D2, 512-Dn via the switching network 550 using the first communication protocol adapted for low latency transmissions, thereby resulting in the memory network 760-mem-net having a first latency performance in conjunction with the access. FIG. 22B illustrates one possible embodiment of the memory network 760-mem-net illustrated in FIG. 22A. In FIG. 22B, the memory network 760-mem-net includes a switching network 550 and a shared memory pool 512.

The shared memory pool includes the memory modules 540-$m1$, 540-$m2$, 540-$mk$, including the data sets 512-Dn, 512-D1, 512-D2, respectively. Data interfaces 523-1, 523-2, 523-3 are associated with the memory modules, 540-$m1$, 540-$m2$, 540-$mk$, respectively, and are communicatively connected with the switching network 550. FIG. 22B shows the first memory module 540-$m1$ and first data interface 523-1 included in a separate server 560-S-2, whereas the other memory modules 540-$m2$, 540-$mk$ and their respective data interfaces 523-2, 523-$k$, are not included in separate server 560-S-2 or in any other separate server. However, it is understood that any combination of separate servers is possible, including no servers for any of the memory modules or data interfaces, a single separate server for all of the memory modules and data interfaces, each pair of a memory module and its associated data interface in a separate module, or some pairs of memory modules and data interfaces in separate servers while other pairs are not in separate servers. The system 760 also includes the gateway compute node 550-gate, which, as shown in FIG. 22B, is in a separate server 560-S-3, but which in alternative embodiments may be part of another server with other element of the system 760, and in additional alternative embodiments is not placed in a separate server.

The system 760 achieves communication with the destinations 7DST via the memory network 760-mem-net, while simultaneously achieving, using the memory network 760-mem-net, the access 512-D1-TR, 512-D2-TR by the plurality of compute elements 500-$c1$, 500-$c2$ to the plurality of data sets 512-D1, 512-D2, 512-Dn in conjunction with the first latency performance associated with such access. One result is that the low latency between the compute elements 500-$c1$, 500-$c2$ and the data sets 512-D1, 512-D2, 512-Dn is preserved with no negative impact by communications between the compute element 500-$c1$, 500-$c2$ and the plurality of external destinations 7DST. The forwarded communication (transmission 762-TR) with the external destinations 7DST, that is, from the gateway compute node 500-gate to the external destinations 7DST, uses a second communication protocol that may or may not be low latency, since the latency of communication between the compute elements 500-$c1$, 500-$c2$ and the external destinations 7DST is generally less critical for system performance than latency between the compute elements 500-$c1$, 500-$c2$ and the data sets 512-Dn, 512-D2, 512-D2.

One embodiment is a system 760 operative to communicate with destinations 7DST external to the system 760 via a memory network 760-mem-net. In a particular embodiment, the system 760 includes a gateway compute node 500-gate, a plurality of compute elements 500-$c1$, 500-$c2$, and a memory network 760-mem-net. In a particular embodiment, the memory network 760-mem-net includes a shared memory pool 512 configured to store a plurality of data sets 512-D1, 512-D2, 512-Dn, and a switching network 550. Further, the plurality of compute elements 500-$c1$, 500-$c2$ are configured to access 512-D1-TR, 512-D2-TR the plurality of data sets 512-D1, 512-D2, 512-Dn via the switching network 550 using a first communication protocol adapted for low latency transmissions, thereby resulting in the memory network 760-mem-net having a first latency performance in conjunction with the access by the compute elements 500-$c1$, 500-$c2$. Further, the gateway compute node 500-gate is configured to obtain 761-obt, from the plurality of compute nodes 500-$c1$, 500-$c2$, via the memory network 760-mem-net, using the first communication protocol or another communication protocol adapted for low latency transmissions, a plurality of general communication messages 7mes intended for a plurality of destinations 7DST external to the system 760. The gateway compute node 500-gate is further configured to transmit 762-TR the plurality of general communication messages 7mes to the plurality of destinations 7DST external to the system 760, via a general communication network 760-gn, using a second communication protocol adapted for the general communication network 760-gn. One result is that the system 760 achieves the communication with the destinations 7DST via the memory network 760-mem-net, while simultaneously achieving, using the memory network, the access 512-D1-TR, 512-D2-TR to the plurality of data sets 512-D1, 512-D2, 512-Dn in conjunction with said first latency performance.

In a first alternative embodiment to the system just described, further the switching network 550 is a switching network selected from a group consisting of: (i) a non-blocking switching network, (ii) a fat tree packet switching network, and (iii) a cross-bar switching network, thereby facilitating the access 512-D1-TR, 512-D2-TR being simultaneous in conjunction with at least some of the plurality of data sets 512-D1, D2, 512-Dn, such that at least one 512-D1 of the data sets is accessed simultaneously with at least another 512-D2 of the data sets, thereby preventing delays associated with the access, thereby further facilitating the first latency performance in conjunction with the first communication protocol.

In a second alternative embodiment to the system described above, further the shared memory pool 512 includes a plurality of memory modules 540-m1, 540-m2, 540-mk associated respectively with a plurality of data interfaces 523-1, 523-2, 523-k communicatively connected with the switching network 550, in which the plurality of data sets 512-D1, 512-D2, 512-Dn are distributed among the plurality of memory modules, such that each data interface (e.g., 523-2) is configured to extract from its respective memory module (e.g., 540-m2) the respective data set (e.g., 512-D1) simultaneously with another of the data interfaces (e.g., 523-k) extracting from its respective memory module (e.g., 540-mk) the respective data set (e.g., 512-D2), and such that, as a result, at least one of the data sets (e.g., 512-D1) is transported to one of the compute elements (e.g., 500-c1), in conjunction with the access 512-D1-TR, simultaneously with at least another of the data sets (e.g., 512-D2) being transported to another of the compute elements (e.g., 500-c2) in conjunction with the access 512-D2-TR, thereby preventing delays associated with said access, thereby further facilitating the first latency performance in conjunction with the first communication protocol.

In a first possible configuration of the second alternative embodiment just described, further the memory modules 540-m1, 540-m2, 540-mk are based on random-access-memory (RAM), in which the extraction of the data sets 512-Dn, 512-D1, 512-D21 is performed using random access read cycles, thereby further facilitating the first latency performance in conjunction with said first communication protocol.

In a possible variation of the first possible configuration just described, further, the memory modules 540-m1, 540-m2, 540-mk are based on dynamic-random-access-memory (DRAM), in which the extraction of the data sets 512-Dn, 512-D1, 512-D2 is done in less than 2 (two) microseconds, and the access 512-D1-TR is done in less than 5 (five) microseconds.

In a second possible configuration of the second alternative embodiment described above, further the obtaining 761-obt includes writing, by one or more of the compute elements 500-c1, 500-c2, the general communication messages 7mes into one or more of the memory modules 540-m1, 540-m2, 540-mk, and the obtaining 761-obt includes also reading, by the gateway compute node 500-gate, the general communication messages 7mes from the memory modules 540-m1, 540-m2, 540-mk.

In a possible variation of the second possible configuration just described, further the writing includes sending, by one of the compute elements 500-c1, 500-c2 to one of the data interfaces 523-1, 523-2, 523-k, via the switching network 550, using a packetized message associated with the first communication protocol, one of the general communication messages 7mes, and the writing further include writing one of the general communication messages 7mes, by the specific data interfaces (e.g., 523-1), to the memory module (e.g., 540-m1) associated with that data interface (523-1), using a random-access write cycle.

In a possible option for the possible variation just described, reading further includes reading one of the general communication messages 7mes, by one of the data interfaces (e.g., 523-1), from the associated memory module (e.g., 540-m1), using a random-access read cycle; and reading also includes sending, by the specific data interface (e.g., 523-1), to the gateway compute node 500-gate, via the switching network 550, using a packetized message associated with the first communication protocol, said one of the general communication messages 7mes.

In a third alternative embodiment to the system 760 described above, further the first communication protocol is a layer two (L2) communication protocol, in which layer three (L3) traffic is absent from the memory network 760-mem-net, thereby facilitating the first latency performance, and the second communication protocol is a layer three (L3) communication protocol, in which layer three (L3) functionality is added by the gateway compute element 500-gate to the general communication messages 7mes, thereby facilitating the transmission 762-TR of general communication messages 7mes to those of the destinations 7DST that require layer three (L3) functionality such as Internet-Protocol (IP) addressing functionality.

In a fourth alternative embodiment to the system 760 described above, further the first communication protocol does not include a transmission control protocol (TCP), thereby facilitating the first latency performance, and the second communication protocol includes a transmission control protocol, in which relevant handshaking is added by the gateway compute element 500-gate in conjunction with the general communication messages 7mes when relaying the general communication messages to those destinations 7DST requiring a transmission control protocol.

In a fifth alternative embodiment to the system 760 described above, further the switching network 550 is based on Ethernet.

In one configuration of the fifth alternative embodiment just described, further the general communication network 760-gn is at least one network of the Internet.

In a sixth alternative embodiment to the system 760 described above, further the first latency performance is a latency performance in which the access 512-D1-TR, 512-D2-TR of any of the compute elements 500-c1, 500-c2 to any of the data sets 512-D1, 512-D2, 512-Dn is done in less than 5 (five) microseconds.

In a seventh alternative embodiment to the system described above, further the shared memory pool 512 is a key-value-store 621 (FIG. 13A), in which said plurality of data sets 512-D1, 512-D2, 512-Dn are a plurality of values 618-v1, 618-v2, 618-v3 (FIG. 13A) associated respectively with a plurality of keys 618-k1, 618-k 2, 618-k3 (FIG. 13A).

In one possible configuration of the seventh alternative embodiment just descried, the system further includes a shared input-output medium 685 (FIG. 13A) associated with a medium controller 685-mc (FIG. 13A), in which both the shared input-output medium 685 (FIG. 13A) and the medium controller 685-mc (FIG. 13A) are associated with one of the compute elements 500-c1 (interchangeable with the compute element 600-c1 illustrated in FIG. 13A). Further, the access 512-D1-TR, 512-D2-TR is a high priority key-value transaction 681-kv-tran (FIG. 13A). Further, one of the compute elements (e.g., 500-c1), in conjunction with the first communication protocol, is configured to initiate the high priority key-value transaction 681-kv-tran (FIG. 13A) in conjunction with the key-value-store 621 (FIG. 13A) via the shared input-output medium 685 (FIG. 13A). Further, the medium controller 685-mc (FIG. 13A), in conjunction with the first communication protocol, is configured to block lower priority transactions 686-tran (FIG. 13A) via the shared input-output medium 685 (FIG. 13A) during at least parts of the high priority key-value transactions 681-kv-tran (FIG. 13A), thereby preventing delays in the access 512-D1-TR, 512-D2-TR, thereby further facilitating said first latency performance.

In a possible variation of the possible configuration just described, further, the shared input-output medium 685 (FIG. 13A) is the switching network 550.

In an eighth alternative embodiment to the system described above, further the obtaining 761-obt includes sending by the compute elements 500-c1, 500-c2 the general communication messages 7mes to the gateway compute node 500-gate using a packetized transmission associated with the first communication protocol directly via the switching network 550.

In a ninth alternative embodiment to the system 760 described above, the system 760 further includes a first server 560-S-1, a second server 560-S-2, and a third server 560-S-3. Further, at least one of the compute nodes 500-c1, 500-c2 is located in the first server 560-S-1, at least a part of the shared memory pool 512 (such as a memory module 540-m1) is located inside the second server 560-S-2, the gateway compute node 500-gate is located inside the third server 560-S-3, and the switching network 550 is located outside the first, second, and third servers. In this ninth alternative embodiment, the memory network 760-mem-net facilitates memory disaggregation in the system 760.

Figure 23A:
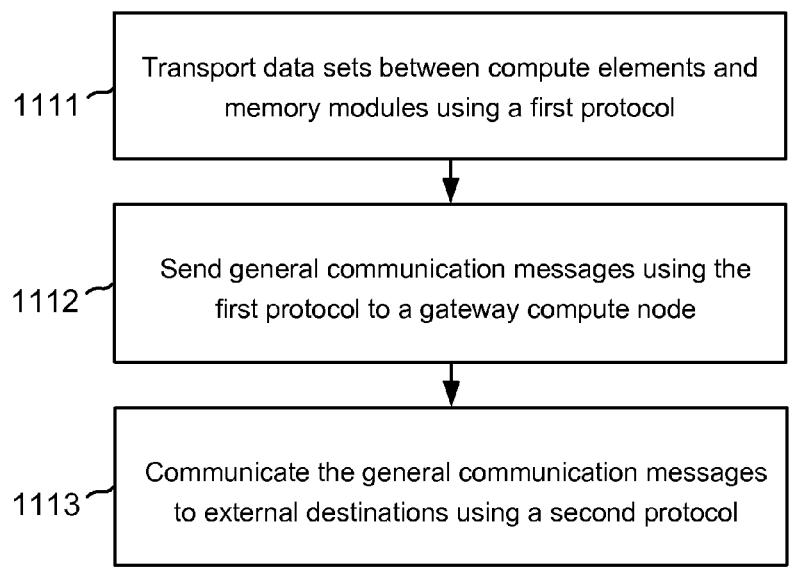
FIG. 23A illustrates one embodiment of a method for facilitating general communication via a switching network currently transporting a plurality of data elements associated with a plurality of memory transactions.

FIG. 23A illustrates one embodiment of a method for facilitating general communication via a switching network 550 currently transporting a plurality of data elements associated with a plurality of memory transactions. In step 1111, a plurality of data sets 512-D1, 512-D2, 512-Dn associated with a plurality of memory transactions 512-D1-TR, 512-D2-TR that are latency critical, are transported, via a switching network 550, using a first communication protocol adapted for low latency transmissions, between a first plurality of compute elements 500-c1, 500-c2 and a plurality of memory modules 540-m1, 540-m2, 540-mk. In step 1112, a plurality of general communication messages 7mes are sent 761-obt, via the switching network 550, by the plurality of compute elements 500-c1, 500-c2, respectively, to a gateway compute node 500-gate, using the first communication protocol or another communication protocol adapted for low latency transmissions, thereby keeping the switching network 550 in condition to continue facilitating the plurality of memory transactions 512-D1-TR, 512-D2-TR. In step 1113, the plurality of general communication messages 7mes are communicated, via a general communication network 760-gn, using a second communication protocol adapted for the general communication network 760-gn, by the gateway compute node 500-gate, on behalf of the plurality of compute elements 500-c1, 500-c2, to a plurality of external destinations 7DST.

Figure 23B:
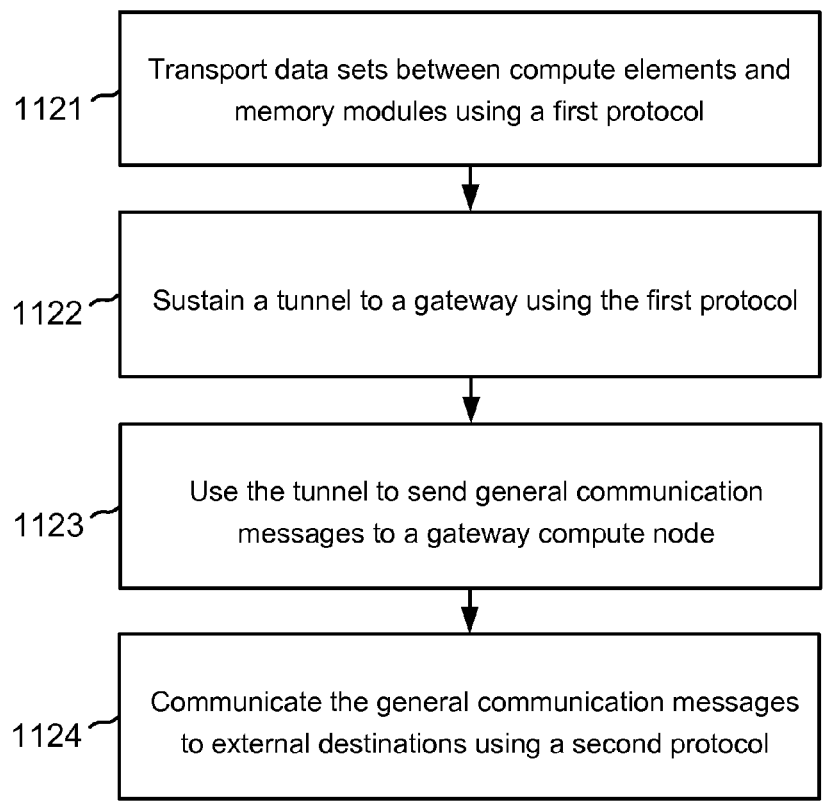
FIG. 23B illustrates an alternative embodiment of a method for facilitating general communication via a switching network currently transporting a plurality of data elements associated with a plurality of memory transactions.

FIG. 23B illustrates an alternative embodiment of a method for facilitating general communication via a switching network 550 currently transporting a plurality of data elements associated with a plurality of memory transactions. In step 1121, a plurality of data sets 512-D1, 512-D2, 512-Dn associated with a plurality of memory transactions 512-D1-TR, 512-D2-TR are transported, via a switching network 550, using a first communication protocol adapted for said switching network 550, between a first plurality of compute elements 500-c1, 500-c2 and a plurality of memory modules 540-m1, 540-m2, 540-mk. In step 1122, a plurality of communication tunnels respectively between said plurality of compute elements 500-c1, 500-c2 and a gateway compute node 500-gate are sustained, using the first communication protocol or another communication protocol adapted for the switching network 550, via the switching network 550. In step 1123, the plurality of tunnels is used by the plurality of compute elements 500-c1, 500-c2 to send a plurality of general communication messages 7mes to the gateway compute node 500-gate. In step 1124, the plurality of general communication messages 7mes are communicated 762-TR, via a general communication network 760-gn, using a second communication protocol adapted for the general communication network 760-gn, by the gateway compute node 500-gate, on behalf of the plurality of compute elements 500-c1, 500-c2, to a plurality of external destinations 7DST.

Figure 24A:
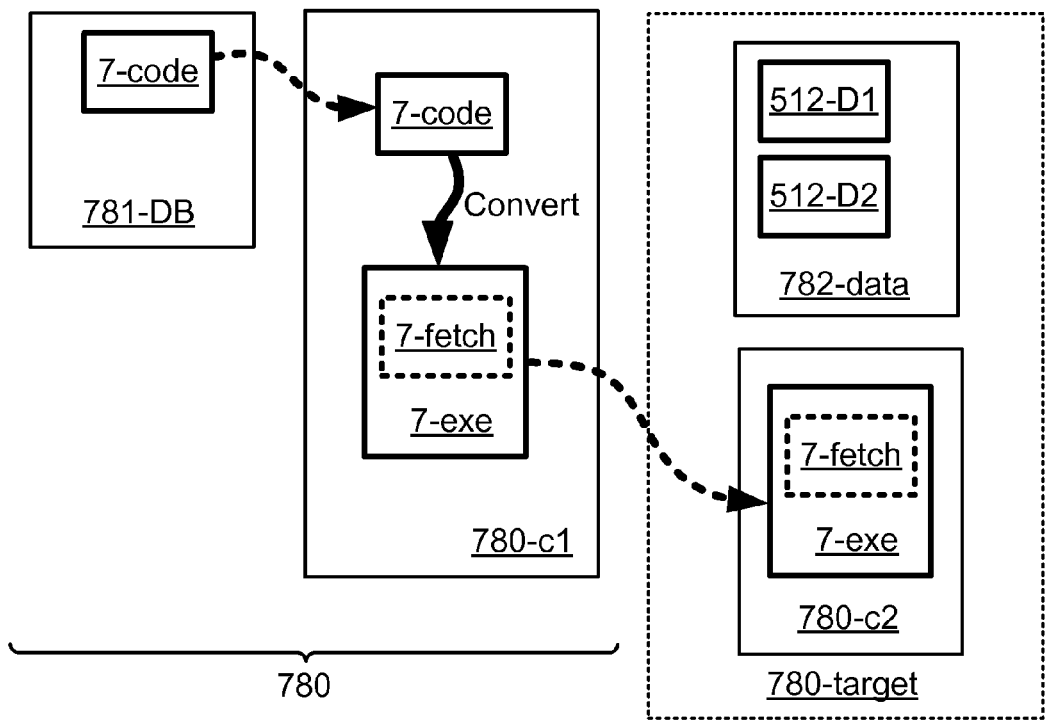
FIG. 24A illustrates one embodiment of a system configured to generate automatically a procedure to effectively combine fetching and processing of data sets.

FIG. 24A illustrates one embodiment of a first system 780 configured to generate automatically a procedure to effectively combine fetching and processing of data sets. The system 780 includes a first database 781-DB storing a code sequence 7-code describing an action to be performed by a target system 780-target separate from the first system 780. Such code sequence 7-code is converted by a first compute element 780-c1 into machine executable instructions 7-exe including a fetching sequence 7-fetch to be executed by the target system 780-target. According to the converted machine executable instructions 7-exe, a second compute element 780-c2 located in the target system 780-c2, will fetch the data set from a data source 782-data located in the target system 780-target, and then process such data set. The fetching-and-processing procedure to be executed by the second compute element 780-c2 is operative to fetch, by the second compute element 780-c2, from the data source 782-data, using the fetching sequence 7-fetch, a first data set 512-D1 belonging to the plurality of data sets. The fetch-and-processing procedure is operative also to conclude, by the second compute element 780-c2, that the first data set 512-D1 has not yet been received in the second compute element 780-c2 due to a first latency associated with the fetch. Therefore, in order to not lose time, and instead of processing the first data set 512-D1 that is not yet available to the second compute element, the second compute element 780-c2 fetches from the data source 782-data a second data set 512-D2 belonging to the plurality of data sets. The fetch-and-processing procedure is operative also to process, by the second compute element 780-c2, the first data set 512-D1 after such first data set 512-D1 has been received by the second compute element 780-c2 from the data source 782-data. As described herein the code sequence 7-code might be a source code, a high-level computer language code, or other data bits that are not immediately executable by a data processor until the code sequence 7-code has been converted into executable machine language.

Figure 24B:
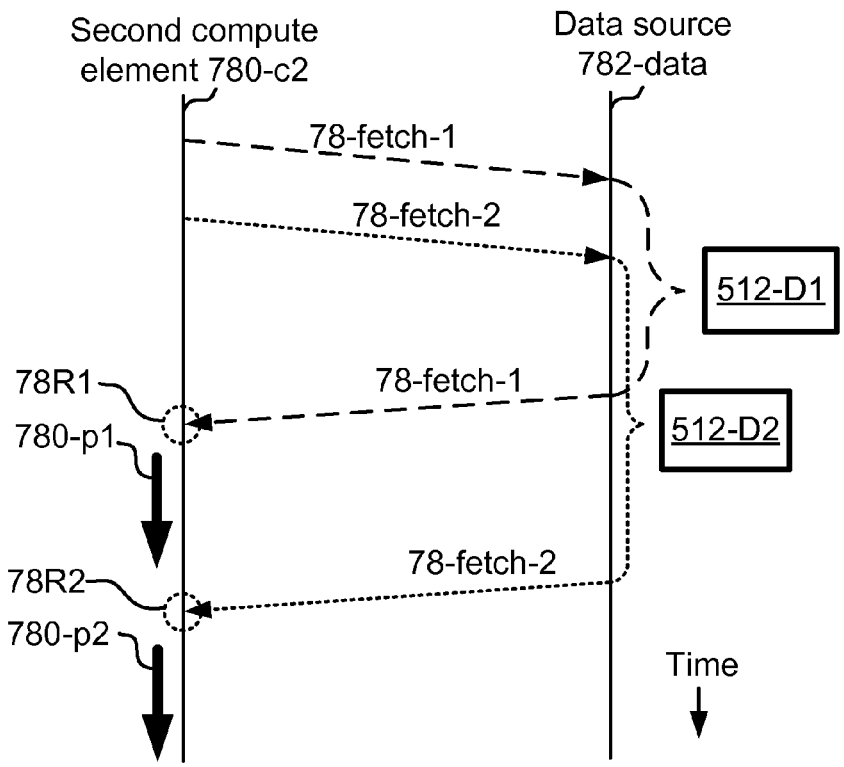
FIG. 24B illustrates one embodiment of a compute element operative to fetch and process data sets, including a depiction of the requests for data sets and the reception of data sets.

FIG. 24B illustrates one embodiment of a second compute element 780-c2 operative to fetch and process data sets 512-D1, 512-D2 according to the machine executable instructions 7-exe, including a depiction of the requests for data sets and the reception of data sets. The second compute element 780-c2, according to the machine executable instructions 7-exe, initiates a process to fetch 78-fetch-1 a first data set 512-D1 stored in the data source 782-data by sending a request to data source 782-data. There will be a latency associated with the receipt 78R1 by the second compute element 780-c2 of the first data set 512-1. During this latency, and in order not to lose time, the second compute element 780-c2, according to the machine executable instructions 7-exe, initiates another process to fetch 78-fetch-2 a second data set 512-D2 stored in the data source 782-data by sending another request to the data source 782-data. The first data set 512-D1 is then received 78R1 from data source 782-data in the second compute element 780-c2. The second compute element 780-c2, after it has received 78R1 the first data set 512-D1, processes 780-p1 this first data set 512-D1. Thereafter, the second compute element 780-c2 receives 78R2 the second data set 512-D2, and afterwards processes 780-p2 the second data set 512-D2, all according to the machine executable instructions 7-exe.

Figure 24C:
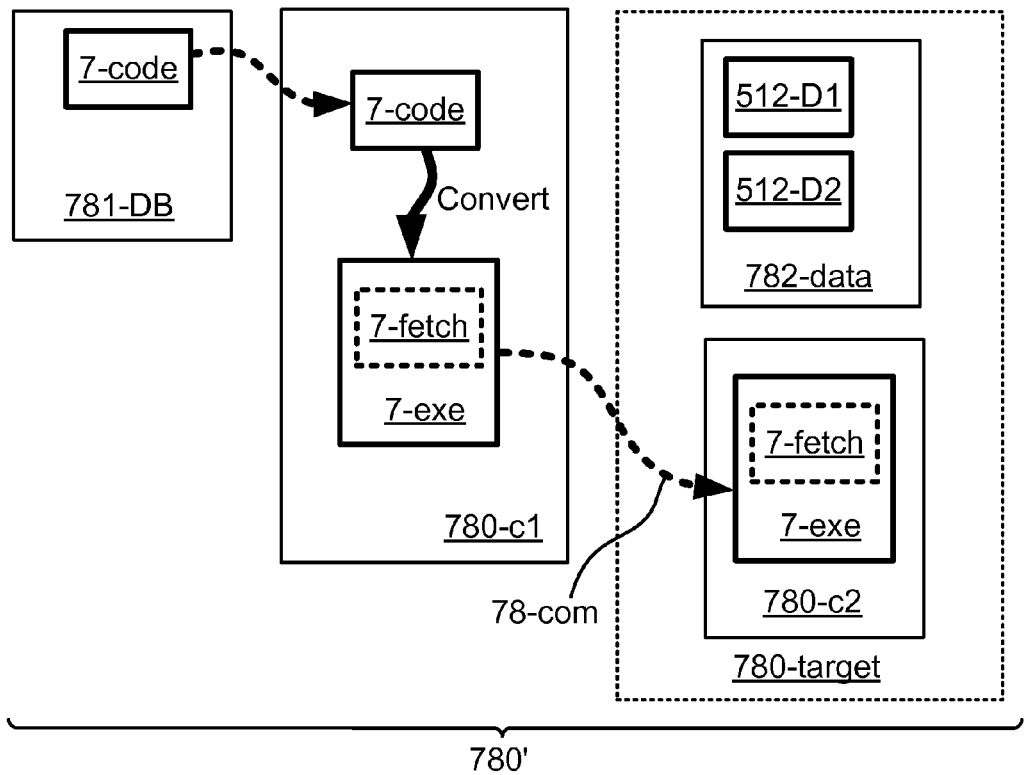
FIG. 24C illustrates one embodiment of a system configured to generate automatically a procedure to effectively combine fetching and processing of data sets, in which executable instructions are executed immediately upon their receipt by an executing compute element.

FIG. 24C illustrates one embodiment of a system 780' configured to generate automatically a procedure to effectively combine fetching and processing of data sets, in which executable instructions are executed immediately upon their receipt by an executing compute element 780-c2. This system includes (i) a first database 781-DB configured to store an executable code 7-code, (ii) a first compute element 780-c1 configured to convert the executable code 7-code into a sequence of machine executable instructions 7-exe and communicate 78-com the converted machine executable instructions 7-exe to a second compute element 780-c2, and (iii) a target system 780-target including a data source 782-data storing a plurality of data sets 512-D1, 512-D2, and a second compute element 780-c2 configured to execute a fetch-and-processing procedure. The structure of the system 780' illustrated in FIG. 24C is the same as the system 780 illustrated in FIG. 24A, except that the system 780' in FIG. 24C includes also, within the overall system 780', the target system 780-target. The system 780' in FIG. 24C operates in a manner similar to the system 780 and target system 780-target in FIG. 24A, except that in the system 780' of FIG. 24C the first compute element 780-c1 communicates 78-com the sequence of executable instructions 7-exe to the second compute element 780-c2 just before the second compute element 780-c2 starts executing the sequence of executable instructions 7-exe in the sequence illustrated in FIG. 24B as 78-fetch-1, 78-fetch-2, 78R1, 780-p1, 78R2, and 780-p2. Hence, both the structure and the execution of the embodiment illustrated in FIG. 24C are different than the structure and the execution of the embodiment illustrated in FIG. 24A.

One embodiment is a system 780 configured to generate automatically a procedure operative to effectively combine fetching and processing of data sets. In a particular embodiment, a first database 781-DB is configured to store a code sequence 7-code describing an action to be performed by a target system 780-target on each of a plurality of data sets 512-D1, 512-D2, in which the action for each of the plurality of data sets comprises (i) fetching the data set from a data source 782-data in the target system 780-target, and (ii) processing the data set fetched. Further, a first compute element 780-c1 has access to the first database 781-DB, and is configured to convert the code sequence 7-code into a sequence of executable instructions 7-exe includes a fetching sequence 7-fetch, in which the sequence of executable instructions 7-exe, when executed by a second compute element 780-c2 of the target system 780-target, results in a fetching-and-processing procedure. Further, the fetching-and-processing procedure is operative to fetch 78-fetch-1 from the data source 782-data, using said fetching sequence 7-fetch, a first data set 512-D1 belonging to the plurality of data sets. The fetching-and-processing procedure is further operative to conclude that the first data set 512-D1 has not yet been received 78R1 in the second compute element 780-c2 due to a first latency associated with the fetch 78-fetch-1, and therefore, in order to not lose time, and instead of processing 780-p1 the first data set 512-D1, to fetch 78-fetch-2 from the data source 782-data a second data set 512-D2 belonging to the plurality of data sets. The fetching-and-processing procedure is further configured to process 780-p1 the first data set 512-D1 after the first data set 512-D1 has been received 78R1 by the second compute element 780-c2.

In a first alternative embodiment to the system just described, the fetching-and-processing procedure is further operative to process 780-p2 the second data set 512-D2 after it has been received by the second compute element 780-c2.

In a possible configuration of the first alternative embodiment just described, the fetching-and-processing procedure is further operative to perform a sequence of additional fetches of additional ones of the plurality of data sets, until all of the data sets have been fetched. In one embodiment of this possible configuration, the additional fetches are done regardless of and asynchronously with reception of the additional ones of the plurality of data sets.

In one possible variation of the possible configuration just described, the fetching-and-processing procedure is further operative to process each of such additional ones of the plurality of data sets as they are received, until all of said data sets have been processed.

In a second alternative embodiment to the system described above to generate automatically a procedure operative to effectively combine fetching and processing of data sets, the system 780 (from FIG. 24A) further includes the target system 780-target and thus becomes a new system 780' (from FIG. 24B).

In a first possible configuration of the second alternative embodiment just described, further the conversion is performed by the first compute element 780-c1 just before the second compute element 780-c2 starts executing the sequence of machine executable instructions 7-exe.

In a possible variation of the first possible configuration of the second alternative embodiment just described, further the first compute element 780-c1 communicates 78-com the sequence of machine executable instructions 7-exe to the second compute element 780-c2 just before the second compute element 780-c2 starts executing the sequence of machine executable instructions 7-exe.

In a second possible configuration of the second alternative embodiment previously described, further the first compute element 780-c1 and the second compute element 780-c2 are a single compute element.

In a third alternative embodiment to the system described to generate automatically a procedure operative to effectively combine fetching and processing of data sets, further the code sequence 7-code is written in a high-level programming language, and the conversion of the code sequence 7-code into machine executable instructions 7-exe is a compilation process.

One embodiment is a system 780' configured to combine effectively fetching and processing of data sets according to an automatically generated procedure. In a particular embodiment, the system includes a data source 782-data configured to produce, store, or obtain a plurality of data sets 512-D1, 512-D2, a first compute element 780-c1, and a second compute element 780-c2 communicatively connected with said the source 782-data. The system also includes a code sequence 7-code describing an action to be performed on each of the plurality of data sets 512-D1, 512-D2, in which the action for each of the plurality of data sets comprises: (i) fetching the data set from the data source 782-data, and (ii) processing the data set fetched. Further, the first compute element 780-c1 is configured to convert the code sequence 7-code into a sequence of machine executable instructions 7-exe including a fetching sequence 7-fetch in which the sequence of machine executable instructions 7-exe, when executed by the second compute element 780-c2, results in a procedure that combines effectively the fetching of the data sets and the processing of the data sets. Further, the second compute element 780-c2 is configured to receive 78-com and execute the sequence of machine executable instructions 7-exe, thereby implementing the procedure for fetching and processing data sets. Further, the fetching-and-processing procedure is operative to fetch 78-fetch-1 from the data source 782-data, using the fetching sequence 7-fetch, a first data set 512-D1 belonging to the plurality of data sets. The fetching-and-processing procedure is further operative to conclude that the first data set 512-D1 has not yet been received 78R1 in the second compute element 780-c2 due to a first latency associated with the fetch 78-fetch-1, therefore, in order to not lose time, and instead of processing 780-p1 the first data set 512-D1, to fetch 78-fetch-2 from the data source 782-data a second data set 512-D2 belonging to the plurality of data sets. The fetching-and-processing procedure is further operative to process 780-p1 the first data set 512-D1 after it has been received 78R1 by the second compute element 780-c2.

In a first alternative embodiment to the system just described, the system further includes a switching network 550 (FIG. 10B), and the data source 782-data is a data interface 523-1, 523-2, 523-k (FIG. 10B) associated with a shared memory pool 512 (FIG. 10B), in which the data interface is communicatively connected with the second compute element 780-c2 via the switching network 550 (FIG. 10B). In this embodiment, the second compute element 780-c2 is interchangeable with the plurality of compute elements 500-c1, 500-c2, 500-cn illustrated in FIG. 10B.

In one possible configuration of the first alternative embodiment just described, further the plurality of data sets 512-D1, 512-D2 is a plurality of values 618-v1, 618-v2 (FIG. 11A) associated respectively with a plurality of keys 618-k1, 618-k 2 (FIG. 11A). In this embodiment, the switching network illustrated as element 550 in FIG. 10B is interchangeable with the switching network illustrated as element 650 in FIG. 11A. Further, it should be understood that the key value system depicted as element 621 in FIG. 11A may be implemented, in some embodiments, using the shared memory pool illustrated as element 512 in FIG. 10B. In this sense the key value system 621 and the shared memory pool 512 may be considered interchangeable in the context of the data sets represented by the values associated with the keys in the key value system.

In one possible variation of the first possible configuration just described, further the fetching sequence 7-fetch is operative to send to the data interface 523-1, 523-2, 523-k (FIG. 10B), via the switching network 650 (FIG. 11A), one of the keys 618-k1 (FIG. 11A) in the plurality of keys 618-k1, 618-k 2, 618-k3, thereby allowing the data interface to find one of the values 618-v1 (FIG. 11A) in the plurality of values 618-v1, 618-v2, 618-v3 that is associated with the one of the keys sent. The fetching sequence 7-fetch is further operative to receive from the data interface 523-1, 523-2, 523-k3, via the switching network 650, the one of the values found 618-v1.

In one possible option to the possible variation just described, further the first latency is associated with a time required for one of plurality of keys 618-k1, 618-k 2, 618-k3 to arrive at the data interface 523-1, 523-2, 523-k. The first latency is further associated with a time required for finding the one of the values 618-v1. The first latency is further associated with the time required for the reception by the second compute element 780-c2 of the one of the values 618-v1.

In a second alternative embodiment to the system described above that is configured to combine effectively fetching and processing of data sets according to an automatically generated procedure, further the data source 782-data is a shared input-output medium 685 (FIG. 13A). Further, the fetching 78-fetch-1, 78-fetch-2 in conjunction with the data sets 512-D1, 512-D2, is associated with a memory transaction or a key-value transaction 681-kv-tran (FIG. 13A) conveyed via the shared input-output medium 685 (FIG. 13A).

In a first possible configuration of the second alternative embodiment just described, further the first latency is associated with a delay in the fetching 78-fetch-1, 78-fetch-2 resulting from any general communication transaction 686-tran (FIG. 13A) conveyed via the shared input-output medium 685 (FIG. 13A).

In a second possible configuration of the second alternative embodiment described above, further the shared input-output medium 685 (FIG. 13A) is based on an interconnect element selected from a group consisting of: (i) peripheral-component-interconnect-express (PCIE) computer expansion bus, (ii) Ethernet, and (iii) Infiniband.

Figure 25:
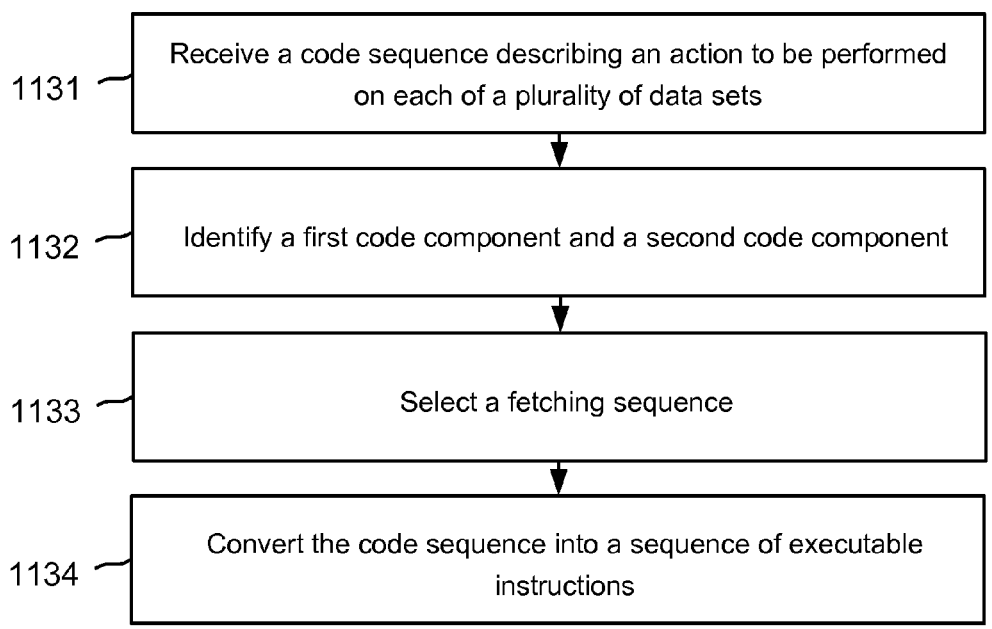
FIG. 25 illustrates one embodiment of a method for generating a sequence of executable instructions operative to combine effectively fetching and processing of data sets.

FIG. 25 illustrates one embodiment of a method for generating a sequence of executable instructions operative to combine effecting fetching and processing of data sets. In step 1131, a first compute element 780-c1 receives a code sequence 7-code describing an action to be performed on each of a plurality of data sets 512-D1, 512-D2, in which the action for each of the plurality of data sets comprises: (i) fetching the data set from a data source 782-data, and (ii) processing the data set fetched. In step 1132, the first compute element 780-c1 identifies, in the code sequence 7-code: a first code component describing the fetching (for example, a "get" instruction, or an equation having an argument that needs to be fetched from somewhere), and a second code component 780-c2 describing the processing to be done in conjunction with each data set fetched (for example, a mathematical expression acting on the argument). In step 1133, the first compute element 780-c1 selects, based on (i) the identification, and on (ii) at least a first characteristic of the data sets 512-D1, 512-D2, a fetching sequence suitable for the fetching. As just one example, if the data sets are key-value pairs, then a fetching of a value using a key is used. In step 1134, the first compute element converts the code sequence 7-code into a sequence of machine executable instructions 7-exe including at least one instance of the fetching sequence selected 7-fetch, in which the sequence of machine executable instructions 7-exe, when executed, results in a fetching-and-processing procedure. Further, the fetching-and-processing procedure is operative to have a second compute element 780-c1 fetch 78-fetch-1, from the data source 782-data, using the fetching sequence 7-fetch, a first data set 512-D1 belonging to the plurality of data sets 512-D1, 512-D2. The fetching-and-processing procedure is further operative to have the second compute element 780-c2 conclude that the first data set 512-D1 has not yet been received 78R1 in the second compute element 780-c2 due to a first latency associated with the fetch 78-fetch-1. Therefore, in order to not lose time, and instead of processing 780-p1 the first data set 512-D1, the procedure is operative to have the second compute element 780-c2 fetch 78-fetch-2 from the data source 782-data a second data set 512-D2 belonging to the plurality of data sets 512-D1, 512-D2. The fetching-and-processing procedure is further operative to have the second compute element 780-c2 process the first data set 512-D1 after it has been received 78R1 by the second compute element 780-c2.

In a first alternative embodiment to the method just described, further the second compute element's 780-c2 conclusion that the first data set 512-D1 has not yet been received 78R1 in the second compute element 780-c2 is a default condition when no interrupt associated with reception of the first data set 512-D1 has been detected by the second compute element 780-c2, thereby indicating to the second compute element 780-c2 that the first data set 512-D1 is not yet ready for processing by the second compute element 780-c2, thereby facilitating the fetching 78-fetch-2 of the second data set 512-D2 by the second compute element 780-c2.

In one configuration of the first alternative embodiment just described, further the second compute element's 780-c2 conclusion that the first data set 512-D1 has not yet been received 78R1 in the second compute element 780-c2 is a passive conclusion in which the fetching 78-fetch-2 of the second data set 512-D2 by the second compute element 780-c2 is done automatically unless interrupted by the interrupt.

In a second alternative embodiment to the method described above for generating a sequence of executable instructions operative to combine effecting fetching and processing of data sets, further the second compute element's 780-c2 conclusion that the first data set 512-D1 has not yet been received 78R1 in the second compute element 780-c2 is reached by second compute element's 780-c2 actively checking for reception 78R1 of the first data set 512-D1 by the second compute element 780-c2.

In a third alternative embodiment to the method described above for generating a sequence of executable instructions operative to combine effecting fetching and processing of data sets, further the code sequence 7-code is a loop in which each iteration of the loop describes an action to be performed on one of the data sets (for example, on the first data set 512-D1) of the plurality of data sets 512-D1, 512-D2 having an index associated with the iteration.

In a fourth alternative embodiment to the method described above for generating a sequence of executable instructions operative to combine effecting fetching and processing of data sets, further the code sequence 7-code describes a single instruction to be performed on multiple data, in which the single instruction is associated with the processing and the multiple data are associated with the plurality of data sets 512-D1, 512-D2. In some embodiments, the single instruction to be performed on multiple data is an SIMD instruction.

One embodiment is a system 780 configured to generate automatically a procedure operative to effectively combine fetching and processing of data sets. In a particular embodiment, a first database 781-DB is configured to store a code sequence 7-code describing an action to be performed by a target system 780-target on each of a plurality of data sets 512-D1, 512-D2, in which the action per each of the plurality of data sets comprises: (i) fetching the data set from a data source 782-data in the target system 780-target, and (ii) processing said data set fetched. Further, a first compute element 780-c1, having access to said first database 781-DB, is configured to convert the code sequence 7-code into a sequence of executable instructions 7-exe comprising a fetching sequence 7-fetch, in which said sequence of executable instructions 7-exe, when executed by a second compute element 780-c2 of the target system 780-target, results in a fetching-and-processing procedure. Further, the fetching-and-processing procedure is operative to fetch 78-fetch-1 from the data source 782-data, using said fetching sequence 7-fetch, a first data set 512-D1 belonging to the plurality of data sets. The fetching-and-processing procedure is further operative to initiate a second fetch 78-fetch-2 from the data source 782-data, using said fetching sequence 7-fetch, for a second data set 512-D2 belonging to the plurality of data sets, in which the initiation is done prior to processing 780-p1 of the first data set 512-D1 that has not yet been received 78R1 in said second compute element 780-c2 due to a first latency associated with the fetching 78-fetch-1 of the first data set 512-D1. The fetching-and-processing procedure is further configured to process 780-p1 the first data set 512-D1 after the first data set 512-D1 has been received 78R1 by the second compute element 780-c2.

Figure 26:
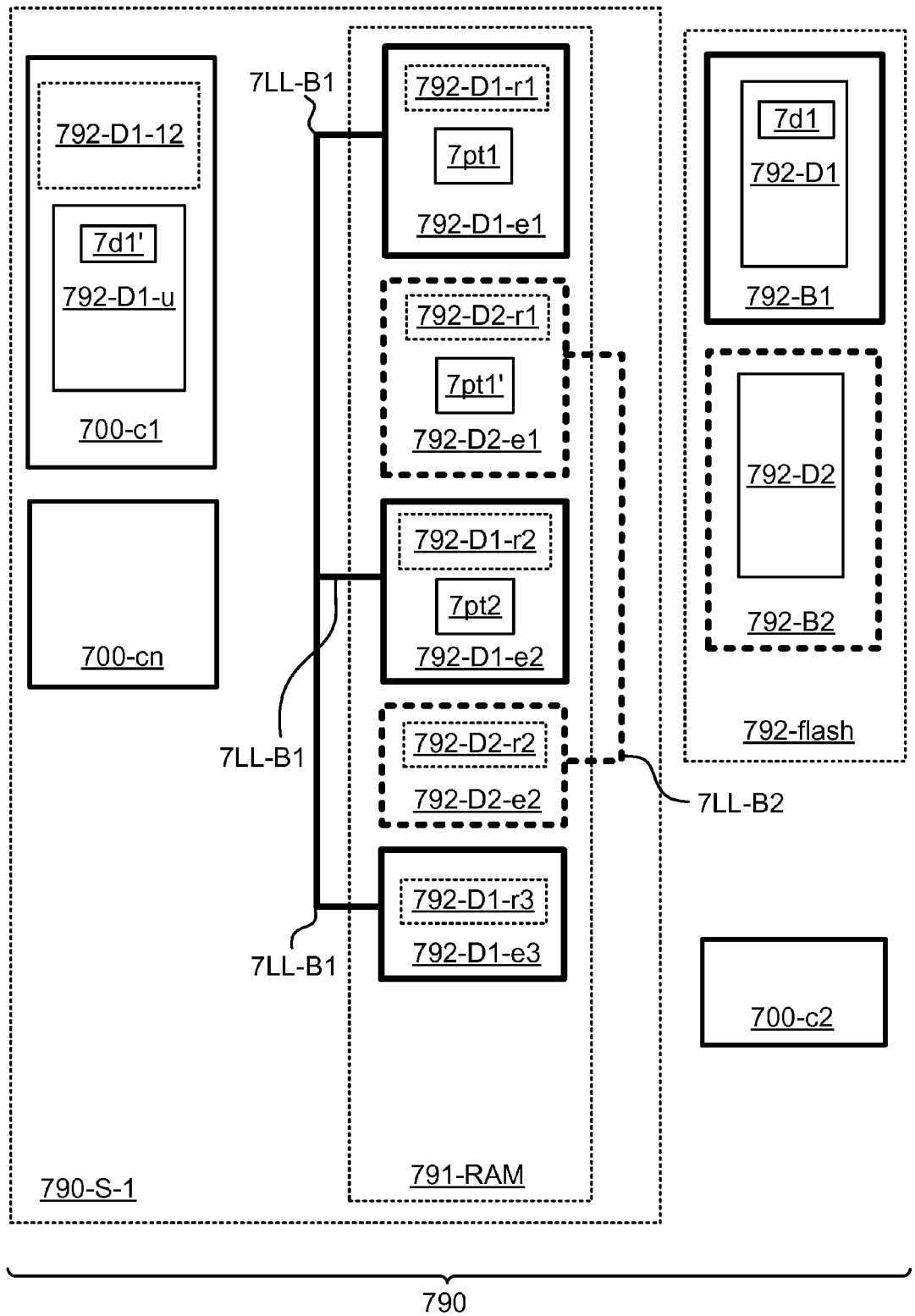
FIG. 26 illustrates one embodiment of a system using a plurality of linked lists for keeping track of changes to be made in data sets currently stored in a flash memory.

FIG. 26 illustrates one embodiment of a system 790 using a plurality of linked lists for keeping track of changes to be made in data sets currently stored in a flash memory. As shown in FIG. 26, the system 790 includes a first server 790-S-1 that includes a first compute element 700-c1, and a first random access memory 791-RAM. In some embodiments, the first compute element 700-c1 includes a data set 792-D1-u that has been updated using some aggregated change requirements, and an updated first data 7d1' which has been extracted by the first compute element 700-c1 from the updated data set 792-D1-u. In some embodiments, the first compute element 700-c1 includes also a plurality of changes to be made to a particular data set, where such changes have been accumulated into an aggregated requirement 792-D1-12, which might be the particular aggregated change requirements that is used to create the updated data set 792-D1-u. In some embodiments, the first server 790-S-1 includes an additional compute element 700-cn, and further there may be three or more compute elements within the first server 790-S-1.

As shown in FIG. 26, the first server 790-S-1 includes also a random access memory 791-RAM, which itself includes multiple change requirements each of which relates to a particular data set with a memory block of a flash memory 792-flash. The various change requirements are accumulated in the random access memory 791-RAM in the order in which they are received, such that requirement 792-D1-r1 is received before 792-D1-r2, which is received before 792-D1-r3. These three change requirements all relate to a first data set 792-D1 in a first memory block 792-B1 within the flash memory 792-flash. However, the receipt of change requirements for a single data set will almost certainly be interspersed with other change requirements related to different data sets. As shown in FIG. 26, change requirement 792-D1-r1 related to data set 792-D1 is received first, then change requirement 792-D2-r1 related to data set 792-D2 in second memory block 792-B2, then change requirement 792-D1-r2 related to the first data set 792-D1, then 792-D2-r2 related to the second data set 792-D2, and finally change requirement 792-D1-r3 related to the first data set 792-D1.

The change requirements in random access memory 791-RAM are executable as data entries, where change requirement 792-D1-r1 is executable as data entry 792-D1-e1, then 792-D2-r1 as 792-D2-e1, 792-D1-r2 as 792-D1-e2, 792-D2-r2 as 792-D2-e2, and 792-D1-r3 as 792-D1-e3. However, in order to perform the execution of changes, each executable data entry related to a particular data set is linked as part of a linked list from an earlier data entry to a later data entry. As shown in FIG. 26, a first linked list 7LL-B1, represented by a boldfaced line segment to the left of 791-RAM, links a first executable data entry 792-D1-e1 related to a first data set 792-D1 to a second executable data entry 792-D1-e2 related to the first data set 792-D1, and also the second executable data entry 792-D1-e3 to a third executable data entry 792-D1-e3 related to the first data set 792-D1. In the embodiment illustrated in FIG. 26, the linkages are made through pointers. So, for example, 792-D1-e1 has pointer 7pt1 which points at the physical address for 792-D1-e2, and 792-D1-e2 has pointer 7pt2 which points at the physical address for 792-D1-e3. In this way, all of the executable data entries for a specific data set are linked, and all of the data entries may be executed when the memory block holding the specific data set is rewritten. For example, all of the data entries for the first data set 792-D1 are executed when the first memory block 792-B1 is rewritten.

Similarly, a second linked list 7LL-B2 shown in FIG. 26 links all of the executable data entries related to the second data set 792-D2. In particular, executable data entry 792-D2-e1 related to the second data set 792-D2 is linked via pointer 7pt1' to executable entry 792-D2-e2 also related to the second data set 792-D2. When sufficient changes for the second data set 792-D2 have been accumulated, the second data block 792-B2 is rewritten with all of these changes. Second linked list 7LL-B2 is illustrated by the dotted line segment to the right of 791-RAM, connecting the dotted-line boxes with the executable data entries 792-D2-e1 and 792-D2-e2 for the second data set 792-D2.

It should be noted that the last entry illustrated for the first data set 792-D1, which is entry 792-D1-e3, does not have a pointer, and the reason is that there is nothing to point to, because this is the last entry for that data set. If, at some time, a fourth change request is made for the first data set 792-D1, then that fourth change request will generate a fourth executable data entry, at which time a pointer will be added from the third entry 792-D1-e3 to the new fourth executable data entry. Similarly, there is no pointer for executable data entry 792-D2-e2 related to the second data set 792-D2, because this is the last executable data entry for the second data set 792-D2, but if, at some time, a third change request is made for second data set 792-D2, then that third change request will generate a third executable data entry, at which time a pointer will be added from the second entry 792-D2-e2 to the new third executable data entry.

The system 790 illustrated in FIG. 26 includes a flash memory 792-flash, which includes multiple memory blocks 792-B1, 792-B2. As shown, first memory block 792-B1, delineated by a boldfaced rectangle, includes a first data set 792-D1, whereas second memory block 792-B2, delineated by a rectangle created by a dotted line, includes a second data set 792-D2. It will be understood that there may be thousands, millions, or even billions of memory blocks with the flash memory 792-flash, and that each memory block will hold one or more specific data sets. Also, periodically the flash memory 792-flash receives a request to read some data held in the flash memory. For example, as shown in FIG. 26, a request has been received to read some piece of data 7d1 of the first data set 792-D1 stored in the first memory block 792-B1. In response to such request, the first data set 792-D1 is sent to the requesting compute element 700-c1, which uses the aggregated change requirements 792-D1-12 to update the first data set 792-D1 into an updated data set 792-D1-u, which then extracts the required data 7d1' from the updated data set 792-D1-u. It will be understood that the extracted first data 7d1' may or may not be identical to the original data requested 7d1. If the aggregated change requirements 792-D1-12 do not impact the specific data requested by the first compute element 700-c1, then the original requested data 7d1 and the extracted data after update 7d1' will be exactly the same. If on the other hand, the aggregated change requirements 792-D1-12 do impact the specific data requested by the first compute element 700-c1, then the original requested data 7d1 will be different from the extracted data after updated 7d1', where the first compute element 700-c1 wishes to read and does read the updated data 7d1'.

As illustrated in FIG. 26, the system 790 includes also a second compute element 700-c2, which executes many of the actions further described herein.

The embodiment illustrated in FIG. 26 is illustrative only and non-limiting, in that alternative structures could achieve the same or similar effects. In alternative embodiments, there may be multiple servers. For example, a first server may include only compute elements 700-c1 and 700-cn, whereas a second server may include the random access memory 791-RAM, a third server may include the flash memory 792-flash, and a fourth memory may include a second compute element 700-c2. As a different example, the first server 790-S-1 may include, in addition to the compute elements 700-c1, 700-cn and random access memory 791-RAM as shown, also the flash memory 792-flash. As a different example, the first server 790-S-1 may include only the compute elements 700-c1, 700-cn, whereas a second server could include the random access memory 791-RAM and the flash memory 792-flash. Many different embodiments are conceivable, in which one or more servers include various ones of the compute elements 700-c1, 700-c2, 700-cn, the random access memory 791-RAM, and the flash memory 792-flash. The various alternative structures of the system 790 may also be used to implement the various methods described below.

The embodiment illustrated in FIG. 26 is illustrative and non-limiting, in that alternative pieces of hardware may execute some of the functions described above as being executed by some exemplary piece of hardware. For example, as described above, the first compute element 700-c1 identifies linked lists, traverses linked lists to accumulate change requirements, makes requests to change a data set, updates a data set, and responds to requests by extracting data from an updated data set. Different ones of these functions may be executed by different hardware, so for example, one compute element might identify, traverse, and make requests, but a separate compute element might update data sets and respond to requests by extracting data. As another example, FIG. 26 shows a single compute element 700-c2 executing functions in the flash memory 792-flash, but these functions may be executed by multiple compute elements.

One embodiment is a system 790 operative to use a plurality of linked lists 7LL-B1, 7LL-B2 for keeping track of changes to be made in data sets currently stored in a flash memory 792-flash. In one particular embodiment, the system 790 includes a first compute element 700-c1, and a first flash memory 792-flash comprising a plurality of blocks 792-B1, 792-B2 currently storing respectively a plurality of data sets 792-D1, 792-D2. The system further includes a first random access memory 791-RAM comprising a plurality of linked lists 7LL-B1, 7LL-B2 associated respectively with the plurality of blocks 792-B1, 792-B2, in which each linked list (for example, 7LL-B1) records a respective plurality of requirements 792-D1-r1, 792-D1-r2 to change the data set 792-D1 of the respective block 792-B1, and in which the plurality of requirements 792-D1-r1, 792-D1-r2 were made by the first compute element 700-c1 and have been accumulated 792-D1-e1, 792-D1-e2 in the linked list 7LL-B1 since the data set 792-D1 was last written to the respective block 792-B1. Further, the system 790 is configured to identify one of the linked lists (such as 7LL-B1) as being currently in condition to be used for updating the respective block 792-B1. The system 790 is further configured to traverse the linked list 7LL-B1 identified in order to accumulate all the respective plurality of requirements 792-D1-r1, 792-D1-r2 into an aggregated requirement 792-D1-12 to change the data set 792-D1 of the respective block 792-B1. The system is further configured to change the data set 792-D1 of the respective block 792-B1 by performing a flash block write to the respective block 792-B1 in conjunction with the aggregated requirement 792-D1-12.

In a first possible alternative to the system just described, further each of the linked lists (such as 7LL-B1) comprises a plurality of data entries 792-D1-e1, 792-D1-e2 associated respectively with the plurality of requirements 792-D1-r1, 792-D1-r2, in which each of the data entries (e.g. 792-D1-e1) is linked to the next data entry 792-D1-e2 using a pointer 7pt1 to an address associated with the next such data entry 792-D1-e2, except that the most recent data entry does not yet have a pointer because it has no subsequent data entry to point to.

In a first possible configuration to the first possible alternative just described, further the traversing of the linked list 7LL-B1 is done by performing a random access read cycle to each of the data entries (for example, to 792-D1-e2) in the linked list using the addresses as referenced by the pointers 7pt1, 7pt2. As an example, pointer 7pt1 stores the address associated with data entry 792-D1-e2, such that data entry 792-D1-e2 can be randomly accessed using the address stored in pointer 7pt1. Entry 792-D1-e1 can be randomly accessed using an address stored in a "head" pointer (not depicted) associated with block 792-B1, in which such a head pointer points to the beginning of the linked list 7LL-B1 and is thus used to start such traversing of the linked list 7LL-B1.

In a second possible configuration to the first possible alternative described above, further all the pluralities of data entries (as illustrated in FIG. 26, first plurality 792-D1-e1, 792-D1-e2, 792-D1-e3 and second plurality 792-D2-e1, 792-D2-e2) are stored in a single memory space (for example, a successive series of addresses) within the first random access memory 791-RAM, thereby resulting is the plurality of linked lists 7LL-B1, 7LL-B2 being interlaced across the single memory space, but such that the traversing is possible for each of the linked lists using the pointers (for example, 7pt1 and 7pt2 for linked list 7LL-B1).

In a second possible alternative to the system for using a plurality of linked lists as described above, further identification of one of the linked lists 7LL-B1, 7LL-B2 as being currently in condition to be used for updated its respective block is based on the number of requirements in the plurality of requirements.

In one possible configuration of the second possible alternative just described, further the linked list that is identified is the linked list associated with the highest number of requirements, as compared with the other linked lists.

In a third possible alternative to the system for using a plurality of linked lists as described above, further each of the plurality of requirements (for example, 792-D1-r1, 792-D1-r2, 792-D1-r3 for a first data set 792-D1) is stored in the respective linked list (in this case, first linked list 7LL-B1) as part of a sequence of new data to be written to specific address in the respective block 792-B1.

In one possible configuration of the third possible alternative just described, further the identification is based on the length of the sequences of new data, such that the identification is made when the sequence of new data exceeds a certain threshold length.

In a fourth possible alternative to the system for using a plurality of linked lists as described above, the system 790 further comprises additional compute elements 700-cn, each of which is operative to make additional requirements to change the data set of at least some of the blocks, and in which each such additional compute element necessitates an additional plurality of linked lists in support of the additional requirements, thereby resulting is several pluralities of linked lists. Further, the first random access memory is a shared memory pool (512 in FIG. 10B) which is large enough to store the several pluralities of linked lists.

In a fifth possible alternative to the system for using a plurality of linked lists as described above, the system 790 further comprises a second compute element 700-c2 associated with the first flash memory 792-flash, and a switching network (550 in FIG. 10B). Further, the first random access memory 791-RAM is located in a first server 790-S-1 together with the first compute element 700-c1. Further, the first compute element 700-c1 is configured to perform the identification, traversing, and accumulation in conjunction with the first random access memory 791-RAM. Further, the first compute element 700-c1 is additionally configured to send the aggregated requirement 792-D1-12 accumulated to the second compute element 700-c2 via said switching network (550 in FIG. 10B). Further, the second compute element 700-c2 is configured to receive the aggregated requirement 792-D1-12 and perform the changing using the aggregated requirement received.

In a sixth possible alternative to the system for using a plurality of linked lists as described above, the system 790 further comprises additional compute elements 700-cn, in which the first requirement 792-D1-r1 is made by the first compute element 700-c1, and the second requirement 792-D1-r2 is made by one of the additional compute elements 700-cn, such that the link list 7LL-B1 aggregates requirements from multiple sources.

One embodiment is a system 790 operative to use a plurality of linked lists for keeping track of changes to be made in data sets currently stored in a flash memory 792-flash. In one particular embodiment, the system includes a first compute element 700-c1, and a first flash memory 792-flash comprising a plurality of blocks 792-B1, 792-B2 currently storing respectively a plurality of data sets 792-D1, 792-D2. The system 790 further includes a first random access memory 791-RAM comprising a plurality of linked lists 7LL-B1, 7LL-B2 associated respectively with the plurality of blocks 792-B1, 792-B2, in which each linked list (for example, first linked list 7LL-B1) records a respective plurality of requirements (for first linked list 7LL-B1, the requirements 792-D1-r1, 792-D1-r2) to change the data set 792-D1 of the respective block 792-B1, in which the plurality of requirements 792-D1-r1, 792-D1-r2 were made by the first compute element 700-c1 and have been accumulated 792-D1-e1, 792-D1-e2 in the linked list 7LL-B1 since the data set 792-D1 was last written to the respective block 792-B1. Further, the first compute element 700-c1 is configured to make a new requirement 792-D1-r3 to change the data set 792-D1 of one of the blocks 792-B1. Further, the system 790 is configured to link the new requirement 792-D1-r3 to the linked list 7LL-B1 associated with said one of the blocks 792-B1, thereby appending the new requirement 792-D1-r3 to the plurality of requirements 792-D1-r1, 792-D1-r2 already associated with the one of the blocks 792-B1.

In a possible alternative to the system just described, further each of the listed links (for example, first listed link 7LL-B1) comprises a plurality of data entries 792-D1-e1, 792-D1-e2 associated respectively with the plurality of requirements 792-D1-r1, 792-D1-r2, in which each of the data entries (for example, 792-D1-e1 for change requirement 792-D1-r1) is linked to the next data entry (in this example, to 792-D1-e2) using a pointer (in this example, 7pt1) to an address associated with the next such data entry, except that the most recent data entry does not yet have a pointer because it has no subsequent data entry to point to. Further, the new change requirement 792-D1-r3 is associated with a new data entry 792-D1-e3. Further, the linkage of the new requirement 792-D1-r3 to the linked list 7LL-B1 is performed by: (i) adding, in conjunction with the most recent data entry 792-D1-e2, and using a first random access write cycle, a new pointer 7pt2 to a new address to be associated with the new data entry 792-D1-e3, and (ii) adding, using a second random access write cycle, at the new address, the new data entry 792-D1-e3.

In a possible configuration of the possible alternative just described, further the linkage is performed in less than one microsecond, as a result of the first random access write cycle and the second random access write cycle being both random access cycles performed in conjunction with the first random access memory 791-RAM.

In a first possible variation of the possible configuration just described, further the first random access memory 791-RAM is a first dynamic random access memory.

In a second possible variation of the possible configuration just described, further the new data entry 792-D1-e3 is less than 500 (five hundred) bytes in length, thereby allowing low latency data writes in conjunction with small data objects such as the new data entry.

In a third possible variation of the possible configuration just described, further the most recent data entry 792-D1-e2 is located using a "tail" pointer (not depicted) associated with block 792-B1, and thus preventing a need to traverse the linked list 7LL-B1 in order to locate the most recent data entry 792-D1-e2, thereby facilitating said linkage being performed in less than one microsecond.

One embodiment is a system 790 operative to use a plurality of linked lists 7LL-B1, 7LL-B2 for keeping track of changes to be made in data sets currently stored in a flash memory. In one particular embodiment, the system includes a first compute element 700-c1, and a first flash memory 792-flash comprising a plurality of blocks 792-B1, 792-B2 currently storing respectively a plurality of data sets 792-D1, 792-D2. The system 790 further includes a first random access memory 791-RAM comprising a plurality of linked lists 7LL-B1, 7LL-B2 associated respectively with the plurality of blocks 792-B1, 792-B2, in which each linked list (for example, first linked list 7LL-B1) records a respective plurality of requirements (for first linked list 7LL-B1, requirements 792-D1-r1, 792-D1-r2) to change the data set (in this example, first data set 792-D1) of the respective block (in this example, 792-B1 for first data set 792-D1), in which the plurality of requirements (in this example, 792-D1-r1, 792-D1-r2) were made by the first compute element 700-c1 and have been accumulated (in this example, 792-D1-e1, 792-D1-e2) in the linked list (in this example, 7LL-B1) since the data set (in this example, 792-D1) was last written to the respective block (in this example 792-B1). Further, the system 790 is configured to: (i) receive a first request to read a first data 7d1 associated with the data set (in this example, first data set 792-D1) stored in one of the blocks (in this example, 792-B1), (ii) read the data set (in this example, 792-D1) from the one of the blocks (in this example, 792-B1), and (iii) traverse the linked list (in this example, first linked list 7LL-B1) associated with the one of the blocks (in this example, 792-B1) in order to accumulate all the respective plurality of change requirements (in this example, 792-D1-r1, 792-D1-r2) into an aggregated requirement 792-D1-12 to change the data set (in this example, first data set 792-D1) of the one of the blocks (in this example, first memory block 792-B1). Further, the system 790 is configured: (i) to update the data set read (in this example, first data set 792-D1), using the aggregated requirement 792-D1-12, into an updated data set 792-D1-u, and (ii) respond to the first request by extracting said first data 7d1' from the updated data set 792-D1-u. In the embodiment herein described, it is understood that first data 7d1' extracted may or may not be different than the original first data set 7d1, depending on whether the aggregated requirement 792-D1-12 has changed the first data 7d1. If the aggregated requirement 792-D1-12 has changed the specific data that has been requested, then 7d1' will be different and more updated than original and not-yet-updated 7d1. If aggregated requirement 792-D1-12 has not changed the specific data that has been requested, then 7d1' will be the same as 7d1, since the original data would not be changed by a rewrite of the memory block in which the original data 7d1 is located.

Figure 27:
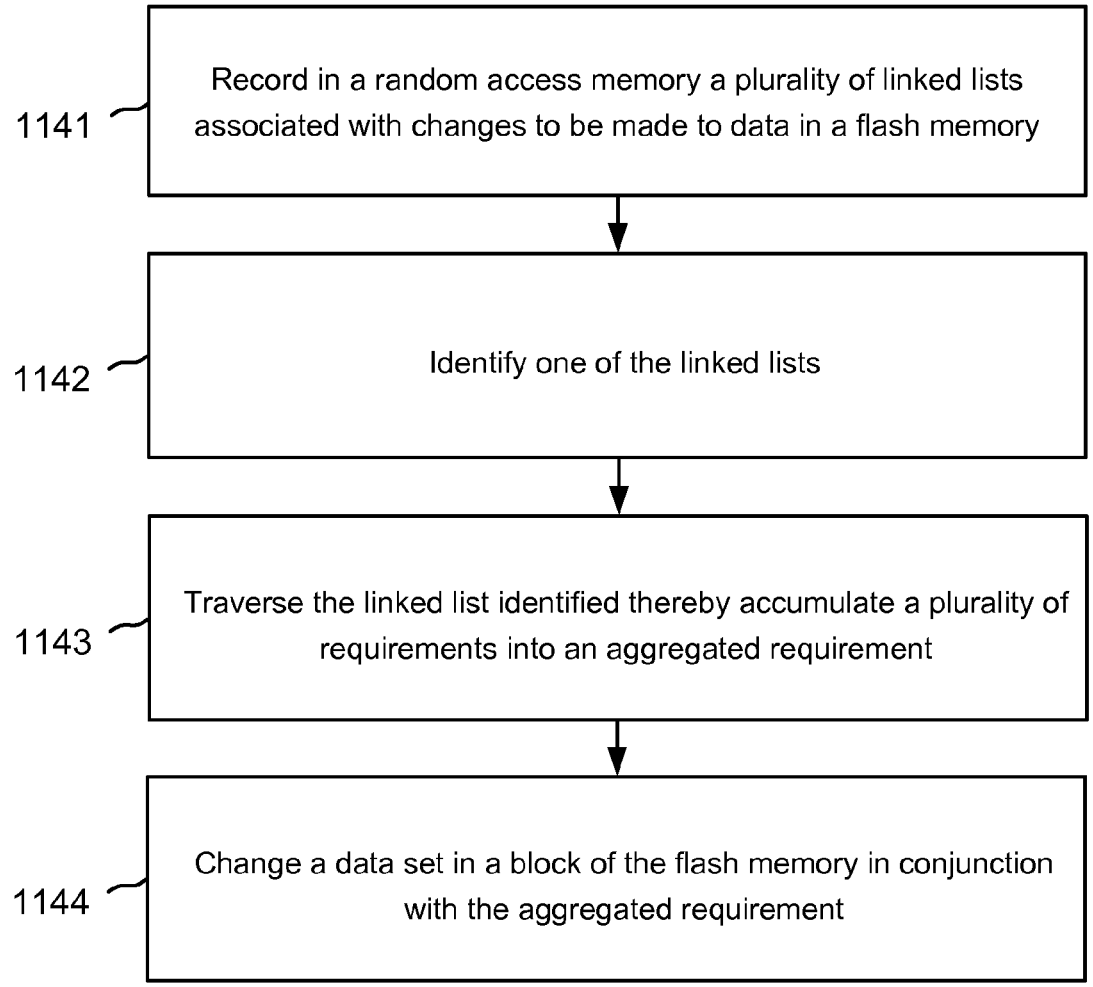
FIG. 27 illustrates one embodiment of a method for keeping track of changes to be made in data sets currently stored in a flash memory.

FIG. 27 illustrates one embodiment of a method for using as plurality of linked lists for keeping track of changes to be made in data sets stored in a flash memory. In step 1141, a system 790 records, in a first random access memory 791-RAM, a plurality of linked lists 7LL-B1, 7LL-B2 associated respectively with a plurality of blocks 792-B1, 792-B2 of a first flash memory 792-flash, in which each linked list (e.g. 7LL-B1) is a record of a respective plurality of requirements 792-D1-r1, 792-D1-r2 to change a data set 792-D1 associated with the respective block 792-B1. In step 1142, the system 790 identifies one of the linked lists (such as, for example 7LL-B1) as being in condition to be used for updating the respective block (such as block 792-B1). In step 1143, the system 790 traverses the linked list identified 7LL-B1 in order to accumulate all the respective plurality of requirements 792-D1-r1, 792-D1-r2 into a single aggregated requirement 792-D1-12 to change the data set 792-D1 of the associated block 792-B1. In step 1144, the system 790 changes the data set 792-D1 of the respective block 792-B1 by performing a flash block write to the respective block 792-B1 in conjunction with said aggregated requirement 792-D1-12. In some embodiments, steps 1141, 1142 and 1143 are executed by a first compute element 700-c1 within the system 790, and step 1144 is executed by a second compute element 700-c2 within the system 790. It is understood, however, that different compute elements may perform the various steps, or there may be more than two compute elements performing the steps, or a compute element may be combined with other hardware elements, such as, solely for example, the first compute element 700-c1 with the random access memory 791-RAM, or the second compute 700-c2 with the random access memory 791-RAM, or the second compute element 700-c2 with the flash memory 792-flash.

Figure 28A:
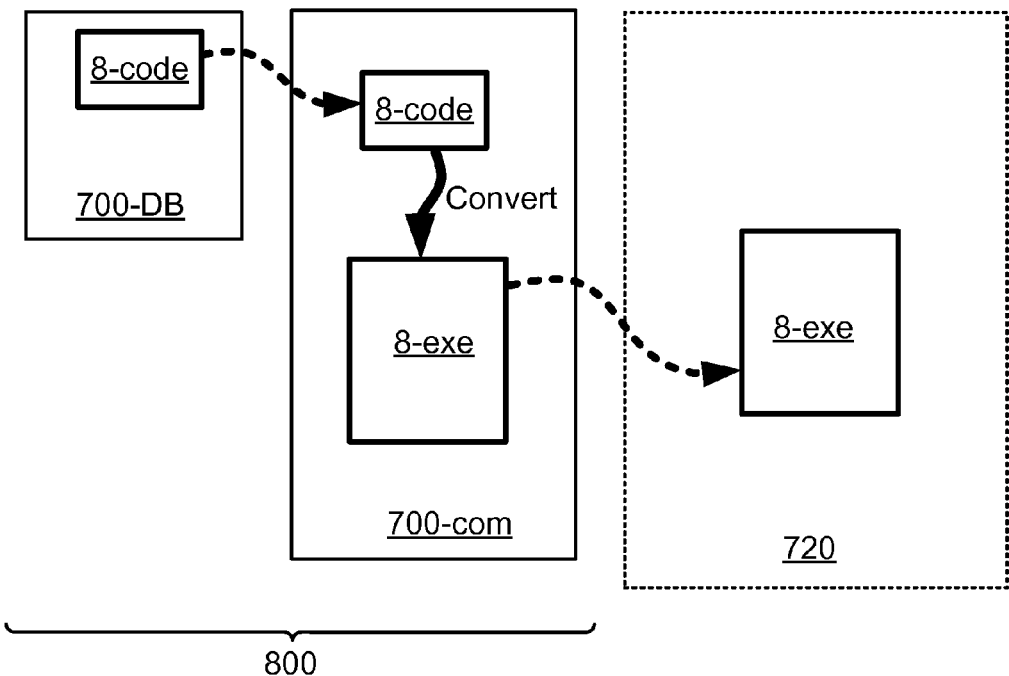
FIG. 28A illustrates one embodiment of a system configured to generate automatically a procedure operative to distributively process a plurality of data sets stored on a plurality of memory modules of a target system, in which the target system is not part of the configured system.

FIG. 28A illustrates one embodiment of a system 800 configured to generate automatically a procedure operative to distributively process a plurality of data sets stored on a plurality of memory modules. In one particular form of such embodiment, the system includes a first database 700-DB configured to store a code sequence 8-code describing an action to be performed by a target system 720 (FIG. 28A, FIG. 17A) on each of a plurality of data sets 712-D1, 712-D2, 712-D3, 712-D4, 712-D5, 712-D6 (FIG. 17A) stored in a shared memory pool 512 (FIG. 17A) in the target system 720, where such shared memory pool 512 includes a plurality of memory modules 540-m1, 540-m2, 540-mk (FIG. 17A) associated respectively with a plurality of data interfaces 523-1, 523-2, 523-k (FIG. 17A) all belonging to the target system 720, in which the action per each of the plurality of data sets 712-D1, 712-D2, 712-D3, 712-D4, 712-D5, 712-D6 comprises: (i) fetching the data set from the shared memory pool 512 in the target system 720, and (ii) processing the data set fetched. The system 800 illustrated in FIG. 28 includes also a first compute element 700-com, having access to the first database 700-DB, and configured to convert the code sequence 8-code into a sequence of executable instructions 8-exe, in which the sequence of executable instructions 8-exe, when executed simultaneously by each of a plurality of compute elements 700-c1, 700-c2, 700-cn (FIG. 17A) of the target system 720, results in a distributive fetching-and-processing procedure. By such procedure, each of the compute elements sends a plurality of data requests (for example, 7DR1, 7DR3, FIG. 17D) to at least some of the plurality of data interfaces (for example, 523-1, 523-2, FIG. 17D), in which each of the data requests is sent to one of the plurality of data interfaces. Also by such procedure, each of the compute elements receives, as a response to the specific data requests it has sent (for example, to data request 7DR1 in FIG. 17D), from the data interface receiving the data request (for example, 523-1, FIG. 17D, FIG. 17E), a reply (for example, 7SR1, FIG. 17E) including a specific one of the data sets (for example, 712-D1, FIG. 17E) stored in the memory module (for example, 540-m1, FIG. 17E) associated with the data interface (for example, 523-1, FIG. 17D, FIG. 17E). Also by such procedure, each of the compute elements processes the data sets it has received. The sending of data requests, receiving responses with data sets, and processing of data sets received, are continued by each of the plurality of compute elements 700-c1, 700-c2, 700-cn (FIG. 17A), until a first condition is met.

In one embodiment, the conversion of the code sequence 8-code is a compilation process resulting in the sequence of executable instructions 8-exe, following which the sequence of executable instructions is distributed among the plurality of compute elements and data interfaces, thereby facilitating the distributive fetching-and-processing procedure. The first compute element 700-com, which may act as a complier performing the conversion, needs to recognize certain aspects of the data sets and certain aspects of how the data sets are to be processed, before such first compute element continues with the conversion of code sequence 8-code into the distributive fetching-and-processing procedure. As an example, the first compute element 700-com recognizes, by inspecting the code sequence 8-code, that (i) the plurality of data sets 712-D1, 712-D2, 712-D3, 712-D4, 712-D5, 712-D6 (FIG. 17A) are stored across the plurality of memory modules 540-m1, 540-m2, 540-mk (FIG. 17A) associated respectively with the plurality of data interfaces 523-1, 523-2, 523-k (FIG. 17A), that (ii) any one of said plurality of data sets can be processed before or after any other of said plurality of data sets, and therefore that (iii) each fetch for one of the data sets can be done by any one of the plurality of compute elements in conjunction with the data interface associated with the memory module storing that data set, asynchronously with any other of the fetches done by any other of the plurality of compute elements in conjunction with any one of the data interfaces. The abovementioned recognition may guarantee that the action described by code sequence 8-code may indeed be successfully implemented by the distributive fetching-and-processing procedure.

In the embodiment illustrated in FIG. 28A, the target system 720 and all of its components are not part of the base system 800, although the base system 800 and the target system 720 are in communicative contact. In the embodiment illustrated in FIG. 28A, after the code source 8-code has been converted by the first compute element 700-com into the sequence of executable instructions 8-exe, the sequence of executable instructions 8-exe may be executed immediately by the target system 720, or, alternatively, may continue in an executable but not yet executed state, until some time, or condition, or event occurs to have the target system 720 execute the sequence of executable instructions 8-exe.

Figure 28B:
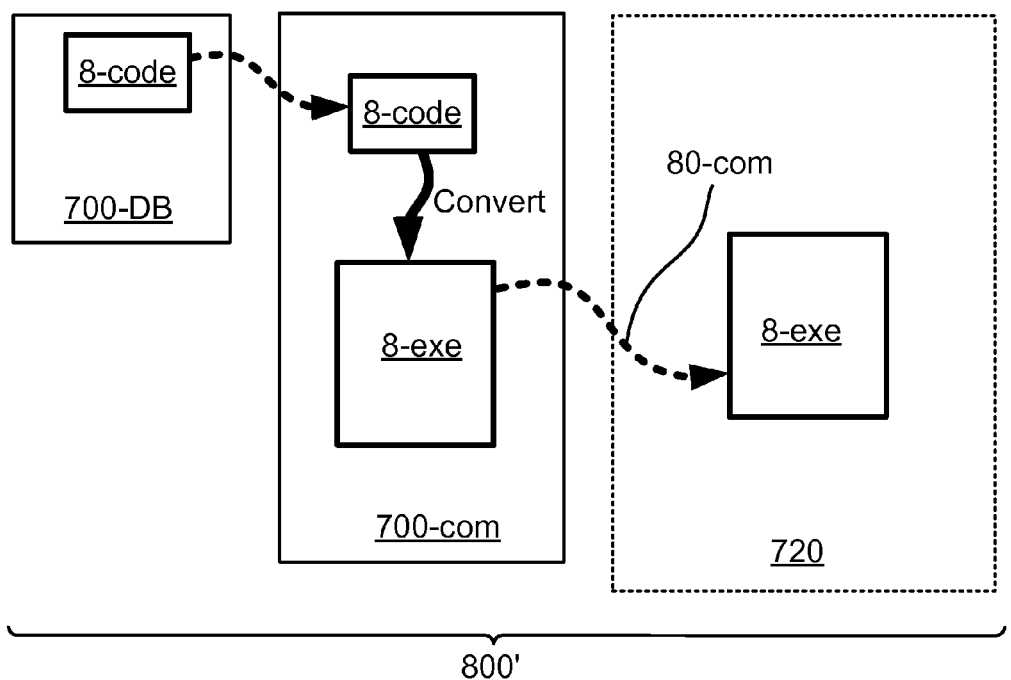
FIG. 28B illustrates one embodiment of a system configured to generate automatically a procedure operate to distributively process a plurality of data sets stored on a plurality of memory modules of a target system, in which the target system is part of the configured system.

FIG. 28B illustrates one embodiment of a system 800' configured to generate and execute a procedure operative to distributively process a plurality of data sets stored on a plurality of memory modules. System 800', unlike system 800 in FIG. 28A, includes a target system 720 (FIG. 28B, FIG. 17A) as part of the base system 800'. Therefore, the system 800' includes the target system 720, which itself includes a shared memory pool 512 (FIG. 17A) with a plurality of memory modules 540-m1, 540-m2, 540-mk (FIG. 17A) associated respectively with a plurality of data interfaces 523-1, 523-2, 523-k (FIG. 17A), and a plurality of compute elements 700-c1, 700-c2, 700-cn (FIG. 17A). The system 800' includes also a first database 700-DB configured to store a code sequence 8-code describing an action to be performed by the target system 720 on each of a plurality of data sets 712-D1, 712-D2, 712-D3, 712-D4, 712-D5, 712-D6 (FIG. 17A) stored in the shared memory pool 512, in which the action per each of the plurality of data sets comprises: (i) fetching the data set from the shared memory pool 512 (FIG. 17A), and (ii) processing said data set fetched. The system 800' includes also a first compute element 700-com, having access to the first database 700-DB, and configured to convert the code sequence 8-code into a sequence of executable instructions 8-exe.

In the system 800' illustrated in FIG. 28B, the plurality of compute elements 700-c1, 700-c2, 700-cn is configured to execute simultaneously the sequence of executable instructions 8-exe, resulting in a distributive fetching-and-processing procedure. By this procedure, each of the plurality of compute elements (for example, 700-c1, FIG. 17D) sends a plurality of data requests (for example, 7DR1, 7DR3, FIG. 17D) to at least some of the plurality of data interfaces (for example, 523-1, 523-2, FIG. 17D), in which each of the data requests is sent to one of the plurality of data interfaces (for example, 7DR1 sent to 523-1, and 7DR3 sent to 523-2). Also by this procedure, each of the plurality of compute elements (for example, 700-c1, FIG. 17D) receives, as a response to each of the data requests (for example, to data request 7DR1 in FIG. 17D), from the data interface receiving the data request (for example, 523-1, FIG. 17D, FIG. 17E), a reply (for example, 7SR1, FIG. 17E) including a specific one of the data sets (for example, 712-D1, FIG. 17E) stored in the memory module (for example, 540-m1, FIG. 17E) associated with the data interface (for example, 523-1, FIG. 17D, FIG. 17E). Also by this procedure, each of the compute elements processes the data sets it has received in response to the requests for data it has sent to one or more data interfaces. The sending of data requests, receiving responses with data sets, and processing of data sets received, are continued by each of the plurality of compute elements 700-c1, 700-c2, 700-cn, until a first condition is met.

It is noted that in stating that the sequence of executable instructions 8-exe is executed simultaneously by each of the plurality of compute elements 700-c1, 700-c2, 700-cn (FIG. 17A) of the target system 720, it is understood that each of the compute elements 700-c1, 700-c2, 700-cn (FIG. 17A) runs an instance of the sequence of executable instructions 8-exe, in which each such instance runs asynchronously to the other instances of the sequence of executable instructions 8-exe. One of the compute elements 700-c1, 700-c2, 700-cn (FIG. 17A) can run any part of the sequence of executable instructions 8-exe, while another of the compute elements 700-c1, 700-c2, 700-cn (FIG. 17A) can run any other part of the sequence of executable instructions 8-exe at any given time.

One embodiment is a system 800 configured to generate automatically a procedure operative to distributively process a plurality of data sets stored on a plurality of memory modules. In one particular form of such embodiment, the system 800 includes a first database 700-DB configured to store a code sequence 8-code describing an action to be performed by a target system 720 (FIG. 28A, FIG. 17A) on each of a plurality of data sets 712-D1, 712-D2, 712-D3, 712-D4, 712-D5, 712-D6 (FIG. 17A) stored in a shared memory pool 512 (FIG. 17A), where the shared memory pool 512 includes a plurality of memory modules 540-m1, 540-m2, 540-mk (FIG. 17A) associated respectively with a plurality of data interfaces 523-1, 523-2, 523-k (FIG. 17A) all belonging to the target system 720, in which the action per each of the plurality of data sets includes: (i) fetching the data set from the shared memory pool 512 in the target system 720, and (ii) processing said data set fetched. The system 800 also includes a first compute element 700-com, having access to the first database 700-DB, and configured to convert the code sequence 8-code into a sequence of executable instructions 8-exe, in which the sequence of executable instructions 8-exe, when executed simultaneously by each of a plurality of compute elements 700-c1, 700-c2, 700-cn (FIG. 17A) of the target system 720, results in a distributive fetching-and-processing procedure. By this procedure, each compute element (for example, 700-c1) sends a plurality of data requests (for example, 7DR1, 7DR3, FIG. 17D) to at least some of the plurality of data interfaces (for example, 523-1, 523-2, FIG. 17D), in which each of the data requests is sent to one of the plurality of data interfaces. Also by this procedure, the compute element (for example, 700-c1) receives, as a response to each of the data requests (for example, to data request 7DR1 in FIG. 17D), from the data interface receiving the data request (for example, 523-1, FIG. 17D, FIG. 17E), a reply (for example, 7SR1, FIG. 17E) including a specific one of the data sets (for example, 712-D1, FIG. 17E) stored in the memory module (for example, 540-m1, FIG. 17E) associated with the data interface (for example, 523-1, FIG. 17D, FIG. 17E). Also by this procedure, the compute element (for example, 700-c1) processes the data sets it has received. The sending of data requests, receiving of responses, and processing of data sets received, by each of the plurality of compute elements 700-c1, 700-c2, 700-cn, continues until a first condition is met.

In a first possible alternative to the system just described, the specific one of the data sets (for example, 712-D1, FIG. 17E) is selected by the data interface (for example, 523-1, FIG. 17E) from the memory module (for example, 540-m1, FIG. 17E) such as to guarantee that the specific one of the data sets has not previously been sent in conjunction with previous replies made by the data interface 523-1 (FIG. 17E).

In one possible configuration of the first possible alternative just described, further the sequence of executable instructions 8-exe, when executed simultaneously by each of the plurality of data interfaces 523-1, 523-2, 523-k (FIG. 17A) of the target system 720 (FIG. 28A, FIG. 17A), facilitates the selections, the replies, and therefore the guarantee.

It is noted that in stating that the sequence of executable instructions 8-exe is executed simultaneously by each of the plurality of data interfaces 523-1, 523-2, 523-k (FIG. 17A), it is understood that each of the data interfaces 523-1, 523-2, 523-k (FIG. 17A) runs an instance of the sequence of executable instructions 8-exe, in which each such instance runs asynchronously to the other instances of the sequence of executable instructions 8-exe. One of the data interfaces 523-1, 523-2, 523-k (FIG. 17A) can run any part of the sequence of executable instructions 8-exe, while another of the data interfaces 523-1, 523-2, 523-k (FIG. 17A) can run any other part of the sequence of executable instructions 8-exe at any given time.

It is further noted that in stating that the sequence of executable instructions 8-exe is executed simultaneously by each of the plurality of compute elements 700-c1, 700-c2, 700-cn (FIG. 17A) and that the sequence of executable instructions 8-exe is also executed simultaneously by each of the plurality of data interfaces 523-1, 523-2, 523-k (FIG. 17A), it is understood that:

(i) either the sequence of executable instructions 8-exe is run by both the plurality of compute elements 700-c1, 700-c2, 700-cn (FIG. 17A) and the plurality of data interfaces 523-1, 523-2, 523-k (FIG. 17A), such that the plurality of compute elements 700-c1, 700-c2, 700-cn (FIG. 17A) run a first portion of the sequence of executable instructions 8-exe that is dedicated for the compute elements, while the plurality of data interfaces 523-1, 523-2, 523-k (FIG. 17A) run a second portion of the sequence of executable instructions 8-exe that is dedicated for the data interfaces, (ii) or the sequence of executable instructions 8-exe actually comprises a first set of executable instructions intended for the plurality of compute elements 700-c1, 700-c2, 700-cn (FIG. 17A), and a second set of executable instructions intended for the plurality of data interfaces 523-1, 523-2, 523-k (FIG. 17A).

In a second possible configuration of the first possible alternative described above, further each of the data interfaces 523-1, 523-2, 523-*k* (FIG. 17A) is configured to receive some of the plurality of data requests (for example, 7DR1, 7DR2, FIG. 17B) from any one of the plurality of compute elements (for example, from 700-*c*1, 700-*c*2, FIG. 17B). Each of the data interfaces is configured also to identify from the data sets of the respective memory module (for example, 540-*m*1, FIG. 17B) the ones of the data sets that were not yet served (for example, 712-D1, 712-D2, FIG. 17B), thereby facilitating the guarantee. Each of the data interfaces is configured also to serve, as the reply (for example, 7SR1, 7SR2, FIG. 17C) to the data requests (for example, 7DR1, 7DR2, FIG. 17B), the data sets identified (for example, 712-D1, 712-D2, FIG. 17B, FIG. 17C). Each of the data interfaces is also configured to keep track of the ones of the data sets already served, thereby further facilitating the guarantee.

In a first possible variation of the second possible configuration just described, further the data requests (for example, 7DR1, 7DR2, FIG. 17B), according to the sequence of executable instructions 8-exe, do not specify certain ones of the plurality of data sets to be served 712-D1, 712-D2, 712-D3, 712-D4, 712-D5, 712-D6 (FIG. 17A), such that the identification and keeping track is the only way by which said plurality of data interfaces 523-1, 523-2, 523-*k* (FIG. 17A) know which one of the plurality of data sets 712-D1, 712-D2, 712-D3, 712-D4, 712-D5, 712-D6 (FIG. 17A) is to be specifically served to the one of the plurality of compute elements 700-*c*1, 700-*c*2, 700-*cn* (FIG. 17A) making the data request, and such that the identification and keeping track is the only way of making sure, by the target system 720 (FIG. 28A, FIG. 17A), that none of the data sets 712-D1, 712-D2, 712-D3, 712-D4, 712-D5, 712-D6 is served more than once, thereby facilitating the guarantee.

In a second possible variation of the second possible configuration described above, further the sequence of executable instructions 8-exe, when executed simultaneously by each of the plurality of data interfaces 523-1, 523-2, 523-*k* (FIG. 17A) of the target system 720 (FIG. 28A, FIG. 17A), facilitates the identification, the serving, and the keeping track.

In a second possible alternative to the above described system configured to generate automatically a procedure operative to distributively process a plurality of data sets stored on a plurality of memory modules, further the first condition is a condition in which the plurality of data sets 712-D1, 712-D2, 712-D3, 712-D4, 712-D5, 712-D6 (FIG. 17A) is served and processed in its entirety by the plurality of compute elements 700-*c*1, 700-*c*2, 700-*cn* (FIG. 17A). Further, the plurality of compute elements 700-*c*1, 700-*c*2, 700-*cn* (FIG. 17A) is configured to execute distributively a first task associated with the plurality of data sets 712-D1, 712-D2, 712-D3, 712-D4, 712-D5, 712-D6 (FIG. 17A) by performing the processing of the data sets received, in which the execution of the first task can be done in any order of said processing of said plurality of data sets. In sum, any one of said plurality of data sets can be processed before or after any other of said plurality of data sets.

In a third possible alternative to the above described system to generate automatically a procedure operative to distributively process a plurality of data sets stored on a plurality of memory modules, further each of the compute elements 700-*c*1, 700-*c*2, 700-*cn* (FIG. 17A) is configured, according to the sequence of executable instructions 8-exe, per each said sending of one of said data requests (for example, 7DR1, FIG. 17B) made by such compute element (for example, 700-*c*1, FIG. 17B), to select one (for example, 523-1, FIG. 17B) of the plurality of data interfaces 523-1, 523-2, 523-*k* (FIG. 17A) as a target of receiving such data request, in which the selection is a round robin selection or a pseudo-random selection. Further, the selection of one of the plurality of data interfaces as a target of receiving such data request may be directed by load-balancing considerations, such that, as an example, a data interface that is relatively not loaded with data requests may be selected, or such that data interfaces associated with a relatively large number of data sets may be selected more frequently.

In a fourth possible alternative to the above described system to generate automatically a procedure operative to distributively process a plurality of data sets stored on a plurality of memory modules, further the code sequence 8-code is written in a high-level programming language, and the conversion is a compilation process.

One embodiment is a system 800' configured to generate and execute a procedure operative to distributively process a plurality of data sets stored on a plurality of memory modules. In one particular form of such embodiment, the system 800' includes a target system 720 (FIG. 28B, FIG. 17A), which itself includes a shared memory pool 512 (FIG. 17A), with a plurality of memory modules 540-*m*1, 540-*m*2, 540-*mk* (FIG. 17A) associated respectively with a plurality of data interfaces 523-1, 523-2, 523-*k* (FIG. 17A), which also includes a plurality of compute elements 700-*c*1, 700-*c*2, 700-*cn* (FIG. 17A). The system 800' also includes a first database 700-DB configured to store a code sequence 8-code describing an action to be performed by the target system 720 on each of a plurality of data sets 712-D1, 712-D2, 712-D3, 712-D4, 712-D5, 712-D6 (FIG. 17A) stored in the shared memory pool 512, in which the action per each of the plurality of data sets includes: (i) fetching the data set from the shared memory pool 512, and (ii) processing the data set fetched. The system also includes a first compute element 700-com, having access to the first database 700-DB, and configured to convert the code sequence 8-code into a sequence of executable instructions 8-exe. Further, the plurality of compute elements 700-*c*1, 700-*c*2, 700-*cn* (FIG. 17A) is configured to execute simultaneously said sequence of executable instructions 8-exe, resulting in a distributive fetching-and-processing procedure. By this procedure each of the plurality of compute elements 700-*c*1, 700-*c*2, 700-*cn* (FIG. 17A) sends a plurality of data requests (for example, 7DR1, 7DR3, FIG. 17D) to at least some of the plurality of data interfaces (for example, 523-1, 523-2, FIG. 17D), in which each of the data requests is sent to one of the plurality of data interfaces. Also by this procedure, each of the compute elements receives, as a response to each of the data requests (for example, to data request 7DR1 in FIG. 17D), from the data interface receiving the data request (for example, 523-1, FIG. 17D, FIG. 17E), a reply (for example, 7SR1, FIG. 17E) comprising a specific one of the data sets (for example, 712-D1, FIG. 17E) stored in the memory module (for example, 540-*m*1, FIG. 17E) associated with the data interface (for example, 523-1, FIG. 17D, FIG. 17E). Also by this procedure, each of the compute elements processes the data sets it has received. The sending of data requests, receiving of responses, and processing of data sets received, by each of the plurality of compute elements 700-*c*1, 700-*c*2, 700-*cn*, continues until a first condition is met.

In a first possible alternative to the system 800' just described, further the first condition is a condition in which the plurality of data 712-D1, 712-D2, 712-D3, 712-D4, 712-D5, 712-D6 (FIG. 17A) is served and processed in its entirety by the plurality of compute elements 700-*c*1, 700-*c*2, 700-*cn* (FIG. 17A). Further, the plurality of compute elements 700-c1, 700-c2, 700-cn (FIG. 17A) is configured to execute distributively a first task associated with said plurality of data sets 712-D1, 712-D2, 712-D3, 712-D4, 712-D5, 712-D6 by performing the processing of the data sets received, in which the execution of said first task can be done in any order of said processing of said plurality of data sets. In sum, any one of said plurality of data sets can be processed before or after any other of said plurality of data sets.

In a second possible alternative to the above described system 800' configured to generate and execute a procedure operative to distributively process a plurality of data sets stored on a plurality of memory modules, further the specific one of the data sets (for example, 712-D1, FIG. 17E) is selected by the data interface (for example, 523-1, FIG. 17E) from the memory module (for example, 540-m1, FIG. 17E), such as to guarantee that said specific one of the data sets has not previously been sent in conjunction with previous replies made by the data interface (for example, 523-1, FIG. 17E).

In one possible configuration of the second possible alternative just described, further the sequence of executable instructions 8-exe, when executed simultaneously by each of the plurality of data interfaces 523-1, 523-2, 523-k (FIG. 17A), facilitates the selections, the replies, and therefore the guarantee.

In a third possible alternative to the above described system 800' configured to generate and execute a procedure operative to distributively process a plurality of data sets stored on a plurality of memory modules, further the conversion is performed by the first compute element 700-com just before the plurality of compute elements 700-c1, 700-c2, 700-cn (FIG. 17A) starts executing simultaneously the sequence of executable instructions 8-exe.

In one possible configuration of the third possible alternative just described, further the first compute element 700-com communicates 80-com the sequence of executable instructions 8-exe to the plurality of compute elements 700-c1, 700-c2, 700-cn (FIG. 17A) just before the plurality of compute elements 700-c1, 700-c2, 700-cn starts executing simultaneously the sequence of executable instructions 8-exe.

In a fourth possible alternative to the above described system 800' configured to generate and execute a procedure operative to distributively process a plurality of data sets stored on a plurality of memory modules, further the first compute element 700-com is one of the plurality of compute elements 700-c1, 700-c2, 700-cn (FIG. 17A).

Figure 29:
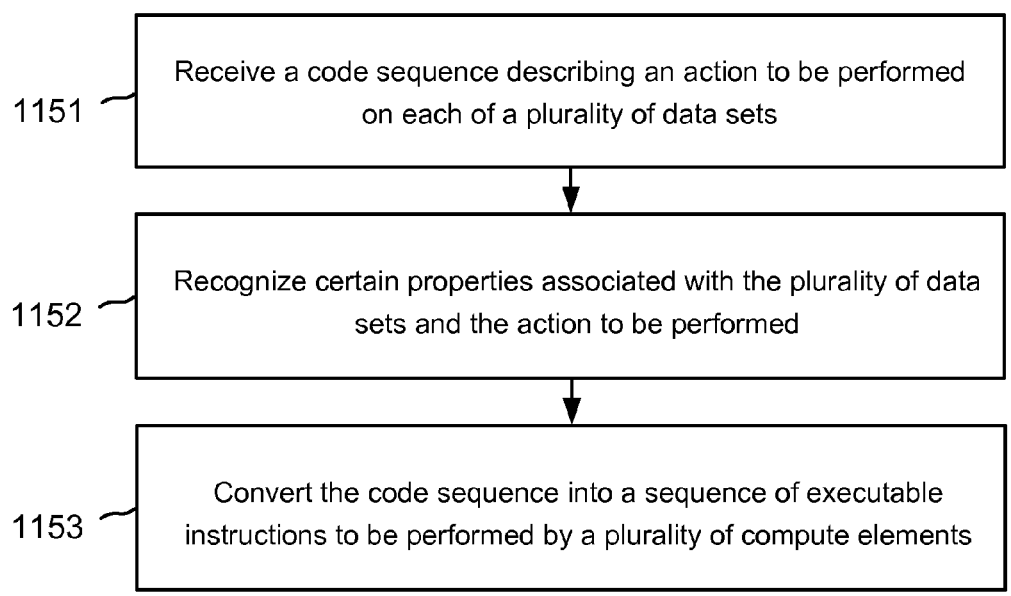
FIG. 29 illustrates one embodiment of a method for generating automatically a procedure operative to distributively process a plurality of data sets stored on a plurality of memory modules.

FIG. 29 illustrates one embodiment of a method for generating automatically a procedure operative to distributively process a plurality of data sets stored on a plurality of memory modules. In step 1151, a first compute element 700-com receives a code sequence 8-code describing an action to be performed by a target system 720 (FIG. 28A, FIG. 17A) on each of a plurality of data sets 712-D1, 712-D2, 712-D3, 712-D4, 712-D5, 712-D6 (FIG. 17A). Such data sets are stored in a shared memory pool 512 (FIG. 17A) which includes a plurality of memory modules 540-m1, 540-m2, 540-mk (FIG. 17A) associated respectively with a plurality of data interfaces 523-1, 523-2, 523-k (FIG. 17A) all belonging to the target system 720 (FIG. 28A, FIG. 17A). The action to be performed includes: (i) fetching the data set from the shared memory pool 512 (FIG. 17A) in the target system 720 (FIG. 28A, FIG. 17A), and (ii) processing the data set fetched. In step 1152, the first compute element 700-com recognizes, by inspecting the code sequence 8-code, that (i) the plurality of data sets 712-D1, 712-D2, 712-D3, 712-D4, 712-D5, 712-D6 (FIG. 17A) are stored across the plurality of memory modules 540-m1, 540-m2, 540-mk (FIG. 17A) associated respectively with the plurality of data interfaces 523-1, 523-2, 523-k (FIG. 17A), that (ii) any one of said plurality of data sets can be processed before or after any other of said plurality of data sets, and therefore that (iii) each fetch for one of the data sets can be done by any one of the plurality of compute elements in conjunction with the data interface associated with the memory module storing that data set, asynchronously with any other of the fetches done by any other of the plurality of compute elements in conjunction with any one of the data interfaces. In step 1153, the first compute element 700-com converts, according to the recognition, the code sequence 8-code into a sequence of executable instructions 8-exe, in which the sequence of executable instructions 8-exe, when executed simultaneously by each of the plurality of compute elements 700-c1, 700-c2, 700-cn of the target system 720, results in a distributive fetching-and-processing procedure operative, per each of the plurality of compute elements 700-c1, 700-c2, 700-cn, to execute three actions: According to the procedure, each one of the compute elements 700-c1, 700-c2, 700-cn sends a plurality of data requests (for example, compute element 700-c1 sends 7DR1, 7DR3, FIG. 17D) to at least some of the plurality of data interfaces (for example, 7DR1 to 523-1 and 7DR3 to 523-2, FIG. 17D), in which each of the data requests is sent to one of the plurality of data interfaces. Also according to the procedure, the same compute element (in this example, 700-c1) receives, as a response to each of the data requests sent (for example, in response to data request 7DR1 in FIG. 17D), from the data interface receiving the data request (for example, 523-1, FIG. 17D, FIG. 17E), a reply (for example, 7SR1, FIG. 17E) including a specific one of the data sets (for example, 712-D1, FIG. 17E) stored in the memory module (for example, 540-m1, FIG. 17E) associated with the data interface fetching that data set (for example 523-1, FIG. 17D, FIG. 17E). Also according to the procedure, the same compute element (for example, 700-c1) processes all of the data sets (for example, 712-D1, 712-D3, FIG. 17C, FIG. 17E) it has received from whatever data interface (for example, from only 523-1 as shown in FIG. 17C, or from both 523-1 and 523-2 as shown in FIG. 17E). The sending of data requests, receiving responses, and processing of data sets received, is done by each of the plurality of compute elements 700-c1, 700-c2, 700-cn in the target system 720, until a first condition is met.

In a first possible alternative to the method described above in FIG. 29, further the recognition is achieved by the first compute element 700-com identifying, in the code sequence 8-code, a loop, in which each iteration of the loop describes the action to be performed on one of the plurality of data sets 712-D1, 712-D2, 712-D3, 712-D4, 712-D5, 712-D6 (FIG. 17A), and further identifying, in the code sequence 8-code, that the plurality of data sets 712-D1, 712-D2, 712-D3, 712-D4, 712-D5, 712-D6 are of a data type intended for storage across the plurality of memory modules 540-m1, 540-m2, 540-mk (FIG. 17A).

In one possible configuration of the first possible alternative just described, the recognition is further achieved by the first compute element 700-com identifying, in the loop, that the processing of each of the plurality of data sets 712-D1, 712-D2, 712-D3, 712-D4, 712-D5, 712-D6 (FIG. 17A) is unrelated to any other of the plurality of data sets 712-D1, 712-D2, 712-D3, 712-D4, 712-D5, 712-D6.

In a second possible alternative to the method described above in the description of FIG. 29, further the recognition is achieved by the first compute element 700-com identifying, in the code sequence 8-code, a single instruction to be performed on multiple data (SIMD), in which said single instruction is associated with the processing and the multiple data are associated with said plurality of data sets 712-D1, 712-D2, 712-D3, 712-D4, 712-D5, 712-D6 (FIG. 17A). Recognition is further achieved by the first compute element 700-com identifying, in the code sequence 8-code, that the plurality of data sets 712-D1, 712-D2, 712-D3, 712-D4, 712-D5, 712-D6 (FIG. 17A) are of a data type intended for storage across said plurality of memory modules 540-m1, 540-m2, 540-mk (FIG. 17A).

Figure 30A:
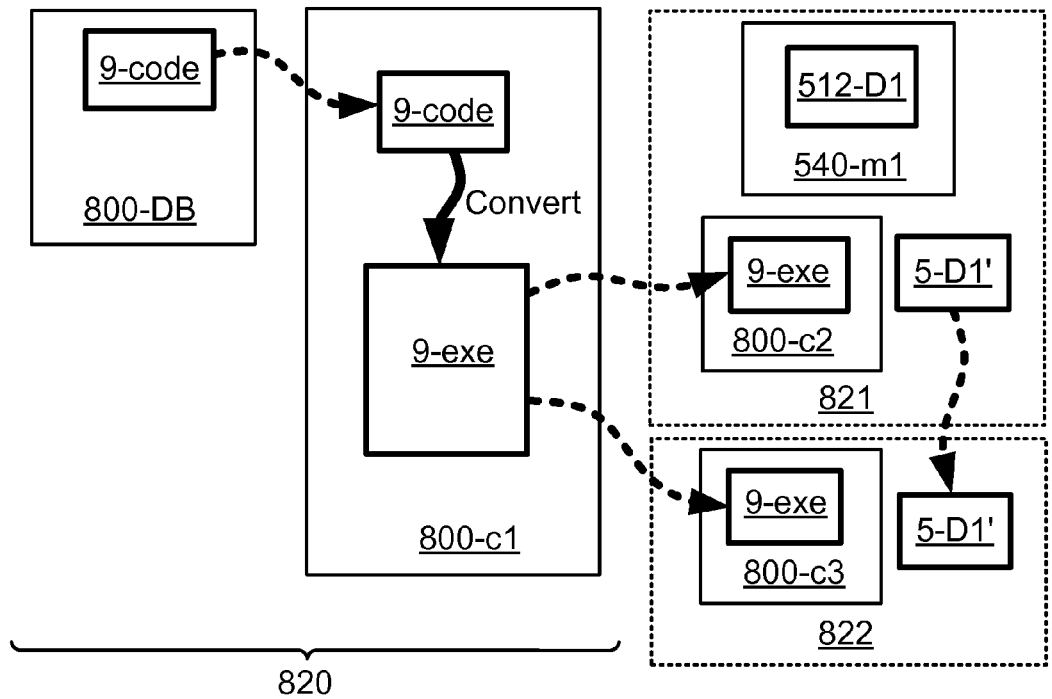
FIG. 30A illustrates one embodiment of a system configured to generate automatically a procedure operative to divide a processing task between two or more compute elements, in which there are at least two sub-systems, each including at least one compute element.

FIG. 30A illustrates one embodiment of a system 820 configured to generate automatically a procedure operative to divide a processing task between two or more compute elements. In one particular form of such embodiment, the system includes a first database 800-DB configured to store a code sequence 9-code describing an action to be performed on a first data set 512-D1 stored in memory module 540-m1, in which the action includes (i) fetching the first data set 512-D1 from the memory module 540-m1, and (ii) performing a first processing task on the fetched data set 512-D1. In this embodiment, the system 820 includes a first compute element 800-c1 configured to decide how to divide the first processing task into two separate sub-tasks, by recognizing that the first processing task can be performed distributively by a second compute element running a first sub-task, and then by a third compute element running a second sub-task. The first compute element 800-c1 is then configured to convert the code sequence 9-code into a sequence of executable instructions 9-exe operative to instruct such a second compute element regarding execution of the first sub-task, and operative to instruct such a third compute element regarding execution of the second sub-task. Such instructions 9-exe may be sent and executed almost immediately upon conversion, or may be stored initially in the system 820 with the first compute element 800-c1 for a specific period of time before execution or executed when some condition arises, or may be sent to either or both of a first server 821 and a second server 822 where they may be stored for a specific period of time before execution or executed when some condition arises.

After conversion, the instructions 9-exe are sent to a second compute element 800-c2 in the first server 821 and a third compute element 800-c3 in the second server 822. In the particular embodiment shown in FIG. 30A, both the first server 821 and the second server 822 are located outside the system 820, each of these two servers is separate from the other. Further, the first server includes the second compute element 800-c2, the memory module 540-m1 storing the first data set 512-D1 prior to any processing, and eventually a modified data set 5-D1' that has been derived by the second compute element 800-c2 from the first data set 512-D1 using the first processing sub-task in the instructions 9-exe. The modified data set 5-D1' is received by the second server 822, where the third compute element 800-c3 is configured to execute on this modified data set 5-D1' the second processing sub-task directed by the executable instructions 9-exe.

Various alternative embodiments not shown in FIG. 30A are also possible, including:

First server 821 and all of its included elements—the second compute element 800-c2, the memory module 540-m1 with the first data set 512-D1, and the modified data set 5-D1'—are part of the system 820 rather than being external to that system 820; or There is not a first server 821, but rather the elements of that server 821—the second compute element 800-c2, the memory module 540-m1 with the first data set 512-D1, and the modified data set 5-D1'—are part of the system 820, possibly co-located on a single server with first compute element 800-c1; or The second server 822 and all of its included elements—the third compute element 800-c3, and the modified data set 5-D1'—are part of the system 820 rather being external to that system 820; or There is not a second server 822, but rather the elements of that server 822—the third compute element 800-c3, and the modified data set 5-D1'—are part of the system 820, possibly co-located on a single server with first compute element 800-c1.

Figure 30B:
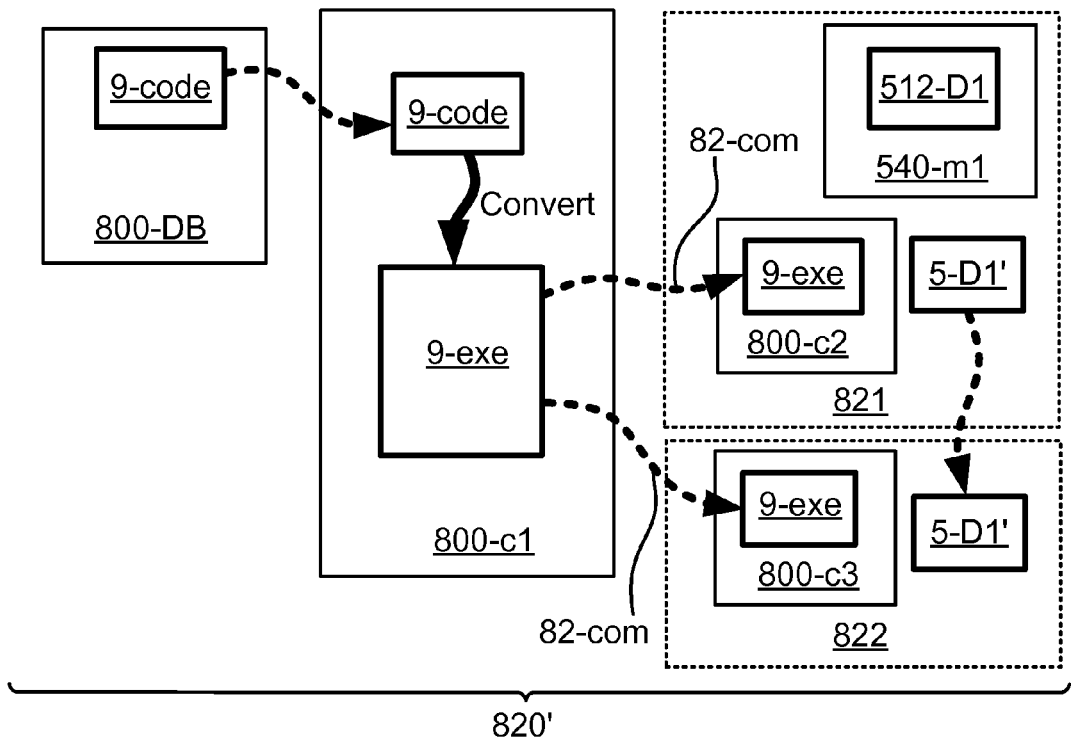
FIG. 30B illustrates one embodiment of a system configured to generate and execute a procedure operative to divide a processing task between two or more compute elements, in which all compute elements are part of the same system.

FIG. 30B illustrates one embodiment of a system 820' configured to generate and execute a procedure operative to divide a processing task between two or more compute elements. The system 820' portrayed in FIG. 30B includes of the elements illustrated in FIG. 30A, but with two differences. First, as shown in FIG. 30B, all of the main elements, including the database 800-DB, the first compute element 800-c1, the first server 821 with its elements, and the second server 822 with its elements, are all part of the same system 820'. None of these components are outside the system 820'. Second, the first compute element 800-c1 communicates 82-com the sequence of executable instructions 9-exe to the second compute element 800-c2 and the third compute element 800-c3 just before the second compute element 800-c2 starts executing the sequence of executable instructions 9-exe, meaning that such communication 82-com may be the trigger for executing the sequence of executable instructions 9-exe, or that such communication 82-com and executing the sequence of executable instructions 9-exe are together part of an on-going sequence on inter-related events.

One embodiment is a system 820 configured to generate automatically a procedure operative to divide a processing task between at least two compute elements. In one particular form of such embodiment, the system 820 includes a first database 800-DB configured to store a code sequence 9-code describing an action to be performed on a first data set 512-D1 stored in a memory module 540-m1, in which the action comprises: (i) fetching the first data set 512-D1 from the memory module 540-m1, and (ii) performing a first processing task on said first data set 512-D1 fetched. The system 820 further includes a first compute element 800-c1, having access to the first database 800-DB, and configured to convert the code sequence 9-code into a sequence of executable instructions 9-exe, in which the sequence of executable instructions 9-exe is operative to instruct a second compute element 800-c2 associated with the memory module 540-m1 to: (i) access the first data set 512-D1 in the memory module 540-m1; and (ii) perform a first processing sub-task on said first data set accessed, thereby resulting in a modified data set 5-D1'. The sequence of executable instructions 9-exe is further operative to instruct a third compute element 800-c3 to: (i) obtain the modified data set 5-D1'; and (ii) perform a second processing sub-task on said modified data set obtained. The first processing sub-task, together with the second processing sub-task, constitute the first processing task, thereby achieving the action distributively by the second compute element 800-c2 and the third compute element 800-c3.

In a first possible alternative to the just described system 820 configured to generate automatically a procedure operating to divide a processing task between at least two compute elements, further the second compute element 800-c2 is a data interface 523-1 (FIG. 10B) associated with the memory module 540-m1, and the accessing of the first data set is a random access read cycle performed on the memory module 540-*m*1 by the data interface 523-1 (FIG. 10B). Such data interface 523-1 (FIG. 10B) may be the controller of the memory module 540-*m*1.

In a second possible alternative to the system 820 configured to generate automatically a procedure operating to divide a processing task between at least two compute elements, further the third compute element 800-*c*3 is communicatively connected with the second compute element 800-*c*2 via a switching network 550 (FIG. 10B) through which the obtaining of the modified data set 5-D1' is done.

In a possible configuration of the second possible alternative just described, further the memory module 540-*m*1 is a part of a shared memory pool 512 (FIG. 10B) accessible to the third compute element 800-*c*3 via the switching network 550 (FIG. 10B).

In a possible variation of the possible configuration just described, further the first processing sub-task is a stored procedure.

In a second possible configuration of the second possible alternative described above, further the second compute element 800-*c*2 and the memory module 540-*m*1 both reside in one server 821.

In a possible variation of the second possible configuration just described, further third compute element 800-*c*3 resides outside the one server 821, and in a second server 822.

One embodiment is a system 820' configured to generate and execute a procedure operative to divide a processing task between at least two compute elements. In one particular form of such embodiment, the system 820' includes a first database 800-DB configured to store a code sequence 9-code describing an action to be performed on a first data set 512-D1, in which the action comprises: (i) accessing the first data set 512-D1, and (ii) performing a first processing task on the data set 512-D1 accessed. The system 820' further includes a first compute element 800-*c*1, having access to the first database 800-DB, and configured to convert said the sequence 9-code into a sequence of executable instructions 9-exe. The system 820' further includes a memory module 540-*m*1 storing the first data set 512-D1. The system 820' further includes a second compute element 800-*c*2 associated with the memory module 540-*m*1 and configured to execute the sequence of executable instructions 9-exe, resulting in a procedure operative to: (i) access the first data set 512-D1 in the memory module 540-*m*1; and (ii) generate a modified data set 5-D1' by performing a first processing sub-task on the first data set 512-D1 accessed. The system 820' further includes a third compute element 800-*c*3 configured to execute the sequence of executable instructions 9-exe, resulting in continuation of the procedure, in which such continuation is operative to: (i) obtain the modified data set 5-D1'; and (ii) perform a second processing sub-task on said modified data set 5-D1' obtained. The first processing sub-task, together with said second processing sub-task, constitute the first processing task, thereby achieving the action distributively by the second compute element 800-*c*2 and the third compute element 800-*c*3.

In a first possible alternative to the just described system 820' configured to generate and execute a procedure operating to divide a processing task between at least two compute elements, further the conversion is performed by the first compute element 800-*c*1 just before the second compute element 800-*c*2 starts executing the sequence of executable instructions 9-exe.

In a possible configuration of the first possible alternative just described, further the first compute element 800-*c*1 communicates 82-com the sequence of executable instructions 9-exe to the second compute element 800-*c*1 and to the third compute element 800-*c*3 just before the second compute element 800-*c*2 starts executing the sequence of executable instructions 9-exe.

In a second possible alternative to the system 820' configured to generate and execute a procedure operating to divide a processing task between at least two compute elements, further the code sequence 9-code is written in a high-level programming language, and further the conversion is a compilation process.

In a third possible alternative to the system 820' configured to generate and execute a procedure operating to divide a processing task between at least two compute elements, further the first compute element 800-*c*1 and the second compute element 800-*c*2 are a same compute element.

In a fourth possible alternative to the system 820' configured to generate and execute a procedure operating to divide a processing task between at least two compute elements, further the first compute element 800-*c*1 and the third compute element 800-*c*3 are a same compute element.

Figure 31:
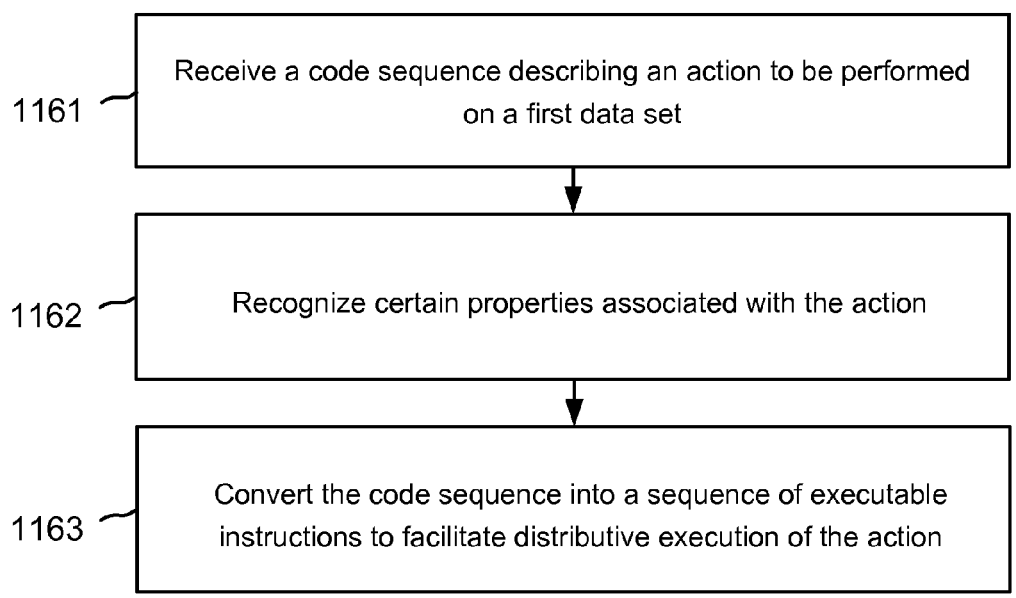
FIG. 31 illustrates one embodiment of a method for generating automatically a procedure operative to divide a processing task between two or more compute elements.

FIG. 31 illustrates one embodiment of a method for generating automatically a procedure operative to divide a processing task between at least two compute elements. In step 1161, a first compute element receives a code sequence 9-code describing an action to be performed on a first data set 512-D1, in which the action comprises: (i) accessing the first data set, and (ii) performing a first processing task on said first data set accessed. In step 1162, the first compute element recognizes, by inspecting the code sequence 9-code, that the first processing task is equivalent to performing a first processing sub-task followed by performing a second processing sub-task. In step 1163, according to the recognition, the first compute element converts the code sequence 9-code into a sequence of executable instructions 9-exe, wherein the sequence of executable instructions 9-exe is operative to instruct a third compute element 800-*c*3 to: (i) send a request to a second compute element 800-*c*2, associated with a memory module 540-*m*1 storing the first data set 512-D1, to perform the first processing sub-task on the first data set 512-D1, (ii) obtain from the second compute element 800-*c*2 a modified data set 5-D1' as a response to the request; and (iii) perform the second processing sub-task on the modified data set 5-D1' obtained. As a result of the steps described herein, the action is achieved distributively by the second compute element 800-*c*2 and the third compute element 800-*c*3.

In a first possible alternative to the method described above in FIG. 31, further the sequence of executable instructions 9-exe is further operative to instruct the second compute element 800-*c*2 associated with the memory module 540-*m*1 to: (i) receive the request; (ii) access the first data set 512-D1 in the memory module 540-*m*1 as a response to the request; (iii) perform the first processing sub-task on the first data set accessed, thereby resulting in the modified data set 5-D1'; and (iv) send the modified data set 5-D1' to the third compute element 800-*c*3.

In a first possible configuration of the first possible alternative embodiment described above, further the accessing is a random access read cycle performed by the second compute element 800-*c*2 on the memory module 540-*m*1.

In a second possible configuration of the first possible alternative embodiment described above, further the sequence of executable instructions 9-exe, or at least a portion thereof that is relevant for the second compute element 800-*c*2, is delivered to the second compute element 800-c2 by the third compute element 800-c3 during run-time of the third compute element 800-c3.

In a possible variation of the second possible configuration just described, further the sequence of executable instructions 9-exe is delivered to the third compute element 800-c3 by the first compute element 800-c1 just before run-time of the third compute element 800-c3.

In a third possible configuration of the first possible alternative embodiment described above, further the sequence of executable instructions 9-exe is delivered to the second compute element 800-c2 by the first compute element 800-c1 just before run-time of the third compute element 800-c3.

In a second possible alternative to the method described above in FIG. 31, further the second compute element 800-c2 and the memory module 540-m1 are associated a-priori with a stored procedure, in which the stored procedure is the first processing sub-task.

In a third possible alternative to the method described above in FIG. 31, further the recognition that the first processing task is equivalent to performing the first processing sub-task followed by performing the second processing sub-task, is achieved by matching the first processing task to a database comprising different combinations of sub-tasks and resulting tasks.

In a fourth possible alternative to the method described above in FIG. 31, further the recognition that the first processing task is equivalent to performing the first processing sub-task followed by performing the second processing sub-task is achieved by concluding, from inspecting the code sequence 9-code, that the first processing task is explicitly described as the first processing sub-task followed by the second processing sub-task.

In a fifth possible alternative to the method described above in FIG. 31, further the association of the second compute element 800-c2 with the memory module 540-m1 is identified by the first compute element 800-c1 during the recognition, by the first compute element's 800-c1 concluding, from inspecting the code sequence 9-code, that the first data set 512-D1 is of a data type that is associated with the second compute element 800-c2 and the memory module 540-m1.

In a sixth possible alternative to the method described above in FIG. 31, further the association of the second compute element 800-c2 with the memory module 540-m1 is identified by the third compute element 800-c3 during execution of the sequence of executable instructions 9-exe by the third compute element 800-c3, using information or operations available to the third compute element 800-c3 during run-time.

Figure 32:
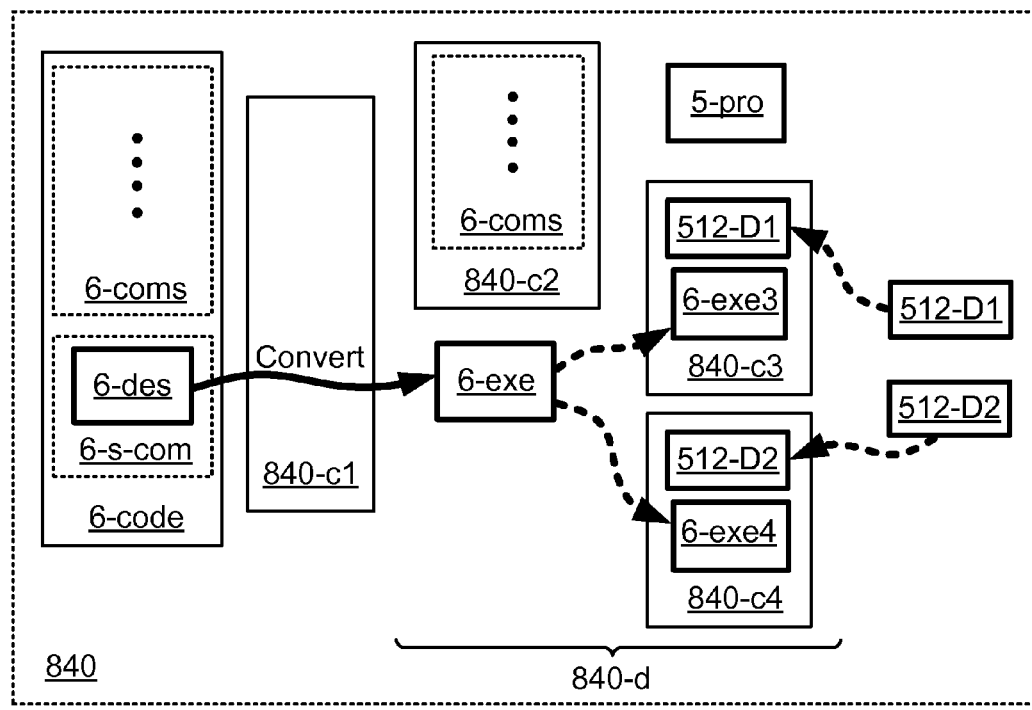
FIG. 32 illustrates one embodiment of a system configured to perform efficiently a first processing task in conjunction with a plurality of data sets.

FIG. 32 illustrates one embodiment of a system 840 configured to perform efficiently a first processing task in conjunction with each of a plurality of data sets 512-D1, 512-D2. In one particular form of such embodiment, the system 840 includes a first code sequence 6-code, which itself includes a plurality of general commands 6-coms and a specific command 6-s-com. The specific command 6-s-com includes a description 6-des of a first processing task to be performed multiple times, each time in conjunction with one of the data sets 512-D1, 512-D2. The system 840 includes also a first compute element 840-c1, that has access to the commands in the code sequence 6-code. The first compute element 840-c1 is configured to automatically (without any review by a person, in accordance with pre-defined instructions) review the commands, identify the specific command 6-s-com, by identifying, within the specific command, that the first processing task, described by 6-des, is to be performed in conjunction with the data sets 512-D1, 512-D2, and, according to the prior identifications, convert the description 6-des into a first sequence of executable instructions 6-exe constituting an efficient implementation of the first processing task. The system 840 includes also a second compute element 840-c2 that has access to the general commands 6-coms and the specific command 6-s-com, and that follows the commands until the specific command 6-s-com is reached, after which the second compute element 840-c2 initiates a plurality of processing events. Each processing event includes executing one of a plurality of instances 6-exe3, 6-exe4 of the first sequence of executable instructions 6-exe in conjunction with the data sets. For example, a first processing event may be execution by a third compute element 840-c3 of the first instance 6-exe3 in conjunction with the first data set 512-D1. As another example, a second processing event may be execution by a fourth compute element 840-c4 of a second instance 6-exe4 in conjunction with the second data set 512-D2. The execution of the processing events results in the system 840 performing efficiently the first processing task in conjunction with the plurality of data sets 512-D1, 512-D2.

In some embodiments, the second compute element 840-c2 initiates the processing events by sending initiation requests to the compute elements 840-c3, 840-c4. The sending of the initiation requests may be directed by a procedure 5-pro of the system 840, in which the procedure 5-pro is associated with efficiently managing and communicating data across the system 840. Procedure 5-pro may be used by the system to allocate a specific data set for processing in a specific compute elements, such that, as an example, once compute element 840-c2 initiates one of the processing events in conjunction with compute element 840-c3, it is procedure 5-pro that takes care of distributing the instance 6-exe3 to compute element 840-c3, and it is procedure 5-pro that takes care of allocating the data set 512-D1 to compute element 840-c3, perhaps because the procedure 5-pro is aware of a fact that data set 512-D1 is stored in a memory module that is closer to compute element 840-c3 than it is to compute element 840-c4. Each of the plurality of compute elements 840-c3, 840-c4 and the second compute element 840-c2 are operative to execute at least a portion of the procedure 5-pro relevant to that compute element. Procedure 5-pro is aware of the underlying architecture of system 840, such as communication network topology and data proximity to compute elements, and is therefore best suited for making data allocation decisions as explained above. It is noted that the underlying architecture of system 840 is not necessarily expressed in the code sequence 6-code, but it is known at the time of generating Procedure 5-pro, possibly to the designer of system 840, and is therefore a "property" of system 840 which is not derived from code sequence 6-code. In addition, it is noted that the description 6-des of the first processing task to be performed in conjunction with the data sets 512-D1, 512-D2 is not known to the designer of system 840, and therefore the system itself needs to convert description 6-des into efficient executable instructions such as 6-exe.

In various embodiments, the system 840 includes a subsystem which is itself a distributed processing system 840-d. This distributed processing system 840-d includes, in some embodiments, the second compute element 840-c2 with the plurality of general commands 6-coms, the first sequence of executable instructions 6-exe, the second 840-c3 and third 840-c4 compute elements, and the procedure 5-pro. In some embodiments, the third compute element 840-*c*3 includes data from the first data set 512-D1 and the instance 6-exe3 associated with the third compute element 840-*c*3, plus the fourth compute element 840-*c*4 includes data from the second data set 512-D2 and the instance 6-exe4 associated with the fourth compute element 840-*c*4.

The various embodiments as described herein provide a superior solution to the difficulty of effectively converting commands into instructions executable by compute elements within a system. On one hand, it would be highly complex, and possibly even unachievable, to convert all of the high-level commands in a code sequence 6-code to efficient system-tailored machine executable code. There are three reasons for this difficulty, any one of which, or all of which, may be present in a data processing system. The first reason for the difficulty is that the instruction set is diverse. The second reason for the difficulty is that not all types of commands lend themselves to efficient conversion. The third reason for the difficulty is that not all types of commands can exploit, or be tailored-to, a specific system architecture. On the other hand, many high-level commands do not need to be efficiently converted to executable instructions, since the interpretation of such commands and/or the conversion of such commands to even inefficient executable instructions presents a "good enough" way of following such commands. The way is "good enough" because execution of such commands does not present a real bottleneck when it comes to overall system performance, and hence does not negatively impact system performance.

In short, some commands, and in particular specific task-defining code within specific commands, present problems of execution, and must be handled specially, whereas other commands, in particular general commands, do not need to be efficiently converted to executable instruction since the commands do not create a bottleneck and efficient conversion would not significantly improve system performance.

To solve these problems, that is, to improve system performance by giving special handling to specific task-defining code within specific commands, the embodiments proposed herein distinguish between multiple general commands 6-coms on the one hand, and on the other hand a specific command 6-*s*-com describing 6-des a processing task to be performed in conjunction with multiple data sets. The specific command 6-*s*-com is recognized as special by the system 840, which then converts at least the description 6-des within the specific command into machine executable code that is optimally configured to be processed by the system 840. In this way, the speed and efficiency of the system 840 are enhanced. It is noted that the description 6-des within the specific command 6-*s*-com, which may be a mathematical expression or an algorithm written using the high level language, may be relatively easily converted, efficiently, into executable instructions, either directly, or via an intermediary high-level language, such as the C language.

Various embodiments use a procedure 5-pro in the system 840 to communicate data across the system 840, in which such procedure 5-pro has various parts that may be executed by second compute element 840-*c*2 and the multiple compute elements 840-*c*3, 840-*c*4. In various embodiments, the procedure 5-pro may direct instances of the executable code 6-exe to be executed by different compute elements, for example 840-*c*3 to execute 6-exe3 and 840-*c*4 to execute 6-exe4. In various embodiments, the procedure 5-pro may direct various of the data sets to different compute elements, for example 512-D1 to 840-*c*3 and 512-D2 to 840-*c*4. The procedure 5-pro may be stored in any of the compute elements, 840-*c*1, 840-*c*2, 840-*c*3, 840-*c*4 or memories thereof, or may be stored in an entirely separate compute element. The procedure 5-pro is optimized to take advantage of the requirements and capabilities of the specific elements in the distributed processing system 840-*d*, and in some embodiments of the requirements and capabilities of elements in the system 840 other than those in the distributed processing system 840-*d*. In some embodiments, 5-pro understands which data set, such as 512-D1 or 512-D2, resides in a memory module associated with a specific compute element, such as 840-*c*3 or 840-*c*4, and then directs the specific compute element to execute the task on the data set residing in that compute element (for example, compute element 840-*c*3 executes a task on data set 512-D1, and compute element 840-*c*4 executes a task on data set 512-D2). In all of the embodiments in which the procedure 5-pro is operable, the procedure 5-pro in some way or ways improves the speed and efficiency of the system 840. The procedure 5-pro takes care of the "management aspects" of carrying our specific command 6-*s*-com in view of system 840 architecture, and may be independent of the description 6-des appearing in 6-*s*-com, while the first sequence of executable instructions 6-exe, which is totally dependent on the description 6-des and directly derived from it, takes care of efficiently executing the first processing task on compute elements 840-*c*3, 840-*c*4.

In various embodiments, the first compute elements 840-*c*1 is aware of the requirements and capabilities of the specific compute elements 840-*c*2, 840-*c*3, 840-*c*4 in the distributed processing system 840-*d*. In these embodiments, the first compute element 840-*c*1 converts the description 6-des in specific command 6-*s*-com in a manner to optimize the machine executable code 6-exe for use and processing by these compute elements 840-*c*2, 840-*c*3, 840-*c*4. In these embodiments, the efficiency of the conversion process is enhanced in order to improve the speed and efficiency of the system 840.

One embodiment is a system 840 configured to perform efficiently a first processing task in conjunction with each of a plurality of data sets 512-D1, 512-D2. In one particular form of such embodiment, the system 840 includes a first code sequence 6-code comprising (i) a plurality of commands 6-coms, and (ii) a specific command 6-*s*-com comprising a description 6-des of a first processing task to be performed in conjunction with each of a plurality of data sets 512-D1, 512-D2. The system 840 includes also a first compute element 840-*c*1 having access to the code sequence 6-code and configured to: (i) identify automatically, by inspecting the specific command 6-*s*-com within the first code sequence 6-code, that the first processing task is to be performed in conjunction with each of said plurality of data sets 512-D1, 512-D2, and (ii) according to said identification, convert, specifically, said description 6-des, into a first sequence of executable instructions 6-exe constituting an efficient implementation of said first processing task. The system 840 includes also a second compute element 840-*c*2, having access to at least the plurality of commands 6-coms, and configured to first follow the plurality of commands 6-coms until the specific command 6-*s*-com is reached, and then initiate a plurality of processing events, in which each of the processing events comprises executing an instance (6-exe3 is one such instance, 6-exe4 is another) of the first sequence of executable instructions 6-exe in conjunction with one of the data sets 512-D1, 512-D2 (e.g., a first processing event would be an execution of instance 6-exe3, which may be identical to 6-exe, in conjunction with data set 512-D1), thereby resulting in performing efficiently the first processing task in conjunction with each of the plurality of data sets 512-D1, 512-D2.

In a first possible alternative to the system 840 just described to perform efficiently a first processing task in conjunction with each of a plurality of data sets 512-D1, 512-D2, the system 840 further comprises a plurality of compute elements 840-c3, 840-c4, wherein the plurality of processing events occur respectively in the plurality of compute elements.

In a first possible configuration of the first possible alternative system described above, further the instances 6-exe3, 6-exe4 of the first sequence of executable instructions 6-exe are available to the plurality of compute elements 840-c3, 840-c4 through the system 840 sending such instances 6-exe3, 6-exe4 to the plurality of compute elements 840-c3, 840-c4, or through the plurality of compute elements 840-c3, 840-c4 obtaining the instances 6-exe3, 6-exe4 from the system 840.

In a second possible configuration of the first possible alternative system described above, further the plurality of data sets 512-D1, 512-D2 is available respectively to the plurality of compute elements 840-c3, 840-c4 through the plurality of compute elements, 840-c3, 840-c4, respectively, being pointed to the plurality of data sets 512-D1, 512-D32 by the system 840.

In a third possible configuration of the first possible alternative system described above, further the initiation is done by the second compute element 840-c2 sending a plurality of initiation requests respectively to the plurality of compute elements 840-c3, 840-c4.

In a first possible variation the third possible configuration described above, further the plurality of initiation requests also convey to the plurality of compute elements 840-c3, 840-c4, respectively, the plurality of data sets 512-D1, 512-D2 (that is, data set 512-D1 is conveyed to compute element 840-c3, and data set 512-D2 is conveyed to compute element 840-c4).

In a second possible variation of the third possible configuration described above, further the plurality of initiation requests also convey to the plurality of compute elements 840-c3, 840-c4 respectively a plurality of instances 6-exe3, 6-exe4 of the first sequence of executable instructions 6-exe (that is, instance 6-exe3 is conveyed to compute element 840-c3, and instance 6-exe4 is conveyed to compute element 840-c4).

In a third possible variation of the third possible configuration described above, further the sending of the plurality of initiation requests is directed by a procedure 5-pro of the system 840, in which the procedure 5-pro is associated with managing and communicating data across the system 840, such that each of the plurality of compute elements 840-c3, 840-c4 and the second compute element 840-c2 is operative to execute at least a portion of the procedure 5-pro relevant to that compute element.

In one possible option of the third possible variation described above, further execution of the procedure 5-pro together with execution of the instances 6-exe3, 6-exe4 of the first sequence of executable instructions 6-exe implement the specific command 6-s-com.

In a fourth possible configuration of the first possible alternative system described above, further the plurality of compute elements 840-c3, 840-c4 together with the second compute element 840-c2 constitute at least a part of a distributed processing system 840-d.

In a second possible alternative to the system 840 described above to perform efficiently a first processing task in conjunction with each of a plurality of data sets 512-D1, 512-D2, further the plurality of processing events occur in the second compute element 840-c2.

In a third possible alternative to the system 840 described above to perform efficiently a first processing task in conjunction with each of a plurality of data sets 512-D1, 512-D2, further the first compute element 840-c1 and the second compute element 840-c2 are a same compute element.

In a fourth possible alternative to the system 840 described above to perform efficiently a first processing task in conjunction with each of a plurality of data sets 512-D1, 512-D2, further the following of the plurality of commands 6-coms is started after the conversion of the description 6-des.

In a fifth possible alternative to the system 840 described above to perform efficiently a first processing task in conjunction with each of a plurality of data sets 512-D1, 512-D2, further the conversion of the description 6-des is done after the following of at least some of the plurality of commands 6-coms, but before the initiation of the plurality of processing events.

In a possible configuration of the fifth possible alternative to the system 840 described above, further the conversion of the description 6-des is performed just-in-time for the initiation of the plurality of processing events. That is to say, the initiation of the plurality of processing events begins right after the conversion of the description 6-des.

In a sixth possible alternative to the system 840 described above to perform efficiently a first processing task in conjunction with each of a plurality of data sets 512-D1, 512-D2, further the following of the plurality of commands 6-coms is an interpretation process associated with the plurality of commands.

In a possible configuration of the sixth possible alternative to the system 840 described above, further the initiation of the plurality of processing events is performed instead of the second compute element 840-c2 interpreting the specific command 6-s-com, thereby further facilitating the performing efficiently of the first processing task in conjunction with each of the plurality of data sets 512-D1, 512-D2.

In a seventh possible alternative to the system 840 described above to perform efficiently a first processing task in conjunction with each of a plurality of data sets 512-D1, 512-D2, further the code sequence 6-code is a source code written in a high level language, the description of the first processing task is written using the same high level language, and the conversion of the description 6-des is a compilation process.

Figure 33:
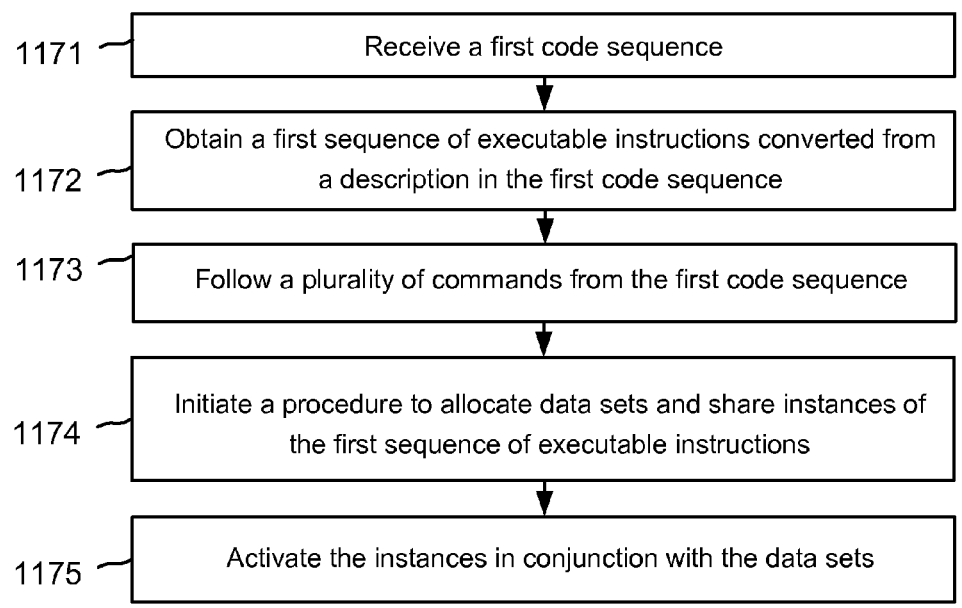
FIG. 33 illustrates one embodiment of a method for performing efficiently and distributively a first processing task in conjunction with each of a plurality of data sets.

FIG. 33 illustrates one embodiment of a method for performing efficiently and distributively a first processing task in conjunction with each of a plurality of data sets 512-D1, 512-D2. In step 1171, a distributed processing system 840, including a plurality of compute elements 840-c3, 840-c4 and an additional compute element 840-c2, receives a first code sequence 6-code comprising (i) a plurality of general commands 6-coms and (ii) a specific command 6-s-com comprising a description 6-des of a first processing task to be performed in conjunction with each of the plurality of data sets 512-D1, 512-D2 stored in the distributed processing system 840. In step 1172, the distributed processing system 840 obtains a first sequence of executable instructions 6-exe converted from the description 6-des of the first processing task, in which the first sequence of executable instructions 6-exe is operative to be effectively executed by each of the plurality of compute elements 840-c3, 840-c4, thereby implementing effectively the first processing task. In step 1173, the additional compute element 840-*c*2 follows the plurality of commands 6-coms, until the specific command 6-*s*-com is reached. In step 1174, the additional compute element 840-*c*2 initiates a procedure 5-pro associated with the distributed processing system 840, in which the procedure 5-pro is operative to (i) allocate the plurality of data sets 512-D1, 512-D2 to the plurality of compute elements 840-*c*3, 840-*c*4, and (ii) share instances 6-exe3, 6-exe4 of the first sequence of executable instructions 6-exe with the plurality of compute elements 840-*c*3, 840-*c*4. In step 1175, each of the plurality of compute elements 840-*c*3, 840-*c*4 activates the respective instance (e.g., 840-*c*3 activates 6-exe3, 840-*c*4 activates 6-exe4) of the first sequence of executable instructions 6-exe in conjunction with the data set allocated to the compute element (e.g., 512-D1 allocated to 840-*c*3, 512-D2 allocated to 840-*c*4), thereby performing efficiently and distributively the first processing task in conjunction with each of the plurality of data sets 512-D1, 512-D2.

In a first possible alternative to the method described above in FIG. 33, further the distributed system 840 identifies, by inspecting the specific command 6-*s*-com within the first code sequence 6-code, that the first processing task, as described in the specific command 6-*s*-com, is to be performed in conjunction with each of the plurality of data sets 512-D1, 512-D2. Further, the obtaining of the first sequence of executable instructions by the distributed processing system 840 is done as a result of such identification.

In a possible configuration of the first possible alternative to the method described in FIG. 33, further the obtaining of the first sequence of executable instructions 6-exe by the distributed processing system 840 comprises performing the conversion of the description 6-des, in which the conversion is done by the distributed processing system 840.

In a possible variation of the possible configuration just described, further the code sequence 6-code is a source code written in a high level language, the description 6-des of the first processing task is written using the high level language as part of the source code, and the conversion of the description 6-des is a compilation process.

In one option of the possible variation just described, further the following the plurality of commands 6-coms by the additional compute element 840-*c*2 is an interpretation process associated with the plurality of commands 6-coms.

In a second possible alternative to the method described above in FIG. 33, further the specific command 6-*s*-com is a single instruction to be performed on multiple data (SIMD), in which the single instruction is associated with the first processing task and the multiple data is associated with the plurality of data sets 512-D1, 512-D2. Further, said identifying automatically, that the first processing task is to be performed in conjunction with each of said plurality of data sets, is done by identifying that the specific command is the single instruction to be performed on multiple data (SIMD), in which such identification may be directed by recognizing a certain format associated with the specific command.

In a third possible alternative to the method described above in FIG. 33, further the specific command 6-*s*-com is a map function associated with a lambda operator and an array of data, in which the lambda operator is the description 6-des of the first processing task, and the array of data is the plurality of data sets 512-D1, 512-D2. Further, said identifying automatically, that the first processing task is to be performed in conjunction with each of said plurality of data sets, is done by identifying that the specific command is the map function associated with the lambda operator and an array of data, in which such identification may be directed by recognizing a certain format associated with the map function.

Various systems and methods are described herein to efficiently realize user-defined matrix mathematical operations in a distributed processing system. The user-defined operation will be executed on two matrices. Each matrix may include any number of scalar values, but as in all matrix operations, the number of scalar values in a row of one matrix will be equal to the number of scalar values in a column of the second matrix. The user-defined operation may be repeated on any number of combinations, provided that each combination includes a row of the first matrix (or a portion of a row of the first matrix) and a column of the second matrix (or a portion of a row of the second matrix). Compute elements within the system identify and execute a command which references two matrices and defines a mathematical function to be executed on the two matrices.

Figure 34A:
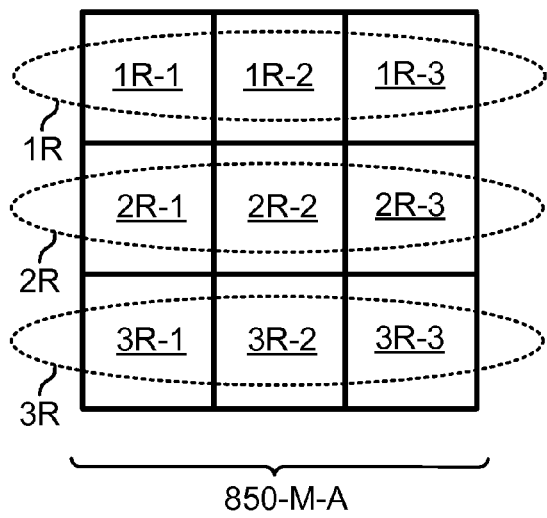
FIG. 34A illustrates one embodiment of a first matrix with a number of rows of scalar values. In the particular embodiment depicted, the matrix has three rows, each of three scalar values, in which each row is a vector.

FIG. 34A illustrates one embodiment of a first matrix 850-M-A with a number of rows of scalar values. In the particular embodiment depicted, the matrix has three rows 1R, 2R, 3R, each of three scalar values, in which each row is a vector. The first row, 1R, includes the three values 1R-1, 1R-2, and 1R-3. The second row, 2R, includes the three values 2R-1, 2R-2, and 2R-3. The third row, 3R, includes the three values 3R-1, 3R-2, and 3R-3. It is understood that there may be more or less than three rows, and each row may consist of two values or any number of values greater than two.

Figure 34B:
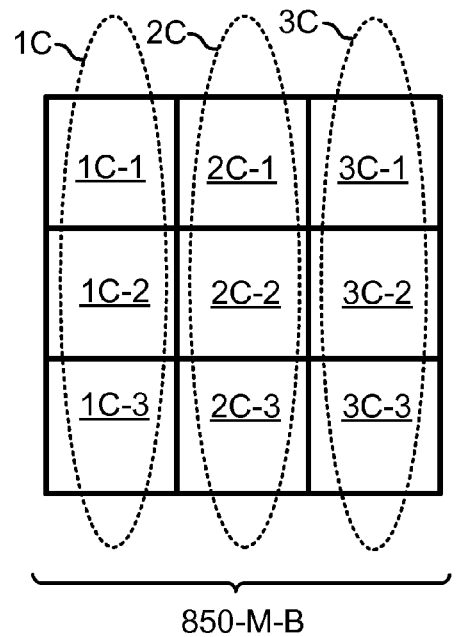
FIG. 34B illustrates one embodiment of a second matrix with a number of columns of scalar values. In the particular embodiment depicted, the matrix has three columns, each of three scalar values, in which each column is a vector.

FIG. 34B illustrates one embodiment of a second matrix 850-M-B with a number of columns of scalar values. In the particular embodiment depicted, the matrix has three columns 1C, 2C, 3C, each of three scalar values, in which each column is a vector. The first column, 1C, includes the three values 1C-1, 1C-2, and 1C-3. The second column, 2C, includes the three values 2C-1, 2C-2, and 2C-3. The third column, 3C, includes the three values 3C-1, 3C-2, and 3C-3. It is understood that there may be more or less than three columns, and each column may consist of two values or any number of values greater than two. However, if there is only one column in FIG. 34B, then there must be at least two rows in FIG. 34A. Similarly, if there is only one row in FIG. 34A, then there must be at least two columns in FIG. 34B.

Figure 34C:
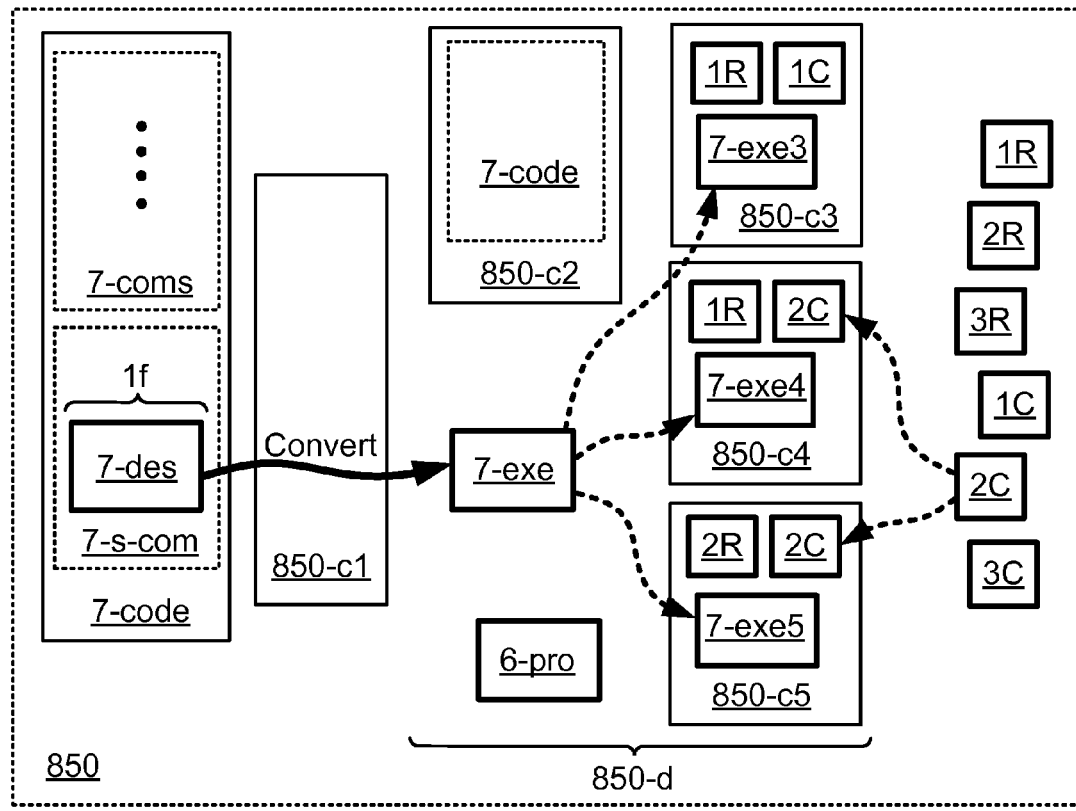
FIG. 34C illustrates one embodiment of a system configured to create combinations of vectors from the first matrix and the second matrix, and to implement a user-defined function by executing executable code on the combinations.

FIG. 34C illustrates one embodiment of a system 850, which may be a distributed processing system, configured to create combinations of vectors from the first matrix 850-M-A and the second matrix 850-M-B, and to implement a user-defined function by executing executable code 7-exe on the combinations. In one particular form of such embodiment, the system 850 includes a first code sequence 7-code, which itself includes a plurality of commands 7-coms and a specific command 7-*s*-com. The specific command 7-*s*-com references the first matrix 850-M-A and the second matrix 850-M-B. In addition, the specific command 7-*s*-com also describes 7-des a user-defined mathematical function 1*f* of two vectors, where each function is to be performed multiple times, each time with a different combination of one of the rows 1R, 2R, 3R from the first matrix 850-M-A and one of the columns 1C, 2C, 3C, from the second matrix 850-M-A. The system 850 includes also a first compute element 850-*c*1, which has access to the code sequence 7-code. Further, the first compute element 850-*c*1 is configured to identify automatically that the mathematical function 1*f* is to be executed multiple times with respect to the rows and column in matrices 850-M-A and 850-M-B, respectively. The identification is automatic in that is executed by the first compute element's 850-*c*1 inspecting the specific command 7-s-com within the first code sequence and recognizing the operation called for by this command 7-s-com or recognizing a specific command format associated with such operation. Further, the first compute element 850-c1 is also configured to convert, in accordance with the first compute element's 850-c1 identification, the mathematical function 1f into a sequence of executable instructions 7-exe which constitute an efficient implementation of the mathematical function. The system also includes a second compute element 850-c2 that has access to at least the plurality of commands 7-coms. The second compute element 850-c2 is configured to follow the plurality of commands 7-coms until the specific command 7-s-com is reached, and then to initiate a plurality of processing events. Each such processing event includes executing an instance 7-exe3, 7-exe4, 7exe5 of the sequence of executable instructions 7-exe in conjunction with one of the different combinations of one of the rows 1R, 2R, 3R, and one of the columns 1C, 2C, 3C, or a portion of the row associated with the combination and a respective portion of the column associated with the combination. The instances 7-exe3, 7-exe4, 7-exe5, are distributed among multiple compute elements. According to one set of examples, illustrated in FIG. 34C, a third compute element 850-c3 executes instance 7-exe-3 thereby executing the mathematical function 1f on the vectors 1R and 1C, whereas a fourth compute element 850-c4 executes instance 7-exe-4 thereby executing the mathematical function 1f on the vectors 1R and 2C, and a fifth compute element 850-c5 executes instance 7-exe5 thereby executing the mathematical function 1f on the vectors 2R and 2C. As shown in FIG. 34C, all of the rows and vectors may be included within the system 850, such that 1R and 1C will form a combination, 1R and 2C will form a second combination, 1R and 3C will form a third combination, 2R and 1C will form a fourth combination, 2R and 2C will form a fifth combination, 2R and 3C will form a sixth combination, 3R and 1C will form a seventh combination, 3R and 2C will form an eighth combination, and 3R and 3C will form a ninth combination. The completion of all the processing events results in the system 850 performing efficiently the mathematical function 1f in conjunction with the two matrices 850-M-A, 850-M-B.

In some embodiments, various elements of the system 850 are formed into a sub-system 850-d, which may be referred to as a distributed processing system. It is noted that both the system 850 and sub-system 850-d may be referred to as a distributed processing system, in the sense that both include a plurality of processing elements 850-c3, 850-c4, 850-c5 working distributively on a task. In one example, illustrated in FIG. 34C, distributed processing system 850-d includes the code sequence 7-code in the second compute element 850-c2, the executable instructions 7-exe prior to distribution, the executable instructions 7-exe after distribution to the compute elements, 7-exe3 distributed to 850-c3, 7-exe4 distributed to 850-c4, 7-exe5 distributed to 850-c5. These combinations shown in FIG. 34C are first three combinations listed above, but it is understood that in this example, all nine of the combinations will be distributed to and processed by the compute elements 850-c3, 850-c4, 850-c5, or by additional compute elements not shown, or that the number of compute elements exceeds nine, in which each compute element will receive only a portion of a row and a column combination.

In some embodiments, the system 850 includes a procedure 6-pro configured to send the initiation request to various compute elements 850-c2, 850-c3, 850-c4, 850-c5, each of which compute elements is operative to execute at least a portion of the procedure 6-pro relevant to that compute element. For example, procedure 6-pro may direct third compute element 850-c3 to execute instance 7-exe3 on row 1R and column 1C, as illustrated in FIG. 34C. In various embodiments, the execution of procedure 6-pro, and the execution of the instances 7-exe3, 7exe-4, 7-exe5 of the executable instructions 7-exe, together implement the specific command 7-s-com.

An example of a specific format for command 7-s-com is [A.matrix(B, lambda)], where A is a first matrix with a certain number of rows, B is a second matrix with a certain number of columns, and a matrix operation will be executed according to lambda. Lambda defines a function of two vectors in which the vectors are taken from different combinations of rows (or portions of rows) in the first matrix A, and columns (or portions of columns) in the second matrix B. A compute element in the system takes lambda and compiles it into executable code. In the various embodiments that include procedure 6-pro, 6-pro sends to multiple compute elements in the system, different combination of rows from A (or portions of rows form A) and columns from B (or portions of columns from B), plus the executable code to implement lambda. After execution of the executable code by the compute elements, the results is a third matrix of scalar values, with the number of rows equal to the number rows in matrix A and the number of columns equal to the number of columns in matrix B.

The procedure 6-pro may be stored in any of the compute elements, 850-c1, 850-c2, 850-c3, 850-c4, 850-c5, or may be stored in an entire separate compute element. The procedure 6-pro may be created shortly before conversion of a specific command 7-s-com to machine executable code 7-exe, or may be rather created any prior time and stored within the system 850, to become operable only when a specific command 7-s-com is to be so converted. The procedure 6-pro is optimized to take advantage of the requirements and capabilities of the specific elements in the distributed processing system 850-d, and in some embodiments of the requirements and capabilities of elements in the system 850 other than those in the distributed processing system 850-d. In all of the embodiments in which the procedure 6-pro is operable, the procedure 6-pro in some way or ways improves the speed and efficiency of the system 850.

In various embodiments, the first compute elements 850-c1 is aware of the requirements and capabilities of the specific compute elements 850-c2, 850-c3, 850-c4, 850-c5, in the distributed processing system 850-d. In these embodiments, the first compute element 850-c1 converts the description 7-des in a manner to optimize the machine executable code 7-exe for later use and processing by these compute elements 850-c2, 850-c3, 850-c4, 850-c5. In these embodiments, the efficiency of the conversion process is enhanced in order to improve the speed and efficiency of the system 850.

Figure 34D:
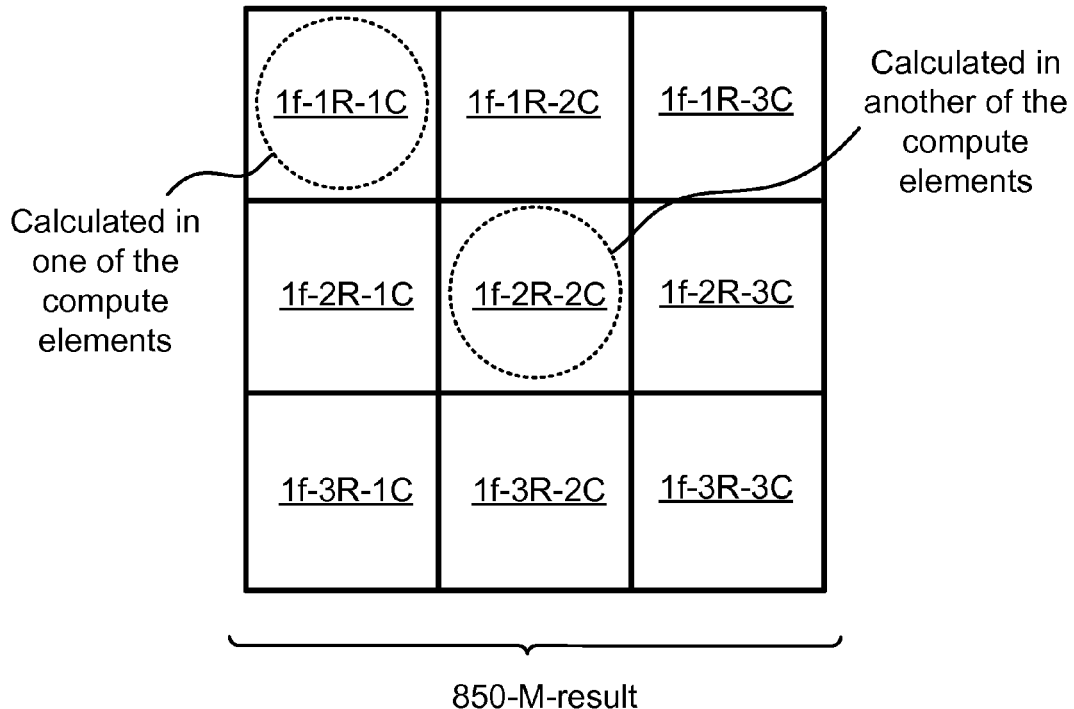
FIG. 34D illustrates one embodiment of a third matrix of scalar values, that has been created by the execution of the executable code on the combinations of vectors.

FIG. 34D illustrates one embodiment of a third matrix 850-M-result of scalar values, that has been created by the execution of the executable code 7-exe on the combinations of vectors. There are nine scalar values in matrix 850-M-result, which is the result of performing a mathematical operation including three rows, 1R, 2R, 3R from the first matrix 850-M-A and the three columns, 1C, 2C, 3C from the second matrix 850-M-B. Had there been, for example, only two columns in matrix 850-M-B, then there would be only six scalar values in the matrix 850-M-result.

As shown in FIG. 34D, one of the scalar values, in the box at the upper right, is 1f-1R-1C, which is the result of mathematical function 1f in conjunction with vectors 1R and 1C. Similarly, 1f-1R-2C is the result of mathematical function 1f in conjunction with vectors 1R and 2C, 1f-1R-3C is the result of mathematical function 1f in conjunction with vectors 1R and 3C, 1f-2R-1C is the result of mathematical function 1f in conjunction with vectors 2R and 1C, 1f-2R-2C is the result of mathematical function 1f in conjunction with vectors 2R and 2C, 1f-2R-3C is the result of mathematical function 1f in conjunction with vectors 2R and 3C, 1f-3R-1C is the result of mathematical function 1f in conjunction with vectors 3R and 1C, 1f-3R-2C is the result of mathematical function 1f in conjunction with vectors 3R and 2C, and 1f-3R-3C is the result of mathematical function 1f in conjunction with vectors 3R and 3C. As indicated in FIG. 34D, scalar values 1f-1R-1C and 1f-2R-2C were calculated by different compute elements, which, as shown in FIG. 34C, were the third compute element 850-c3 and the fifth compute element 850-c5, respectively. The implication is that the various scalar values shown in FIG. 34D have been calculated by different ones of the compute elements in FIG. 34C. In FIG. 34C, four compute elements, 850-c2, 850-c3, 850-c4, 850-c5 are illustrated that may calculate the scalar values. Since the number of scalar values (or portions thereof) to be calculated may be higher than the number of compute elements, it is understood that some or all of the compute elements will calculate two or more scalar values or portions thereof. That is one case. It is possible, however, that there will be one compute element for each scalar value or a portion thereof to be computed, in which case in some embodiments each compute element will calculate only one scalar value of a portion thereof, although it is possible, even in this situation, to allocate two or more calculations to one compute element. It is also possible, that in a specific situation there are more compute elements than scalar values to be calculated, in which case some the scalar values will be calculated by only part of the compute elements.

One embodiment is a system 850 configured to perform efficiently a mathematical function 1f in conjunction with two matrices, first matrix 850-M-A, second matrix 850-M-B. In one particular form of such embodiment, the system 850 includes a code sequence 7-code comprising a plurality of commands 7-coms and a specific command 7-s-com, in which the specific command (i) references the first matrix 850-M-A having a plurality of rows 1R, 2R, 3R and the second matrix 850-M-B having a plurality of columns 1C, 2C, 3C, and (ii) describes 7-des a mathematical function 1f of two vectors to be executed multiple times. Each execution is of a different combination of one of the rows 1R, 2R, 3R in matrix 850-M-A and one of the columns 1C, 2C, 3C of matrix 850-M-B, acting as the two vectors. The system 850 also includes a first compute element 850-c1 having access to the code sequence 7-code. The first compute element 850-c1 is configured to: (i) identify automatically, by inspecting the specific command 7-s-com within the first code sequence 7-code, that the mathematical function 1f is to be executed multiple times in conjunction with the two matrices 850-M-A, 850-M-B, and (ii) according to said identification, convert the mathematical function 1f, into a sequence of executable instructions 7-exe constituting an efficient implementation of the mathematical function 1f. The system 850 also includes a second compute element 850-c2, having access to at least the plurality of commands 7-coms. The second compute element 850-c2 is configured to: (i) follow the plurality of commands 7-coms, until the specific command 7-s-com is reached; and then (ii) initiate a plurality of processing events, in which each of the processing events comprises executing an instance of the sequence of executable instructions 7-exe in conjunction with one of the different combinations of one of the rows 1R, 2R, 3R and one of the columns 1C, 2C, 3C, or a portion of the row and a respective portion of the column associated with the combination, thereby resulting in performing efficiently the mathematical function 1f in conjunction with the two matrices 850-M-A, 850-M-B.

In a first possible alternative to the system 850 just described to perform efficiently a mathematical function 1f in conjunction with two matrices first matrix 850-M-A, second matrix 850-M-B, system 850 further includes a plurality of compute elements 850-c3, 850-c4, 850-c5, and each of the plurality of processing events occurs in each of the plurality of compute elements, respectively.

In a first possible configuration of the first possible alternative system 850 described above, further the instances 7-exe3, 7-exe4, 7-exe5 of the sequence of executable instructions 7-exe are available to the plurality of compute elements 850-c3, 850-c4, 850-c5 through the system 850 sending such instances to the plurality of compute elements 850-c3, 850-c4, 850-c5, or through the plurality of compute elements obtaining such instances from the system.

In a second possible configuration of the first possible alternative system 850 described above, further the different combinations of one of the rows 1R, 2R, 3R and one of the columns 1C, 2C, 3C, or the portions of the rows and respective portions of the columns, are available respectively to the plurality of compute elements 850-c3, 850-c4, 850-c5 through the plurality of compute elements respectively being pointed to the different combinations or portions by the system 850, using, as an example, pointers to memory locations within system 850.

In a third possible configuration of the first possible alternative system 850 described above, further the initiation is done by the second compute element 850-c2 sending a plurality of initiation requests to the plurality of compute elements 850-c3, 850-c4. 850-c5, respectively.

In a first possible variation of the third possible configuration just described, further the plurality of initiation requests also convey to the plurality of compute elements 850-c3, 850-c4. 850-c5, respectively, the different combinations or portions.

In a second possible variation of the third possible configuration described above, further the plurality of initiation requests also convey to the plurality of compute elements 850-c3, 850-c4. 850-c5, respectively, a plurality of instances 7-exe3, 7-exe4, 7-exe5 of the sequence of executable instructions 7-exe.

In a third variation of the third possible configuration described above, further the sending of the plurality of initiation requests is directed by a procedure 6-pro of the system 850, in which the procedure 6-pro is associated with managing and communicating data across the system 850, and such that each of the plurality of compute elements 850-c3, 850-c4. 850-c5 and the second compute element 850-c2 is operative to execute at least a portion of the procedure 6-pro relevant to that compute element.

In one option of the third variation just described, further execution of the procedure 6-pro, together with execution of the instances 7-exe3, 7-exe4, 7-exe5 of the sequence of executable instructions 7-exe, implements the specific command 7-s-com.

In a fourth possible configuration of the first possible alternative system 850 described above, further the plurality of compute elements 850-c3, 850-c4. 850-c5, together with the second compute element 850-c2, constitutes at least a part of a distributed processing system 850-d.

In a second possible alternative to the system 850 described above to perform efficiently a mathematical function $1f$ in conjunction with two matrices, first matrix 850-M-A, second matrix 850-M-B, further the plurality of processing events occur in the second compute element 850-$c2$.

In a third possible alternative to the system 850 described above to perform efficiently a mathematical function $1f$ in conjunction with two matrices, first matrix 850-M-A, second matrix 850-M-B, further the first compute element 850-$c1$ and the second compute element 850-$c2$ are the same compute element.

In a fourth possible alternative to the system 850 described above to perform efficiently a mathematical function $1f$ in conjunction with two matrices, first matrix 850-M-A, second matrix 850-M-B, further the following of the plurality of commands 7-coms is started after the conversion of the mathematical function $1f$.

In a fifth possible alternative to the system 850 described above to perform efficiently a mathematical function $1f$ in conjunction with two matrices, first matrix 850-M-A, second matrix 850-M-B, further the conversion of the mathematical function $1f$ is done after the following of at least some of the plurality of commands 7-coms, but before the initiation of the plurality of processing events.

In a possible configuration of the fifth possible alternative system 850 just described, further the conversion of the mathematical function $1f$ is performed just-in-time for the initiation of the plurality of processing events.

In a six possible alternative to the system 850 described above to perform efficiently a mathematical function $1f$ in conjunction with two matrices, first matrix 850-M-A, second matrix 850-M-B, further the following of the plurality of commands 7-coms is an interpretation process associated with the plurality of commands 7-coms.

In a possible configuration of the sixth possible alternative system 850 just described, further the initiation of the plurality of processing events is performed instead of the second compute element 850-$c2$ interpreting the specific command 7-$s$-com, thereby further facilitating the performing efficiently of the mathematical function $1f$ in conjunction with the two matrices 850-M-A, 850-M-B.

In a seventh possible alternative to the system 850 described above to perform efficiently a mathematical function $1f$ in conjunction with two matrices, first matrix 850-M-A, second matrix 850-M-B, further the code sequence 7-code is a source code written in a high level language, the description of the mathematical function $1f$ is written using the high level language, and the conversion of the mathematical function $1f$ is a compilation process.

Figure 35:
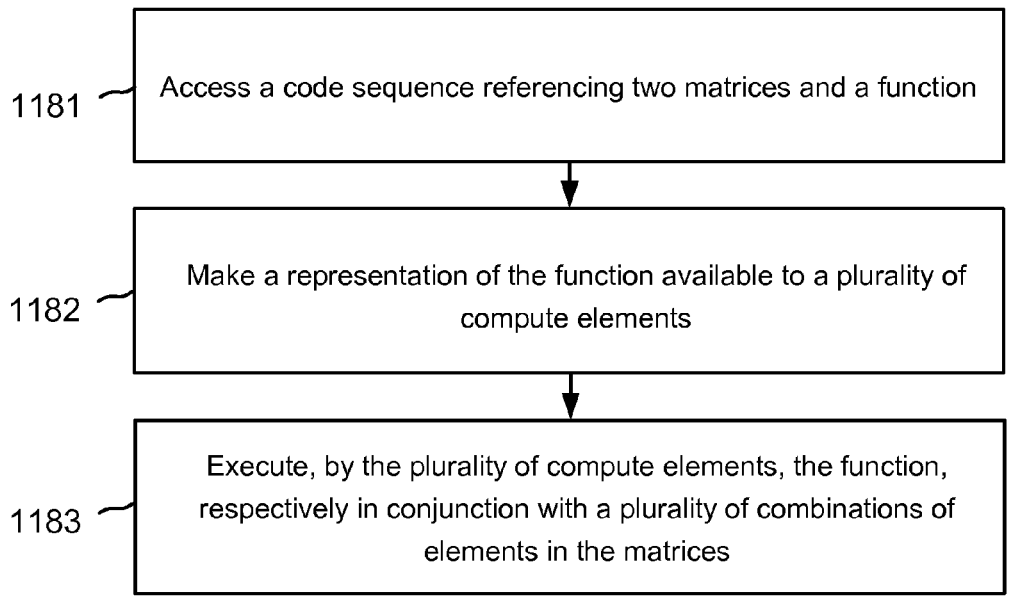
FIG. 35 illustrates one embodiment of a method for performing matrices related operations.

FIG. 35 illustrates one embodiment of a method for performing efficiently matrices related operations. In step 1181, a distributed processing system 850 accesses a code sequence 7-code that (i) references a first matrix 850-M-A having a plurality of rows 1R, 2R, 3R and a second matrix 850-M-B having a plurality of columns 1C, 2C, 3C, and (ii) describes 7-des a mathematical function $1f$ of two vectors to be executed multiple times, each time with a different combination of one of the rows and one of the columns acting as the two vectors. For example, mathematical function $1f$ is to be applied/executed a first time on row 1R acting as the first vector and on column 1C acting as the second vector, and the same mathematical function $1f$ is to be applied a second time on row 1R acting as the first vector and column 2C acting as the second vector, and so on, with different combinations of rows 1R, 2R, 3R and columns 1C, 2C, 3C.

In step 1182, upon following the code sequence 7-code, the system 850 makes available to each of a plurality of compute elements 850-$c3$, 850-$c4$, 850-$c5$ belonging to the system 850, the description 7-des of the mathematical function or a representation 7-exe thereof, together with at least one of the different combinations of one of the rows and one of the columns or a portion of the row and a respective portion of the column associated with the combination. For example, in one embodiment, a combination may be row 1R and column 2C, and this combination may be made available to compute element 850-$c4$. For example, in an alternative embodiment, a row 1R may be apportioned in conjunction with a first row portion 1R-1, 1R-2 (1R-1 and 1R-2 together are the first row portion), and a column 2C may be apportioned in conjunction with a respective first column portion 2C-1, 2C-2 (1C-1 and 1C-2 together are the first column portion). Then portions of rows and columns are made available to a compute element, for example, the first row portion 1R-1, 1R-2 and the respective first column portion 2C-1, 2C-2 are made available to compute element 850-$c4$.

In step 1183, each of the compute elements executes the mathematical function $1f$ in conjunction with the row and the column made available to the compute element, or in conjunction with the portion of the row and the respective portion of the column made available to the compute element, thereby realizing the mathematical function $1f$ in conjunction with the first matrix 850-M-A and the second matrix 850-M-B. For example, a compute element receiving row 1R and column 1C may execute the mathematical function $1f$ to generate the result $1f$-1R-1C. Alternatively, a compute element receiving the first row portion 1R-1, 1R-2 and the respective first column portion 2C-1, 2C-2 may execute the mathematical function $1f$ to generate a first portion of the result $1f$-1R-2C, to be later combined with another portion of said result into the complete result $1f$-1R-2C. The compute elements will continue to execute the mathematical function $1f$ on all the combinations of rows and columns, or row portions and column portions, received by the compute elements until the mathematical function $1f$ has been executed on all available vectors.

In a first possible alternative to the method described above in FIG. 35, further the plurality of rows 1R, 2R, 3R constitute M rows (for example, M=3), the plurality of columns 1C, 2C, 3C constitute N columns (for example, N=3), and therefore a total of M*N (M times N) different combinations of one of the rows and one of the columns exist (for example, 3 rows times 3 columns equals 9 combinations.) Further, according to the code sequence 7-code, the mathematical function $1f$ is to be executed for each of the M*N different combinations, resulting in a third matrix 850-M-result having M rows and N columns, in which the third matrix has M*N entries constituting respectively the following M*N results: $1f$-1R-1C, $1f$-2R-1C, $1f$-2R-1C, $1f$-1R-2C, $1f$-2R-2C, $1f$-2R-2C, $1f$-1R-3C, $1f$-2R-3C, and $1f$-2R-3C. Further, each of the compute elements 850-$c3$, 850-$c4$, 850-$c5$, as well as possibly others not illustrated in FIG. 34C, after executing the mathematical function $1f$, holds at least one of the entries of the third matrix 850-M-result, or a part of one of the entries of the third matrix 850-M-result corresponding to the mathematical function $1f$ applied on the portion of the respective row and the portion of the respective column.

In a first possible configuration of the first possible alternative to the method described in FIG. 35, further each of the plurality of M rows is of length L, each of the plurality of N columns is of the same length L, and the mathematical function $1f$ is a length-L dot-product of the two vectors such that the third matrix 850-M-result is equal to the first matrix 850-M-A multiplied by the second matrix 850-M-B.

In a second possible configuration of the first possible alternative to the method described in FIG. 35, further each of the plurality of M rows is of length L, each of the plurality of N columns is of the same length L, and the mathematical function 1*f* is a length-L weighted dot-product of the two vectors.

In a second possible alternative to the method described above in FIG. 35, further the code sequence 7-code comprises a specific command 7-*s*-com, the specific command includes the references to the first matrix 850-M-A and the second matrix 850-M-B, and the specific command 7-*s*-com further includes the description 7-des of the mathematical function 1*f*.

In a first possible configuration of the second possible alternative to the method described in FIG. 35, further interpreting, by an additional compute element 850-*c*2 belonging to the distributed processing system 850, the specific command 7-*s*-com, in which the interpretation constitutes at least part of the following of the code sequence 7-code.

In a possible variation of the first possible configuration of the second alternative to the method described in FIG. 35, further the additional compute element 850-*c*2 detects, by inspecting the specific command 7-*s*-com in the code sequence 7-code, that (i) the specific command 7-*s*-com makes said references to the first matrix 850-M-A and the second matrix 850-M-B, and that (ii) the specific command 7-*s*-com describes 7-des the mathematical function 1*f*. The additional compute element 850-*c*2 extracts, from the specific command 7-*s*-com, the description 7-des of the mathematical function 1*f*. Further, the system 850 facilitates, based on the detection and extraction, the availability of vectors and execution of mathematical function 1*f* in conjunction with the plurality of compute elements 850-*c*3, 850-*c*4, 850-*c*5.

In a second possible configuration of the second possible alternative to the method described in FIG. 35, further the additional compute element 850-*c*1 detects, by inspecting the specific command 7-*s*-com in the code sequence 7-code, that (i) the specific command 7-*s*-com makes the references to the first matrix 850-M-A and the second matrix 850-M-B, and that (ii) the specific command 7-*s*-com describes the mathematical function 1*f*. Further, the additional compute element 850-*c*1 extracts, from the specific command 7-*s*-com, the description 7-des of the mathematical function 1*f*. Further, the first compute element 850-*c*1 converts the description 7-des of the mathematical function 1*f*, into a sequence of executable instructions 7-exe, in which the sequence of executable instructions 7-exe constitutes said representation of the mathematical function 1*f*, wherein each of the compute elements 850-*c*3, 850-*c*4. 850-*c*5, executes the mathematical function 1*f* in conjunction with the row 1R, 2R, 3R and the column 1C, 2C, 3C made available to that compute element, or in conjunction with the portion of the row and the respective portion of the column made available to that compute element, by executing the sequence of executable instructions 7-exe or an instance 7-exe3, 7-exe4, 7-exe5 of the sequence of executable instructions 7-exe.

In a third possible alternative to the method described above in FIG. 35, further the executing of the mathematical function 1*f* is done simultaneously by the plurality of compute elements 850-*c*3, 850-*c*4, 850-*c*5.

Various systems and methods are described herein to alternate system states between a first state in which a compute element conveys data write requests wherein each data write request includes a single data set extracted from a store command recently received in the compute element, and a second state in which the compute element conveys aggregated data write requests wherein each aggregated data write request includes two or more data sets. The first state allows synchronization between incoming store commands and outgoing data write requests, but increases the traffic load on a switching network within the system. The second state reduces significantly the traffic load on the switching network, but at the cost of losing one-to-one synchronization between store commands and write requests. Various systems and methods described herein permit automatic switching between the first state and the second state, and also between second state and the first state. If the system is operating in the first state, and there are no attempts or negligible attempts to read-back the data sets conveyed by the data write requests, the system will automatically switch to the second state. If the system is operating in the second state, and requests are received to read one or more of the data sets conveyed within the data write requests, the system will automatically switch to the first state.

In some embodiments, the second state includes two data sets per data write request. In alternative embodiments, the second state includes some number of data sets greater than two, within each data write request. In alternative embodiments, each data write request can hold two or more data sets, and the number of data sets per data write request will vary depending on various criteria, such as, but not by way of limitation, the total number of data sets to be written into memory, the rapidity of changes between the first system state and the second system state, and other such criteria.

In some embodiments, even one data read request will trigger the automatic switch from the second system state to the first system state. In alternative embodiments, the switch from the second system state to the first system state occurs only have a predetermined number of data read requests have been received. In alternative embodiments, the switch from the second system state to the first system state occurs only when the system experiences a predetermined rate of data read requests per unit of time.

Figure 36A:
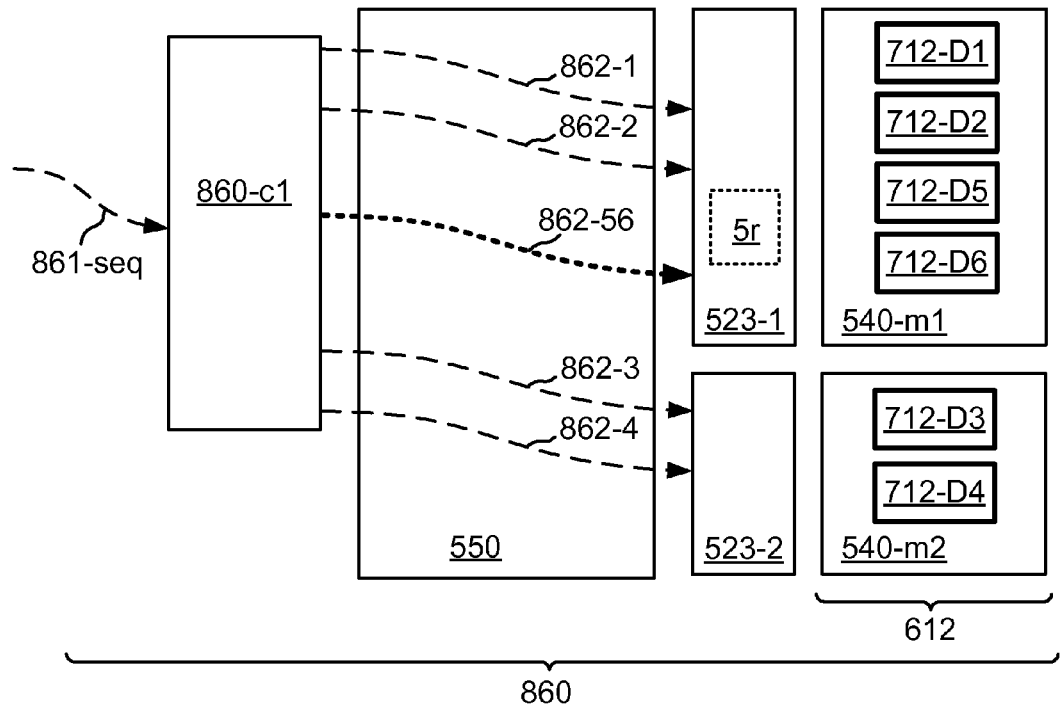
FIG. 36A illustrates one embodiment of a system operative to automatically decide to aggregate data write requests in a distributed data store.

FIG. 36A illustrates one embodiment of a system 860 operative to automatically decide to aggregate data write requests 862-1, 862-2, 862-3, 862-4, 862-56 in a distributed data store 612. A first compute element 860-*c*1 receives a sequence 861-seq of store commands (861-1, 861-2, 861-3, 861-4, 861-5, 861-6, 861-7, 861-8 in FIG. 37A) associated with a sequence of data sets 712-D1, 721-D2, 712-D3, 712-D4, 712-D5, 712-D6 in FIG. 36A and FIG. 37A, and 712-D7, 712-D8 in FIG. 38A. In the sequence 861-seq, each store command includes a single data sets (in FIG. 37A, data set 712-D1 in store command 861-1, 712-D2 in 861-2, 712-D3 in 861-3, 712-D4 in 861-D4, 712-D5 in 861-5, 712-D6 in 861-6, 712-D7 in 861-D7, 712-D2 in 861-8). Initially, some of these store commands (for example, four of the store commands), including the data sets, are conveyed by the first compute element 860-*c*1 via a switching network 550 respectively as four data write requests 862-1, 862-2, 862-3, 862-4, but eventually some of the following store commands (for example, two of the following store commands) are conveyed as an aggregated write request 862-56. The data write requests are conveyed through the switching network 550 to one or more data interfaces 523-1, 523-2, in which each data interface is associated with its respective memory module 523-1 with 540-*m*1, 523-2 with 540-*m*2. After execution of the data write requests, each data set will be located in one of the memory modules within the data store 612 (where data sets 712-D1, 712-D2, 712-D5, 712-D6 are located within module 540-*m*1, and data sets 712-D3, 712-D4 are located within module 540-*m*2).

In some alternative embodiments illustrated in FIG. 36A, the storing of those data sets 712-D1, 712-D2 performed in synchronization with the reception of data write requests 862-1, 862-2, is performed in conjunction with a data register 5*r* which is part of or associated with a particular data interface 523-1.

Figure 36B:
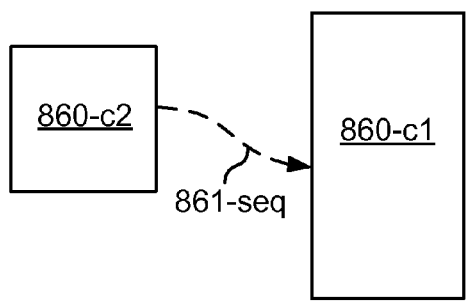
FIG. 36B illustrates one embodiment of two compute elements in which the second compute element sends to the first compute element store commands for data sets, but the second compute element does not know if the data sets are to be conveyed either in individual data write requests or rather as aggregated data write requests.

FIG. 36B illustrates one embodiment of two compute elements 860-*c*1, 860-*c*2, in which the second compute element 860-*c*2 sends to the first compute element 860-*c*1 the series 861-seq of store commands for data sets, but the second compute element 860-*c*2 does not know if the data sets are to be conveyed either in individual data write requests or rather as aggregated data write requests. Stated alternatively, the second compute element 860-*c*2 does not know if the system 860 is in the first state (that is, individual data write requests) or the second state (that is, aggregated data write requests).

Figure 36C:
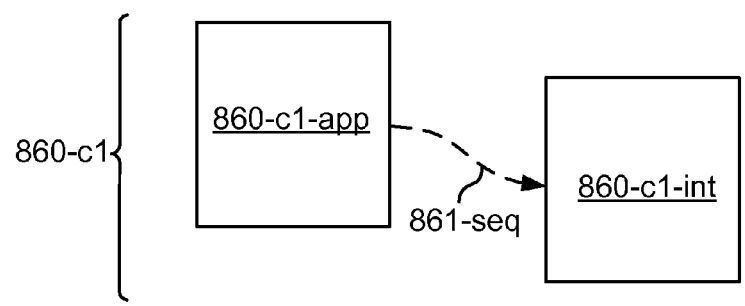
FIG. 36C illustrates one embodiment of a first compute element including an application layer that generates a sequence of store commands, and an interface layer that both receives the sequence of store commands and sends data sets to data interfaces with either individual data write requests or with aggregated data write requests.

FIG. 36C illustrates one embodiment of a first compute element 860-*c*1, including an application layer 860-*c*1-app that generates and conveys a sequence 861-seq of store commands, and an interface layer 860-*c*1-int that both receives the sequence 861-seq of store commands and sends data sets to data interfaces (523-1, 523-2 from FIG. 36A) with either individual data write requests or with aggregated data write requests. The application layer 860-*c*1-app does not know if the data sets are to be conveyed either in individual data write requests or rather as aggregated data write requests. Stated alternatively, the application layer 860-*c*1-app does not know if the system 860 is in the first state (that is, individual data write requests) or the second state (that is, aggregated data write requests).

FIG. 37A illustrates one embodiment of a sequence 861-seq of store commands, in which each store command includes a single data set to be stored, store command 861-1 includes data set 712-1, 861-2 includes 712-D2, 861-3 includes 712-D3, 861-4 includes 712-D4, 861-5 includes 712-D5, 861-5 includes 712-D6, 861-6 includes 712-D7, 861-8 includes 712-D8. The system initially generates a series 862-ser of data write requests in which each data write request includes a single data set, data write request 862-1 includes data set 712-D1, 862-2 includes 712-D2, 862-3 includes 712-D3, 862-4 includes 712-D4. This has previously been called the "first state" of the system, which is a state in which there is synchronization between each store command and a respective write request in conjunction with a single data set. FIG. 37A illustrates also the "second state" of the system, in which a single data write request includes two or more data sets, here data write request 862-56 includes data sets 712-D5, 712-D6, and data write request 862-78 includes data sets 862-D7 and 862-D8. This "second state" is also referenced as the state with "aggregated data write requests", in which "aggregated" means holding two or more data sets to be conveyed for storage. In one embodiment, it is a data interface (for example, data interface 523-1, FIG. 36A) that indicates to the first compute element 860-*c*1 to switch from the first state to the second state, or from the second state back to the first state, based on whether or not an attempt was made to read-back, from that data interface, one of the data sets already written. If no attempt was made to read-back one of the data sets, then aggregation is chosen, and the system is in the "second state".

FIG. 37B illustrates one embodiment of multiple store commands 861-9, 861-10, each of which includes a single data set, store command 861-9 includes data set 712-D9, store command 861-10 includes data set 712-D10. The store commands generate a series 863-ser of data write requests 862-9, 862-10, which are synchronized in the sense that each data write request includes a single data set associated with a single store command, and is conveyed as soon as possible: data write request 862-9 includes data set 712-D9 to be conveyed as soon as store commands 861-9 is received, data write request 862-10 includes data set 712-D20 to be conveyed as soon as store command 861-10 is received. FIG. 37B is an example of the first system state, with synchronization. In chronological order, a first synchronized state shown in series 862-ser in FIG. 37A, became the second state shown in 862-56, 862-78 in FIG. 37A, and then changed back to the first state in FIG. 37B. In this sense, FIG. 37B shown a resynchronization of the data write requests with the store commands.

FIG. 37C illustrates one embodiment of multiple store commands each holding a single data set, store command 861-11 holding data set 712-D11, store command 861-12 holding store command 712-D12, in which at least two data sets 712-11, 712-12 have been aggregated in a single data write request 862-1112. The single aggregated data write request 862-1112 is similar in structure to the aggregated data requests 862-56, 862-78 in FIG. 37A, except that 862-1112 is specifically sent by the first compute element 860-1 to a data interface that was not the data interface indicating that no data read request was received for the data sets recently written into memory. It is this condition, the total absence of data read requests, or negligible data read requests, that causes the system to automatically alternate from the first state to the second state. In data write requests 862-56, 862-78 in FIG. 37A, a data interface 523-1 in FIG. 36A has detected the condition and subsequently receives aggregated data write requests. In data request 862-1112, one data interface, say 523-1 had detected and reported the condition, but the data request 862-1112 is then send to a different data interface, for example 523-2.

One embodiment is a system 860 operative to automatically decide to aggregate data write requests in a distributed data store. In one particular form of such embodiment, the system includes a distributed data store 612 comprises a plurality of memory modules 540-*m*1, 540-*m*2, in which the plurality of memory modules 540-*m*1, 540-*m*2 are associated respectively with a plurality of data interfaces 523-1, 523-2. The system further includes a switching network 550. The system further includes a first compute element 860-*c*1 configured to receive sequentially a sequence 861-seq of store commands 861-1, 861-2, 861-3, 861-4, 861-5, 861-6, 861-7, 861-8 associated respectively with a sequence of data sets 712-D1, 712-D2, 712-D3, 712-D4, 712-D5, 712-D6, 712-D7, 712-D8, in which each of the store commands, for example. 861-1, instructs the first compute element 860-*c*1 to store the respective data set, for example 712-D1, in the distributed data store 612. For example, store command 861-1 may instruct the first compute element 860-*c*1 to store data set 712-D1 in memory module 540-*m*1 of data store 612. Further, the first compute element 860-*c*1 is configured to initiate, as a result of the sequence 861-seq, a series 862-ser of data write requests 862-1, 862-2, 862-3, 862-4, respectively, with some of the commands 861-1, 861-2, 861-3, 861-4, and in synchronization therewith, in which: (i) each of the data write requests, for example 862-1, comprises one of the data sets, for example 712-D1 received in conjunction with store command 861-1, to be conveyed, and (ii) each of the data write requests, for example 862-1, is sent via the switching network 550 to one of the data interfaces, for example 523-1, that consequently stores, in the respective memory module 540-m1, the data set 712-D1 conveyed. Further, each of the data interfaces, 523-1, 523-2, is configured to detect a condition in which: (i) at least a certain number of the data write requests, for example the two data write requests 862-1 and 862-2, have arrived at the data interface 523-1, while (ii) there has been essentially no attempt, or in some embodiments a negligible number of attempts, to read any of the data sets conveyed to the data interface, for example, there was no attempt, or perhaps only one attempt, to read-back the data sets 712-D1, 712-D2 conveyed respectively by the data write requests 862-1, 862-2. The absence of data read requests, or the low number of data read requests, signifies that maintaining low latency through the synchronization is not critical, at least at that point of time. Therefore, in response to one of the data interfaces, for example 523-1, signaling that the condition has been detected, the first compute element 860-c1 is further configured to send at least one aggregated data write request 862-56 to the data interface 523-1, in which the aggregated data write request 862-56 conveys at least two of the data sets 712-D5, 712-D6 that have not yet been conveyed. As a result of this change in system state from sending synchronized data write requests (that is, only one data set per data write request) to a second state in of aggregated data write requests (that is, the data write requests include two or more data sets), synchronization between data write requests and data sets is broken, and consequently a latency associated with storage of the data sets 712-D5, 712-D6 conveyed is increased. However, this change in system state also achieves a reduction of traffic load on the switching network 550.

In a first alternative embodiment to the system 860 operating to automatically decide to aggregate data write requests in a distributed data store 612, each of the data interfaces, for example 523-1, is further configured to detect a departure from the condition, by identifying an attempt to read any of the data sets 712-D1, 712-D2, 712-D5, 712-D6 conveyed to the data interface, in this example 523-1, thereby signifying that maintaining low latency through a renewed synchronization with the sequence of store commands 861-seq is now important or even critical. Further, as a response to one of the data interfaces 523-1 signaling that said departure from the condition has been detected, the first compute element 860-c1 is further configured to stop aggregation of data sets 712-D7, 712-D8 into a next aggregated data write request 862-78, and to send, as quickly as possible, the next aggregated data write request 862-78 containing whatever data sets 712-D7, 712-D8 that have already been accumulated.

In a possible configuration of the first alternative embodiment, as a further response to one of the data interfaces 523-1 signaling the said departure from the condition has been detected, the first compute element 860-c1 is further configured to initiate a second series 863-ser of data write requests 862-9, 862-10 in a renewed synchronization with the store commands 861-9, 861-10 that are still being received, in which: (i) each of the data write requests, for example 862-9, in the second series 863-ser comprises one of the data sets 712-D9 that has been recently received in one of the store commands, in this example 861-9, and (ii) each of the data write requests, 862-9, 862-10 in the second series 863-ser is sent via the switching network 550 to one of the data interfaces, for example 523-1, that consequently stores, in the respective memory module 540-m1, the respective data set 712-D9, 712-D10. As a result, the synchronization is renewed, and thereby a latency associated with storage of the data sets conveyed 712-D9, 712-D10 is decreased, but in addition the traffic load on the switching network 550 is increased.

In a first possible variation of the possible configuration, further the renewed synchronization is done in conjunction with all of the data interfaces 523-1, 523-2.

In a second possible variation of the possible configuration, further the renewed synchronization is done in conjunction with only the data interface 523-1 which has detected the departure from the condition.

In a second alternative embodiment to the system 860 operating to automatically decide to aggregate data write requests in a distributed data store 612, the first compute element 860-c1, as a further response to one of the data interfaces, for example 523-1, signaling that the condition has been detected, is further configured to send at least another aggregated data write request 862-1112 to one of the data interfaces 523-2 other than the data interface 523-1 that has detected the condition, and in which the another aggregated data write request 862-1112 conveys at least another two of the data sets, 712-D11, 712-D12, that have not yet been conveyed.

In a possible configuration of the second alternative embodiment, further the at least two data sets 712-D5, 712-D6 conveyed by the aggregated data write request 862-56 are selected for aggregation in the aggregated data write request 862-56 according to a decision by the first compute element 860-c1 to store the at least two data sets 712-D5, 712-D6 in conjunction with one of the data interfaces 523-1. Further, the at least another two data sets 712-D11, 712-D12 conveyed by the another aggregated data write request 862-1112 are selected for aggregation in the another aggregated data write request 862-1112 according to another decision by the first compute element 860-c1 to store the at least another two data sets 712-D11, 712-D12 in conjunction with another of the data interfaces 523-2.

In a third alternative embodiment to the system 860 operating to automatically decide to aggregate data write requests in a distributed data store 612, the breaking of synchronization between data write requests and data sets is done for all of the data interfaces 523-1, 523-2.

In a fourth alternative embodiment to the system 860 operating to automatically decide to aggregate data write requests in a distributed data store 612, the breaking of synchronization is done in conjunction with only the data interface, for example 623-1, that detected the condition.

In a fifth alternative embodiment to the system 860 operating to automatically decide to aggregate data write requests in a distributed data store 612, further the first compute element 860-c1 decides, per each of the data write requests 862-1, 862-2, 862-3, 862-4, according to an input, which of the data interfaces 523-1, 523-2 are the target of the data write request.

In a possible configuration of the fifth alternative embodiment, further the distributed data store 612 is a key-value store (KVS), 621 in FIG. 13A. Also, the sequence of data sets 712-D1, 712-D2, 712-D3 is a sequence of values 618-v1, 618-v2, 618-v3 in FIG. 13A, in which each of the data sets 712-D1, 712-D2, 712-D3, is a value associated with a key 618-k1, 618-k 2, 618-k3 in FIG. 13A. Also, the input by which the first compute element 806-c1 decides which data interface 523-1, 523-2 is the target for each data write request 862-1, 862-2, 862-3, 862-4, is the respective key of the data set.

In a sixth alternative embodiment to the system 860 operating to automatically decide to aggregate data write requests in a distributed data store 612, further the sequence 861-seq of store commands 861-1, 861-2, 861-3, 861-4, 861-5, 861-6, 861-7, 861-8 is sent to the first compute element 860-c1 by a second compute element 860-c2, in which the second compute element 860-c2 is not aware whether or not the data sets 712-D1, 712-D2, 712-D3, 712-D4, 712-D5, 712-D6, 712-D7, 712-D8 in the sequence of store commands 861-1, 861-2, 861-3, 861-4, 861-5, 861-6, 861-7, 861-8 are conveyed to the data interfaces 523-1, 523-2 using aggregated data write requests.

In a possible configuration of the sixth alternative embodiment, the first compute element 860-c1 does not know when the second compute element 860-c2 will decide to read-back any of the data sets 712-D1, 712-D2, 712-D3, 712-D4, 712-D5, 712-D6, 712-D7, 712-D8 conveyed by the second compute element 860-c2.

In a seventh alternative embodiment to the system 860 operating to automatically decide to aggregate data write requests in a distributed data store 612, the sequence 861-seq of store commands 861-1, 861-2, 861-3, 861-4, 861-5, 861-6, 861-7, 861-8 is generated by an application layer 860-c1-app running on the first compute element 860-c1. Further the sequence of store commands 861-1, 861-2, 861-3, 861-4, 861-5, 861-6, 861-7, 861-8 are received by an interface layer 860-c1-int running on the first compute element 860-c1. Further, the series 862-ser of data write requests 862-1, 862-2, 862-3, 862-4 and the at least one aggregated data write request 862-56 are all sent by the interface layer 860-c1-int. Further, the application layer 860-c1-app is not aware whether or not the interface layer 860-c1-int sends the data sets 712-D1, 712-D2, 712-D3, 712-D4, 712-D5, 712-D6, 712-D7, 712-D8 to the data interfaces 523-1, 523-2 using aggregated data write requests.

In a possible configuration of the seventh alternative embodiment, further the interface layer 860-c1 does not know when the application layer 860-c1-app will decide to read-back any of the data sets conveyed 712-D1, 712-D2, 712-D3, 712-D4, 712-D5, 712-D6, 712-D7, 712-D8.

Figure 38:
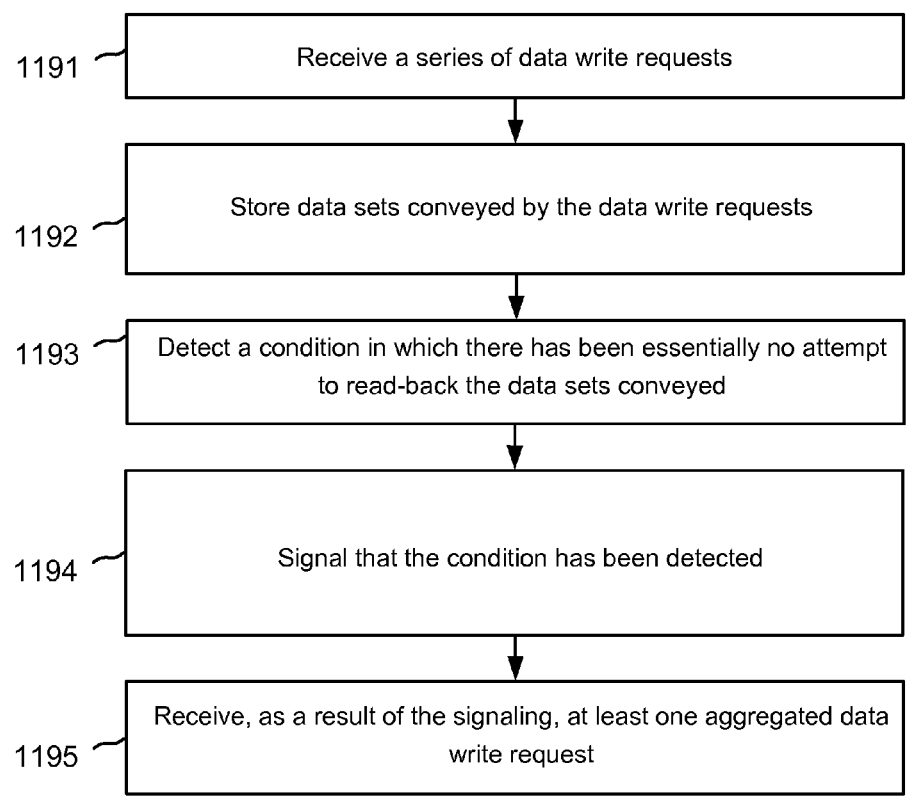
FIG. 38 illustrates one embodiment of a method for signaling a compute element to start aggregating data write requests.

FIG. 38 illustrates one embodiment of a method to start aggregating data write requests. In step 1191, a data interface 523-1 receives from a compute element 860-c1 a series of data write requests 862-1, 862-2 conveying, respectively, a series of data sets 712-D1, 712-D2, in which each of the data sets conveyed is to be stored by the data interface 523-1.

In step 1192, the data interface 523-1 stores each of the data sets conveyed 712-D1, 712-D2, as soon as the data set is conveyed, such that said storing is performed in synchronization with the reception of the data write requests 862-1, 862-2, thereby facilitating low latency read-back of the data sets already conveyed.

In step 1193, the data interface 523-1 detects a condition in which: (i) at least a certain number of the data write requests 862-1, 862-2 have arrived at the data interface 523-1, (ii) and there has been essentially no attempts, or a negligible number of attempts, by the data interface to read-back any of the data sets 712-D1, 712-D2 conveyed to the data interface.

In step 1194, as a result of the detection, the data interface 523-1 signals to the compute element 860-c1, that the condition has been detected, thereby implying to the compute element 860-c1 that: (i) maintaining a low latency in conjunction with the storage of the data sets 712-D1, 712-D2 is not critical, and therefore (ii) that aggregation of data write requests is now possible.

In step 1195, as a result of the signaling, the data interface 523-1 receives from the compute element 860-c1 at least one aggregated data write request 862-56, in which the aggregated data write request 862-56 conveys at least two additional data sets 712-D5, 712-D6 to be stored by the data interface 523-1.

In a first possible alternative to the method described above in FIG. 38, further the data interface 523-1 eventually stores in a memory module 540-m1 the at least two additional data sets 712-D5, 712-D65 conveyed by the aggregated data write request 862-56.

In a possible configuration of the first possible alternative to the method described in FIG. 38, further the data interface 523-1 detects a departure from the condition by identifying an attempt to read any of the data sets 712-D1, 712-D2, 712-D5, 712-D6 conveyed to the data interface 523-1, thereby signifying that maintaining the low latency in conjunction with the storage of data sets is now critical. Further, the data interface 523-1 signals to the compute element 860-c1 that the departure from the condition has been detected, thereby implying to the compute element 860-c1 that: (i) it is now critical again to maintain the low latency in conjunction with the storage of data sets, and therefore (ii) that aggregation of data write requests is not possible anymore.

In a second possible alternative to the method described above in FIG. 38, further the storing by the data interface 523-1 of each of the data sets 712-D1, 712-D2 conveyed by the data write requests 862-1, 892-2, which is performed in synchronization with the reception of the data write requests 862-1, 862-2, is performed in conjunction with a memory module 540-m1 associated with the data interface 523-1.

In a third possible alternative to the method described above in FIG. 38, further the storing by the data interface 523-1 of each of the data sets 712-D1, 712-D2 conveyed by the data write requests 862-1, 862-2, which is performed in synchronization with the reception of the data write requests 862-1, 862-2, is performed in conjunction with a data register 5r belonging to the data interface 523-1.

In a possible configuration of the third possible alternative to the method described in FIG. 38, further transferring the data sets 712-D1, 712-D2 conveyed by the data write requests 862-1, 862-2 to the data interface 523-1, from the data register 5r of the data interface 523-1 to a memory module 540-m1 associated with the data interface 523-1.

In a fourth possible alternative to the method described above in FIG. 38, further the condition detected by the data interface 523-1 is a condition in which: (i) at least a first quantity Q1 of said data write requests 862-1, 862-2 have arrived at the data interface 523-1, while (ii) there has been a second quantity Q2 of attempts to read-back, from the data interface 523-1, any of the data sets 712-D1, 712-D2 conveyed to the data interface 523-1. Further, first quantity Q1 is at least 10 (ten) times larger than said second quantity Q2. This ratio implies that there were essentially no attempts, or a negligible quantity of attempts, to read any of the data sets conveyed to the data interface 232-1.

In a fifth possible alternative to the method described above in FIG. 38, the condition detected is a condition in which: (i) at least 10 (ten) of said data write requests have arrived at the data interface 523-1, while (ii) there has been absolutely no attempt to read any of the data sets conveyed to the data interface.

Described herein are systems and methods that can reduce the number of data fetching operations, or the duration of a data fetching operation, in conjunction with executing a plurality of actions or algorithms. In particular, where two or more compute elements or processes require the same data set, but at different periods of time, systems and methods are defined, according to various embodiments, by which a single data fetch operation is performed, rather than a data fetch operation for each compute element or process. In some embodiments, a data set is fetched by a first compute element/process, and the data set is stored in a memory location associated with that first compute element. Such memory location may be the cache memory of the first compute element, or a memory module on the same computer board as the first compute element, or another location that is in close proximity to the first compute element and that does not require an additional fetch operation nor any sending of the data set over a switching network after the first fetch operation. The first compute element/process uses the data set in a processing task. In some embodiments, a second compute element/process accesses the data set after it has been used by the first compute element/process. In these embodiments, the second compute element/process accesses the first data set from the memory location associated with the first compute element, and uses the first data set to execute a second processing action. In other embodiments, the system makes sure that the second process either (i) transfers or "migrates" to the first compute element, or (ii) is scheduled to run on the first compute element, while the first data set is still stored in the memory location of the first compute element. In such embodiments, the system executes the processing action near the cached data. The effect is essentially the same, although in the original embodiments the data set was transferred from the first memory location to the second compute element, whereas in these embodiments the processing operation is either transferred or "migrated" from the second compute element to the first compute element or is scheduled for execution in the first compute element.

There are many permutations of the various embodiments described. All such permutations are within the scope of, and are included within, the invention described herein. For example, although the embodiments heretofore described included only two compute elements/processes, there may be three or any higher number of compute elements/processes, in which two or more compute elements/processes are accessing the data set placed in the memory location associated with a first compute element. For example, for various reasons, the specific data elements of the data set may be stored in different memory locations associated with the first compute element, and all of these data elements may be accessed by a second or subsequent compute elements. For example, a second compute element may access and use—in processing—multiple data sets, in which all of the data sets are stored in one or more memory locations associated with the first compute element. For example, a second compute element may access and use multiple data sets, one or more of which are stored in one or more memory locations associated with the first compute element, but one or more of the data sets may be stored in memories associated with additional compute elements and not with the first compute element. Many additional variations and permutations are also possible, provided only that each compute element/process seeking a data set will receive that data set form the memory associated with another compute element or another process that has previously fetched such data set via a switching network, and therefore the load traffic on the switching network will be reduced.

Figure 39A:
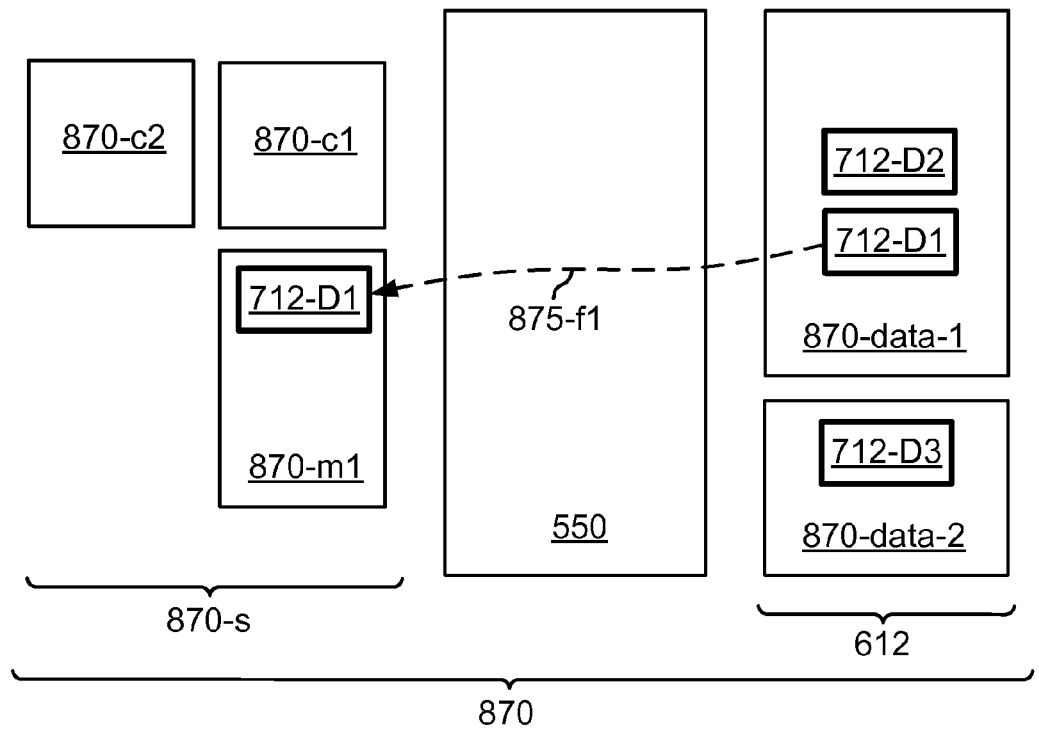
FIG. 39A illustrates one embodiment of a system operative to execute efficiently a plurality of actions each associated with a first data set that is fetched only once from a data source.

FIG. 39A illustrates one embodiment of a system 870 operative to execute efficiently a plurality of actions. The system 870 includes a distributed data store 612 (from FIG. 39A, and also from FIG. 36A), which includes multiple data sources 870-data-1, 870-data-2, each of which includes one or more data sets, 870-data-1 includes data sets 712-D1 and 712-D2, 870-data-2 includes data set 712-D3. A data source may be a memory module, or a data card, or a compute element generating data, or even a source accessible over a cloud network. All of the data sources are aggregated, either physically or virtually, in the data store 612. The data sources are all in communicative contact, through a switching network 550, with a plurality of compute elements 870-c1, 870-c2. The system includes also a memory 870-m1 that is associated with the first compute element 870-c1. In this sense, "associated with" may mean that the memory 870-m1 is part of the cache memory of the first compute element 870-c1, or that the memory 870-m1 and first compute element reside on the same server, or that the memory module 870-m1 is in some other way in close physical or virtual contact with the first compute element. When the first compute element is called upon to execute a process that requires the use of a first data set 712-D1, it will fetch 875-f1 the data set 712-D1 from the first data source 870-data-1 through a switching network 550, and place the data set 712-D1 in the associated memory 870-m1. The first compute element will then execute the process, using the first data set 870-m1. In alternative embodiments, the first compute element 870-c1 performs the fetch 875-f1, then executes the process, then places the first data set 712-D1 in the associated memory 870-m1. After the first compute element 870-c1 executes this process, a second compute element 870-c2 executes a second process that also requires use of the first data set 712-D1, now stored in the associated memory 870-m1 of the first compute element 870-c1. In some embodiments, the compute elements 870-c1, 870-c2 and memory 870-m1 may all be located in a single server or card 870-s.

Figure 39B:
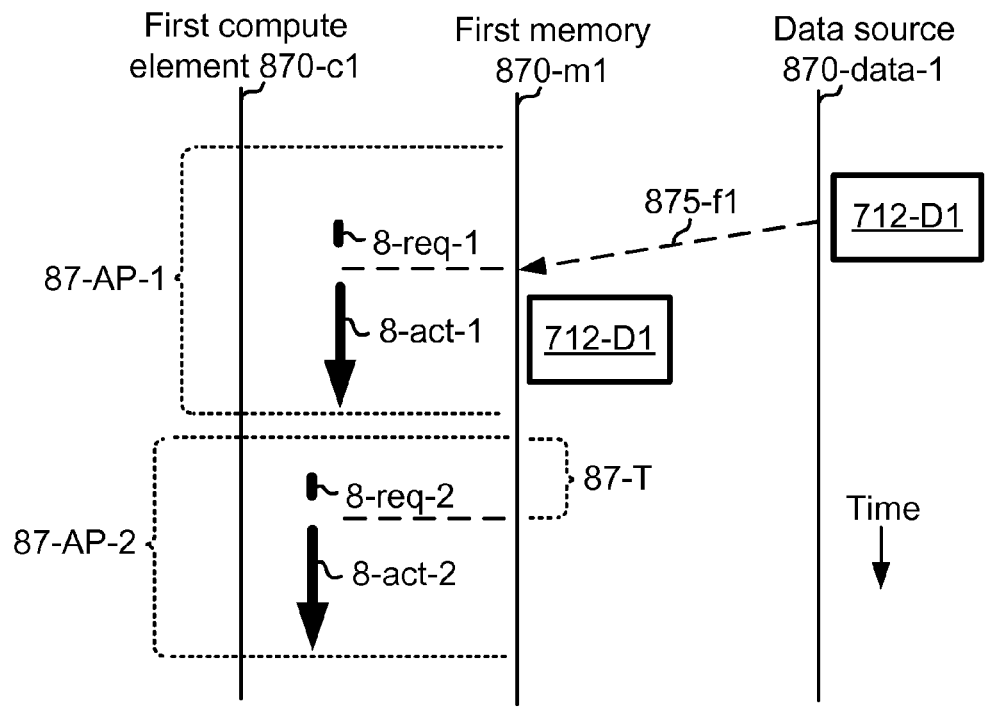
FIG. 39B illustrates one embodiment of a system operative to execute efficiently a plurality of actions over time, and in particular the execution of two actions, in which the first action uses a first data set that has been fetched from a first data source, and then a second action uses the same data set but without fetching the data set from the first data source.

FIG. 39B illustrates one embodiment of the system 870 operative to execute efficiently a plurality of actions over time, and in particular the execution of two actions 8-act-1, 8-act-2, in which the first action 8-act-1 uses a first data set 712-D1 that has been fetched 875-f1 from a first data source into a first memory 870-m1 associated with the first compute element 870-c1, and then a second action 8-act-2 uses the same data set 712-D1 but without fetching the data set 712-D1 from the first data source. In FIG. 39B, the first compute element 870-c1 executes both actions 8-act-1, 8-act-2. The first compute element 870-c1 executes the first action 8-act-1 in accordance with a first application program 87-AP-1, in which certain preparations are executed, a first request 8-req-1 is made for the data set 712-D1, and the first action 8-act-1 is then performed using the fetched 875-f1 data set 712-D1. The first compute element then executes a second application program 87-AP-2, in which certain preparations are executed, the same first data set 712-D1 is requested 8-req-2 but the request is not executed, rather the second action 8-act-2 is then performed using the first data set 712-D1 already in the memory 870-m1. FIG. 39B shows also 87-T, which is a predetermined amount of time that the second processing is running, from the time it begins/resumes running until the first data set 712-D1 is required by the first compute element 870-c1. By estimating this length of time 87-T, the system facilitates identification and scheduling of the second action 8-act-2.

It is understood that each application program 87-AP-1, 87-AP-2 may be any program, layer, algorithm, or some other scheme for organizing the steps by which a process is executed.

It is understood that the two actions are not the same. For example, one action may require counting the words in the first data set 712-D1, whereas the other action may require using the data in the first data set 712-D1 to compute a certain quantity. There is no limit to the different actions that may be executed using all or part of the data in the data set 712-D1, provided that the two actions include different processing with different results.

Figure 40A:
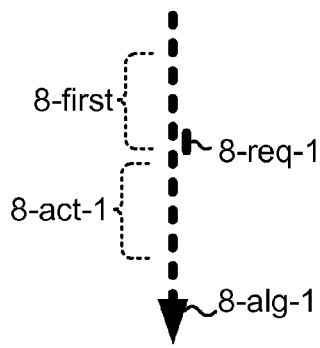
FIG. 40A, FIG. 40B, and FIG. 40C, collectively illustrate one embodiment of a procedure by which a single data set is fetched only once in conjunction with two different processes.
Figure 40B:
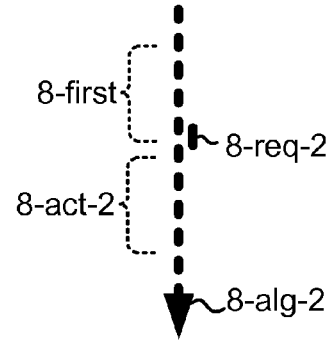
Figure 40C:
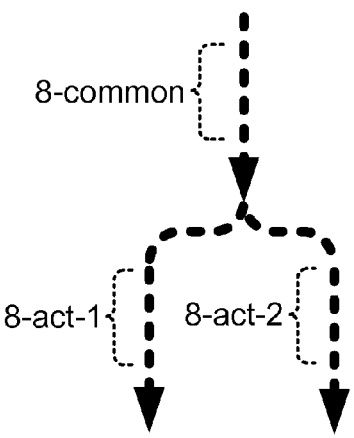

FIG. 40A, FIG. 40B, and FIG. 40C, collectively illustrate one embodiment of a procedure by which a single data set is used in two different processes.

FIG. 40A illustrates one embodiment of a process in which a first action is taken prior to use of a particular data set, the data set is requested and received, and a second action is then taken using the data set. In FIG. 40A, there is an algorithm 8-alg-1, which includes preliminary steps 8-first executed prior to receipt of requested data, and a first action 8-act-1 which is executed after receipt of requested data. As part of the preliminary steps 8-first, the system makes a first request 8-req-1 to fetch data set 712-D1. The data set is fetched and received (not shown on FIG. 40A), and then the first action 8-act-1 is executed. The action 8-act-1 is a continuation and completion of the algorithm 8-alg-1 started in 8-first.

FIG. 40B illustrates one embodiment of a process in which a first action is taken prior to use of a particular data set, the data set is requested and received, and a second action is then taken using the data set. The process illustrated in FIG. 40B is different from the process illustrated in FIG. 40A, in that the two processes use the same data set 712-D1 for different actions. In FIG. 40B, there is an algorithm 8-alg-2, which includes preliminary steps 8-first executed prior to receipt of requested data, and a second action 8-act-2 which is executed after receipt of requested data. As part of the preliminary steps 8-first, the system makes a request 8-req-2 to fetch data set 712-D1. The data set is fetched and received (not shown on FIG. 40B), and then the second action 8-act-2 is executed. The action 8-act-2 is a continuation and completion of the algorithm 8-alg-2 started in 8-first.

The first algorithm 8-alg-1 can be executed independently of the second algorithm 8-alg-2, but this will result in two separate fetches of data set 712-D1: one fetch as a result of request 8-req-1 appearing in 8-alg-1, and a second fetch as a result of request 8-req-2 appearing in 8-alg-2. There is a better way of executing the two algorithms 8-alg-1, 8-alg-2, which is illustrated in FIG. 40C.

FIG. 40C illustrates one embodiment of the two processes, in which the processes share a common first action, and the processes both use the same data set, but the processes use the data set in different actions. In FIG. 40C, the steps 8-common are identical (common) to steps 8-first appearing at the beginning of both the first and the second algorithms 8-alg-1, 8-alg-2, or in other words, the two algorithms are identical up to a certain point. The steps 8-common include the fetching for data set 712-D1. The system executes the common steps 8-common once, resulting in a single fetch for data set 712-D1. The system then splits execution, such that the first algorithm 8-alg-1 continues as 8-act-1 (FIG. 40C), and the second algorithm 8-alg-2 continues as 8-act-2 (FIG. 40C). The result is execution of the two algorithms 8-alg-1, 8-alg-2, while performing only a single fetch for data set 712-D1.

One embodiment is a system 870 operative to execute efficiently a plurality of actions. In one particular form of such embodiment, there is a first compute element 870-c1 associated with a first memory 870-m1, and a first data set 712-D1 associated with a first data source 870-data-1. Further, the system 870 is configured to fetch 875-f1 the first data set 712-D1 from the first data source 870-data-1 to the first memory 870-m1. Further, the first compute element 870-c1 is configured to execute, in conjunction with the first data set 712-D1 now in the first memory 870-m1, a first action 8-act-1 involving the first data set 712-D1. Further, the system 870 is configured to identify a second action 8-act-2 that, like the first action 8-act-1, involves the first data set 712-D1. Further, the system 870 is configured to cause the second action 8-act-2 to be executed in the first compute element 870-c1, and in conjunction with the first data set 712-D1 already in the first memory 870-m1, while the first data set 712-D1 is still in the first memory 870-m1, thereby avoiding a need to re-fetch the first data set 712-D1 from the data source.

In a first alternative embodiment to the system 870 operative to execute efficiently a plurality of actions, further the first memory 870-m1 is a cache memory of the first compute element 870-c1. Also, the execution of the first action 8-act-1 is directed by a first application program 87-AP-1 running on the first compute element 870-m1. Also, the execution of the second action 8-act-2 is directed by a second application program 87-AP-2. Also, the causing of the second action 8-act-2 to be executed in the first compute element 870-c1 is facilitated by the system 870 instructing the first compute element 870-c1, after said execution of the first action 8-act-1, to at least temporarily halt execution of the first application program 87-AP-1 while leaving the first data set 712-D1 in the cache memory 870-m1, and to temporarily execute the second application program 87-AP-2 at least until the second action 8-act-2 is performed by the second application program 87-AP-2 in conjunction with the first data set 712-D1 still in the cache memory 870-m1.

In a first possible configuration of the first alternative embodiment, further the identification of the second action 8-act-2 is facilitated by estimating, by the system 870, that the second application program 87-AP-2, if allowed to run on the first compute element 870-c1, will reach execution of the second action 8-act-2 not later than a predetermined amount of time 87-T after the allowance to run.

In a first possible variation of the first possible configuration, further the predetermined amount of time 87-T is 10 (ten) milliseconds.

In a second possible variation of the first possible configuration, the system 870 includes a second compute element 870-c2, the estimation is done by the second compute element 870-c2 by analyzing the second application program 87-AP-2, and the instructing of the first compute element 870-c1 is done by the second compute element 870-c2.

In a first possible option of the second possible variation, further the second application program 87-AP-2 is executed in the second compute element 870-c2 before the estimation and the instructing take place, and prior to the temporary halt and the temporary execution of the second application program 87-AP-2 in the first compute element 870-c1.

In a second possible option of the second possible variation, further the second compute element 870-c2 has access to both the first application program 87-AP-1 and the second application program 87-AP-2, thereby enabling the second compute element 870-c2 to achieve the identification.

In a second alternative embodiment to the system 870 operative to execute efficiently a plurality of actions, further the first action 8-act-1 is associated with a first application program 87-AP-1. Also, the second action 8-act-2 is associated with a second application program 87-AP-2. Also, the identification of the second action 8-act-2 is facilitated by detecting, in the second application program 87-AP-2, a fetching request 8-req-2 for the first data set 712-D1, in which the fetching request 8-req-2 for the first data set is similar to another fetching request 8-req-1, in the first application program 87-AP-1, for the first data set 712-D1.

In a first possible configuration of the second alternative embodiment to the system 870 operative to execute efficiently a plurality of actions, further the identification of the second action 8-act-2 is further facilitated by detecting, in the second application program 87-AP-2, that the fetching request 8-req-2 precedes the second action 8-act-2, while also detecting, in the first application program 87-AP-1, that the another fetching request 8-req-1 precedes the first action 8-act-1, thereby realizing an association between the first action 8-act-1 and the second action 8-act-2 via the first data set 712-D1 and the fetching thereof.

In a second possible configuration of the second alternative embodiment to the system 870 operative to execute efficiently a plurality of actions, further the second fetching request 8-req-2 is never executed, such that the first fetching request 8-req-1 is the only one executed by the system 870.

In a third possible configuration of the second alternative embodiment to the system 870 operative to execute efficiently a plurality of actions, further the fetch 875-$f1$ is a result of the first fetching request 8-req-1 in the first application program 87-AP-1.

In a third alternative embodiment to the system 870 operative to execute efficiently a plurality of actions, further the first action 8-act-1 is a part of a first algorithm 8-alg-1 comprising a first part 8-first and the first action 8-act-1. Also, the second action 8-act-2 is a part of a second algorithm 8-alg-2 comprising the first part 8-first and the second action 8-act-2. Also, the system 870 is further configured to execute the first part 8-first prior to the execution of the first action 8-act-1, thereby facilitating execution of the first algorithm 8-alg-1 and the second algorithm 8-alg-2 up to a point where the first part 8-first ends. Also, the execution of the first action 8-act-1 follows the execution of the first part 8-first, such that the execution of the first action 8-act-1 is a continuation of the execution of the first algorithm 8-alg-1. Also the causing of the second action 8-act-2 to be executed in the first compute element 870-$c1$ is facilitated by the system 870 instructing the first compute element 870-$c1$, after the execution of the first action 8-act-1, to switch to executing the second action 8-act-2.

In a possible configuration of the third alternative embodiment to the system 870 operative to execute efficiently a plurality of actions, further the identification of the second action 8-act-2 is facilitated by the system 870 detecting that the first part 8-first is a common part 8-common of both the first algorithm 8-alg-1 and the second algorithm 8-alg-2, and that the first action 8-act-1, which follows the common part 8-common, is different than the second action 8-act-2 that also follows the common part 8-common, while both the first action 8-act-1 and the second action 8-act-2 are operating on the first data set 712-D1.

In a possible variation of the possible configuration of the third alternative embodiment, further the identification of the second action 8-act-2 is further facilitated by detecting, in the second algorithm 8-alg-2, a fetching request 8-req-2 for the first data set 712-D1, in which the fetching request 8-req-2 for the first data set 712-D1 is similar to another fetching request 8-req-1, in the first algorithm 8-alg-1, for the first data set 712-D1. Also, the identification of the second action 8-act-2 is further facilitated by detecting that the first fetching request 8-req-1 terminates the common part 8-common of the first algorithm 8-alg-1, and that the second fetching request 8-req-2 terminates the common part 8-common of the second algorithm 8-alg-2.

In a fourth alternative embodiment to the system 870 operative to execute efficiently a plurality of actions, further the first data source 870-data-1 is configured to produce, store, or obtain the first data set 712-D1.

In a possible configuration of the fourth alternative to the system 870 operative to execute efficiently a plurality of actions, further the first data source 870-data-1 is selected from a group consisting of: (i) an element of a distributed data store 612 (for example, as illustrated in FIG. 39A and FIG. 36A), (ii) a memory module 540-$m1$ (for example, as illustrated in FIG. 36A), (iii) a data interface 523-1 (for example, as illustrated in FIG. 36A), and (iv) another compute element (for example, 860-$c2$, as illustrated in FIG. 36B).

In a fifth alternative embodiment to the system 870 operative to execute efficiently a plurality of actions, further the first fetch 875-$f1$ is done via a switching network 550, thereby introducing a first latency in conjunction with the fetch 875-$f1$, in which the first latency is circumvented as a result of avoiding the need to re-fetch the first data set 712-D1.

In a sixth alternative embodiment to the system 870 operative to execute efficiently a plurality of actions, further the first action 8-act-1 is selected form a group of actions consisting of: (i) a matrix multiplication in which the first data set 712-D1 is a first matrix that is multiplied by a second matrix, (ii) a filtering or sorting process to be applied on the first data set 712-D1, and (iii) any mathematical function involving the first data set 712-D1.

In a possible configuration of the sixth alternative to the system 870 operative to execute efficiently a plurality of actions, further the second action 8-act-2 is selected form a group of actions consisting of: (i) a matrix multiplication in which the first data set 712-D1 is the first matrix that is multiplied by a third matrix, (ii) another filtering or sorting process to be applied on the first data set 712-D1, and (iii) any other mathematical function involving the first data set 712-D1.

Figure 41A:
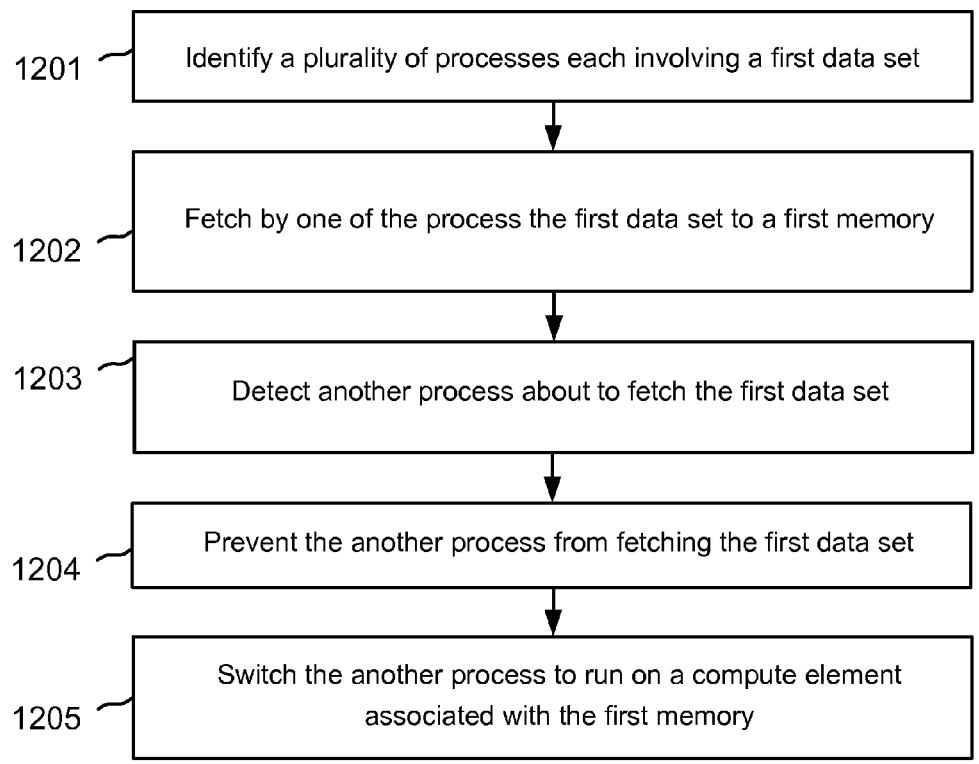
FIG. 41A illustrates one embodiment of a method for executing efficiently a plurality of processes, in which a second process is migrated from a second compute element to be executed on a first compute element.

FIG. 41A illustrates one embodiment of a method for executing efficiently a plurality of actions. In step 1201, a distributed processing system 870, comprising a plurality of compute elements 870-$c1$, 870-$c2$ and at least a first data source 870-data-1, identifies a plurality of processes 87-AP-1, 87-AP-2 currently running in the distributed processing system 870, in which each of the plurality of processes involves a first data set 712-D1. In step 1202, one of the processes 87-AP-1 running on one of the compute elements 870-$c1$ fetches 875-$f1$ the first data set 712-D1 that is needed by the process 87-AP-1, from the first data source 870-data-1, into a first memory 870-$m1$ associated with the compute element 870-$c1$ on which the process 87-AP-1 is running. In step 1203, the distributed processing system 870 detects another of the processes 87-AP-2, which is about to fetch the first data set 712-D1 from the first data source 870-data-1, and which is currently running on another 870-$c2$ of the compute elements. In step 1204, the distributed processing system 870 prevents the another process 87-AP-2 from fetching the first data set 712-D1 from the first data source 870-data-1. Instead of fetching the first data set 712-D1 from the first data source 870-data-1, the distributed processing system 870 switches execution of the another process 87-AP-2 from the another compute element 870-$c2$ to the compute element 870-$c1$ associated with the first memory 870-$m1$, thereby making available to the another process 87-AP-2 the first data set 712-D1 already located in the first memory 870-*m*1 associated with the first compute element 870-*c*1.

Figure 41B:
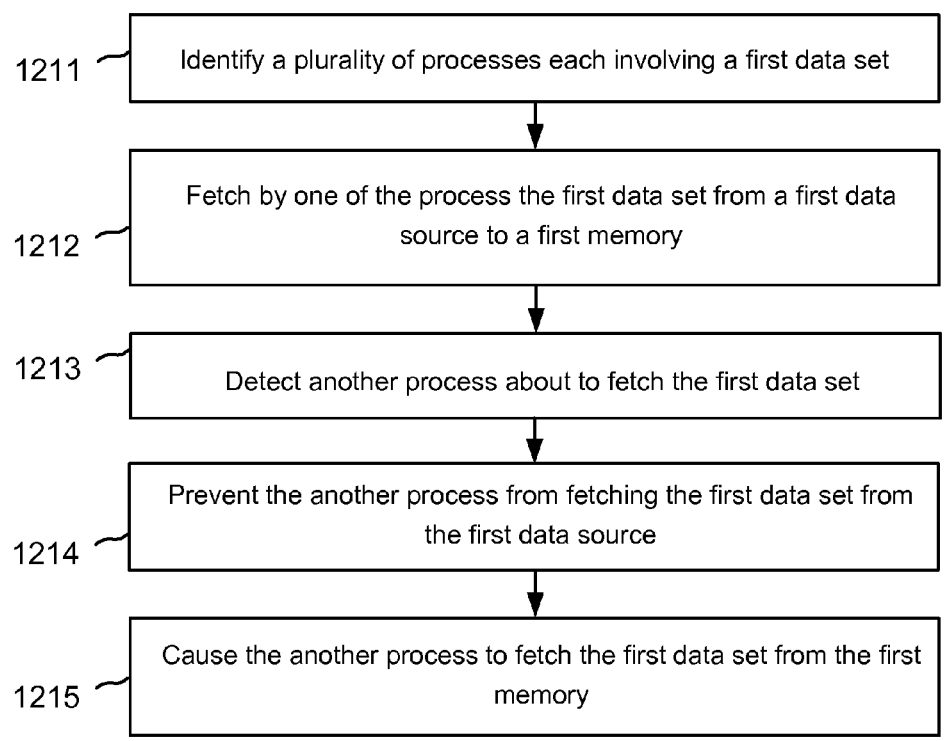
FIG. 41B illustrates one embodiment of a method for executing efficiently a plurality of processes, in which a data set used by both processes is accessed by a second compute element, executing a second process, from a first memory associated with a first compute element.

FIG. 41B illustrates one embodiment of a method for executing efficiently a plurality of actions. The method illustrated in FIG. 41B differs from the method illustrated in FIG. 41A, in that in FIG. 41A the first compute element 870-*c*1 executes both processes with the single data set 712-D1, whereas in FIG. 41B the first compute element 870-*c*1 executes the first process but then the single data set 712-D1 is migrated to a second compute element 870-*c*1 which executes the second process. In step 1211, a distributed processing system 870, comprising a plurality of compute elements 870-*c*1, 870-*c*2 and at least a first data source 870-data-1, identifies a plurality of processes 87-AP-1, 87-AP-2 currently running in the distributed processing system 870, in which each of the plurality of processes involves a first data set 712-D1. In step 1212, one of the processes 87-AP-1 running on one of the compute elements 870-*c*1 fetches 875-*f*1 the first data set 712-D1 that is needed by the process 87-AP-1, from the first data source 870-data-1, into a first memory 870-*m*1 associated with the compute element 870-*c*1 on which the process 87-AP-1 is running. In step 1213, the distributed processing system 870 detects another of the processes 87-AP-2, which is about to fetch the first data set 712-D1 from the first data source 870-data-1, and which is currently running on another 870-*c*2 of the compute elements. In step 1214, the distributed processing system 870 prevents the another process 87-AP-2 from fetching the first data set 712-D1 from the first data source 870-data-1. Instead of fetching the first data set 712-D1 from the first data source 870-data-1, the distributed processing system 870 causes the another process 87-AP-2 running on another compute element 870-*c*2 to fetch the first data set 712-D1 from the first memory 870-*m*1 associated with the first compute element 870-*c*1, thereby allowing the another compute element 870-*c*2 to use the first data set 712-*c*1 to execute the another process 87-AP-2.

In a first possible alternative to the method described above in FIG. 41B, further the fetching 875-*f*1 by the process 87-AP-1 is performed via a switching network 550, and the compute element 870-*c*1 on which the process 87-AP-1 runs is co-located in a server 870-*s* with the another 870-*c*2 compute elements and the first memory 870-*m*1. The result is that the another process 87-AP-2 fetches the first data set 712-D1 from the first memory 870-*m*1, but does not fetch the first data set 712-D1 from the first data source 870-data-1. Therefore, the switching network 550 is not involved with this fetch, the load on the switching network is reduced, and latency associated with the fetching from the first memory 870-*m*1 is reduced.

In a possible configuration of the first possible alternative to the method described in FIG. 41B, further the first memory 870-*m*1 is a cache memory of the compute element 870-*c*1 on which the process 87-AP-1 runs.

In a second possible alternative to the method described above in FIG. 41B, further the detection is facilitated by the another of the processes 87-AP-2 indicating to the distributed processing system 870 that the process 87-AP-2 is about to fetch the first data set 712-D1 from the first data source 870-data-1.

In a third possible alternative to the method described above in FIG. 41B, further the prevention is facilitated by the distributed processing system 870 signaling the another of the processes 87-AP-2 that the first data set 712-D1 is also located in the first memory 870-*m*1, thereby causing the another process 87-AP-2 to fetch the first data set 712-D1 from the first memory 870-*m*1 rather than from the first data source 870-data-1.

Described herein are systems and methods related to a two-tier distributed memory, in which the request for a data set may be redirected from a first tier comprising a plurality of memory modules to a second tier comprising a plurality of cache memories in which each cache memory is associated with one or more compute elements. The redirection is achieved by a plurality of data interfaces, each of which is aware, through its data registry, of data sets recently fetched by compute elements into specific cache memories. The data interfaces are therefore able to tell a compute element requesting a specific data set to fetch the data set from the second tier of distributed memory, that is, from a cache memory other than the specific cache memory associated with the requesting compute element. Since each requesting compute element is unaware of data sets held in cache memories not associated with that requesting compute element, it is necessary that the request be redirected, which is done, as noted, by a data interface. The results of redirecting requested data sets from the first tier to the second tier include reducing the number of requests on the first tier of the distributed memory, reducing the distance by which requested data sets must be fetched from the relatively distant first tier to the relatively close second tier, and reducing the demands on the switching network which is no longer required to transport some of the requested data sets from the first tier of distributed memory to the second tier of distributed memory. As a result of the redirections of requested data sets from the first tier to the second tier, system efficiency is enhanced.

There are many permutations of the various embodiments described. All such permutations are within the scope of, and are included within, the invention described herein. For example, although the embodiments described herein include only three memory modules and three associated data registries in the first tier, there may be tens, hundreds, or even thousands of memory modules and associated data registries in the first tier. Further, the embodiments described herein include a single memory module associated with a single data registry, but in alternative embodiments any plurality of memory modules may be associated with a single data registry. The embodiments illustrated herein include either one or two data sets in each memory module in the first tier, but a memory module may include three or other numbers of data sets. Some of the embodiments described herein present one memory modules and its associated data interface on a single server, but in alternative embodiments a single server may include any number of memory modules and associated data registries. Some of the embodiments described herein present memory modules and associated data interfaces in different servers. In some embodiments, each memory module is on the same server as its associated data interface, whereas in alternative embodiments each memory module is on a separate server from its associated data interface, and in other alternative embodiments some of the memory modules are on the same servers as their associated data interfaces whereas other memory modules are on different servers than their associated data interfaces.

Additional embodiments are included within the invention described herein. For example, although the embodiments described herein include only three compute elements and three associated cache memories in the second tier, there may be tens, hundreds, or even thousands of compute elements and associated cache memories in the second tier.

Further, the embodiments described herein include a single cache memory associated with a single compute element, but in alternative embodiments any plurality of cache memories may be associated with a single compute element, or any plurality of compute elements may be associated with a single cache memory. Some of the embodiments described herein include a compute element and its associated cache memory on a single server, while alternative embodiments described herein include two compute elements and their associated cache memories on a single server. Any combination of servers is possible, including all of the compute elements and associated cache memories on a single server, or each pair of a compute element and its associated cache memory on its own server, or each compute element and its associated cache memory on separate servers, or any combination compute elements and associated cache memories on the same or different servers.

Additional embodiments are included within the invention described herein. For example, although the embodiments described herein include a single switching network 880-SN between the first tier and the second tier, alternative embodiments may include two or more switching networks, in which each such switching networks connects some or all of the data interfaces with some or all of the compute elements and associated cache memories. In all cases, there is a structure and capability for transferring requested data sets from the first tier to at least some of the compute elements and associated cache memories in the second tier.

Figure 42:
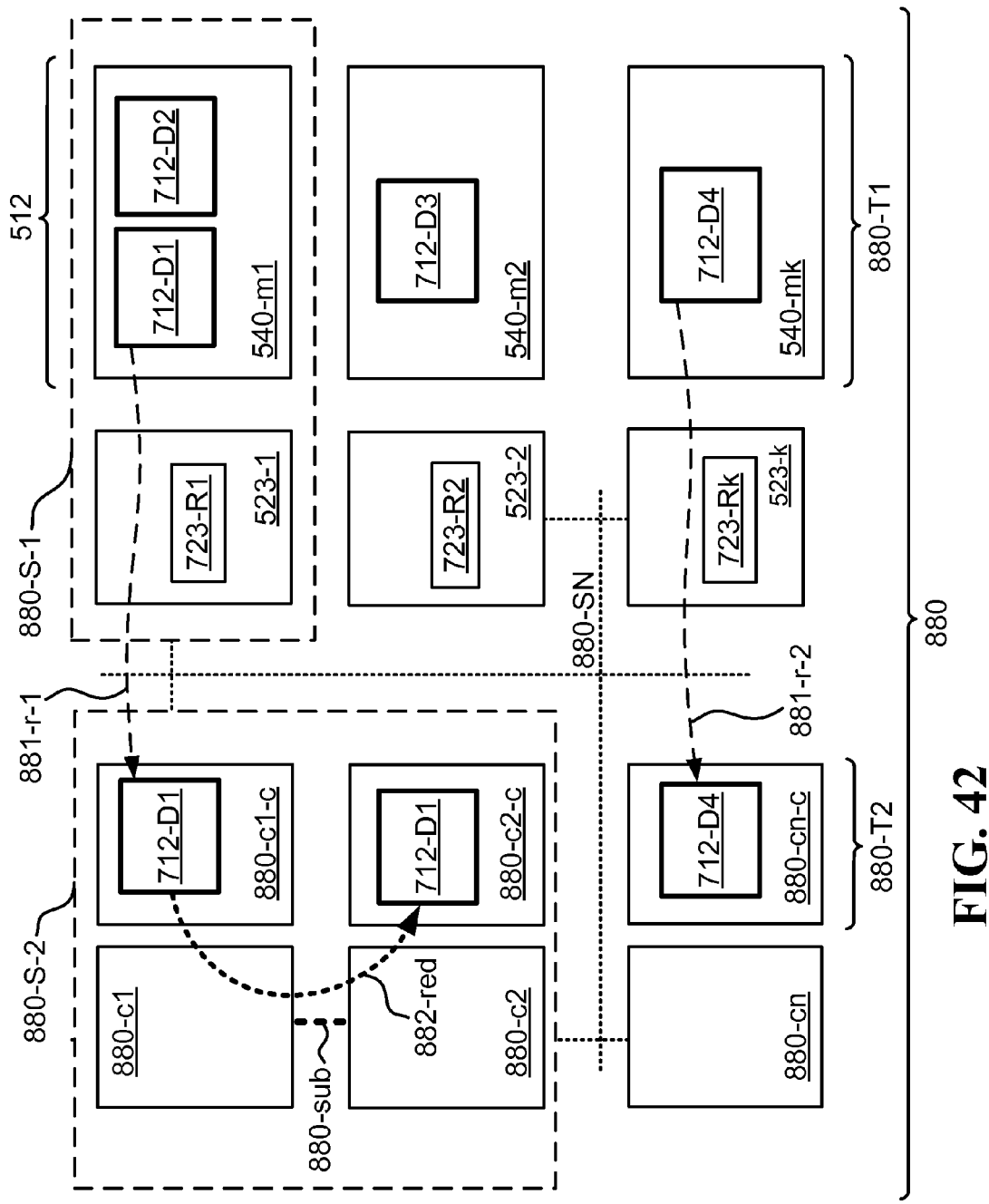
FIG. 42 illustrates one embodiment of a system operative to produce a two-tier distributed memory, and which can decide on redirecting data read requests in conjunction with memory disaggregation.

FIG. 42 illustrates one embodiment of a system 880 operative to produce a two-tier distributed memory, and which can decide on redirecting data read requests in conjunction with memory disaggregation. The system 880 includes a first memory tier 880-T1, which has various memory modules 540-$m$1, 540-$m$2, 540-$mk$, which contain various data sets, 712-D1 and 712-D2 in 540-$m$1, 712-D3 in 540-$m$2, and 712-D4 in 540-$mk$. The first tier 880-T1 is in essence a shared memory pool 512. Each memory module 540-$m$1, 540-$m$2, 540-$mk$ in the first tier 880-T1 is associated with a specific data interface, 540-$m$1 with 523-1, 540-$m$2 with 523-2, 540-$mk$ with 523-$k$. Each data interface has a data registry, 523-1 has 723-R1, 523-2 has 723-R2, 523-$k$ has 723-Rk. The memory modules 540-$m$1, 540-$m$2, 540-$mk$ of the first memory tier 880-T1, and the associated data interfaces 523-1, 523-2, 523-$k$, can be structured in many different ways. The specific embodiment presented in FIG. 42 shows a single server 880-S-1 including the first memory module 540-$m$1 and the associated first data interface 523-1, while all of the other memory modules 540-$m$2, 540-$mk$ in the first tier 880-T1, and all of the other data interface 523-2, 523-$k$, are on separate servers. As explained previously, the particular embodiment illustrated in FIG. 42 is only one of many ways in which the various elements of memory modules and data interfaces in FIG. 42 may be structured, and all of these ways are encompassed in various embodiments of the invention described herein.

In FIG. 42, the system 880 includes a second memory tier 880-T2, which has various cache memories 880-$c$1-$c$, 880-$c$2-$c$, 880-$cn$-$c$. Each of these cache memories is associated with a compute element, 880-$c$1-$c$ with 880-$c$1, 880-$c$2-$c$ with 880-$c$2, 880-$cn$-$c$ with 880-$cn$. In the particular embodiment illustrated in FIG. 42, two compute elements and associated cache memories, 880-$c$1 with 880-$c$1-$c$ and 880-$c$2 with 880-$c$2-$c$, are located on a single server 880-S-2, while the last compute element 880-$cn$ and its associated cache memory 880-$cn$-$c$ are located on one or more separate servers. As explained previously, the particular embodiment illustrated in FIG. 42 is only one of many ways in which the various elements of compute elements and associated cache memories in FIG. 42 may be structured, and all of these ways are encompassed in various embodiments of the invention described herein.

In FIG. 42, data sets are requested and fetched in a variety of ways. As illustrated, the first compute element 880-$c$1 requests the first data set 712-D1, which is sent 881-$r$-1 by the first data interface 523-1 from the first memory module 540-$m$1 over a switching network 880-SN to the cache memory 880-$c$1-$c$ associated with the first compute element 880-$c$1. FIG. 42 shows the first compute element cache 880-$c$1-$c$ after the first data set 712-D1 has been requested and received.

After the first data set 712-D1 has been received in the first cache memory 880-$c$1-$c$, a different compute element, say the second compute element 880-$c$2 as shown in FIG. 42, requests from the first data interface 723-R1 to receive the same data set 712-D1. One of the functions of each data registry is to record information associated with prior distribution of a data set from an associated memory module to the cache memory associated with any of the compute elements. Consequently, the first data registry 723-R1 has recorded that the first data set 712-D1 was recently sent to the first cache memory 880-$c$1-$c$, and therefore the first data interface 523-1 redirects the data request from the second compute element 880-$c$2 from the first memory tier 880-T1 to the second memory tier 880-T2, specifically to the first cache memory 880-$c$1-$c$ in which the first data set 712-D1 is now located. Therefore, the first data set 712-D1 is not sent over the switching network 880-SN. Rather, the second compute element 880-$c$2 requests the first data set 712-D1 from the first compute element 880-$c$1. This request is fulfilled by the first compute element 880-$c$1, which sends 882-red the first data set 712-D1 from the first cache memory 880-$c$1-$c$ to the second compute element 880-$c$2. The second compute element 880-$c$2 places the first data set 712-D1 in the second cache memory 880-$c$2-$c$, which is associated with the second compute element 880-$c$2. In the particular embodiment illustrated in FIG. 42, the sending of the first data set 712-D1 from the first compute element 880-$c$1 to the second compute element 880-$c$2 is via a communication sub-system 880-sub which may be, for example, a parallel bus, or another switching network in addition to switching network 880-SN. The use of such a sub-system 880-sub is possible because the compute elements 880-$c$1 and 880-$c$2 are on the same server 880-S-2. That would work also if the compute elements were not on the same server, but were otherwise in close physical proximity.

FIG. 42 shows another example of a data set being sent. Here, compute element 880-$cn$ requests the fourth data set 712-D4 from data interface 523-$k$. Note that the data register 723-Rk associated with the data interface 723-$k$ does not show that the requested data set 712-D4 was recently requested by any of the compute elements. Therefore, the data set 712-D4 is sent 881-$r$-2 via the switching network 880-SN to the cache memory 880-$cn$-$c$ associated with the requesting compute element 880-$cn$. FIG. 42 shows that a copy of data set 712-D4 is sent, such that after the sending the data set appears both in the memory module 540-$mk$ of the first tier 880-T1 and in the cache memory 880-$cn$-$c$ of the second tier.

The description of embodiments herein has used the word "recently", in the sense that if a data set has "recently" been sent to a cache memory, then for subsequent data requests the data set will be fetched from second tier cache memory rather from first tier memory modules. Conversely, if the data set was either not fetched at all to cache memory, or was fetched but not "recently", then the data set will be fetched from first tier memory modules rather than from second tier cache memory. The term "recently" is relative. In some embodiments, a data set placed in a cache memory will be available for only a fixed period of time, so that if that time has expired the data set is erased from cache memory and the data set was no longer "recently" sent to cache memory. In such embodiments, the data register associated with the data interface that sent the data set will know of the time constraint, and will not redirect a data request if the data set cannot be fetched from the cache memory within the time constraint. In other embodiments, "recently" relates to the current status of the cache memory holding the data set. If the cache memory is full, almost full, or otherwise unable to hold the data set, it will erase the data set from cache memory and the associated compute element will inform the sending data interface that the data set was erased from cache memory. In such embodiments, after erasure the data set was no longer "recently" sent to cache memory. In other embodiments, the data set is placed into cache memory permanently. In such embodiments, "recently" is not an effective constraint, and the sending data interface will continue to redirect requests for the data set from the first tier to the second tier. If and when the data set is updated or changed in some way, the data interface will then cease to redirect requests for that data set, and will instead send the data set from the memory module holding the data set to the cache memory associated with the requesting compute element.

One embodiment is a system 880 operative to produce a two-tier memory. In one particular form of such embodiment, the system 880 includes a plurality of compute elements 880-*c*1, 880-*c*2, 880-*cn* associated respectively with a plurality of cache memories 880-*c*1-*c*, 880-*c*2-*c*, 880-*cn*-*c*. The system 880 further includes a plurality of data interfaces 523-1, 523-2, 523-*k* associated respectively with a plurality of memory modules 540-*m*1, 540-*m*2, 540-*mk*, where the memory modules store distributively a plurality of data sets 712-D1, 712-D2, 712-D3, 712-D4. The system 880 further includes a switching network 880-SN configured to communicatively interconnect the plurality of compute elements 880-*c*1, 880-*c*2, 880-*cn* and the plurality of data interfaces 523-1, 523-2, 523-*k*. Further, each of the compute elements 880-*c*1, 880-*c*2, 880-*cn* is configured to request and receive from any of the data interfaces 523-1, 523-2, 523-*k*, via the switching network 880-SN, at least one of the data sets stored in the associated memory module. For example, compute element 880-*c*1 requests and receives 881-*r*-1 from 523-1 the data set 712-D1 stored in 540-*m*1, and 880-*cn* requests and receives 881-*r*-2 from 523-*k* the data set 712-D4 stored in 540-*mk*, thereby creating, in conjunction with the plurality of cache memories 880-*c*1-*c*, 880-*c*2-*c*, 880-*cn*-*c*, a distributed copy of at least some of the data sets 712-D1, 712-D4. Further, each of the data interfaces 523-1, 523-2, 523-*k* is configured to record in a data registry 723-R1, 723-R2, 723-Rk, in conjunction with the corresponding requests for the data sets, an identity of the compute element which made the request. For example, data registry 723-1 in data interface 523-1 records in conjunction with 881-*r*-1 the identity of 880-*c*1 making the request for 712-D1, and data registry 723-Rk in data interface 523-*k* records in conjunction with 881-*r*-2 the identity of 880-*cn* making the request for 712-D4. Each of the data interfaces 523-1, 523-2, 523-*k* is further configured to redirect any current request for one of the data sets to one of the compute elements whose identity has been recorded. For example, 880-*c*2 makes a current request for 712-D1 from 523-1 which in turn redirects the request to 880-*c*1 whose identity has been recorded in data registry 723-R1, thereby making 880-*c*2 receive 882-red the data set 712-D1 from the cache 880-*c*1-*c* associated with compute element 880-*c*1, instead of from memory module 540-*m*1 via data interface 523-1. The result is a two-tier distributed memory, in which one tier 880-T1 is associated with the plurality of memory modules 540-*m*1, 540-*m*2, 540-*mk*, and a second tier 880-T2 is associated with the plurality of cache memories 880-*c*1-*c*, 880-*c*2-*c*, 880-*cn*-*c*.

In a first alternative embodiment to the system 880 operative to produce a two-tier memory, further each of the compute elements 880-*c*1, 880-*cn* currently caching a data set is configured to store locally the data set in the respective cache memory until such time that the data set is erased from the cache memory. For example, 880-*c*1 stores locally the data set 712-D1 in 880-*c*1-*c*, and 880-*cn* stores locally the data set 712-D4 in 880-*cn*-*c*. Consequently, after erasure from a cache memory, the compute element associated with the cache memory indicates to the appropriate data interface that the data set is no longer stored in the cache memory, thereby causing the appropriate data interface to remove the identity of the compute element from the record in the data registry, such that any future request for the data set will be served from the respective memory module. For example, 880-*c*1 indicates to 523-1 that 712-D1 is no longer cached in 880-*c*1-*c*, thereby causing 523-1 to remove the identity of 880-*c*1 from the record 723-R1, such that any future request for 712-D1 will be served from 540-*m*1, and 880-*cn* indicates to 523-*k* that 712-D4 is no longer cached in 880-*cn*-*c*, thereby causing 523-*k* to remove the identity of 880-*cn* from the record 723-Rk, such that any future request for 712-D4 will be served from 540-*mk*.

In a second alternative embodiment to the system 880 operative to produce a two-tier memory, further each redirected request is served from the cache memory associated with the compute element receiving the redirection. For example, a data request by 880-*c*2 for 712-D1 is redirected by 523-1 to 880-*c*1, which serves the data set 712-D1 from 880-*c*1-*c* to 880-*c*2.

In a third alternative embodiment to the system 880 operative to produce a two-tier memory, further the two-tier distributed memory 880-T1, 880-T2 is operative to produce memory disaggregation in the system 880.

In a fourth alternative embodiment to the system 880 operative to produce a two-tier memory, further the redirection is done provided that a first condition has been met, in which the first condition is selected from a group consisting of: (i) a condition in which, according to a topology associated with the switching network 880-SN, serving the current request via the switching network 880-SB from one of the compute elements whose identity has been recorded, will result in a latency that is lower than a latency associated with serving the current request, via the switching network, and (ii) a condition in which the appropriate data interface is overloaded. As an example of the first condition, data interface 523-1 decides that serving data set 712-D1 from compute element 880-*c*1-*c* to compute element 880-*c*2 will be faster than serving 712-D1 from memory module 540-*m*1, because 880-*c*1 is topologically closer to 880-*c*2 than 523-1, and consequently 523-1 redirects the request by 880-*c*2 for 712-D1 to 880-*c*1. As an example of the second condition, data interface 523-1 decides that serving data set 712-D1 from compute element 880-*c*1-*c* to compute element 880-*c*2 will be preferable over serving 712-D1 from memory 540-*m*1, because 523-1 is overloaded, perhaps with other requests associated with data set 712-D2, and consequently 523-1 redirects the request by 880-*c*2 for 712-D1 to 880-*c*1.

One embodiment is a system 880 operative to decide on redirecting data read requests in conjunction with memory disaggregation. In one particular form of such embodiment, the system 880 includes a plurality of compute elements 880-*c*1, 880-*c*2, 880-*cn*. The system 880 also includes a first data interface 523-1 associated with a first memory module 540-*m*1 storing a plurality of data sets 712-D1, 712-D2, in which the first memory module 540-*m*1 belongs to a shared memory pool 512 operative to achieve, in conjunction with the plurality of compute elements, memory disaggregation in the system 880. The system also includes a registry 723-R1 associated with the first data interface 523-1. Further, the first data interface 523-1 is configured to record in an associated data registry 723-R1 information associated with prior distribution of any of the data sets 712-D1, 712-D2 to any of the compute elements 880-*c*1, 880-*c*2, 880-*cn* in conjunction with operation of the memory disaggregation. For example, the data registry 723-R1 of first data interface 523-1 records the prior distribution 881-*r*-1 of first data set 712-D1 to the first cache memory 880-*c*1-*c* associated with the first compute element 880-*c*1. The first data interface 523-1 is further configured to receive from one of the compute elements 880-*c*2 a current request for one of the data sets 712-D1. The first data interface 523-1 is further configured to decide, based at least in part on the information recorded in the first data registry 723-R1, whether to (i) respond to the current request by transporting, in conjunction with the memory disaggregation, the data set 712-D1 from the first memory module 540-*m*1 to the compute element making the current request 880-*c*2, or (ii) respond to the current request by causing the compute element 880-*c*2 making the current request to receive 882-red the data set 712-D1 from one of the compute elements 880-*c*1 to which the data set was previously distributed 881-*r*-1, thereby boosting performance of the memory disaggregation.

In a first alternative embodiment to the system 880 operative to decide on redirecting data read requests in conjunction with memory disaggregation, further the information recorded in the data registry 723-R1 includes a list of the data sets 712-D1 that were previously distributed to any of the cache memories 880-*c*1-*c* associated with a compute element 880-*c*1, in which the decision to receive the data set 712-D1 from one of the compute elements 880-*c*1 is made when the data set currently requested 712-D1 is in the list of data sets recorded in the data registry 723-R1.

In a first possible configuration of the first alternative embodiment just described, the information recorded in the data registry 723-R1 further comprises, per each data set in the list 712-D1, at least a first identity associated with one of the compute elements 880-*c*1 to which the data set 712-D1 was previously distributed 881-*r*-1, in which said first identity is used to communicatively locate the compute elements 880-*c*1 to which the data set 712-D1 was previously distributed 881-*r*-1, thereby facilitating the causing of the compute element 880-*c*2 making the current request to receive 882-red the data set 712-D1 from one of the compute elements 880-*c*1 to which the data set 712-D1 was previously distributed 881-*r*-1.

In a possible variation of the first possible configuration just described, further a switching network 880-SN is configured to communicatively interconnect the plurality of compute elements 880-*c*1, 880-*c*2, 880-*cn* and the first data interface 523-1. In addition, the decision is further based on an estimation of the system 880 whether receiving 882-red the data set 712-D1 from one of the compute elements 880-*c*1 via the switching network 880-SN is communicatively preferable over transporting (not shown) the data set 712-D1 via the switching network 880-SN from the first memory module 540-*m*1 to the compute element 880-*c*2 making the current request.

In one option for the possible variation just described, further the system 880 includes a switching network 880-SN communicatively interconnecting the plurality of compute elements 880-*c*1, 880-*c*2, 880-*cn* and the first data interface 523-1, and a communication sub-system 880-sub communicatively connecting the compute element 880-*c*2 making the current request with one of the compute elements 880-*c*1 to which the data set 712-D1 was previously distributed 881-*r*-1. Further, the receiving of the data set 712-D1 from one of the compute elements 880-*c*1 is done via the communication sub-system 880-sub, and is communicatively preferable as a result of a loading condition associated with the switching network 880-SN.

In a first possible form of the option just described, further the communication sub-system 880-sub is a data bus.

In a second possible form of the option just described, further the communication sub-system 880-sub is another switching network.

In a second possible configuration of the first alternative embodiment described above, further the compute element 880-*c*1 to which the data set 712-D1 was previously distributed 881-*r*-1 is configured to store locally the data set 712-D1 in an associated cache 880-*c*1-*c* until such time that the data set is erased from the associated cache. Consequently, the compute element 880-*c*1 is further configured to indicate to the first data interface 523-1 that the data set 712-D1 in no longer stored in the cache 880-*c*1-*c*, thereby causing the first data interface 523-1 to adjust the list in the data registry 723-R1 accordingly, such that any future request for the data set 712-D1 will be served from the first memory module 540-*m*1 rather than from the cache memory 880-*c*1-*c*.

In a second alternative embodiment to the system 880 operative to decide on redirecting data read requests in conjunction with memory disaggregation, further the prior distribution 881-*r*-1 is done via the switching network 880-SN and in conjunction with the first memory module 540-*m*1 so as to result in a distribution latency of between 5 (five) microseconds and 500 (five hundred) nanoseconds, which is fast enough to facilitate the memory disaggregation in the system 880. Further, the reception 882-red of the data set 712-D1 from one of the compute elements 880-*c*1 to which the data set was previously distributed 881-*r*-1 is associated with a latency that is lower than 500 (five hundred) nanoseconds, thereby boosting performance in conjunction with said memory disaggregation.

Figure 43:
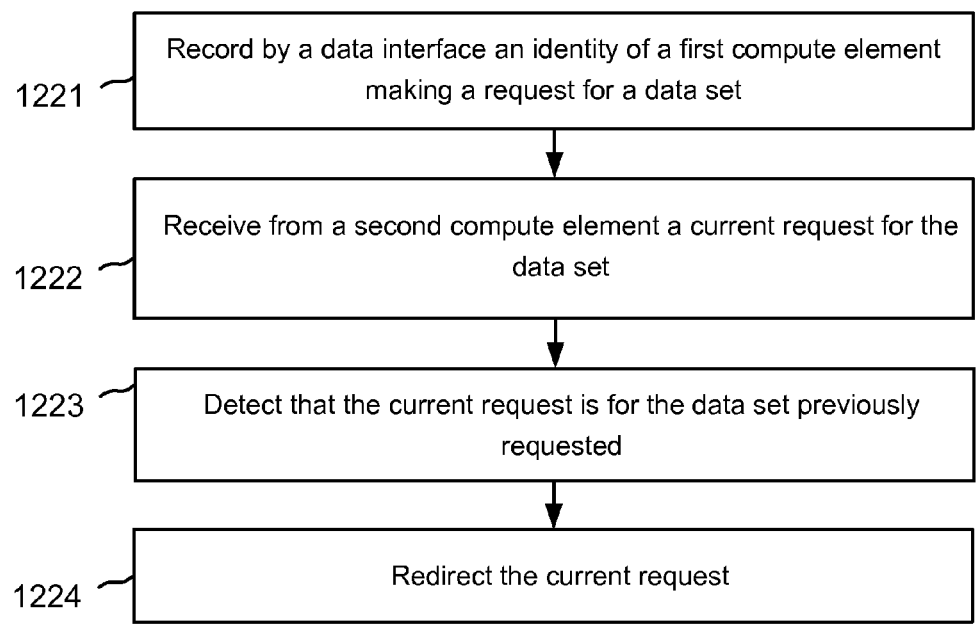
FIG. 43 illustrates one embodiment of a process for redirecting data read requests.

FIG. 43 illustrates one embodiment of a method for redirecting data read requests. In step 1221, the data registry 723-1 of a first data interface 523-1 associated with storage of a first data set 712-D1 in a memory module 540-*m*1, records an identity associated with a first compute element 880-*c*1 that has requested, and has received 881-*r*-1, the first data set 712-D1 from the first data interface 523-1, such that an association is made between the first compute element 880-*c*1 and the first data set 712-D1. In step 1222, the first data interface 523-1 receives, from a second compute element 880-*c*2, a current request to obtain the first data set 712-D1. In step 1223, the first data interface 523-1 detects, in conjunction with the current request, and based on the association made, that the second compute element 880-*c*2 is currently requesting the first data set 712-D1 that was previously requested by the first compute element 880-c1. In step 1224, based on said detection, the first data interface 523-1 causes the second compute element 880-c2, in conjunction with the current request, to receive 882-red the first data set 712-D1 from the first compute element 880-c1 or a cache thereof 880-c1-c, instead of receiving the first data set 712-D1 from said the data interface 523-1 or associated memory module 540-m1, thereby effectively redirecting the current request.

In a first possible alternative to the method just described for redirecting data read requests, further the causing is achieved by the first data interface 523-1 signaling to the second compute element 880-c2, that the first data set 712-D1 is located with the cache memory 880-c1-c of the first compute element 880-c1, thereby making the second compute element 880-c2 fetch the first data set 712-D1 from the first compute element 880-c1 or the cache 880-c1-c associated with the first compute element 880-c1.

In a possible configuration of the first possible alternative just described, further the first data interface 523-1 sends to the second compute element 880-c2, the identity associated with the first compute element 880-c1, thereby enabling the second compute element 880-c2 to communicatively locate the first compute element 880-c1 in conjunction with the fetching. Further, the identity is selected from a group consisting of: (i) an identifier or address of the first compute element 880-c1, (ii) an identifier or address of the cache 880-c1-c associated with the first compute element 880-c1, (iii) an address associated with a communication interface via which the first compute element or the cache thereof is accessed, and (iv) any sort of a pointer to the first compute element 880-c1 or its associated cache memory 880-c1-c.

In a second possible alternative to the method described for redirecting data read requests, further the causing is achieved by the first interface 523-1 instructing the first compute element 880-c1 to send the first data set 712-D1 from the first compute element 880-c1 or the cache thereof 880-c1-c to the second compute element 880-c2.

In a third possible alternative to the method described for redirecting data read requests, further the first data interface 523-1 is communicatively connected with the first compute element 880-c1 and the second compute element 880-c2 via a switching network 880-SN, such that the first compute element 880-c1 that has requested, and has received 881-r-1, the first data set 712-D1 from the first data interface 523-1, has done so via the switching network 880-SN, and also the sending of the current request by the second compute element 880-c2 is also done via the switching network 880-SN. However, the reception 882-red of the first data set 712-D1 by the second compute element 880-c2 from the first compute element 880-c1 or a cache thereof 880-c1-c is done without involving the switching network 880-SN, and the result is that (i) a load on the switching network 880-SN is reduced, or (ii) a latency associated with obtaining the first data set 712-D1 by the second compute element 880-c1 is reduced, or (iii) both a load on the switching network is reduced and a latency associated with obtaining the first data set by the second compute element is reduced.

In a first possible configuration of the third possible alternative just described, further the first data interface 523-1 and associated memory module 540-m1 are located in a first server 880-S-1, the first compute element 880-c1 and the second compute element 880-c2 are co-located in a second server 880-S-2, and the reception 882-red of the first data set 712-D1 by the second compute element 880-c2 from the first compute element 880-c1 or a cache thereof 880-c1-c is done via a data bus 880-sub belonging to the second server 880-S-2.

In a first possible variation of the first possible configuration just described, the first compute element 880-c1 and the second compute element 880-c2 are co-located on a second server 880-S-2 or on a single board which includes also the data bus 880-sub.

In a second possible variation of the first possible configuration just described, further the reception 882-red of the first data set 712-D1 by the second compute element 880-c2 from the first compute element 880-c1 or a cache thereof 880-c1-c is associated with a latency that is lower than 500 (five hundred) nanoseconds as facilitated by the data bus 880-sub and the co-location in the second server 880-S-2, thereby achieving the reduction in latency associated with obtaining the first data set 712-D1 by the second compute element 880-c2.

In a second possible configuration of the third possible alternative described above, further the reception of the first data set 712-D1 by the second compute element 880-c2 from the first compute element 880-c2 or a cache thereof 880-c1-c is done via another switching network 880-sub.

In a third possible configuration of the third possible alternative just described, further the first data interface 523-1 is associated with a first memory module 540-m1 that stores the first data set 712-D1, such that the receiving of the first data set 712-D1 from the first data interface 523-1 involves the first memory module 540-m1, in which the first memory module 540-m1 belongs to a shared memory pool 512. Further, the shared memory pool 512, in conjunction with the first switching network 880-SN and the two compute elements 880-c1, 880-c2, achieves memory disaggregation, in which the requesting and receiving 881-r-1 of the first data set 712-D1 from the first data interface 523-1 is done in less than 5 (five) microsecond, thereby facilitating said memory disaggregation. Further, the reception 882-red of the first data set 712-D1 by the second compute element 880-c2 from the first compute element 880-c1 or a cache thereof 880-c1-c is associated with a latency that is at least an order of magnitude lower than a latency associated with the requesting and receiving 881-r-1 of the first data set 712-D1 from the first data interface 523-1, thereby boosting performance in conjunction with the memory disaggregation.

In a fourth possible alternative to the method described for redirecting data read requests, further the data register 723-R1 of the first data interface 523-1 records, in conjunction with the identity recording, a first time stamp associated with receiving from the first compute element 880-c1 the request for the first data set 712-D1. Further, the first data interface 523-1 calculates a time difference between current time associated with the detection and the first time stamp. Further, the first data interface 523-1 proceeds with said causing the second compute element 880-c2 to receive the first data set 712-D1 from the first compute element 880-c1 or a cache thereof 880-c1-c, but only if the time difference is below a first threshold, thereby increasing probability of receiving 882-red, by the second compute element 880-c2, the first data set 712-D1 from the first compute element 880-c1 or the cache thereof 880-c1-c.

Described herein are systems and methods related to the creation and use of cached addresses for distributed key-value transactions in a data processing system. A first compute element holding a certain key requests a particular data value associated with that key, where the data value is held in a particular memory module or server. In one embodiment, the first compute element performs a hash function or other calculation, determines the specific data interface associated with the memory module or server holding the desired data value, and sends the request to that data interface. That data interface may then performs a second hash function or other calculation to determine address of the requested data value within the memory value or server, and then uses that address to access the data value, and convey a copy of the requested data value to the compute element. The conveyance includes not only the requested data value, but also the exact address within the memory module in which the data value is located. The compute element uses the data value to complete a particular data processing transaction. The compute element also places into its cache memory, or into another memory unit in close communication with the compute element, the exact address of the requested data value. If and when the compute element needs the requested data value again, the compute element will use the address and send a request for the data value to the data interface associated with the memory module or server holding the requested data value.

The use of the address may create one or more salutary effects. First, since the compute element has sent to the data interface the exact address of the requested data value, the data interface does not need to perform again a hash function or other calculation to obtain that address. Rather, the data interface may proceed directly to the address to access and receive the requested data value. This eliminates the need for a calculation, and therefore saves time. Second, the address cached by the compute element may include not only the address of the needed data value, but also the identity and location of the specific data interface associated with the memory module or server holding the data value. In this case, the compute element knows which data interface to contact, therefore the compute element does not perform a hash function or other calculation to determine the relevant data interface, therefore a calculation is avoided and time is saved. Third, both the first and second salutary effects are achieved. That is, the compute element has cached both the identity and location of the data interface associated with the memory module or server holding the data value, and the exact address of the data value within the memory module or server. Here two hash functions or other calculations are avoided next time the data value is needed, and hence additional time is saved and both salutary effects are achieved. In a data system with thousands of compute elements, corresponding numbers of data interfaces and memory modules, and far higher numbers of data values used in data processing transactions, the accumulated impact of the salutary effects can be substantial on the efficiency of the system. The caching of the exact address may be considered cooperative in the sense that the exact address is actually derived in one place (the data interface), while the caching thereof is performed in completely another place (the compute element). Further cooperation is achieved when the compute element sends the cooperatively cached exact address back to the data interface for directly accessing the data value. It is noted that the data interface itself does not need to cache the exact address, thereby allowing it to focus on actually accessing the data value.

There are many possible permutations of the various embodiments described, all of which are within the scope of, and included within, the invention described herein. For example, the unit holding the requested data value may be a memory module, a server, or any other structure. A multiplicity of memory modules or other such structures may be placed on a single or multiple servers. In some embodiments, all of the memory modules associated with a particular data interface are on a single server, although additional memory modules may also be placed on that server. The data interface itself may be on the same server as its associated memory modules, although in other embodiments the data interface is on a separate module from its associated memory modules. Each memory module may be random access memory unit, or a flash memory, or any other kind of specific memory structure. The location of a desired data value may be a physical address or a virtual address. Various embodiments described herein do not require that the data value be unchanged from one request by a compute element to a subsequent request—the data value may indeed be unchanged, but it may also be changed, and the access for the current transaction insures that the current transaction is using the most current data value. In some embodiments, a current transaction requiring the data value is a read transaction, in which the data interface reads the value and sends that value to the requesting compute element. In alternative embodiments, a current transaction is a write transaction, in which the data interface writes a new value into the data value stored in a memory module or server. In some embodiments, both read and write transactions are effected by the data processing system.

Figure 44:
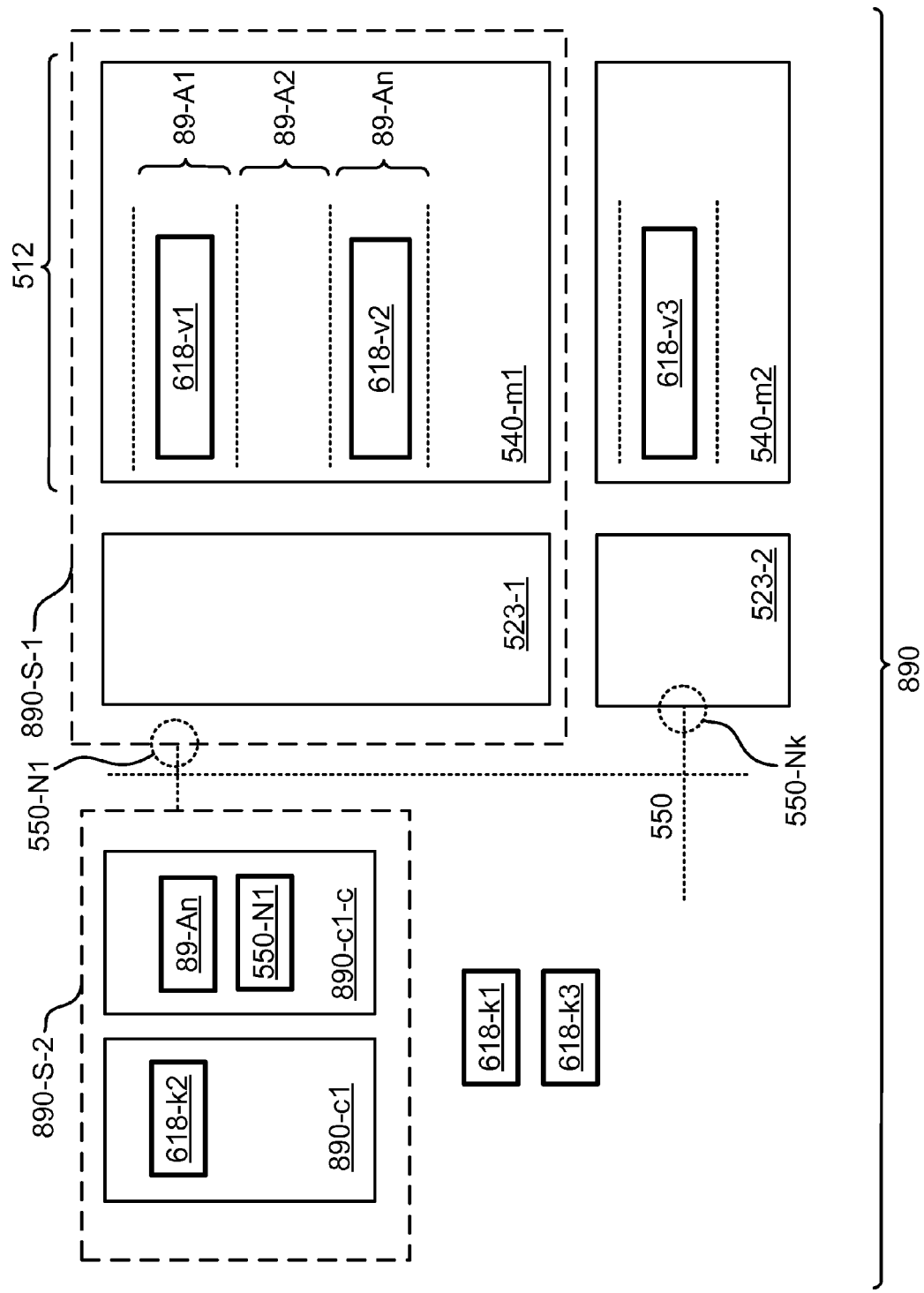
FIG. 44 illustrates one embodiment of a system operative to cooperatively cache addresses in conjunction with distributed key-value transactions.

FIG. 44 illustrates one embodiment of a system 890 to cooperatively cache addresses and access data in conjunction with distributed cache-value transactions. The system 890 includes a first compute element 890-*c*1, which holds in its memory or otherwise has access to a key 618-*k* 2 associated with a particular data value 618-*v*2. The data value 618-*v*2 is not held in the first compute element 890-*c*1, but rather in a memory module 540-*m*1 associated with a particular data interface 523-1. When the first compute element 890-*c*1 needs the data value 618-*v*2 for a particular data processing transaction, the first compute element 890-*c*1 uses the key 618-*k* 2 to derive the network address 550-N1 associated with the data interface 523-1 that is associated with the memory module 540-*m*1 holding the required data value 618-*v*2. After the data interface 523-1 receives the data request, it uses the key 618-*k* 2 to derive a random access address 89-An within the memory module 540-*m*1 that stores the data value 618-*v*2. The data interface 523-1 reads the value 618-*v*2 from the random access address 89-An, sends to the first compute element 890-*c*1 both the value 618-*v*2 and the random access address 89-An. After receiving the value 618-*v*2 and random access address 89-An, the first compute element 890-*c*1 uses the value 618-*v*2 in a current data processing transaction, and caches the network address 550-*n*1 and the random access address 89-An in a its cache memory 890-*c*1-*c* or otherwise. In a future transaction, the first compute element may use the network address 550-N1 and the random access address 89-An, to access the value 618-*v*2 directly, via the data interface 523-1.

In FIG. 44, there are several keys. Three are shown, 618-*k*1, 618-*k* 2, and 618-*k*3, but it is clear that there may any number of key higher than three. There are a number of data values associated with the keys. Shown are 618-*v*1 associated with 618-*k*1, 618-*v*2 associated with 618-*k* 2, and 618-*v*3 associated with 618-*k*3.

Each data value is located at a specific address. Shown are 618-*v*1 at 89-A1, 618-*v*2 at 89-An, and 618-*v*3 at a specific address that is not shown in FIG. 44. Also shown in FIG. 44 is address 89-A2, which currently is not filled with any data value, but which may later be filled with a new data value. The entire group of memory modules and associated random access addresses may constitute a shared memory pool, as shown in element 512 of FIG. 44. However, although all of the memory modules may be on a single server, that is optional—in other embodiments, the memory modules are not on one server. For example FIG. 44 shows memory module 540-$m1$ on a server 890-S-1, but memory module 540-$m2$ is not on server 890-S-1. This server, 890-S-1, may hold structures in addition to memory modules, as shown in FIG. 44, in which server 890-S-1 holds also the first data interface 523-1, which is associated with the first memory module 540-$m1$.

As shown in FIG. 44, there is a switching network 550 which includes a separate network address for each data interface or server, 550-N1 for first data interface 523-1 or server 890-S-1, 550-Nk for second data interface 523-2. Second data interface 523-2 is associated with memory module 540-$m2$ holding data value 618-$v3$, but, in the particular embodiment shown, neither the data interface 523-2 nor the memory module 540-$m2$ are on the first server 890-S-1. This server 890-S-1 is communicatively connected to the first compute element 890-$c1$ via the switching network 550, and particularly at the network address 550-N1. Shown in FIG. 44 is the first compute element 890-$c1$ and the first cache memory 890-$c1$-$c$ on a second server 890-S-2, which is separate from the first server 890-S-1 on which are placed the first data interface 523-1 with its associated memory module 540-$m1$. The second server 890-S-2 does not include any other keys 618-$k1$, 618-$k3$, or other compute elements, or any cache memories associated with compute elements, and it is one possible implementation. In alternative implementations, the second server 890-S-2 may hold additional compute elements, with or without keys, and with or without the cache memories associated with the additional compute elements.

One embodiment is a system 890 operative to cooperatively cache addresses in conjunction with distributed key-value transactions. In one particular form of such embodiment, the system includes a plurality of data interfaces 523-1, 523-2 associated respectively with a plurality of memory modules 540-$m1$, 540-$m2$, in which the memory modules store distributively a plurality of values 618-$v1$, 618-$v2$, 618-$v3$ associated respectively with a plurality of keys 618-$k1$, 618-$k\,2$, 618-$k3$. The system also includes a first compute element 890-$c1$ having access to one of the keys 618-$k\,2$ associated with one of the values 618-$v2$, and a switching network 550 configured to communicatively connect the first compute element 890-$c1$ with the plurality of data interfaces 523-1, 523-2. Further, the first compute element 890-$c1$ is configured to: (i) derive, using the key 618-$k\,2$, a network address 550-N1 associated with the data interface 523-1 and memory module 540-$m1$ storing the respective value 618-$v2$, and (ii) send to the data interface 523-1, using the network address derived 550-N1, a first request to receive the value 618-$v2$. Further, the data interface 523-1 is configured to receive the first request, derive using the key 618-$k\,2$ a random access address 89-An within the respective memory module 540-$m1$ that stores the respective value 618-$v2$, read the value 618-$v2$ from the random access address 89-An derived, and send back to the first compute element 890-$c1$ both the value 618-$v2$ read and the random access address 89-An derived. Further, the first compute element 890-$c1$ is configured to use the value 618-$v2$ at a present time, cache the network address 550-N1 together with the random access address 890-An, and in a future transaction access directly the value 618-$v2$ in the memory module 540-$m1$ using the network address 550-N1 together with the random access address 89-An cached.

In one embodiment, the direct accessing of the value 618-$v2$ in the memory module 540-$m1$ is facilitated through a direct-memory-access (DMA) procedure, thereby reducing involvement of the first compute element 890-$c1$ in conjunction with the future transaction. In one embodiment, the DMA procedure is a remote-direct-memory-access (RDMA) procedure.

In a first alternative embodiment to the system 890 operative to cooperatively cache addresses in conjunction with distributed key-value transactions, further the first compute element 890-$c1$ is also configured, in conjunction with the future transaction, to send, using the network address cached 550-N1, to the data interface 523-1, a second request either to receive again the value 618-$v2$ or to update the value, in which the second request also includes the random access address cached 89-An. Further, the data interface 523-1 is also configured to receive the random access address 89-An, and use the random access address received either to read again the value 618-$v2$ from the respective memory module 540-$m1$ and send the value 618-$v2$ again to the first compute element 890-$c1$, or to update the value 618-$v2$ in the respective memory module 540-$m1$.

In a possible configuration of the first alternative embodiment just described, the system further includes a first server 890-S-1 housing the data interface 523-1 and the memory module 540-$m1$, in which the network address 550-N1 is associated with the first server 890-S-1.

In a possible variation of the possible configuration just described, the data interface 523-1 is further configured to send back to the first compute element 890-$c1$ an identity of the memory module 540-$m1$ storing the value 618-$m1$. Further, the first compute element 890-$c1$ is also configured to (i) cache the identity of the memory module 540-$m1$, and (ii) include in the second request the identity of the memory module 540-$m1$ cached, thereby allowing the data interface 523-1 to locate the memory module 540-$m1$ within the first server 890-S-1.

In a second alternative embodiment to the system 890 operative to cooperatively cache addresses in conjunction with distributed key-value transactions, further the derivation of the network address 550-N1 by the first compute element 890-$c1$ is performed using a hash function or a hash table in conjunction with the key 618-$k\,2$.

In a third alternative embodiment to the system 890 operative to cooperatively cache addresses in conjunction with distributed key-value transactions, further the derivation of the random access address 89-An by the data interface 523-1 is performed using a hash function or a hash table in conjunction with the key 618-$k\,2$.

In a fourth alternative embodiment to the system 890 operative to cooperatively cache addresses in conjunction with distributed key-value transactions, further the first request includes the key 618-$k\,2$.

In a fifth alternative embodiment to the system 890 operative to cooperatively cache addresses in conjunction with distributed key-value transactions, further the random access address 89-An is a physical address.

In a sixth alternative embodiment to the system 890 operative to cooperatively cache addresses in conjunction with distributed key-value transactions, further the random access address 89-An is a virtual address.

In a seventh alternative embodiment to the system 890 operative to cooperatively cache addresses in conjunction with distributed key-value transactions, further the memory module 540-$m1$ is a random access memory.

In an eighth alternative embodiment to the system 890 operative to cooperatively cache addresses in conjunction with distributed key-value transactions, further the memory module 540-*m*1 is a flash memory.

Figure 45:
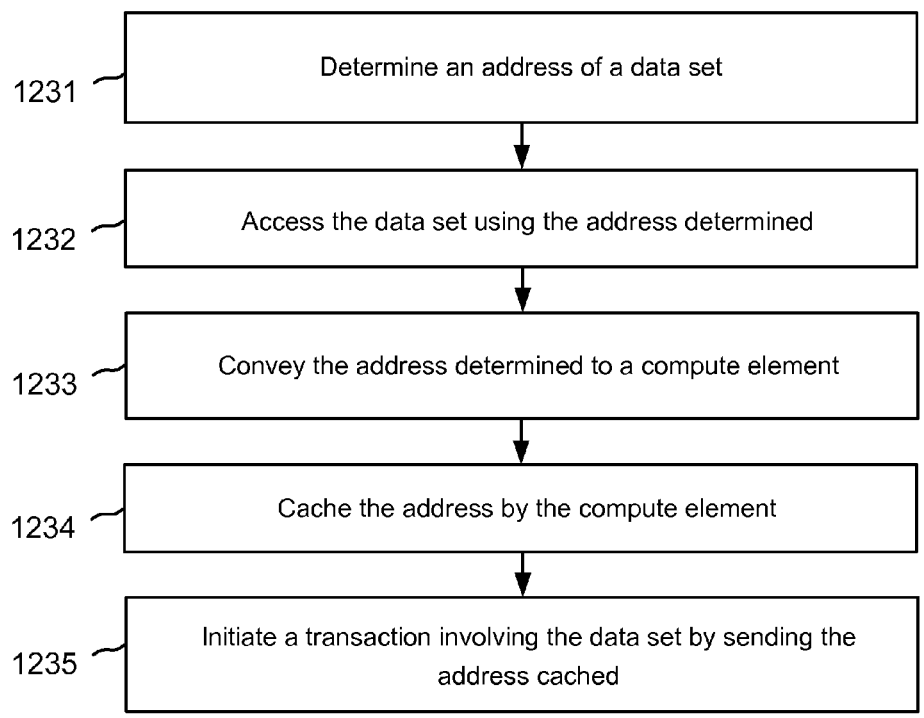
FIG. 45 illustrates one embodiment of a method for cooperatively caching addresses and accessing data.

FIG. 45 illustrates one embodiment of a method for cooperatively caching addresses and accessing data. In step 1231, a data interface 523-1 associated with a memory module 540-*m*1, determines an address 89-An in the memory module in which a certain data set 618-*v*2 is stored. In step 1232, the data interface 523-1, using the determined address 89-An, accesses the data set 618-*v*2, thereby facilitating a current transaction involving the data set 618-*v*2. In step 1233, the data interface 523-1 conveys to a first compute element 890-*c*1, the determined address 89-An. In step 1234, the first compute element 890-*c*1 caches the conveyed address 89-An. In step 1235, the first compute element 890-*c*1 initiates a second transaction involving the data set 618-*v*2, by sending to the data interface 523-1 a request comprising the cached address 89-An. The data interface 523-1 then uses the address 89-An to access directly the data set 618-*v*2 in the memory module 540-*m*1, thereby facilitating the second transaction.

In a first possible alternative to the method just described for cooperatively caching addresses and accessing data, further the data set 618-*v*2 is a value associated with a key 618-*k* 2, and the determination of the address 89-An is performed using a hash function or a hash table in conjunction with the key 618-*k* 2.

In a possible configuration of the first possible alternative just described, further the key 618-*k* 2 is sent to the data interface 523-1 by the first compute element 890-*c*1 in conjunction with a request to perform the current transaction.

In a possible variation of the possible configuration just described, further the request to perform the current transaction further comprises an indication of the type of transaction.

In a first possible option of the possible variation just described, further the type of transaction is a read transaction, thereby resulting in the data interface 523-1 reading the value 618-*v*2 using the address 89-An determined by the data interface, and sending the value 618-*v*2 to the first compute element 890-*c*1.

In a second possible option of the possible variation described above, further the type of transaction is a write transaction, in which the request to perform the current transaction further comprises a new value, thereby resulting in the data interface 523-1 writing the new value in the address 89-An determined by the data interface 523-1.

In a second possible alternative to the method described above for cooperatively caching addresses and accessing data, further the address 89-An is a physical random access address.

In a third possible alternative to the method described above for cooperatively caching addresses and accessing data, further the address 89-An is a virtual random access address.

In a fourth possible alternative to the method described above for cooperatively caching addresses and accessing data, further as a result of the request comprising the address 89-An cached, the data interface 523-1 does not need to determine again the address 89-An in conjunction with the second transaction, thereby facilitating the accessing directly of the data set 618-*v*2 in conjunction with the second transaction.

In a fifth possible alternative to the method described above for cooperatively caching addresses and accessing data, further the data interface 523-1 and the memory module 540-*m*1 are located in a first server 890-S-1, the first compute element 890-*c*1 is located in a second server 890-S-2, and the conveying and sending is facilitated by a switching network 550 communicatively connecting the first compute element 890-*c*1 with the data interface 523-1.

Described herein are systems and methods related to efficiently processing, according to a certain order, a plurality of data sets arranged in data blocks. In one embodiment, a first compute element is to process the data sets. The first compute element may or may not have any knowledge of the reason for the certain order, or the use to which the processed results will be put. The first compute element receives the order from a second compute element, a third compute element, or other compute elements. Each order may include the specific identities of the data sets to be processed and the order in which the sets will be processed. Alternatively, the order may include keys or pointers, in which each key or pointer is to be used by the first compute element to determine the data set or value associated with that key, in which the order of the keys conveyed to the first compute element is the order in which the associated data sets will be processed by the first compute element. In some embodiments, two or more orders will be sent to the first compute element, in which the multiple orders may be sent by a single compute element or by multiple compute elements, and in which the order of data sets or keys is either the same in the multiple orders or varied from one order to the next order.

The data sets to be processed by the first compute element may be initially stored in or generated by a first data source, which may be a memory module or a communication interface, and in which such data source may be by itself or may be part of a pool of other memory units. The data sets are held within the data source or accessed in blocks, according to a certain size of block.

The first compute element is configured to instruct a first data interface to obtain from the first data source a certain data block containing data sets, and to deliver the data block from the first data source to an intermediary medium, which may be a memory module, and which may or may not be part of a pool of other such memory units. The intermediary medium will store each data set of the data block at a particular address within the medium, possibly according to the original order at which the data sets are stored in the data block.

The first compute element is also configured to stream the plurality of data sets stored in the intermediary medium from the intermediary medium to a first cache memory associated with the first compute element. However, the streaming is not performed in the order in which the data sets are stored in the intermediary medium, but rather in the order in which the data sets are to be processed. Such order has been set in the streaming order that the first compute element received from a second, third, or other compute element.

In some embodiments, multiple orders are issued to the first compute element to execute multiple tasks using some or all of the data sets copied from the data block in the first data source.

It is understood that a reference to a next data set to be streamed to the cache memory and processed by the first compute element includes also embodiments in which another compute element provides keys, pointers, or addresses associated with the data sets. In such embodiments, the first compute element uses the keys, pointers, or addresses to calculate or otherwise determine the addresses of desired data sets to be streamed next according to the streaming order, in which the streaming order is manifested by the order in which the keys, pointes, or addresses are arranged.

Figure 46:
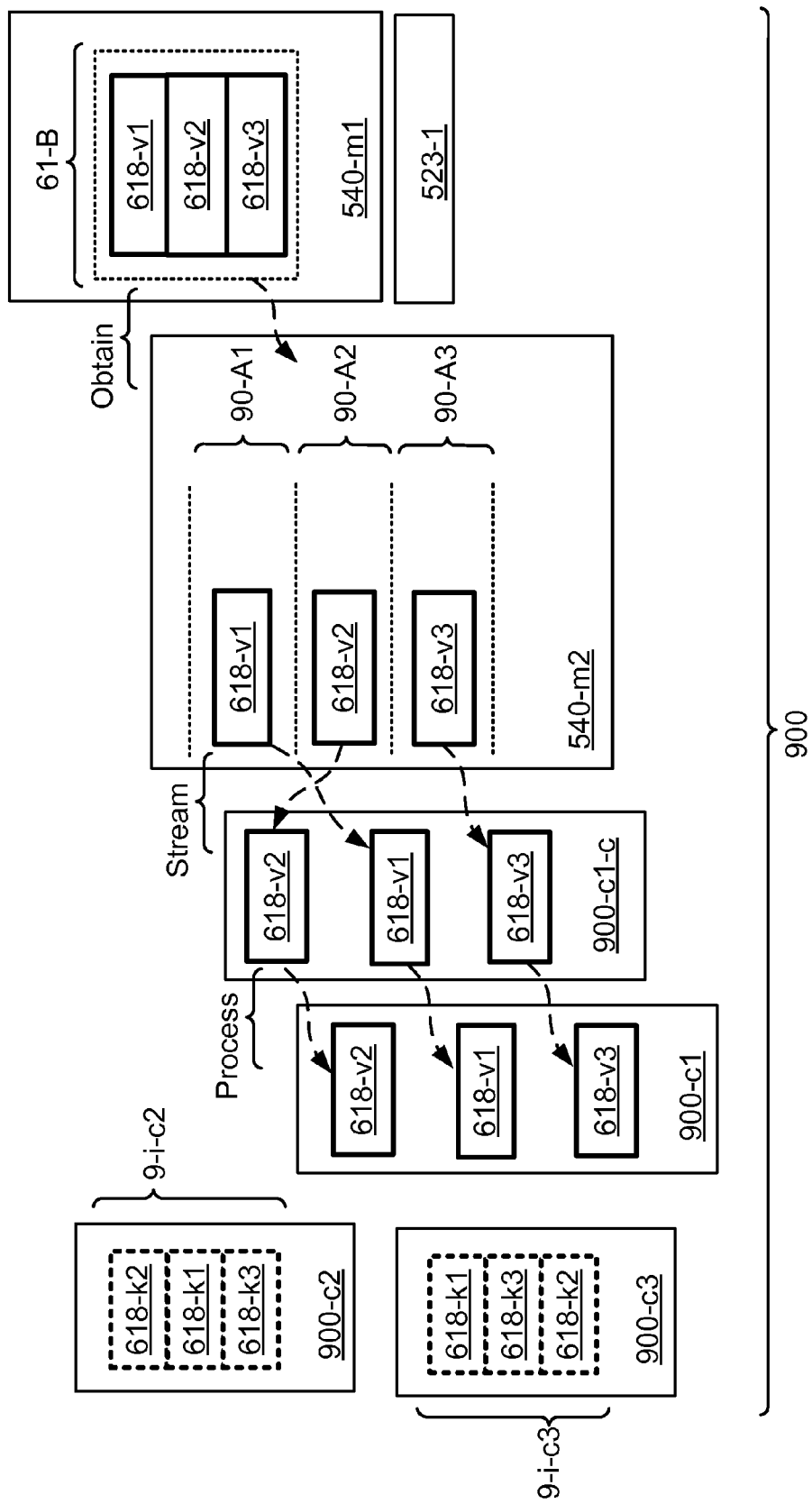
FIG. 46 illustrates one embodiment of a system operative to efficiently process, in a pre-determined particular order, a plurality of data sets arranged in data blocks.

FIG. 46 illustrates one embodiment of a system 900 operative to process efficiently, according to a certain order, a plurality of data sets arranged in data blocks. There is a first compute element 900-c1, with an associated cache memory 900-c1-c, that receives a first streaming order 9-i-c2 from a second compute element 900-c2. This first streaming order 9-i-c2 includes certain entries in a certain order, which may include the specific addresses of such data sets or, as shown in FIG. 46, keys 618-k 2, 618-k1, 618-k3 to the data sets 618-v1, 618-v2, 618-v3, which are used by the first compute element 900-c1 to determine the addresses of the data sets required to execute the processing task. The data sets 618-v1, 618-v2, 618-v3, are stored in a block 61-B within a first data source 540-m1, but they are not necessarily stored in the order in which they will be used to execute a processing task. There is a first data interface 523-1, which is instructed by the first compute element 900-c1 to obtain from the first data source 540-m1, and deliver to an intermediary medium 540-m2, a copy of each data block 61-B to be used in the processing task. The data sets 618-v1, 618-v2, 618-v3, are received by the intermediary memory 540-m2 in the order in which they were stored in the data block 6-B. Each data set is stored in the intermediary medium 540-m2 with its own address, 618-v1 with 90-A1, 618-v2 with 90-A2, 618-v3 with 90-A3, where such address may be a physical address or rather a virtual address permitting computation to determine the location of the desired data set. The first compute element 900-c1 causes the data sets 618-v1, 618-v2, 618-v3 to be streamed from the intermediary medium 540-m2 to the cache memory 900-c1-c, but the order of streaming is not as the data sets were stored in 540-m1 or 540-m2, but rather in the order in which they will be processed according to the first streaming order 9-i-c2 received by the first compute element 900-c1. As shown in FIG. 46, the order in which the data sets are streamed by the intermediary medium 540-m2 and received by the cache memory 900-c1-c is first 618-v2, then 618-v1, then 618-v3, in accordance with the order of key entries in the first streaming order 9-i-c2, first 618-k 2, then 618-k1, then 618-k3. As shown in FIG. 46, this same order is used to process the data sets in and by the first compute element 900-c1, first 618-v2, then 618-v1, then 618-v3. One result is that the data sets are received in the cache memory 900-c1-c just-in-time to be used to execute the first processing task. A second result is that the data sets are received by the first compute element 900-c1 and used for efficient execution of the first processing task by the first compute element 900-c1. In some embodiments, the data sets are processed by the first compute element 900-c1 immediately after they are received by the cache memory 900-c1-c, in which case it may be said that the data sets are received just-in-time by the first compute element 900-c1. In other embodiments, the processing of a particular data set may be delayed for some reason, but here, too, the order of the processing will be as determined in the first streaming order 9-i-c2.

There may be two, three, or any higher number of streaming orders. As shown in FIG. 46, a third compute element 900-c3 sends a second streaming order 9-i-c3 to the first compute element 900-c1. This second streaming order 9-i-c3 is received by the first compute element 900-c1 after the first compute element 900-c1 has received the first streaming order 9-i-c2. The second streaming order 9-i-c3 may be received by the first compute element 900-c1 either before or after the first compute element 900-c1 has finished processing the first streaming order, but in any case the second streaming order 9-i-c3 is processed only after the first compute element 900-c1 has finished processing the first streaming order 9-i-c2. Note that the order of data sets to be processed has changed. In the first streaming order 9-i-c2, the order was 618-v2, 618-v1, 618-v3, whereas in the second streaming order 9-i-c3 the order is 618-v1, 618-v3, 618-v2. When the first compute element 900-c1 processes the data sets according to the second streaming order 618-v1, 618-v3, 618-v2, the data sets in the intermediary medium may be reused, such that there is no need to re-copy the data block 61-B from the data source 540-m1 again into the intermediary medium 540-m2.

One embodiment is a system 900 operative to process efficiently, according to a certain order, a plurality of data sets arranged in data blocks. In one particular form of such embodiment, the system 900 includes a first compute element 900-c1 associated with a first cache memory 900-c1-c. The system 900 also includes a first data interface 523-1 associated with a first data source 540-m1 and configured to obtain data sets 618-v1, 618-v2, 618-v3 from the first data source 540-m1 in a form of data blocks 61-B, such that each of the data blocks obtained includes a plurality of data sets. The system 900 also includes an intermediary medium 540-m2 operative to store and access data, in which the intermediary medium is communicatively connected with the first cache memory 900-c1-c and the first data source 540-m1. Further, the first compute element 900-c1 is configured, in conjunction with a first processing task associated with the pluralities of data sets 618-v1, 618-v2, 618-v3, to instruct the first data interface 523-1 to obtain and deliver the data blocks 61-B from the first data source 540-m1 to the intermediary medium 540-m2. The first compute element 900-c1 is further configured to stream the pluralities of data sets 618-v1, 618-v2, 618-v3 from the intermediary medium 540-m2 to the first cache memory 900-c1-c according to a first streaming order 9-i-c2 associated with the first processing task, thereby facilitating (i) just-in-time availability of the data sets 618-v1, 618-v2, 618-v3 in the cache memory 900-c1-c, and therefore (ii) efficient execution of the first processing task by the first compute element 900-c1.

In a first alternative embodiment to the system 900 operative to process efficiently, according to a certain order, a plurality of data sets arranged in data blocks, also the first compute element 900-c1, in carrying out the streaming, is further configured to determine, according to the first streaming order 9-i-c2, an address 90-A2 within the intermediary medium 540-m2 that points to next one of the data sets 618-v2 for streaming, and to issue at least one pre-fetch instruction in conjunction with the address 90-A2 determined, consequently causing an update of the cache memory with the data set 618-v2.

In one possible configuration of the first alternative embodiment just described, further each of the pre-fetch instructions is operative to update one cache-line of the first cache memory 900-c1-c with data associated with the data set 618-v2.

In a first possible variation of the first possible configuration just described, further one cache line is 64 (sixty four) bytes in length.

In a second possible variation of the first possible configuration described above, the updating of the cache lines is done essentially without involvement of the first compute element 900-c1, thereby freeing the first compute element 900-c1 to perform the first processing task in conjunction with a previous one of the data sets already in the cache memory 900-c1-c. In this sense, "without involvement"

means that the first compute element 900-*c*1 is not involved in actually updating the content of cache line—this is done by hardware mechanisms associated with the cache memory. However, the first compute element 900-*c*1 may initiate the update by sending a pre-fetch instruction to the cache memory 900-*c*1-*c* in conjunction with the intermediary memory 540-*m*2 to update the cache line.

In a possible option of the second possible variation just described, the obtaining and delivering of the data blocks 61-B from the first data source 540-*m*1 to the intermediary medium 540-*m*2 is done essentially without involvement of the first compute element 900-*c*1, thereby further freeing the first compute element 900-*c*1 to perform the first processing task. Again, "without involvement" means that the first compute element 900-*c*1 is not involved in actually obtaining or delivering the content of the data block. However, the first compute element 900-*c*1 may initiate the obtaining or delivering by sending an instruction to the first data interface 523-1.

In a possible form of the possible option just described, further the obtaining and delivering of the data blocks 61-B from the first data source 540-*m*1 to the intermediary medium 540-*m*2 is done in conjunction with a direct-memory-access (DMA) procedure.

In a second alternative embodiment to the system 900, operative to process efficiently, according to a certain order, a plurality of data sets arranged in data blocks, further the first data source 540-*m*1 is a data source that is optimized at least in part to operate in conjunction with the data blocks 61-B having a certain size. In a possible configuration of the second alternative embodiment just described, further the first data source 540-*m*1 is selected form a group of data sources consisting of: (i) a flash memory, (ii) a network interface, (iii) a 3D-Xpoint non-volatile memory, (iv) a dynamic random access memory, (v) a magnetic disk, and (vi) any data source presenting any kind of advantage by accessing and delivering data in conjunction with data blocks having a certain size.

In a possible variation of the possible configuration just described, further the intermediary medium 540-*m*2 is any memory capable of accessing and delivering data using random-access memory transactions, thereby allowing a data granularity necessary to facilitate the streaming of the data sets 618-*v*1, 618-*v*2, 618-*v*3 having a certain size that is smaller than the size of the data block 61-B.

In a first possible option of the possible variation just described, further the intermediary medium 540-*m*2 is a dynamic random access memory.

In a second possible option of the possible variation described above, further the intermediary medium 540-*m*2 is a memory module.

Figure 47:
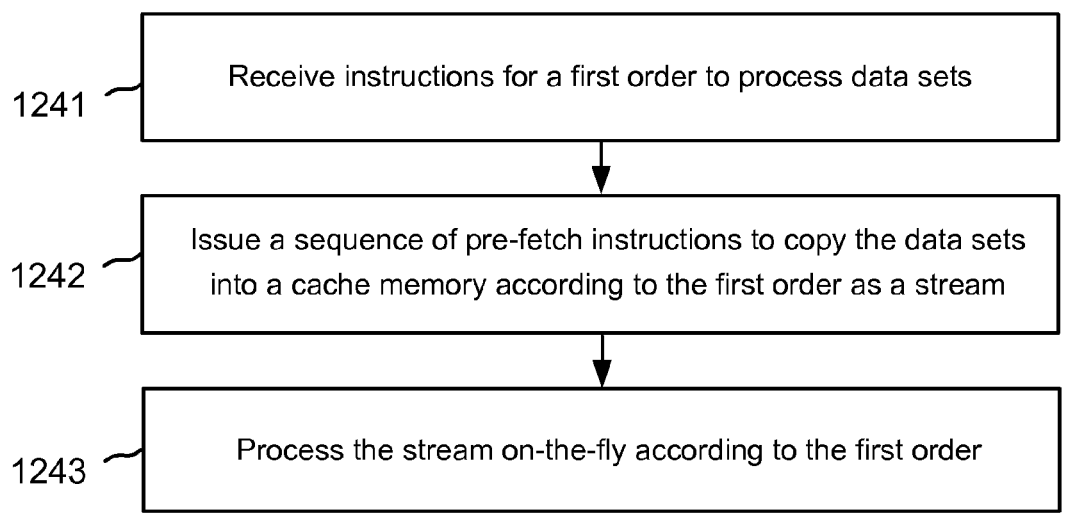
FIG. 47 illustrates one embodiment of a method for efficiently processing a plurality of data sets according to an instructed order.

FIG. 47 illustrates one embodiment of a method for efficiently processing a plurality of data sets according to an instructed order. In step 1241, a first compute element 900-*c*1 receives a first set of instructions 9-*i*-c2 operative to determine a first order (for example, first 618-*k* 2, then 618-*k*1, then 618-*k*3) in which a plurality of data sets 618-*v*1, 618-*v*2, 618-*v*3, which are stored respectively in a plurality of addresses 90-A1, 90-A2, 90-A3 in a memory module 540-*m*2, are to be processed in conjunction with a first processing task. In step 1242, the first compute element 900-*c*1 issues a first sequence of pre-fetch instructions, in which each pre-fetch instruction is operative to copy one of the data sets 618-*v*2 from the corresponding address 90-A2 in the memory module 540-*m*2 into a cache memory 900-*c*1-*c* associated with the first compute element 900-*c*1, in which the first sequence of pre-fetch instructions is issued according to the first streaming order 9-*i*-c2, thereby causing the plurality of data sets to stream into the cache memory 900-*c*1-*c* according to the first order, first 618-*v*2, then 618-*v*1, then 618-*v*3. In step 1243, the first compute element 900-*c*1 processes the plurality of data sets 618-*v*1, 618-*v*2, 618-*v*3 streaming into the cache memory 900-*c*10*c*, according to the first streaming order 9-*i*-c2 (that is, 618-*v*2 first, then 618-*v*1, and then 618-*v*3), and on-the-fly as the stream enters the cache memory 900-*c*1-*c* according to the first streaming order 9-*i*-c2, thereby efficiently executing the first processing task.

In a first possible alternative to the method just described for processing efficiently, according to an instructed order, a plurality of data sets, further the first compute element 900-*c*1 receives a second set of instructions 9-*i*-c3 operative to determine a second order (for example, first 618-*k*1, then 618-*k*3, then 618-*k* 2) in which the same plurality of data sets 618-*v*1, 618-*v*2, 618-*v*3 are to be processed in conjunction with a second processing task. Further, the first compute element 900-*c*1 issues a second sequence of pre-fetch instructions, in which each of the pre-fetch instructions is operative to copy one of the data sets from the corresponding address in the memory module into the cache memory, in which the second sequence is issued according to the second order (that is, first 618-*v*1, then 618-*v*3, then 618-*v*2), thereby causing the same plurality of data sets to stream again into the cache memory 900-*c*1-*c*, but now according to the second streaming order 9-*i*-c3. Further the first compute element 900-*c*1 again processes the plurality of data sets 618-*v*1, 618-*v*2, 618-*v*3 streaming into the cache memory 900-*c*1-*c*, but now according to the second streaming order 9-*i*-c3 (that is, first 618-*v*1, then 618-*v*3, then 618-*v*2), and on-the-fly as the stream enters the cache memory 900-*c*1-*c* according to the second streaming order 9-*i*-c3, thereby efficiently executing the second processing task.

In a second possible alternative to the method described above for processing efficiently, according to an instructed order, a plurality of data sets, further the first set of instructions 9-*i*-c2 is received from a second compute element 900-*c*2, in which the first streaming order 9-*i*-c2 is determined by the second compute element 900-*c*2 according to the first processing task that is under management of the second compute element 900-*c*2.

In a first possible configuration of the first possible alternative just described, further the first compute element 900-*c*1 sends, to the second compute element 900-*c*2, a result of the first processing task.

In a second possible configuration of the first possible alternative described above, further the second set of instructions 9-*i*-3 is received from a third compute element 900-*c*3, in which the second streaming order 9-*i*-c3 is determined by the third compute element 900-*c*3 according to the second processing task that is under management of the third compute element 900-*c*3.

In one possible variation of the second possible configuration just described, further the first compute element 900-*c*1 sends, to the third compute element 900-*c*3, a result of the second processing task.

In a third possible alternative to the method described above for processing efficiently, according to an instructed order, a plurality of data sets, further the plurality of data sets 618-*v*1, 618-*v*2, 618-*v*3 are a plurality of values associated respectively with a plurality of keys 618-*k*1, 618-*k* 2, 618-*k*3. Also, the first set of instructions 9-*i*-c2 is in a form of a list of the keys arranged in the first streaming order 9-*i*-c2.

In one possible configuration of the third possible alternative just described, further the first compute element 900-c1 derives, using the plurality of keys 618-k1, 618-k2, 618-k3 in the list, respectively, the plurality of addresses 90-A1, 90-A2, 90-A3 in the memory module 540-m2 associated, respectively, with the plurality of values 618-v1, 618-v2, 618-v3.

In one possible variation of the possible configuration just described, further the plurality of addresses derived 90-A1, 90-A2, 90-A3 is kept in the list, or in another list, in the order of the first streaming order 9-i-c2 (that is, 90-A2, then 90-A1, and then 90-A3). Further, the first compute element 900-c1 includes, in each of the first sequence of pre-fetch instructions, one of the addresses, according to the order of appearance of the addresses in the list.

In one possible option of the possible variation just described, further the list or the another list is stored in the first memory module 540-m2 or in the cache memory 900-c1-c. Further, the first compute element 900-c1 reads the addresses in the list or the another list, according to the order of the first streaming order 9-i-c2 (that is, 90-A2, then 90-A1, and then 90-A3) in which the addresses appear in the list or in the another list. Further, the first compute element 900-c1 produces the stream of data sets by issuing, with and as part of each of the pre-fetch instructions in the first sequence of pre-fetch instructions, one of the addresses read according to the order of the first streaming order 9-i-c3.

In a fourth possible alternative to the method described above for processing efficiently, according to an instructed order, a plurality of data sets, further the first set of instructions 9-i-c2 is in a form of a list of the plurality of addresses arranged in the order of the first streaming order 9-i.c2 (that is, 90-A2, then 90-A1, and then 90-A3). Further the first compute element 900-c1 reads the addresses in the list according to the first order in which the addresses appear in the list (that is, 90-A2, then 90-A1, and then 90-A3). Further, the first compute element 900-c1 produces the stream of data sets by issuing, with and as part of each of the pre-fetch instructions in the first sequence of pre-fetch instructions, one of the addresses read according to the order of the first streaming order 9-i-c3.

In one possible configuration of the fourth possible alternative just described, further the plurality of data sets 618-v1, 618-v2, 618-v3 are a plurality of values associated respectively with a plurality of keys 618-k1, 618-k2, 618-k3. Further, before the first compute element 900-c1 receives the first set of instructions 9-i-c2, the first compute element 900-c1 uses the plurality of keys 618-k1, 618-k2, 618-k3, to derive, respectively, the plurality of addresses 90-A1, 90-A2, 90-A3 in the memory module 540-m2 associated respectively with the plurality of values 618-v1, 618-v2, 618-v3. Further, also before the first compute element 900-c1 receives the first set of instructions 9-i-c2, the first compute element 900-c1 conveys the plurality of addresses derived 90-A1, 90-A2, 90-A3 to a second compute element 900-c2. Further, before the streaming of data sets to the cache memory 900-c1-c, the first compute element 900-c1 receives from the second compute element 900-c2 the plurality of addresses conveyed 90-A1, 90-A2, 90-A3, in a form of a list ordered according to the order in the first streaming order 9-i-c2 (that is, 90-A2, then 90-A1, then 90-A3) determined by the second compute element 900-c2, in which the list constitutes the first set of instructions 9-i-c2 from the second compute element 900-c2 to the first compute element 900-c1.

In a fifth possible alternative to the method described above for processing efficiently, according to an instructed order, a plurality of data sets, further each of the pre-fetch instructions from the first compute element 900-c1 is operative to update one cache-line of the cache memory 900-c1-c with the corresponding data set.

In a sixth possible alternative to the method described above for processing efficiently, according to an instructed order, a plurality of data sets, further each of the pre-fetch instructions from the first compute element 900-c1 is a sequence of several sub-instructions, where each sub-instruction is operative to update one cache-line of the cache memory 900-c1-c, and in which the several sub-instructions are operative together to update one of the data sets in the cache memory 900-c1-c, and further in which the data set that is the subject of the several sub-sections is bigger than one cache-line of the cache memory 900-c1-c.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagram illustrates non-limiting embodiment/case example of the methods, and block diagrams illustrate non-limiting embodiment/case examples of the devices. Some operations in the flow diagram may be described with reference to the embodiments/cases illustrated by the block diagrams. However, the method of the flow diagram could be performed by embodiments/cases of the invention other than those discussed with reference to the block diagrams, and embodiments/cases discussed with reference to the block diagrams could perform operations different from those discussed with reference to the flow diagram. Moreover, although the flow diagram may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, a system may include multiple compute elements, each of which is communicatively connected to multiple servers, even though specific illustrations presented herein include only one compute element or a maximum of two compute elements.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for redirecting data read requests, comprising:
    recording, by a first data interface associated with storage of a first data set in a memory module, an identity associated with a first compute element that has requested, and has received, said first data set from the first data interface, such that an association is made between said first compute element and the first data set;
    receiving, from a second compute element, in the first data interface, a current request to obtain said first data set;
    detecting, by said first data interface, in conjunction with the current request, and based on the association made, that the second compute element is currently requesting the first data set that was previously requested by the first compute element; and,
    based on said detection, causing the second compute element, by the first data interface, in conjunction with the current request, to receive the first data set from the first compute element or a cache thereof instead of receiving said first data set from said first data interface or associated memory module, thereby effectively redirecting the current request.

2. The method of claim 1, wherein said causing is achieved by signaling, by the first data interface, to the second compute element, that the first data set is located with the first compute element, thereby making the second compute element fetch the first data set from the first compute element or the cache thereof.

3. The method of claim 2, wherein said signaling comprises:
    sending, by the first data interface, to the second compute element, said identity associated with the first compute element, thereby enabling the second compute element to communicatively locate the first compute element in conjunction with said fetching,
    in which said identity is selected from a group consisting of: (i) an identifier or address of the first compute element, (ii) an identifier or address of the cache associated with the first compute element, (iii) an address associated with a communication interface via which the first compute element or the cache thereof is accessed, and (iv) any sort of a pointer to the first compute element or the cache thereof.

4. The method of claim 1, wherein said causing is achieved by instructing the first compute element, by the first data interface, to send the first data set from the first compute element or the cache thereof to the second compute element.

5. The method of claim 1, wherein:
    the first data interface is communicatively connected with the first compute element and the second compute element via a switching network, such that:
    the first compute element that has requested, and has received, the first data set from the first data interface, has done so via the switching network;
    said sending of the current request by the second compute element is also done via the switching network; but
    the reception of the first data set by the second compute element from the first compute element or a cache thereof is done without involving the switching network, thereby either (i) reducing a load on the switching network, or (ii) reducing a latency associated with obtaining the first data set by the second compute element, or (iii) both reducing a load on the switching network and reducing a latency associated with obtaining the first data set by the second compute element.

6. The method of claim 5, wherein:
    the first data interface and associated memory module are located in a first server;
    the first compute element and the second compute element are co-located in a second server; and
    the reception of the first data set by the second compute element from the first compute element or a cache thereof is done via a data bus belonging to the second server.

7. The method of claim 6, wherein the first compute element and the second compute element are co-located on a single board comprising the data bus.

8. The method of claim 6, wherein the reception of the first data set by the second compute element from the first compute element or a cache thereof is associated with a latency that is lower than 500 (five hundred) nanoseconds as facilitated by the data bus and said co-location in the second server, thereby achieving said reduction in latency associated with obtaining the first data set by the second compute element.

9. The method of claim 5, wherein the reception of the first data set by the second compute element from the first compute element or a cache thereof is done via another switching network.

10. The method of claim 5, wherein:
    the first data interface is associated with a first memory module that stores the first data set, such that said receiving of the first data set from the first data interface involves the first memory module, in which said first memory module belongs to a shared memory pool;
    the shared memory pool in conjunction with the first switching network and the two compute elements achieve memory disaggregation, in which said requesting and receiving of the first data set from the first data interface is done in less than 5 (five) microsecond, thereby facilitating said memory disaggregation; and
    the reception of the first data set by the second compute element from the first compute element or a cache thereof is associated with a latency that is at least an order of magnitude lower than a latency associated with said requesting and receiving of the first data set from the first data interface, thereby boosting performance in conjunction with said memory disaggregation.

11. The method of claim 1, further comprising:
- recording, by the first data interface, in conjunction with said identity recording, a first time stamp associated with receiving from the first compute element the request for the first data set;
- calculating, by the first data interface, a time difference between current time associated with said detection and the first time stamp; and
- proceeding, by the first data interface, with said causing the second compute element to receive the first data set from the first compute element or a cache thereof, but only if said time difference is below a first threshold, thereby increasing probability of receiving, by the second compute element, the first data set from the first compute element or the cache thereof.

12. A system operative to decide on redirecting data read requests in conjunction with memory disaggregation, comprising:
- a plurality of compute elements;
- a first data interface associated with a first memory module storing a plurality of data sets, in which the first memory module belongs to a shared memory pool operative to achieve, in conjunction with the plurality of compute elements, memory disaggregation in the system; and
- a registry associated with the first data interface, wherein:
- the first data interface is configured to record, in the registry, information associated with prior distribution of any of the data sets to any of the compute elements in conjunction with operation of the memory disaggregation; and
- the first data interface is further configured to:
- receive from one of the compute elements a current request for one of the data sets; and
- decide, based at least in part on the information recorded, whether to (i) respond to said current request by transporting, in conjunction with said memory disaggregation, the data set from the first memory module to the compute element making the current request, or (ii) respond to said current request by causing the compute element making the current request to receive the data set from one of the compute elements to which the data set was previously distributed, thereby boosting performance of the memory disaggregation.

13. The system of claim 12, wherein the information recorded comprises a list of the data sets that were previously distributed to any of the compute elements, in which the decision to receive the data set from one of the compute elements is made when the data set currently requested is in the list.

14. The system of claim 13, wherein the information recorded further comprises, per each data set in the list, at least a first identity associated with one of the compute elements to which the data set was previously distributed, in which said first identity is used to communicatively locate the compute elements to which the data set was previously distributed, thereby facilitating said causing of the compute element making the current request to receive the data set from one of the compute elements to which the data set was previously distributed.

15. The system of claim 14, further comprising:
- a switching network configured to communicatively interconnect the plurality of compute elements and the first data interface,
- wherein said decision is further based on an estimation of the system to whether receiving the data set from one of the compute elements via the switching network is communicatively preferable over transporting the data set via the switching network from the first memory module to the compute element making the current request.

16. The system of claim 15, wherein the switching network comprises:
- a switching network communicatively interconnecting the plurality of compute elements and the first data interface; and
- a communication sub-system communicatively connecting the compute element making the current request with one of the compute elements to which the data set was previously distributed,
- in which the receiving of the data set from one of the compute elements is done via the communication sub-system, and is communicatively preferable as a result of a loading condition associated with the switching network.

17. The system of claim 16, wherein the communication sub-system is a data bus.

18. The system of claim 16, wherein the communication sub-system is another switching network.

19. The system of claim 13, wherein the compute element to which the data set was previously distributed is configured to:
- store locally the data set in an associated cache until such time that the data set is erased from the cache; and consequently
- indicate to the first data interface that the data set in no longer stored in the cache, thereby causing the first data interface to adjust the list in the registry accordingly, such that any future request for the data set will be served from the first memory module.

20. The system of claim 12, further comprising a switching network, wherein:
- said prior distribution is done via the switching network and in conjunction with the first memory module so as to result in a distribution latency of between 5 (five) microseconds and 500 (five hundred) nanoseconds, which is fast enough to facilitate the memory disaggregation in the system; and
- the reception of the data set from one of the compute elements to which the data set was previously distributed is associated with a latency that is lower than 500 (five hundred) nanoseconds, thereby boosting performance in conjunction with said memory disaggregation.

21. A system operative to produce a two-tier distributed memory, comprising:
- a plurality of compute elements associated respectively with a plurality of cache memories;
- a plurality of data interfaces associated respectively with a plurality of memory modules storing distributively a plurality of data sets; and
- a switching network configured to communicatively interconnect the plurality of compute elements and the plurality of data interfaces, wherein:
- each of the compute elements is configured to request and receive from any of the data interfaces, via the switching network, at least one of the data sets stored in the associated memory module, thereby creating, in conjunction with the plurality of cache memories, a distributed copy of at least some of the data sets; and each of the data interfaces is configured to:
record, in conjunction with said requests for the data sets made therewith, an identity of the compute element which made the request; and
redirect any current request for one of the data sets to one of the compute elements whose identity has been recorded,
thereby producing a two-tier distributed memory, in which one tier is associated with the plurality of memory modules, and a second tier is associated with the plurality of cache memories.

22. The system of claim 21, wherein each of the compute elements currently caching a data set is configured to:
store locally the data set in the respective cache memory until such time that the data set is erased from the cache memory; and consequently
indicate to the appropriate data interface that the data set is no longer stored in the cache memory, thereby causing the appropriate data interface to remove the identity of the compute element from the record, such that any future request for the data set will be served from the respective memory module.

23. The system of claim 21, wherein each redirected request is served from the cache memory associated with the compute element receiving the redirection.

24. The system of claim 21, wherein the two-tier distributed memory is operative to produce memory disaggregation in the system.

25. The system of claim 21, wherein said redirection is done provided that a first condition has been met, in which said first condition is selected from a group consisting of: (i) a condition in which, according to a topology associated with the switching network, serving the current request, via the switching network, from one of the compute elements whose identity has been recorded, will result in a latency that is lower than a latency associated with serving the current request, via the switching network, from the appropriate data interface, and (ii) a condition in which the appropriate data interface is overloaded.

* * * * *